US012015732B2

(12) United States Patent
Wilson et al.

(10) Patent No.: US 12,015,732 B2
(45) Date of Patent: Jun. 18, 2024

(54) DEVICE, METHOD, AND GRAPHICAL USER INTERFACE FOR UPDATING A BACKGROUND FOR HOME AND WAKE SCREEN USER INTERFACES

(71) Applicant: Apple Inc., Cupertino, CA (US)

(72) Inventors: Christopher I. Wilson, San Francisco, CA (US); Pedro Mari, Santa Cruz, CA (US); Richard D. Lyons, San Francisco, CA (US); Teofila Connor, San Francisco, CA (US); Giancarlo Yerkes, Menlo Park, CA (US); Gregory Apodaca, Saratoga, CA (US); Vitalii Kramar, Mountain View, CA (US); Gregg S. Suzuki, Daly City, CA (US); Robert Garcia, III, San Francisco, CA (US); Philip A. Ward, Los Gatos, CA (US); Stephen O. Lemay, Palo Alto, CA (US); Andre Souza Dos Santos, San Jose, CA (US); Cas G. Lemmens, San Francisco, CA (US); Alan Dye, San Francisco, CA (US); Bilal S. Sayed Ahmad, Cupertino, CA (US); Jussi-Pekka Mantere, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 181 days.

(21) Appl. No.: 17/612,903

(22) PCT Filed: May 21, 2020

(86) PCT No.: PCT/US2020/033997
§ 371 (c)(1),
(2) Date: Nov. 19, 2021

(87) PCT Pub. No.: WO2020/242882
PCT Pub. Date: Dec. 3, 2020

(65) Prior Publication Data
US 2022/0174145 A1 Jun. 2, 2022

Related U.S. Application Data

(60) Provisional application No. 63/023,102, filed on May 11, 2020, provisional application No. 62/855,729, filed on May 31, 2019.

(51) Int. Cl.
*G06F 3/048* (2013.01)
*G06F 3/0481* (2022.01)
(Continued)

(52) U.S. Cl.
CPC ...... *H04M 1/72427* (2021.01); *G06F 3/0482* (2013.01); *G06F 3/04845* (2013.01); *H04M 1/724634* (2022.02); *H04M 1/72469* (2021.01)

(58) Field of Classification Search
None
See application file for complete search history.

(56) References Cited

U.S. PATENT DOCUMENTS

| | | | | |
|---|---|---|---|---|
| 8,584,043 B2* | 11/2013 | Cho | ...................... | G06F 3/0488 715/814 |
| 9,189,193 B2* | 11/2015 | Kim | ...................... | G06F 3/1253 |

(Continued)

FOREIGN PATENT DOCUMENTS

| | | |
|---|---|---|
| EP | 3503515 A1 | 6/2019 |
| WO | 2018034396 A1 | 2/2018 |

OTHER PUBLICATIONS

PCT International Search Report and Written Opinion dated Sep. 23, 2020, PCT International Application No. PCT/US2020/033997, pp. 1-21.

(Continued)

*Primary Examiner* — Tuan A Tran
(74) *Attorney, Agent, or Firm* — Fernando & Partners, LLP

(57) ABSTRACT

A method includes: while displaying a wake screen with a first media item as a background and foreground objects displayed over the first media item, detecting first user input (Continued)

that corresponds to a request to display a media gallery; in response to detecting the first user input, ceasing display of the foreground objects; detecting a second user input that corresponds to a request to navigate through media items in the media gallery; in response to detecting the second user input, replacing the first media item with a second media item in the media gallery; detecting a third input that corresponds to a request to dismiss the media gallery; and, in response to detecting the third user input, redisplaying the foreground objects on the display device over a media item from the media gallery that is selected as the background for the wake screen.

21 Claims, 69 Drawing Sheets

(51) Int. Cl.
　　*G06F 3/0482*　　　(2013.01)
　　*G06F 3/0484*　　　(2022.01)
　　*G06F 3/04845*　　(2022.01)
　　*H04M 1/72427*　　(2021.01)
　　*H04M 1/72463*　　(2021.01)
　　*H04M 1/72469*　　(2021.01)

(56) References Cited

U.S. PATENT DOCUMENTS

| | | | | |
|---|---|---|---|---|
| 9,489,050 | B2 * | 11/2016 | Hua | G06F 3/017 |
| 9,547,432 | B2 * | 1/2017 | Lee | H04M 1/724 |
| 9,912,795 | B2 * | 3/2018 | Soundararajan | H04M 1/67 |
| 9,952,756 | B2 * | 4/2018 | Conn | G06F 3/04847 |
| 10,015,301 | B1 * | 7/2018 | Soundararajan | H04M 1/67 |
| 10,114,534 | B2 * | 10/2018 | Kasterstein | G06F 3/04847 |
| 10,157,455 | B2 * | 12/2018 | Jeong | G06T 11/60 |
| 10,241,737 | B2 * | 3/2019 | Choi | H04M 1/72412 |
| 10,409,476 | B2 * | 9/2019 | Choi | G06F 3/04845 |
| 10,733,716 | B2 * | 8/2020 | Jeong | G06T 3/40 |
| 10,834,246 | B2 * | 11/2020 | Soundararajan | H04M 1/67 |
| 10,884,536 | B2 * | 1/2021 | Lee | H04M 1/724 |
| 10,924,600 | B2 * | 2/2021 | Soundararajan | H04M 1/72403 |
| 11,435,894 | B2 * | 9/2022 | Tyler | G06F 3/04817 |
| 11,470,193 | B2 * | 10/2022 | Soundararajan | H04M 1/67 |
| 11,489,803 | B2 * | 11/2022 | Dascola | G06F 3/048 |
| 11,502,984 | B2 * | 11/2022 | Dascola | G06F 3/04883 |
| 11,567,654 | B2 * | 1/2023 | Tyler | H04M 1/673 |
| 11,695,862 | B2 * | 7/2023 | Soundararajan | H04M 1/67 455/414.1 |
| 11,706,329 | B2 * | 7/2023 | Soundararajan | H04M 1/72403 455/414.1 |
| 2013/0305189 | A1 | 11/2013 | Kim | |
| 2015/0205498 | A1 * | 7/2015 | Levi | G06F 3/04842 715/763 |
| 2015/0205505 | A1 | 7/2015 | Conn et al. | |

OTHER PUBLICATIONS

Brad Miser, "My iPhone for Seniors," Pearson Education, 2014, Retrieved from the Internet: https://ptgmedia.pearsoncmg.com/images/9780789753618/samplepages/9780789753618.pdf, pp. 1-127.
Samsung, "Samsung Galaxy Note Edge User Manual," 2014, Retrieved from the Internet: https://downloadcenter.samsung.com/content/UM/201411/20141119095937622/SM-N915_UM_AUS_Kitkat_Eng_Rev.1.1_141118.pdf, pp. 1-196.

* cited by examiner

800

802 — While displaying a wake screen user interface on the display that includes a first media item that is being used as a background for the wake screen user interface and one or more foreground user interface objects that are displayed over the first media item, detect, via the one or more input devices, a first user input that corresponds to a request to display a media gallery user interface

804 — In response to detecting the first user input:
  Determine whether or not the device is unlocked;
  In accordance with a determination that the device is locked, maintain display of the wake screen user interface on the display and forego display of the media gallery user interface; and
  In accordance with a determination that the device is locked, replace display of the wake screen user interface with the media gallery user interface on the display

806 — In response to detecting the first user input, cease display of the one or more foreground user interface objects from the wake screen user interface and display, on the display, the media gallery interface

808 — The media items in the media gallery user interface includes a plurality of media items previously selected by a user of the device, wherein the plurality of media items includes the first media item and the second media item

810 — The media items in the media gallery user interface includes a plurality of media items populated based on media selection criteria, wherein the plurality of media items includes the first media item and the second media item (A)

Figure 8A

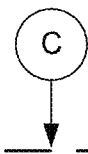

```
┌─ ─ ─ ─ ─ ─ ─ ─ ─ ─ ─ ─ ─ ─ ─ ─ ─ ─ ─ ─ ┐
│      Detect, via the one or more input devices, a fourth user input that
│  corresponds to selecting a respective user interface object from the one or ├─ 830
│  more foreground user interface objects; and
│      In response to detecting the fourth user input, perform an operation that
│  corresponds to the respective user interface object without displaying the
│  media gallery user interface
└─ ─ ─ ─ ─ ─ ─ ─ ─ ─ ─ ─ ─ ─ ─ ─ ─ ─ ─ ─ ┘
```

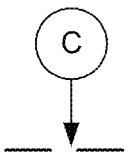

```
┌─ ─ ─ ─ ─ ─ ─ ─ ─ ─ ─ ─ ─ ─ ─ ─ ─ ─ ─ ─ ┐
│      Detect, via the one or more input devices, a fourth user input that
│  corresponds selecting one or more media items;
│      Detect, via the one or more input devices, a fifth user input that ├─ 832
│  corresponds to selecting a share affordance provided to display a share
│  interface including one or more selectable operations for performance on the
│  one or more media items;
│      In response to detecting the fifth user input, display, on the display, the
│  share interface at least including a wallpaper addition affordance that
│  corresponds to adding the one or more media items to the media gallery user
│  interface;
│      Detect, via the one or more input devices, a sixth user input that
│  correspond to selecting the wallpaper addition affordance; and
│  In response to detecting the sixth user input:
│      In accordance with a determination that the fourth user input
│  corresponds to selecting a single media item, display, on the display, a
│  cropping user interface provided to perform one or more modification
│  operations on the single media item; and
│      In accordance with a determination that the fourth user input
│  corresponds to selecting a plurality of media items, display, on the display, a
│  wallpaper settings user interface including a side-by-side preview of a wake
│  screen user interface and a home screen user interface based on one of the
│  plurality of media items
└─ ─ ─ ─ ─ ─ ─ ─ ─ ─ ─ ─ ─ ─ ─ ─ ─ ─ ─ ─ ┘
```

902 — Detect, via the one or more input devices, a user input that corresponds to a request to set a respective media item as a background for a wake screen user interface for the device

904 — In response to detecting the user input:
    In accordance with a determination that the user input corresponds to a request to set a first media item as a background for the wake screen user interface, set a second media item that is different from the first media item as a background for a home screen user interface for the device; and
    In accordance with a determination that the user input corresponds to a request to set a third media item as a background for the wake screen user interface, set a fourth media item that is different from the third media item as a background for the home screen user interface for the device

906 — The second media item is generated based on the first media item, and the fourth media item is generated based on the third media item

908 — The second media item corresponds to a first solid color generated based on one or more visual properties of the first media item, and the fourth media item corresponds to a second solid color generated based on one or more visual properties of the third media item

910 — The second media item corresponds to a first color gradient selected based on one or more visual properties of the first media item, and the fourth media item corresponds to a second color gradient generated based on one or more visual properties of the third media item

912 — The first color gradient is generated using a subset of colors that are contained in the first media item, and the second color gradient is generated using a subset of colors contained in the third media item

914 — The second media item corresponds to a first pattern generated based on one or more visual properties of the first media item, and the fourth media item corresponds to a second pattern generated based on one or more visual properties of the third media item (A)

Figure 9A

Detect, via the one or more input devices, a subsequent user input that corresponds to selection of a respective second editing affordance among the one or more second editing affordances; and ~1120

In response to detecting the subsequent user input, initiate the process for removing a media item that corresponds to the respective second editing affordance from the media gallery

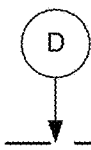

Detect, via the one or more input devices, one or more other user inputs ~1122 selecting one or more media items from the media item picker user interface;

In accordance with a determination that a number of media items selected by the one or more other user inputs does not exceed a media item limit associated with the media gallery, add the one or more media items to the user interface; and In accordance with a determination that the number of media items selected by the one or more other user inputs does exceed the media item limit associated with the media gallery, forgo adding the one or more media items to the media gallery and displaying, via the display device, a notification that the media gallery has reached the media item limit

Detect, via the one or more input devices, another user input that ~1124 corresponds to selecting a respective user interface object from the one or more foreground user interface objects within the wake screen user interface; and In response to detecting the other user input, perform an operation that corresponds to the respective user interface object without displaying the media gallery user interface

Figure 11C

DEVICE, METHOD, AND GRAPHICAL USER INTERFACE FOR UPDATING A BACKGROUND FOR HOME AND WAKE SCREEN USER INTERFACES

TECHNICAL FIELD

This relates generally to electronic devices with touch-sensitive surfaces, including but not limited to electronic devices with touch-sensitive surfaces that update a background for home and wake screen user interfaces.

BACKGROUND

Using inputs for manipulating user interfaces of an electronic device has become ubiquitous. For example, the electronic device uses peripheral-type inputs (e.g., a touchscreen input, mouse, keyboard) in order to affect the display of one or more user interfaces.

However, many of these inputs provide limited and inefficient control for manipulating the user interface. Accordingly, repetitive, complex, and/or cumbersome inputs or input types may be needed to manipulate the user interface in order for the electronic device to perform a particular operation.

SUMMARY

Accordingly, there is a need for electronic devices with faster, more efficient methods and interfaces for navigating and manipulating user interfaces and backgrounds therefor. Such methods and interfaces optionally complement or replace conventional methods for navigating and manipulating user interfaces and backgrounds therefor. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch-screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

In accordance with some embodiments, a method is performed at a device with one or more processors, non-transitory memory, a display device, and one or more input devices. The method includes: while displaying a wake screen user interface on the display device that includes a first media item that is being used as a background for the wake screen user interface and one or more foreground user interface objects that are displayed over the first media item, detecting, via the one or more input devices, a first user input that corresponds to a request to display a media gallery user interface; and, in response to detecting the first user input, ceasing display of the one or more foreground user interface objects from the wake screen user interface. The method also includes: while displaying the first media item without the one or more foreground user interface objects, detecting, via the one or more input devices, a second user input that corresponds to a request to navigate through media items in the media gallery user interface; and, in response to detecting the second user input, replacing the first media item with a second media item in the media gallery user interface on the display device. The method further includes: while displaying the second media item, detecting, via the one or more input devices, a third input that corresponds to a request to dismiss the media gallery user interface; and, in response to detecting the third user input that corresponds to the request to dismiss the media gallery user interface, redisplaying the one or more foreground user interface objects from the wake screen user interface on the display device over a media item from the media gallery user interface that is selected as the background for the wake screen user interface.

In accordance with some embodiments, a method is performed at a device with one or more processors, non-transitory memory, a display device, and one or more input devices. The method includes: detecting, via the one or more input devices, a user input that corresponds to a request to set a respective media item as a background for a wake screen user interface for the device; and, in response to detecting the user input: in accordance with a determination that the user input corresponds to a request to set a first media item as a background for the wake screen user interface, setting a second media item that is different from the first media item as a background for a home screen user interface for the device; and in accordance with a determination that the user input corresponds to a request to set a third media item as a background for the wake screen user interface, setting a fourth media item that is different from the third media item as a background for the home screen user interface for the device.

In accordance with some embodiments, a method is performed at a computing system including non-transitory memory and one or more processors, wherein the computing system is communicatively coupled to a display device and one or more input devices. The method includes: displaying, via the display device, a wake screen user interface that includes a first media item that is being used as a background for the wake screen user interface and one or more user interface objects that are displayed over the first media item; while displaying the first media item that is used as a background for the wake screen user interface, detecting, via the one or more input devices, a user input that corresponds to a request to edit media items in a set of media items in a media gallery that is accessible from the wake screen interface, wherein the set of one or more media items includes at least the first media item; and in response to detecting the user input, displaying, via the display device, an editing user interface for at least one of adding or removing media items from the set of one or more media items in the media gallery.

In accordance with some embodiments, an electronic device includes a display, one or more input devices, one or more processors, non-transitory memory, and one or more programs; the one or more programs are stored in the non-transitory memory and configured to be executed by the one or more processors and the one or more programs include instructions for performing or causing performance of the operations of any of the methods described herein. In accordance with some embodiments, a non-transitory computer readable storage medium has stored therein instructions which when executed by one or more processors of an electronic device with a display and one or more input devices, cause the device to perform or cause performance of the operations of any of the methods described herein. In accordance with some embodiments, a graphical user interface on an electronic device with a display, one or more input devices, a non-transitory memory, and one or more processors configured to execute one or more programs stored in the non-transitory memory, including one or more of the elements displayed in any of the methods described above, which are updated in response to inputs, as described in any of the methods described herein. In accordance with some embodiments, an electronic device includes: a display, one or more input devices; and means for performing or causing performance of the operations of any of the methods described herein. In accordance with some embodiments, an information processing apparatus, for use in an electronic device with a display and one or more input devices, includes means for performing or causing performance of the operations of any of the methods described herein.

In accordance with some embodiments, a computing system includes one or more processors, non-transitory memory, an interface for communicating with a display device and one or more input devices, and one or more programs; the one or more programs are stored in the non-transitory memory and configured to be executed by the one or more processors and the one or more programs include instructions for performing or causing performance of the operations of any of the methods described herein. In accordance with some embodiments, a non-transitory computer readable storage medium has stored therein instructions which when executed by one or more processors of a computing system with an interface for communicating with a display device and one or more input devices, cause the computing system to perform or cause performance of the operations of any of the methods described herein. In accordance with some embodiments, a computing system includes one or more processors, non-transitory memory, an interface for communicating with a display device and one or more input devices, and means for performing or causing performance of the operations of any of the methods described herein.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

For a better understanding of the various described embodiments, reference should be made to the Description of Embodiments below, in conjunction with the following drawings in which like reference numerals refer to corresponding parts throughout the figures.

FIGS. 8A-8D illustrate a flow diagram of a method of accessing and navigating a media gallery user interface in accordance with some embodiments.

FIGS. 9A and 9B illustrate a flow diagram of a method of updating a background or wallpaper for a home screen user interface based on a request to set a media item as a background or wallpaper for a wake screen user interface in accordance with some embodiments.

FIGS. 11A-11E illustrate a flow diagram of a method of modifying media items in the media gallery in accordance with some embodiments

DESCRIPTION OF EMBODIMENTS

According to some embodiments, as disclosed herein, a media (wallpaper) gallery user interface is accessible from the wake screen user interface in order to quickly change a background for the wake and/or home screen user interface. In some embodiments, the media gallery user interface is associated with a media gallery that includes a plurality of customizable media items. As such, if the current wake screen wallpaper is replaced with another media item from the media gallery user interface, the previous wallpaper is easily accessible from the media gallery user interface. In some implementations, when the current wake screen wallpaper is replaced with another media item from the media gallery user interface, the home screen wallpaper is also updated based on a newly selected media item and optionally a home screen treatment option.

According to some embodiments, as disclosed herein, in response to setting a media item as a wake screen background (sometimes also referred to as a wallpaper), the device also updates the home screen background based thereon (and optionally also based on a home screen treatment option such as smart color or smart gradient). In some embodiments, a wallpaper settings user interface displays side-by-side previews of wake and home screen user interfaces for various media items in the media gallery and also includes home screen treatment options for changing the appearance of the home screen user interface.

Figure 10A:
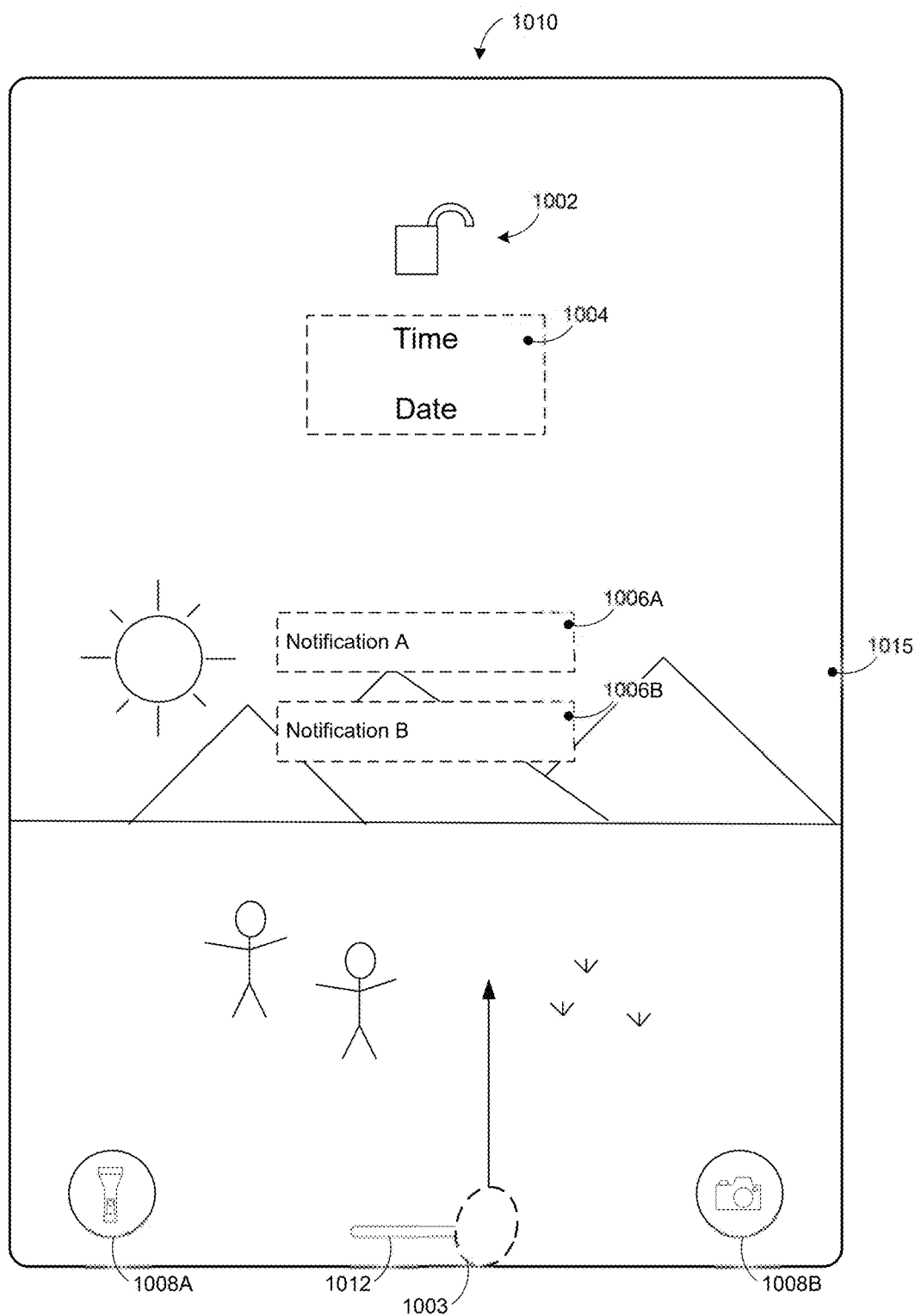
FIGS. 10A-10AB illustrate example user interfaces for modifying media items in a media gallery in accordance with some embodiments.

Below, FIGS. 1A, 1B, 2, 3, 4A, and 4B provide a description of example devices. FIGS. 5A-5I illustrate example user interfaces for accessing and navigating a media gallery user interface. FIGS. 6A-6G illustrate example user interfaces for changing a home screen treatment being applied to a home screen user interface. FIGS. 7A-7H illustrate example user interfaces for adding one or more media items to a media gallery. FIGS. 10A-10AB illustrate example user interfaces for modifying media items in a media gallery.

Figure 9B:
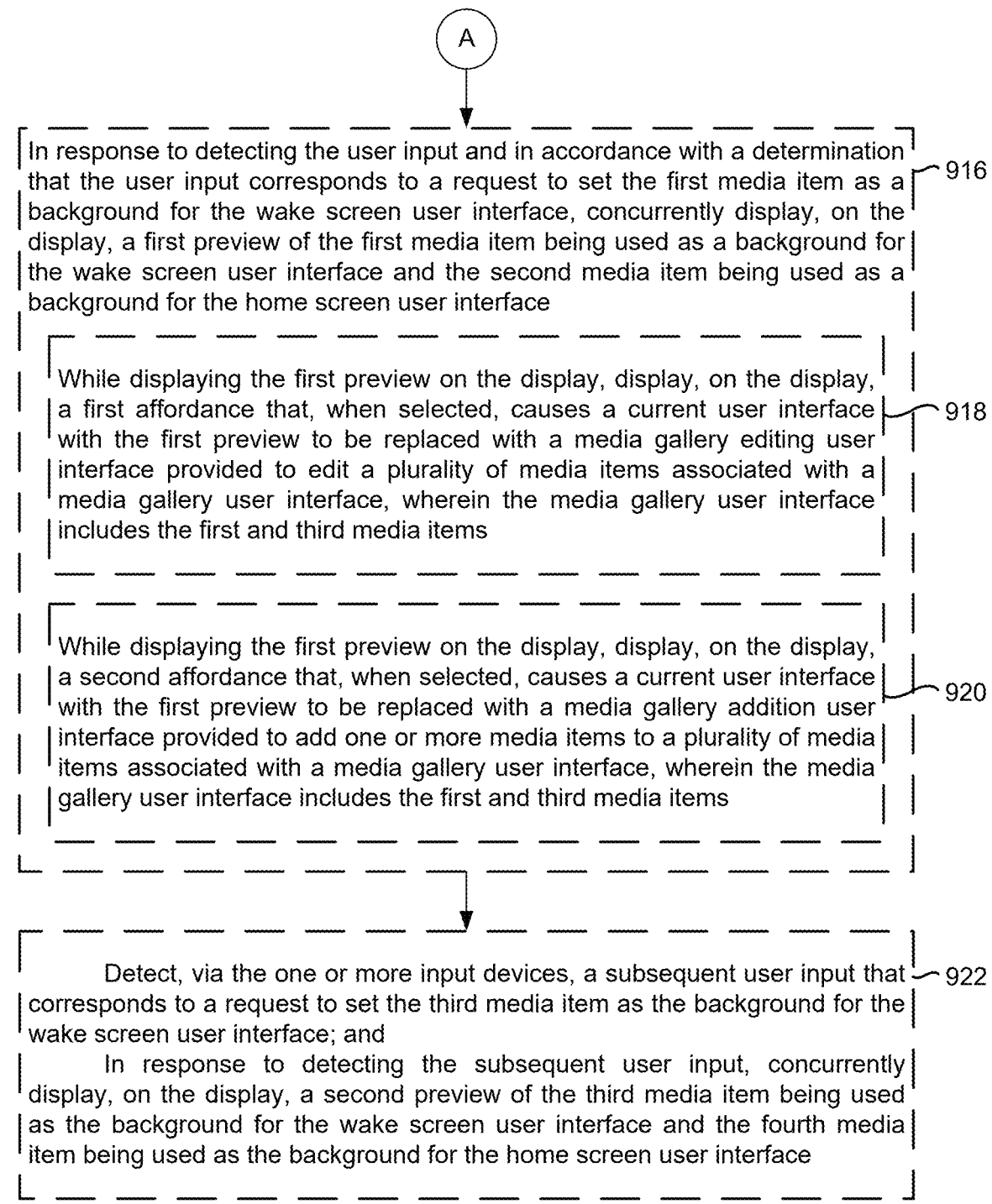

FIGS. 8A-8D illustrate a flow diagram of a method of accessing and navigating a media gallery user interface. FIGS. 9A and 9B illustrate a flow diagram of a method of updating a background or wallpaper for a home screen user interface based on a request to set a media item as a background or wallpaper for a wake screen user interface. FIGS. 11A-11E illustrate a flow diagram of a method of modifying media items in a media gallery. The user interfaces in FIGS. 5A-5I and FIGS. 7A-7H are used to illustrate the process in FIGS. 8A-8D. The user interfaces in FIGS. 6A-6G are used to illustrate the process in FIGS. 9A and 9B. The user interfaces in FIGS. 10A-10AB are used to illustrate the process in FIGS. 11A-11E.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, California Other portable electronic devices, such as laptops or tablet computers with touch-sensitive surfaces (e.g., touchscreen displays and/or touch-pads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
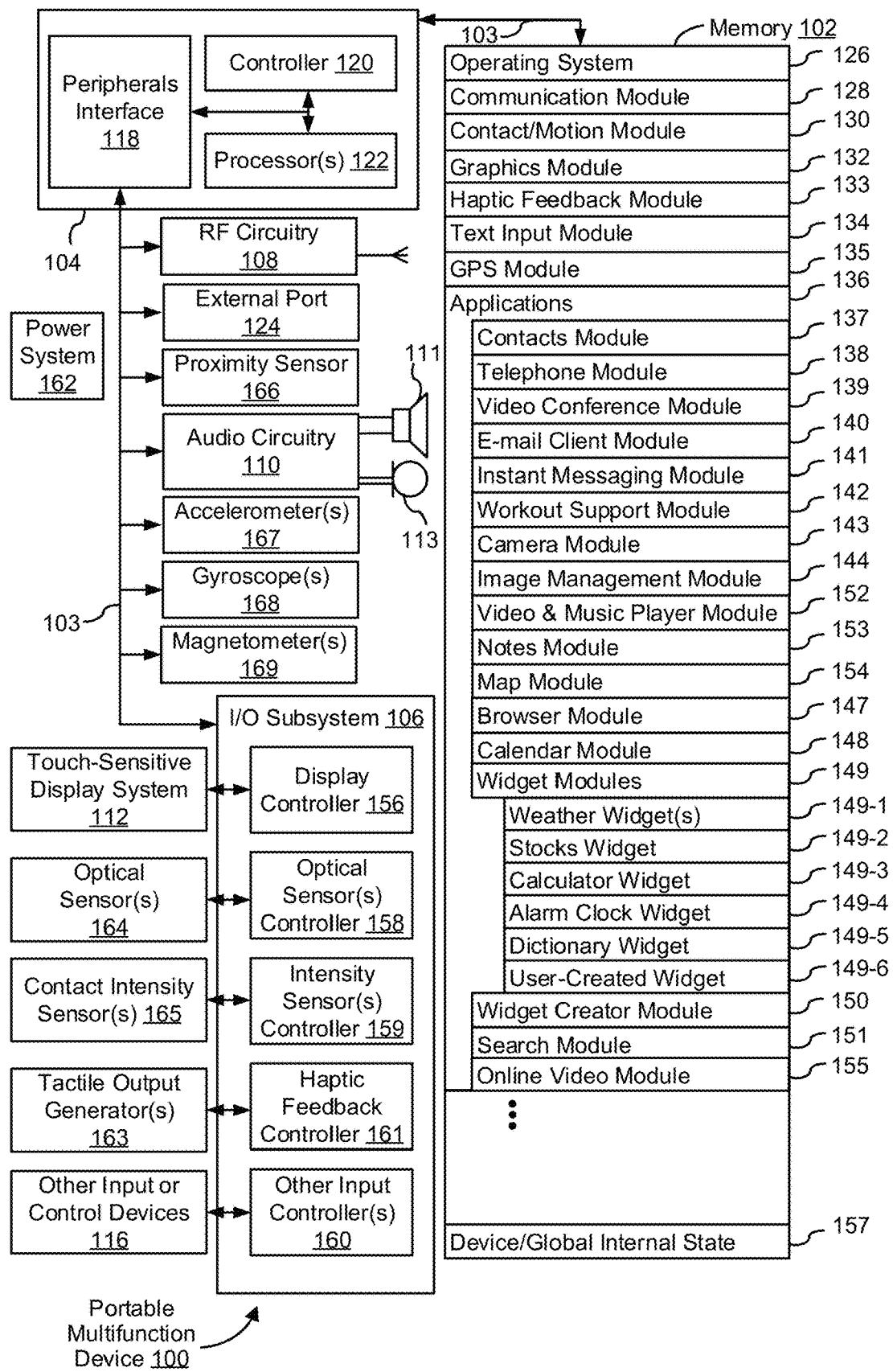
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating a portable multifunction device 100 with a touch-sensitive display system 112 in accordance with some embodiments. The touch-sensitive display system 112 is sometimes called a "touch-screen," for convenience, and is sometimes simply called a touch-sensitive display. The device 100 includes a memory 102 (which optionally includes one or more computer readable storage mediums), a memory controller 122, one or more processing units (CPUs) 120, a peripherals interface 118, an RF circuitry 108, audio circuitry 110, a speaker 111, a microphone 113, an input/output (I/O) subsystem 106, other input or control devices 116, and an external port 124. The device 100 optionally includes one or more optical sensors 164. The device 100 optionally includes one or more intensity sensors 165 for detecting intensity of contacts on the device 100 (e.g., a touch-sensitive surface such as the touch-sensitive display system 112 of the device 100). The device 100 optionally includes one or more tactile output generators 163 for generating tactile outputs on the device 100 (e.g., generating tactile outputs on a touch-sensitive surface such as the touch-sensitive display system 112 of the device 100 or a touchpad 355 of a device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

The memory 102 optionally includes high-speed random-access memory and optionally also includes non-volatile memory, such as one or more magnetic disk storage devices, flash memory devices, or other non-volatile solid-state memory devices. Access to the memory 102 by other components of the device 100, such as the one or more CPUs 120 and the peripherals interface 118, is, optionally, controlled by the memory controller 122.

The peripherals interface 118 can be used to couple input and output peripherals of the device to the one or more CPUs 120 and the memory 102. The one or more CPUs 120 run or execute various software programs and/or sets of instructions stored in the memory 102 to perform various functions for the device 100 and to process data.

In some embodiments, the peripherals interface 118, the one or more CPUs 120, and the memory controller 122 are, optionally, implemented on a single chip, such as a chip 104. In some other embodiments, they are, optionally, implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data is, optionally, retrieved from and/or transmitted to the memory 102 and/or the RF circuitry 108 by the peripherals interface 118. In some embodiments, the audio circuitry 110 also includes a headset jack (e.g., a headset jack 212 in FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch-sensitive display system 112 and the other input or control devices 116, with the peripherals interface 118. The I/O subsystem 106 optionally includes a display controller 156, an optical sensor controller 158, an intensity sensor controller 159, a haptic feedback controller 161, and one or more input controllers 160 for other input or control devices. The one or more input controllers 160 receive/send electrical signals from/to the other input or control devices 116. The other input or control devices 116 optionally include physical buttons (e.g., push buttons, rocker buttons, etc.), dials, slider switches, joysticks, click wheels, and so forth. In some alternate embodiments, the one or more input controllers 160 are, optionally, coupled with any (or none) of the following: a keyboard, infrared port, USB port, stylus, and/or a pointer device such as a mouse. The one or more buttons (e.g., buttons 208 in FIG. 2) optionally include an up/down button for volume control of the speaker 111 and/or the microphone 113. The one or more buttons optionally include a push button (e.g., a push button 206 in FIG. 2).

The touch-sensitive display system 112 provides an input interface and an output interface between the device and a user. The display controller 156 receives and/or sends electrical signals from/to the touch-sensitive display system 112. The touch-sensitive display system 112 displays visual output to the user. The visual output optionally includes graphics, text, icons, video, and any combination thereof (collectively termed "graphics"). In some embodiments, some or all of the visual output corresponds to user-interface objects.

The touch-sensitive display system 112 has a touch-sensitive surface, sensor or set of sensors that accepts input from the user based on haptic/tactile contact. The touch-sensitive display system 112 and the display controller 156 (along with any associated modules and/or sets of instructions in the memory 102) detect contact (and any movement or breaking of the contact) on the touch-sensitive display system 112 and converts the detected contact into interaction with user-interface objects (e.g., one or more soft keys, icons, web pages or images) that are displayed on the touch-sensitive display system 112. In an example embodiment, a point of contact between the touch-sensitive display system 112 and the user corresponds to a finger of the user or a stylus.

The touch-sensitive display system 112 optionally uses LCD (liquid crystal display) technology, LPD (light emitting polymer display) technology, or LED (light emitting diode) technology, although other display technologies are used in other embodiments. The touch-sensitive display system 112 and the display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the touch-sensitive display system 112. In an example embodiment, projected mutual capacitance sensing technology is used, such as that found in the iPhone®, iPod Touch®, and iPad® from Apple Inc. of Cupertino, California.

The touch-sensitive display system 112 optionally has a video resolution in excess of 100 dpi. In some embodiments, the touch-screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touchscreen. In some embodiments, the device translates the rough finger-based input into a precise pointer/cursor position or command for performing the actions desired by the user.

In some embodiments, in addition to the touchscreen, the device 100 optionally includes a touchpad for activating or deactivating particular functions. In some embodiments, the touchpad is a touch-sensitive area of the device that, unlike the touchscreen, does not display visual output. The touchpad is, optionally, a touch-sensitive surface that is separate from the touch-sensitive display system 112 or an extension of the touch-sensitive surface formed by the touchscreen.

The device 100 also includes a power system 162 for powering the various components. The power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 optionally also includes one or more optical sensors 164. FIG. 1A shows an optical sensor coupled with the optical sensor controller 158 in the I/O subsystem 106. The one or more optical sensors 164 optionally include charge-coupled device (CCD) or complementary metal-oxide semiconductor (CMOS) phototransistors. The one or more optical sensors 164 receive light from the environment, projected through one or more lens, and converts the light to data representing an image. In conjunction with an imaging module 143 (also called a camera module), The one or more optical sensors 164 optionally capture still images and/or video. In some embodiments, an optical sensor is located on the back of the device 100, opposite the touch-sensitive display system 112 on the front of the device 100, so that the touch-screen is enabled for use as a viewfinder for still and/or video image acquisition. In some embodiments, another optical sensor is located on the front of the device 100 so that the user's image is obtained (e.g., for selfies, for videoconferencing while the user views the other video conference participants on the touchscreen, etc.).

The device 100 optionally also includes one or more contact intensity sensors 165. FIG. 1A shows a contact intensity sensor coupled with the intensity sensor controller 159 in the I/O subsystem 106. The one or more contact intensity sensors 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). The one or more contact intensity sensors 165 receive contact intensity information (e.g., pressure information or a proxy for pressure information) from the environment. In some embodiments, at least one contact intensity sensor is collocated with, or proximate to, a touch-sensitive surface (e.g., the touch-sensitive display system 112). In some embodiments, at least one contact intensity sensor is located on the back of the device 100, opposite the touch-screen display system 112, which is located on the front of the device 100.

The device 100 optionally also includes one or more proximity sensors 166. FIG. 1A shows proximity sensor 166 coupled with peripherals interface 118. Alternately, a proximity sensor 166 is coupled with the input controller 160 in the I/O subsystem 106. In some embodiments, the proximity sensor 166 turns off and disables the touch-sensitive display system 112 when the device 100 is placed near the user's ear (e.g., when the user is making a phone call).

The device 100 optionally also includes one or more tactile output generators 163. FIG. 1A shows a tactile output generator coupled with haptic feedback controller 161 in I/O subsystem 106. The one or more tactile output generators 163 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). one or more tactile output generators 163 receive tactile feedback generation instructions from the haptic feedback module 133 and generates tactile outputs on the device 100 that are capable of being sensed by a user of the device 100. In some embodiments, at least one tactile output generator is collocated with, or proximate to, a touch-sensitive surface (e.g., the touch-sensitive display system 112) and, optionally, generates a tactile output by moving the touch-sensitive surface vertically (e.g., in/out of a surface of the device 100) or laterally (e.g., back and forth in the same plane as a surface of the device 100). In some embodiments, at least one tactile output generator sensor is located on the back of the device 100, opposite the touch-sensitive display system 112, which is located on the front of the device 100.

The device 100 optionally also includes one or more accelerometers 167, gyroscopes 168, and/or magnetometers 169 (e.g., as part of an inertial measurement unit (IMU)) for obtaining information concerning the position (e.g., attitude) of the device. FIG. 1A shows the sensors 167, 168, and 169 coupled with the peripherals interface 118. Alternately, the sensors 167, 168, and 169 are, optionally, coupled with an input controller 160 in the I/O subsystem 106. In some embodiments, information is displayed on the touch-screen display in a portrait view or a landscape view based on an analysis of data received from the one or more accelerometers. The device 100 optionally includes a GPS (or GLONASS or other global navigation system) receiver for obtaining information concerning the location of the device 100.

Figure 3:
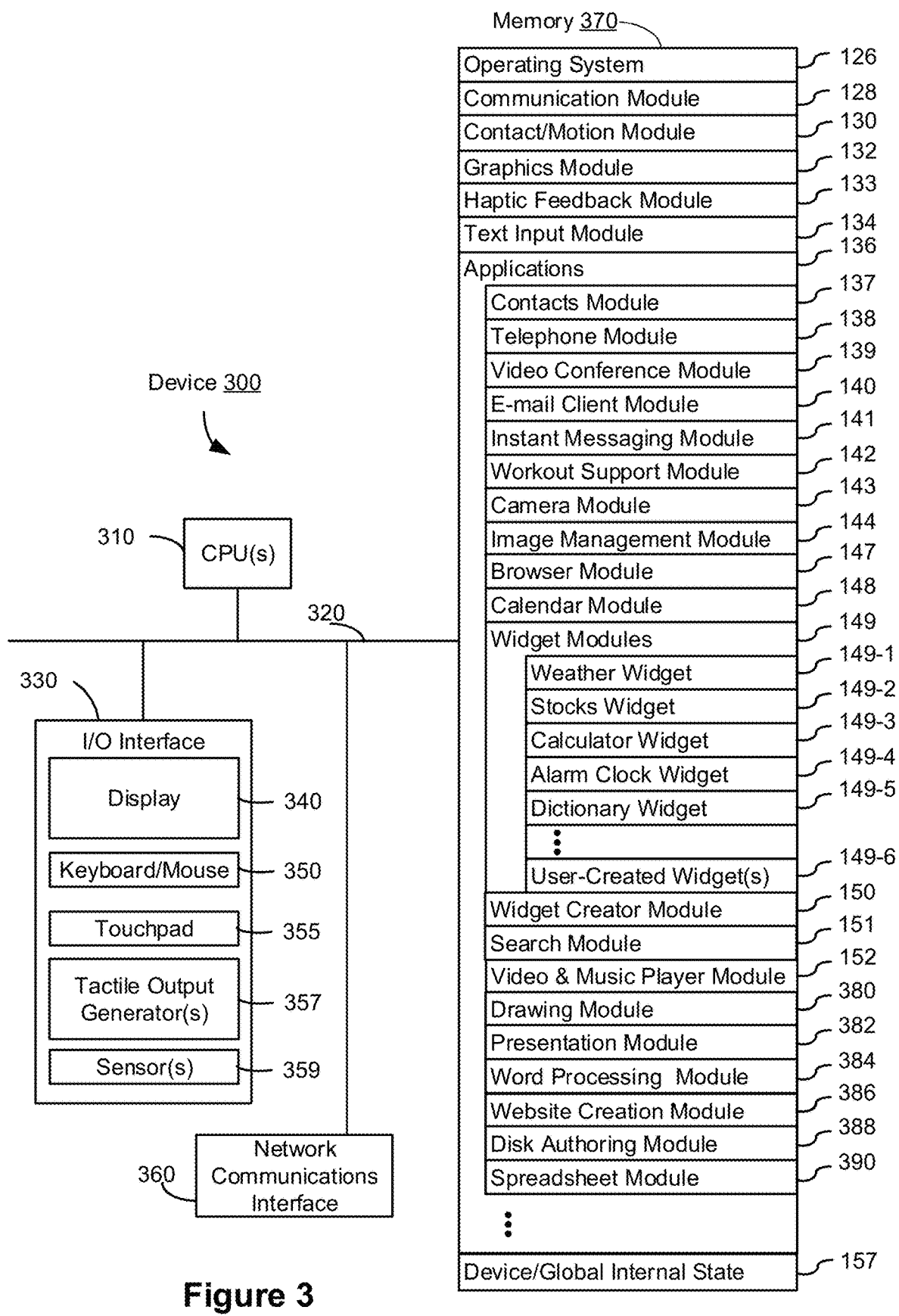
FIG. 3 is a block diagram of an example multifunction device with a display and a touch-sensitive surface in accordance with some embodiments.

In some embodiments, the software components stored in the memory 102 include an operating system 126, a communication module (or set of instructions) 128, a contact/motion module (or set of instructions) 130, a graphics module (or set of instructions) 132, a haptic feedback module (or set of instructions) 133, a text input module (or set of instructions) 134, a Global Positioning System (GPS) module (or set of instructions) 135, and applications (or sets of instructions) 136. Furthermore, in some embodiments, the memory 102 stores a device/global internal state 157, as shown in FIGS. 1A and 3. The device/global internal state 157 includes one or more of: active application state, indicating which applications, if any, are currently active; display state, indicating what applications, views or other information occupy various regions of the touch-sensitive display system 112; sensor state, including information obtained from the device's various sensors and the other input or control devices 116; and location and/or positional information concerning the device's location and/or attitude.

The operating system 126 (e.g., iOS, DARWIN, RTXC, LINUX, UNIX, OS X, WINDOWS, or an embedded operating system such as VXWORKS) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or external port 124. The one or more external ports 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, California In some embodiments, the external port is a Lightning connector that is the same as, or similar to and/or compatible with the Lightning connector used in some iPhone®, iPod Touch®, and iPad® devices from Apple Inc. of Cupertino, California.

The contact/motion module 130 optionally detects contact with the touch-sensitive display system 112 (in conjunction with the display controller 156) and other touch-sensitive devices (e.g., a touchpad or physical click wheel). The contact/motion module 130 includes software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). The contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts and/or stylus contacts). In some embodiments, the contact/motion module 130 and the display controller 156 detect contact on a touchpad.

The contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Similarly, tap, swipe, drag, and other gestures are optionally detected for a stylus by detecting a particular contact pattern for the stylus.

The graphics module 132 includes various known software components for rendering and displaying graphics on the touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations, and the like.

In some embodiments, the graphics module 132 stores data representing graphics to be used. Each graphic is, optionally, assigned a corresponding code. The graphics module 132 receives, from applications etc., one or more codes specifying graphics to be displayed along with, if necessary, coordinate data and other graphic property data, and then generates screen image data to output to the display controller 156.

The haptic feedback module 133 includes various software components for generating instructions used by the one or more tactile output generators 163 to produce tactile outputs at one or more locations on the device 100 in response to user interactions with the device 100.

The text input module 134, which is, optionally, a component of the graphics module 132, provides soft keyboards for entering text in various applications (e.g., a contacts module 137, an e-mail client module 140, an IM module 141, a browser 147, and any other application that needs text input).

The GPS module 135 determines the location of the device and provides this information for use in various applications (e.g., to a telephone module 138 for use in location-based dialing, to a camera module 143 as picture/video metadata, and to applications that provide location-based services such as weather widgets, local yellow page widgets, and map/navigation widgets).

Applications 136 optionally include the following modules (or sets of instructions), or a subset or superset thereof:
- a contacts module 137 (sometimes called an address book or contact list);
- a telephone module 138;
- a video conferencing module 139;
- an e-mail client module 140;
- an instant messaging (IM) module 141;
- a workout support module 142;
- a camera module 143 for still and/or video images;
- an image management module 144;
- a browser module 147;
- a calendar module 148;
- widget modules 149, which optionally include one or more of: a weather widget 149-1, a stocks widget 149-2, a calculator widget 149-3, an alarm clock widget 149-4, a dictionary widget 149-5, and other widgets obtained by the user, as well as a user-created widgets 149-6;
- a widget creator module 150 for making the user-created widgets 149-6;
- a search module 151;
- a video and music player module 152, which is, optionally, made up of a video player module and a music player module;
- a notes module 153;
- a map module 154; and/or
- an online video module 155.

Examples of other applications 136 that are, optionally, stored in the memory 102 include other word processing applications, other image editing applications, drawing applications, presentation applications, JAVA-enabled applications, encryption, digital rights management, voice recognition, and voice replication.

In conjunction with the touch-sensitive display system 112, the display controller 156, the contact module 130, the graphics module 132, and the text input module 134, the contacts module 137 includes executable instructions to manage an address book or contact list (e.g., stored in the application internal state 192 of the contacts module 137 in the memory 102 or a memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by the telephone module 138, the video conferencing module 139, the e-mail client module 140, or the IM module 141; and so forth.

In conjunction with the RF circuitry 108, the audio circuitry 110, the speaker 111, the microphone 113, the touch-sensitive display system 112, the display controller 156, the contact module 130, the graphics module 132, and the text input module 134, the telephone module 138 includes executable instructions to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication optionally uses any of a plurality of communications standards, protocols, and technologies.

In conjunction with the RF circuitry 108, the audio circuitry 110, the speaker 111, the microphone 113, the touch-sensitive display system 112, the display controller 156, the one or more optical sensors 164, the optical sensor controller 158, the contact module 130, the graphics module 132, the text input module 134, the contact list 137, and the telephone module 138, the video conferencing module 139 includes executable instructions to initiate, conduct, and terminate a video conference between a user and one or more other participants in accordance with user instructions.

In conjunction with the RF circuitry 108, the touch-sensitive display system 112, the display controller 156, the contact module 130, the graphics module 132, and the text input module 134, the e-mail client module 140 includes executable instructions to create, send, receive, and manage e-mail in response to user instructions. In conjunction with the image management module 144, the e-mail client module 140 makes it quite easy to create and send e-mails with still or video images taken with the camera module 143.

In conjunction with the RF circuitry 108, the touch-sensitive display system 112, the display controller 156, the contact module 130, the graphics module 132, and the text input module 134, the IM module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with the RF circuitry 108, the touch-sensitive display system 112, the display controller 156, the contact module 130, the graphics module 132, the text input module 134, the GPS module 135, and the map module 154, the workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with the touch-sensitive display system 112, the display controller 156, the one or more optical sensors 164, the optical sensor controller 158, the contact module 130, the graphics module 132, and the image management module 144, the camera module 143 includes executable instructions to capture still images or video (including a video stream) and store them into the memory 102, modify characteristics of a still image or video, and/or delete a still image or video from the memory 102.

In conjunction with the touch-sensitive display system 112, the display controller 156, the contact module 130, the graphics module 132, the text input module 134, and the camera module 143, the image management module 144 includes executable instructions to arrange, modify (e.g., edit), or otherwise manipulate, label, delete, present (e.g., in a digital slide show or album), and store still and/or video images.

In conjunction with the RF circuitry 108, the touch-sensitive display system 112, the display controller 156, the contact module 130, the graphics module 132, and the text input module 134, the browser module 147 includes executable instructions to browse the Internet in accordance with user instructions, including searching, linking to, receiving, and displaying web pages or portions thereof, as well as attachments and other files linked to web pages.

In conjunction with the RF circuitry 108, the touch-sensitive display system 112, the display controller 156, the contact module 130, the graphics module 132, the text input module 134, the e-mail client module 140, and the browser module 147, the calendar module 148 includes executable instructions to create, display, modify, and store calendars and data associated with calendars (e.g., calendar entries, to do lists, etc.) in accordance with user instructions.

In conjunction with the RF circuitry 108, the touch-sensitive display system 112, the display controller 156, the contact module 130, the graphics module 132, the text input module 134, and the browser module 147, the widget modules 149 are mini-applications that are, optionally, downloaded and used by a user (e.g., the weather widget 149-1, the stocks widget 149-2, the calculator widget 149-3, the alarm clock widget 149-4, and the dictionary widget 149-5) or created by the user (e.g., the user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., YAHOO! Widgets).

In conjunction with the RF circuitry 108, the touch-sensitive display system 112, the display controller 156, the contact module 130, the graphics module 132, the text input module 134, and the browser module 147, the widget creator module 150 includes executable instructions to create widgets (e.g., turning a user-specified portion of a web page into a widget).

In conjunction with the touch-sensitive display system 112, the display controller 156, the contact module 130, the graphics module 132, and the text input module 134, the search module 151 includes executable instructions to search for text, music, sound, image, video, and/or other files in the memory 102 that match one or more search criteria (e.g., one or more user-specified search terms) in accordance with user instructions.

In conjunction with the touch-sensitive display system 112, the display controller 156, the contact module 130, the graphics module 132, the audio circuitry 110, the speaker 111, the RF circuitry 108, and the browser module 147, the video and music player module 152 includes executable instructions that allow the user to download and play back recorded music and other sound files stored in one or more file formats, such as MP3 or AAC files, and executable instructions to display, present or otherwise play back videos (e.g., on the touch-sensitive display system 112, or on an external display connected wirelessly or via the one or more external ports 124). In some embodiments, the device 100 optionally includes the functionality of an MP3 player, such as an iPod (trademark of Apple Inc. of Cupertino, California).

In conjunction with touch-sensitive the display system 112, the display controller 156, the contact module 130, the graphics module 132, and the text input module 134, the notes module 153 includes executable instructions to create and manage notes, to do lists, and the like in accordance with user instructions.

In conjunction with the RF circuitry 108, the touch-sensitive display system 112, the display controller 156, the contact module 130, the graphics module 132, the text input module 134, the GPS module 135, and the browser module 147, the map module 154 includes executable instructions to receive, display, modify, and store maps and data associated with maps (e.g., driving directions; data on stores and other points of interest at or near a particular location; and other location-based data) in accordance with user instructions.

In conjunction with the touch-sensitive display system 112, the display controller 156, the contact module 130, the graphics module 132, the audio circuitry 110, the speaker 111, the RF circuitry 108, the text input module 134, the e-mail client module 140, and the browser module 147, the online video module 155 includes executable instructions that allow the user to access, browse, receive (e.g., by streaming and/or download), play back (e.g., on the touchscreen 112, or on an external display connected wirelessly or via the one or more external ports 124), send an e-mail with a link to a particular online video, and otherwise manage online videos in one or more file formats, such as H.264. In some embodiments, the instant messaging module 141, rather than the e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, the memory 102 optionally stores a subset of the modules and data structures identified above. Furthermore, the memory 102 optionally stores additional modules and data structures not described above.

In some embodiments, the device 100 is a device where operation of a predefined set of functions on the device is performed exclusively through a touchscreen and/or a touchpad. By using a touch-screen and/or a touchpad as the primary input control device for operation of the device 100, the number of physical input control devices (such as push buttons, dials, and the like) on the device 100 is, optionally, reduced.

The predefined set of functions that are performed exclusively through a touchscreen and/or a touchpad optionally include navigation between user interfaces. In some embodiments, the touchpad, when touched by the user, navigates the device 100 to a main, home, or root menu from any user interface that is displayed on the device 100. In such embodiments, a "menu button" is implemented using a touchpad. In some other embodiments, the menu button is a physical push button or other physical input control device instead of a touchpad.

Figure 1B:
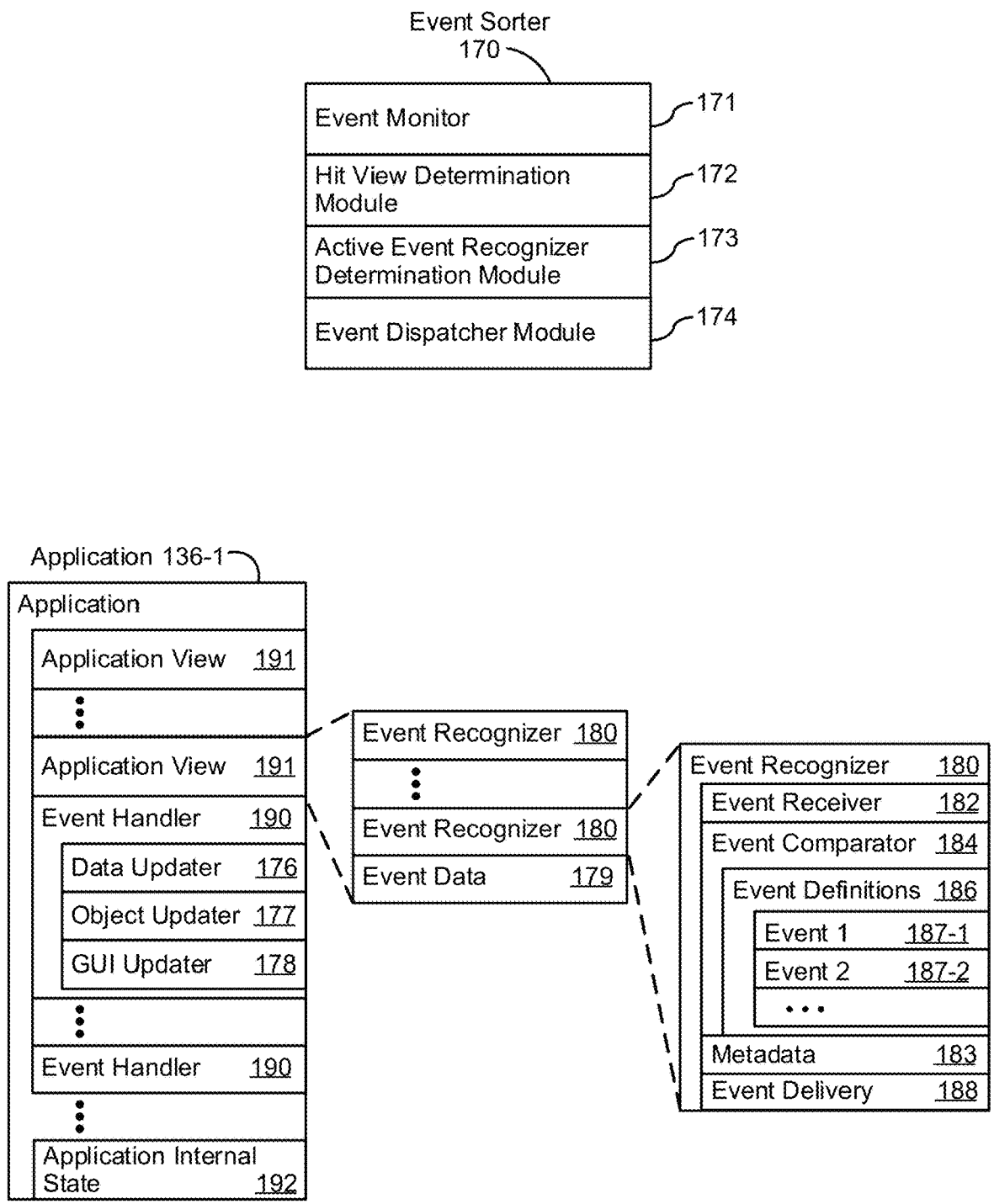
FIG. 1B is a block diagram illustrating example components for event handling in accordance with some embodiments.

FIG. 1B is a block diagram illustrating example components for event handling in accordance with some embodiments. In some embodiments, the memory 102 (in FIG. 1A) or 370 (FIG. 3) includes an event sorter 170 (e.g., in the operating system 126) and a respective application 136-1 (e.g., any of the aforementioned applications 136, 137-155, 380-390).

The event sorter 170 receives event information and determines the application 136-1 and the application view 191 of the application 136-1 to which to deliver the event information. The event sorter 170 includes an event monitor 171 and an event dispatcher module 174. In some embodiments, the application 136-1 includes an application internal state 192, which indicates the current application view(s) displayed on the touch-sensitive display system 112 when the application is active or executing. In some embodiments, the device/global internal state 157 is used by the event sorter 170 to determine which application(s) is (are) currently active, and the application internal state 192 is used by the event sorter 170 to determine the application views 191 to which to deliver event information.

In some embodiments, the application internal state 192 includes additional information, such as one or more of: resume information to be used when the application 136-1 resumes execution, user interface state information that indicates information being displayed or that is ready for display by the application 136-1, a state queue for enabling the user to go back to a prior state or view of the application 136-1, and a redo/undo queue of previous actions taken by the user.

The event monitor 171 receives event information from the peripherals interface 118. Event information includes information about a sub-event (e.g., a user touch on touch-sensitive display system 112, as part of a multi-touch gesture). The peripherals interface 118 transmits information it receives from the I/O subsystem 106 or a sensor, such as the proximity sensor 166, the accelerometer(s) 167, the gyroscope(s) 168, the magnetometer(s) 169, and/or the microphone 113 (through audio circuitry the 110). Information that the peripherals interface 118 receives from the I/O subsystem 106 includes information from the touch-sensitive display system 112 or a touch-sensitive surface.

In some embodiments, the event monitor 171 sends requests to the peripherals interface 118 at predetermined intervals. In response, the peripherals interface 118 transmits event information. In other embodiments, the peripherals interface 118 transmits event information only when there is a significant event (e.g., receiving an input above a predetermined noise threshold and/or for more than a predetermined duration).

In some embodiments, the event sorter 170 also includes a hit view determination module 172 and/or an active event recognizer determination module 173.

The hit view determination module 172 provides software procedures for determining where a sub-event has taken place within one or more views, when the touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

The hit view determination module 172 receives information related to sub-events of a touch-based gesture. When an application has multiple views organized in a hierarchy, the hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

The active event recognizer determination module 173 determines which view or views within a view hierarchy should receive a particular sequence of sub-events. In some embodiments, the active event recognizer determination module 173 determines that only the hit view should receive a particular sequence of sub-events. In other embodiments, the active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

The event dispatcher module 174 dispatches the event information to an event recognizer (e.g., an event recognizer 180). In some embodiments including the active event recognizer determination module 173, the event dispatcher module 174 delivers the event information to an event recognizer determined by the active event recognizer determination module 173. In some embodiments, event dispatcher module 174 stores in an event queue the event information, which is retrieved by a respective event receiver module 182.

In some embodiments, the operating system 126 includes the event sorter 170. Alternatively, the application 136-1 includes the event sorter 170. In yet other embodiments, the event sorter 170 is a stand-alone module, or a part of another module stored in the memory 102, such as the contact/motion module 130.

In some embodiments, the application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher-level object from which the application 136-1 inherits methods and other properties. In some embodiments, a respective event handler 190 includes one or more of: a data updater 176, an object updater 177, a GUI updater 178, and/or event data 179 received from the event sorter 170. The event handler 190 optionally utilizes or calls the data updater 176, the object updater 177, or the GUI updater 178 to update the application internal state 192. Alternatively, one or more of the application views 191 includes one or more respective event handlers 190. Also, in some embodiments, one or more of the data updater 176, the object updater 177, and the GUI updater 178 are included in a respective application view 191.

A respective event recognizer 180 receives event information (e.g., the event data 179) from the event sorter 170 and identifies an event from the event information. The event recognizer 180 includes an event receiver 182 and an event comparator 184. In some embodiments, the event recognizer 180 also includes at least a subset of: metadata 183, and event delivery instructions 188 (which optionally include sub-event delivery instructions).

The event receiver 182 receives event information from the event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

The event comparator 184 compares the event information to predefined event or sub-event definitions and, based on the comparison, determines an event or sub-event, or determines or updates the state of an event or sub-event. In some embodiments, the event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across the touch-sensitive display system 112, and lift-off of the touch (touch end). In some embodiments, the event also includes information for one or more associated event handlers 190.

In some embodiments, the event definition 187 includes a definition of an event for a respective user-interface object. In some embodiments, the event comparator 184 performs a hit test to determine which user-interface object is associated with a sub-event. For example, in an application view in which three user-interface objects are displayed on the touch-sensitive display system 112, when a touch is detected on the touch-sensitive display system 112, the event comparator 184 performs a hit test to determine which of the three user-interface objects is associated with the touch (sub-event). If each displayed object is associated with a respective event handler 190, the event comparator uses the result of the hit test to determine which the event handler 190 should be activated. For example, the event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, the metadata 183 includes configurable properties, flags, and/or lists that indicate how event recognizers interact, or are enabled to interact, with one another. In some embodiments, the metadata 183 includes configurable properties, flags, and/or lists that indicate whether sub-events are delivered to varying levels in the view or programmatic hierarchy.

In some embodiments, a respective event recognizer 180 activates the event handler 190 associated with an event when one or more particular sub-events of an event are recognized. In some embodiments, a respective event recognizer 180 delivers event information associated with the event to the event handler 190. Activating an event handler 190 is distinct from sending (and deferred sending) sub-events to a respective hit view. In some embodiments, the event recognizer 180 throws a flag associated with the recognized event, and the event handler 190 associated with the flag catches the flag and performs a predefined process.

In some embodiments, the event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, the data updater 176 creates and updates data used in the application 136-1. For example, the data updater 176 updates the telephone number used in the contacts module 137 or stores a video file used by the video and music player module 152. In some embodiments, the object updater 177 creates and updates objects used in the application 136-1. For example, the object updater 177 creates a new user-interface object or updates the position of a user-interface object. The GUI updater 178 updates the GUI. For example, the GUI updater 178 prepares display information and sends it to the graphics module 132 for display on the touch-sensitive display 112.

In some embodiments, the event handler(s) 190 includes or has access to the data updater 176, the object updater 177, and the GUI updater 178. In some embodiments, the data updater 176, the object updater 177, and the GUI updater 178 are included in a single module of a respective application 136-1 or the application view 191. In other embodiments, they are included in two or more software modules.

It shall be understood that the foregoing discussion regarding event handling of user touches on touch-sensitive displays also applies to other forms of user inputs to operate the multifunction devices 100 with input-devices, not all of which are initiated on touchscreens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
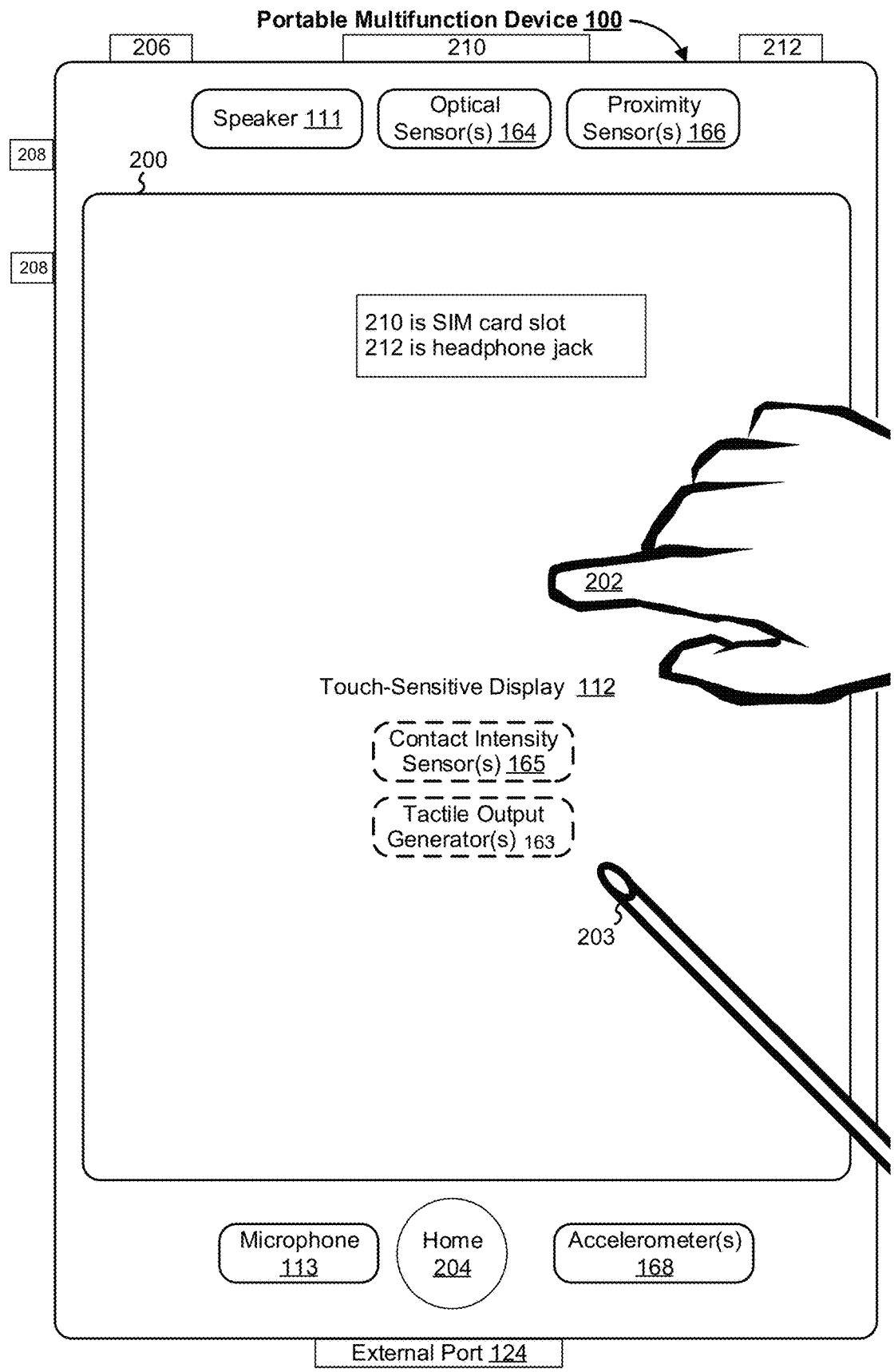
FIG. 2 illustrates a portable multifunction device having a touchscreen in accordance with some embodiments.

FIG. 2 illustrates a portable multifunction device 100 having a touchscreen (e.g., touch-sensitive display system 112, FIG. 1A) in accordance with some embodiments. The touchscreen optionally displays one or more graphics within a user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

The device 100 optionally also includes one or more physical buttons, such as "home" or menu button 204. As described previously, menu button 204 is, optionally, used to navigate to any application 136 in a set of applications that are, optionally executed on the device 100. Alternatively, in some embodiments, the menu button is implemented as a soft key in a GUI displayed on the touch-screen display.

In some embodiments, the device 100 includes the touch-screen display 112, a menu button 204, a push button 206 for powering the device on/off and locking the device, volume adjustment button(s) 208, a Subscriber Identity Module (SIM) card slot 210, a head set jack 212, and a docking/charging external port 124. The push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, the device 100 also accepts verbal input for activation or deactivation of some functions through the microphone 113. The device 100 also, optionally, includes the one or more contact intensity sensors 165 for detecting intensity of contacts on the touch-sensitive display system 112 and/or the one or more tactile output generators 163 for generating tactile outputs for a user of the device 100.

FIG. 3 is a block diagram of an example multifunction device with a display and a touch-sensitive surface in accordance with some embodiments. The device 300 need not be portable. In some embodiments, the device 300 is a laptop computer, a desktop computer, a tablet computer, a multimedia player device, a navigation device, an educational device (such as a child's learning toy), a gaming system, or a control device (e.g., a home or industrial controller). The device 300 typically includes one or more processing units (CPUs) 310, one or more network or other communications interfaces 360, a memory 370, and one or more communication buses 320 for interconnecting these components. The communication buses 320 optionally include circuitry (sometimes called a chipset) that interconnects and controls communications between system components. The device 300 includes an input/output (I/O) interface 330 comprising a display 340, which is typically a touch-screen display. The I/O interface 330 also optionally includes a keyboard and/or mouse (or other pointing device) 350 and touchpad 355, a tactile output generator 357 for generating tactile outputs on the device 300 (e.g., similar to the one or more tactile output generators 163 described above with reference to FIG. 1A), sensors 359 (e.g., touch-sensitive, optical, contact intensity, proximity, acceleration, attitude, and/or magnetic sensors similar to the sensors 112, 164, 165, 166, 167, 168, and 169 described above with reference to FIG. 1A).

The memory 370 includes high-speed random-access memory, such as DRAM, SRAM, DDR RAM or other random-access solid-state memory devices; and optionally includes non-volatile memory, such as one or more magnetic disk storage devices, optical disk storage devices, flash memory devices, or other non-volatile solid-state storage devices. The memory 370 optionally includes one or more storage devices remotely located from the one or more processing units 310. In some embodiments, the memory 370 stores programs, modules, and data structures analogous to the programs, modules, and data structures stored in the memory 102 of the portable multifunction device 100 (FIG. 1A), or a subset thereof. Furthermore, the memory 370 optionally stores additional programs, modules, and data structures not present in the memory 102 of the portable multifunction device 100. For example, the memory 370 of device 300 optionally stores a drawing module 380, a presentation module 382, a word processing module 384, a website creation module 386, a disk authoring module 388, and/or a spreadsheet module 390, while the memory 102 of the portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, the memory 370 optionally stores a subset of the modules and data structures identified above. Furthermore, the memory 370 optionally stores additional modules and data structures not described above.

Attention is now directed towards embodiments of user interfaces ("UI") that are, optionally, implemented on the portable multifunction device 100.

Figure 4A:
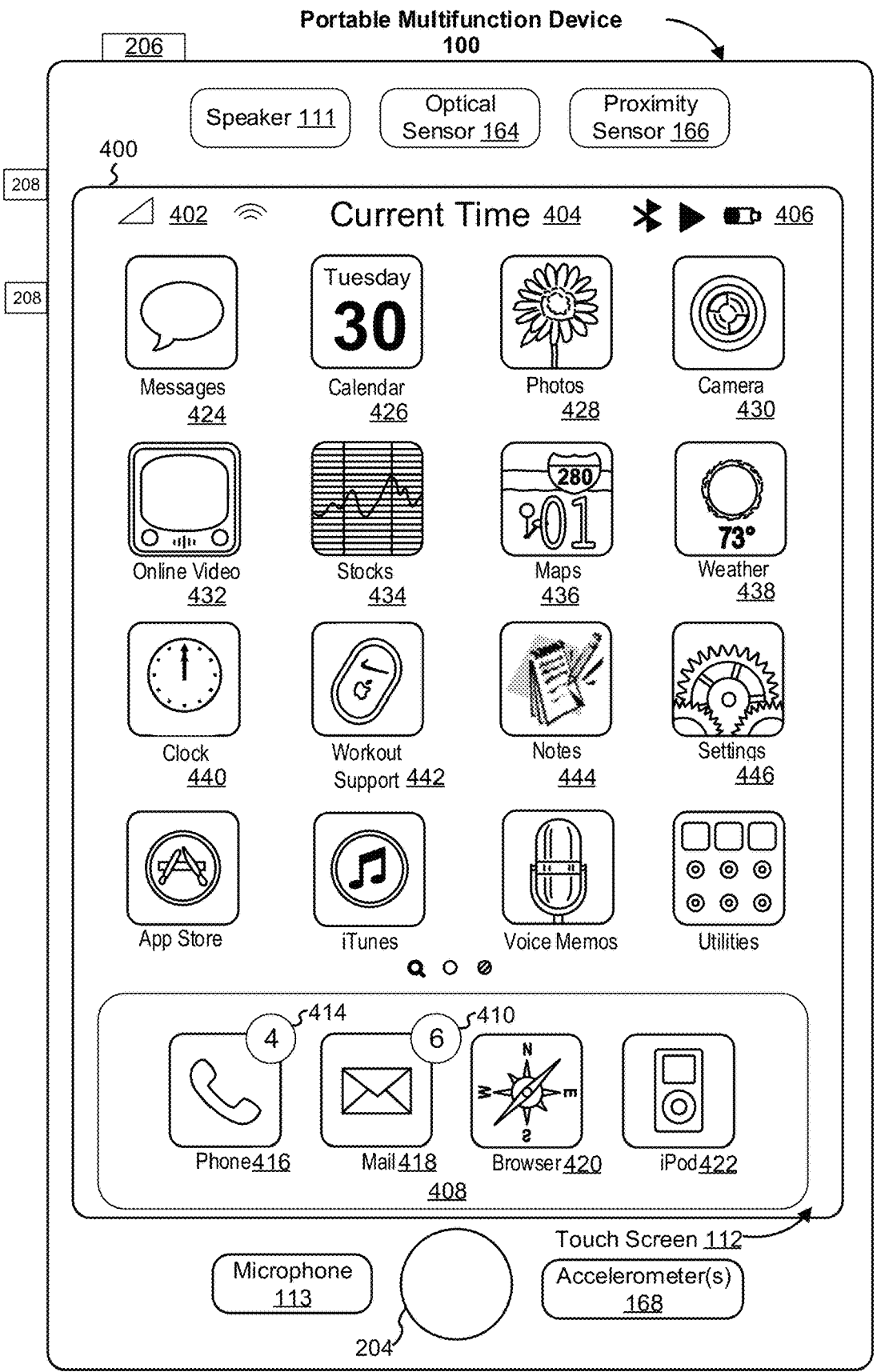
FIG. 4A illustrates an example user interface for a menu of applications on a portable multifunction device in accordance with some embodiments.

FIG. 4A illustrates an example user interface for a menu of applications on the portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for the telephone module 138, labeled "Phone," which optionally includes an indicator 414 of the number of missed calls or voicemail messages;
  Icon 418 for the e-mail client module 140, labeled "Mail," which optionally includes an indicator 410 of the number of unread e-mails;
  Icon 420 for the browser module 147, labeled "Browser"; and
  Icon 422 for the video and music player module 152, also referred to as iPod (trademark of Apple Inc. of Cupertino, California) module 152, labeled "iPod"; and
Icons for other applications, such as:
  Icon 424 for the IM module 141, labeled "Text";
  Icon 426 for the calendar module 148, labeled "Calendar";
  Icon 428 for the image management module 144, labeled "Photos";
  Icon 430 for the camera module 143, labeled "Camera";
  Icon 434 for the stocks widget 149-2, labeled "Stocks";
  Icon 436 for the map module 154, labeled "Map";
  Icon 438 for the weather widget 149-1, labeled "Weather";
  Icon 440 for the alarm clock widget 169-6, labeled "Clock";
  Icon 442 for the workout support module 142, labeled "Workout Support";
  Icon 444 for the notes module 153, labeled "Notes"; and
  Icon 446 for a settings application or module, which provides access to settings for device 100 and its various applications 136.

It should be noted that the icon labels illustrated in FIG. 4A are merely examples. For example, in some embodiments, the icon 422 for the video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
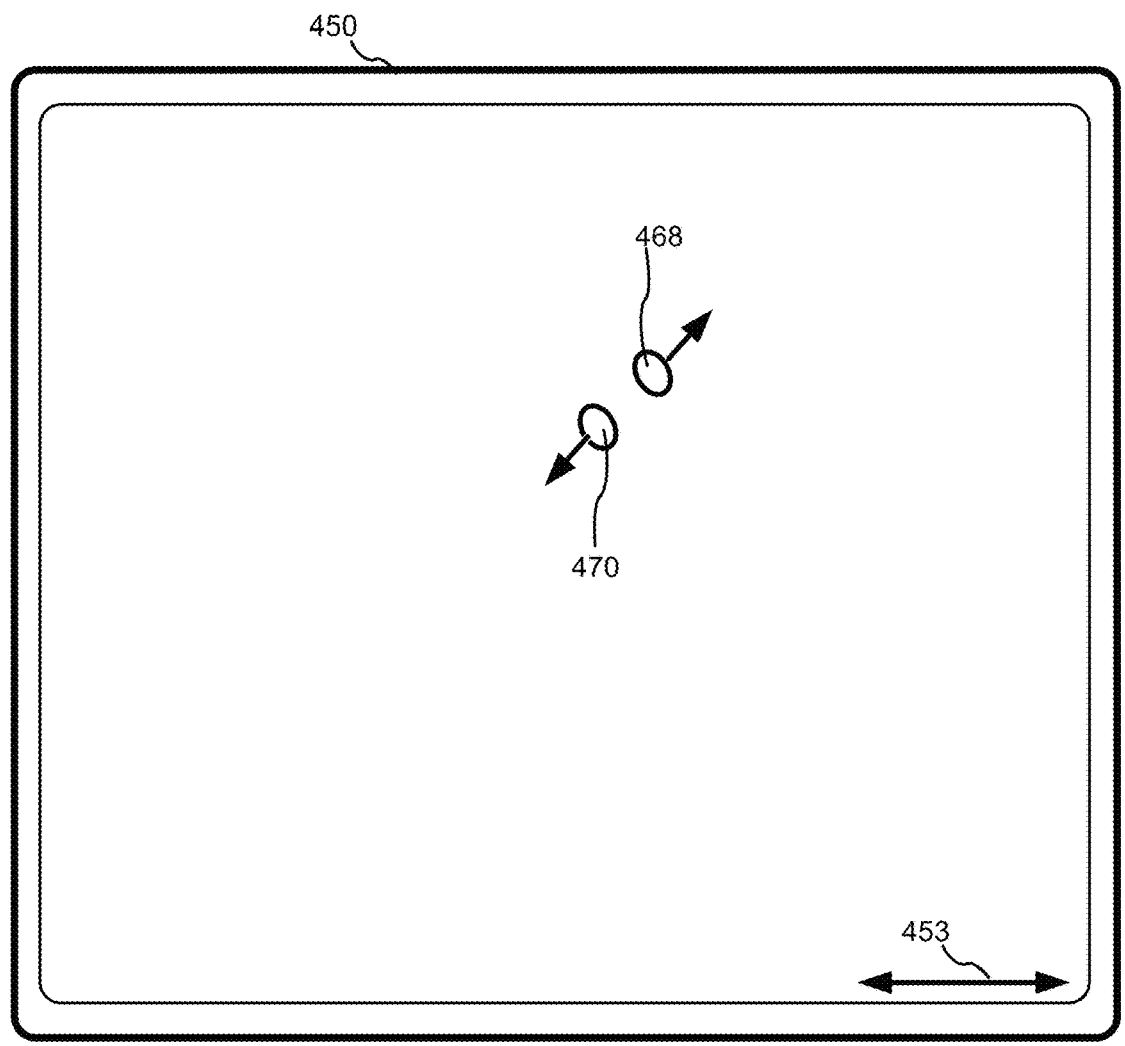
FIG. 4B illustrates an example user interface for a multifunction device with a touch-sensitive surface that is separate from the display in accordance with some embodiments.
Figure 4B:
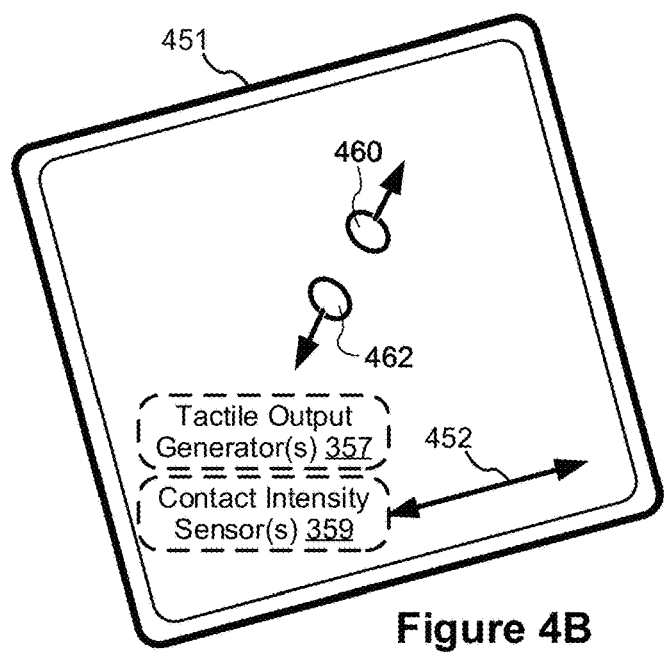

FIG. 4B illustrates an example user interface on a device (e.g., the device 300, FIG. 3) with a touch-sensitive surface 451 (e.g., a tablet or touchpad 355, FIG. 3) that is separate from the display 450. The device 300 also, optionally, includes one or more contact intensity sensors (e.g., the one or more of sensors 359) for detecting intensity of contacts on the touch-sensitive surface 451 and/or the one or more tactile output generators 359 for generating tactile outputs for a user of the device 300.

FIG. 4B illustrates an example user interface on a device (e.g., the device 300, FIG. 3) with a touch-sensitive surface 451 (e.g., a tablet or touchpad 355, FIG. 3) that is separate from the display 450. Although many of the examples that follow will be given with reference to inputs on the touchscreen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., the touch-sensitive surface 451 in FIG. 4B) has a primary axis (e.g., a primary axis 452 in FIG. 4B) that corresponds to a primary axis (e.g., a primary axis 453 in FIG. 4B) on the display (e.g., the display 450 in FIG. 4B). In accordance with these embodiments, the device detects contacts (e.g., contacts 460 and 462 in FIG. 4B) with the touch-sensitive surface 451 at locations that correspond to respective locations on the display (e.g., in FIG. 4B, the contact 460 corresponds to a location 468 and the contact 462 corresponds to a location 470). In this way, user inputs (e.g., contacts 460 and 462, and movements thereof) detected by the device on the touch-sensitive surface (e.g., the touch-sensitive surface 451 in FIG. 4B) are used by the device to manipulate the user interface on the display (e.g., the display 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., the touchpad 355 in FIG. 3 or the touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., the touch-sensitive display system 112 in FIG. 1A or the touch-screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch-screen) will indicate that the user is intending to activate the respective button (as opposed to other user interface elements shown on a display of the device).

User Interfaces and Associated Processes

Attention is now directed toward embodiments of user interfaces ("UI") and associated processes that may be implemented on an electronic device, such as a portable multifunction device (PMD) 100 with a display, a touch-sensitive surface, and optionally one or more sensors to detect intensity of contacts with the touch-sensitive surface, or a device 300 with one or more processors, non-transitory memory, a display, and one or more input devices.

FIGS. 5A-5I illustrate example user interfaces for accessing and navigating a media gallery user interface in accordance with some embodiments. The user interfaces in these figures are used to illustrate the processes described below, including the processes in FIGS. 8A-8D. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B. In some embodiments, user inputs are sometimes referred to herein as touch inputs or touch input gestures.

Figure 5A:
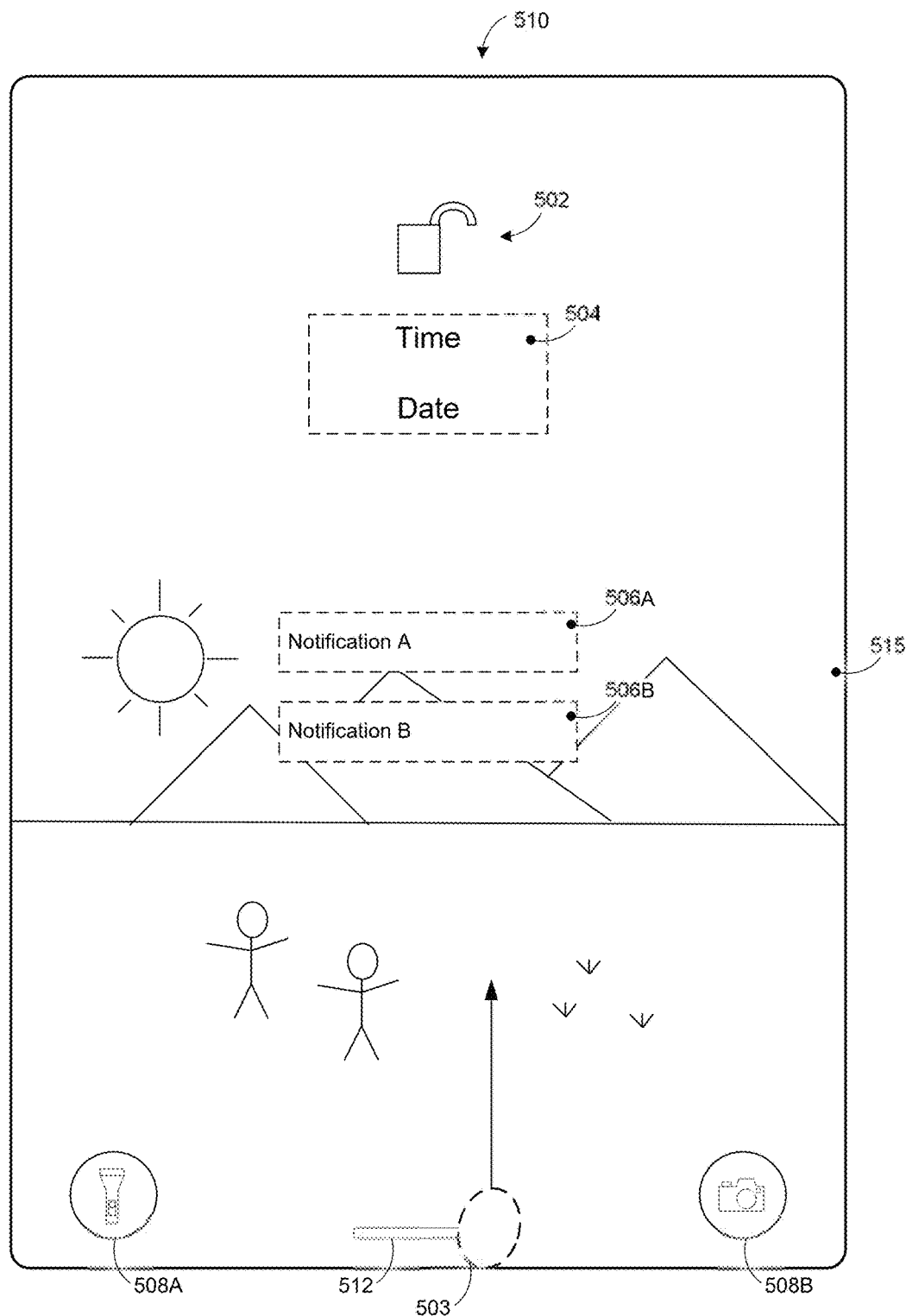
FIGS. 5A-5I illustrate example user interfaces for accessing and navigating a media gallery user interface in accordance with some embodiments.
Figure 5B:
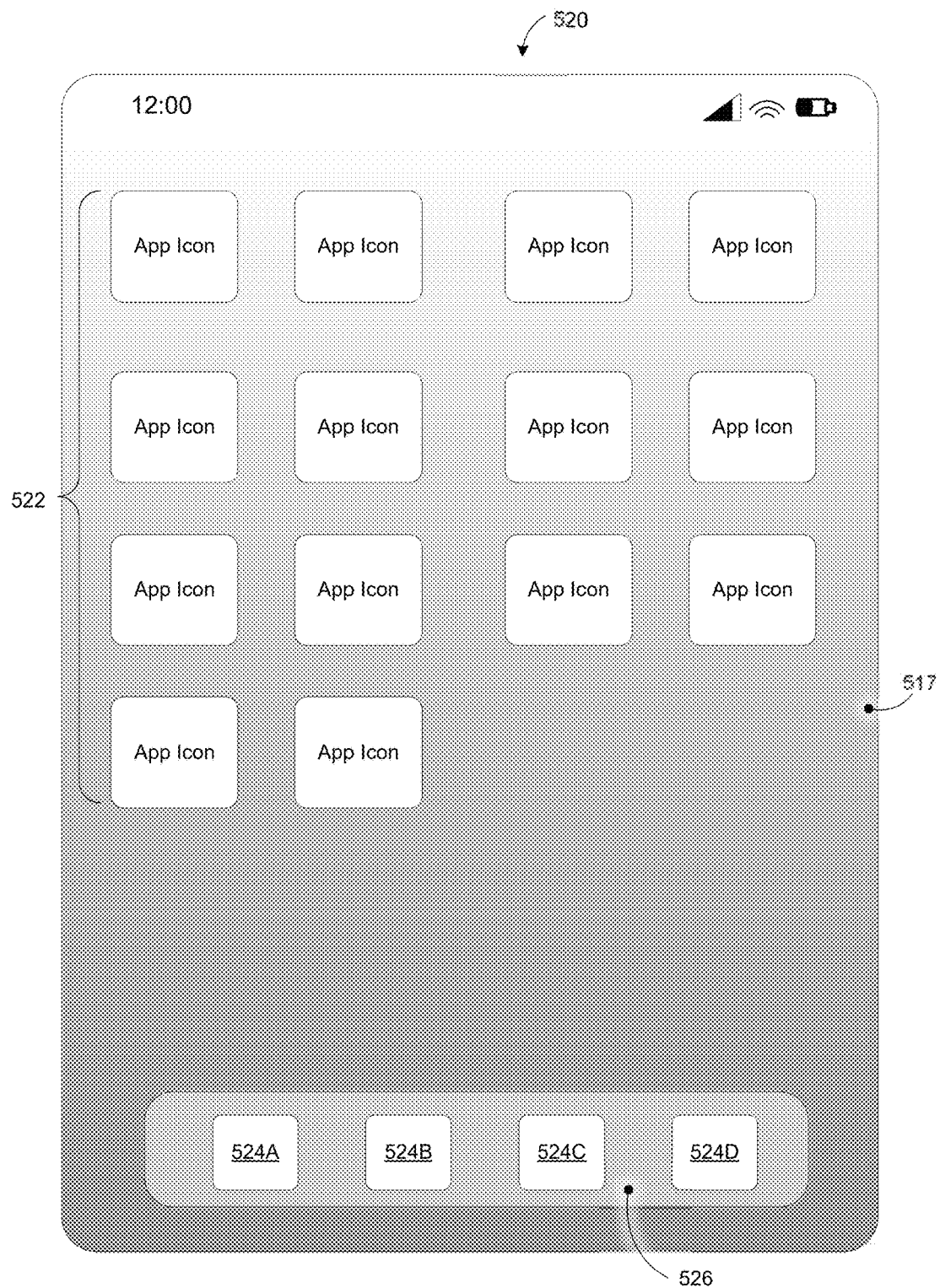

FIGS. 5A and 5B illustrate a sequence in which a wake screen user interface is replaced by a home screen user interface in response to detecting a touch input gesture in accordance with some embodiments. As shown in FIG. 5A, the electronic device displays a wake screen user interface 510 that includes a media item 515 being used as a background or wallpaper. The wake screen user interface 510 also includes a plurality of foreground user interface objects—an authentication indicator 502, a time and date indicator 504, notifications 506A and 506B, a flashlight affordance 508A, an image capture affordance 508B, and a home screen affordance 512.

According to some embodiments, the authentication indicator 502 is represented by an open padlock, as shown in FIG. 5A, while the electronic device is operating in an unlocked mode. According to some embodiments, the authentication indicator 502 is represented by a closed padlock while the electronic device is operating in a locked mode. For example, the electronic device operates in the unlocked mode after a user has been authenticated by the electronic device based on successful entry of a PIN or other alphanumeric code, biometric information (e.g., a 3D face mesh or fingerprint), or the like.

In some embodiments, when selected (e.g., with a single or double tap gesture, tap and hold gesture, deep press gesture, or the like), the flashlight affordance 508A causes the electronic device to maintain display of the wake screen user interface 510 and illuminate a light emission element of the electronic device (e.g., a flash component associated with the camera). In some embodiments, when selected (e.g., with a single or double tap gesture, tap and hold gesture, deep press gesture, or the like), the image capture affordance 508B causes the electronic device to replace display of the wake screen user interface 510 with an image capture user interface provided to capture images using an interior-facing or exterior-facing image sensor of the electronic device.

As shown in FIG. 5A, the electronic device detects a touch input gesture 503 corresponding to an upward swipe that originates at a location that corresponds to a home screen affordance 512. In response to detecting the touch input gesture 503 in FIG. 5A, the electronic device displays a home screen user interface 520 in FIG. 5B. In some embodiments, the electronic device enables (or allows) the transition from the wake screen user interface 510 to the home screen user interface 520 while in the unlocked mode. As shown in FIG. 5B, the electronic device displays a home screen user interface 520 that includes a media item 517 being used as a background or wallpaper. The home screen user interface 520 also includes plurality of selectable application icons 522 and a dock region 526 with selectable application icons 524A, 524B, 524C, and 524D.

For example, the media item 517 corresponds to a smart gradient generated based on one or more visual properties of the media item 515 corresponding to the background for the wake screen user interface 510 shown in FIG. 5A. In some embodiments, the one or more visual properties correspond to a dominant hue/color on a pixelwise basis throughout the media item 515, an average hue/color across the media item 515, an average brightness across the media item 515, an average saturation across the media item 515, or the like. As such, continuing with this example, the media item 517 includes a plurality of stripes (vertical, horizontal, diagonal, etc.) associated with different shades of the dominant color within the media item 515. In some embodiments, a smoothing or blending operation is performed between each of the plurality of stripes. See International Application No. PCT/US2020/024644, filed Mar. 25, 2020, which is incorporated by reference herein in its entirety, for further description regarding the creation of a color gradient (sometimes also herein called a "smart gradient") based on a reference image.

Figure 5C:
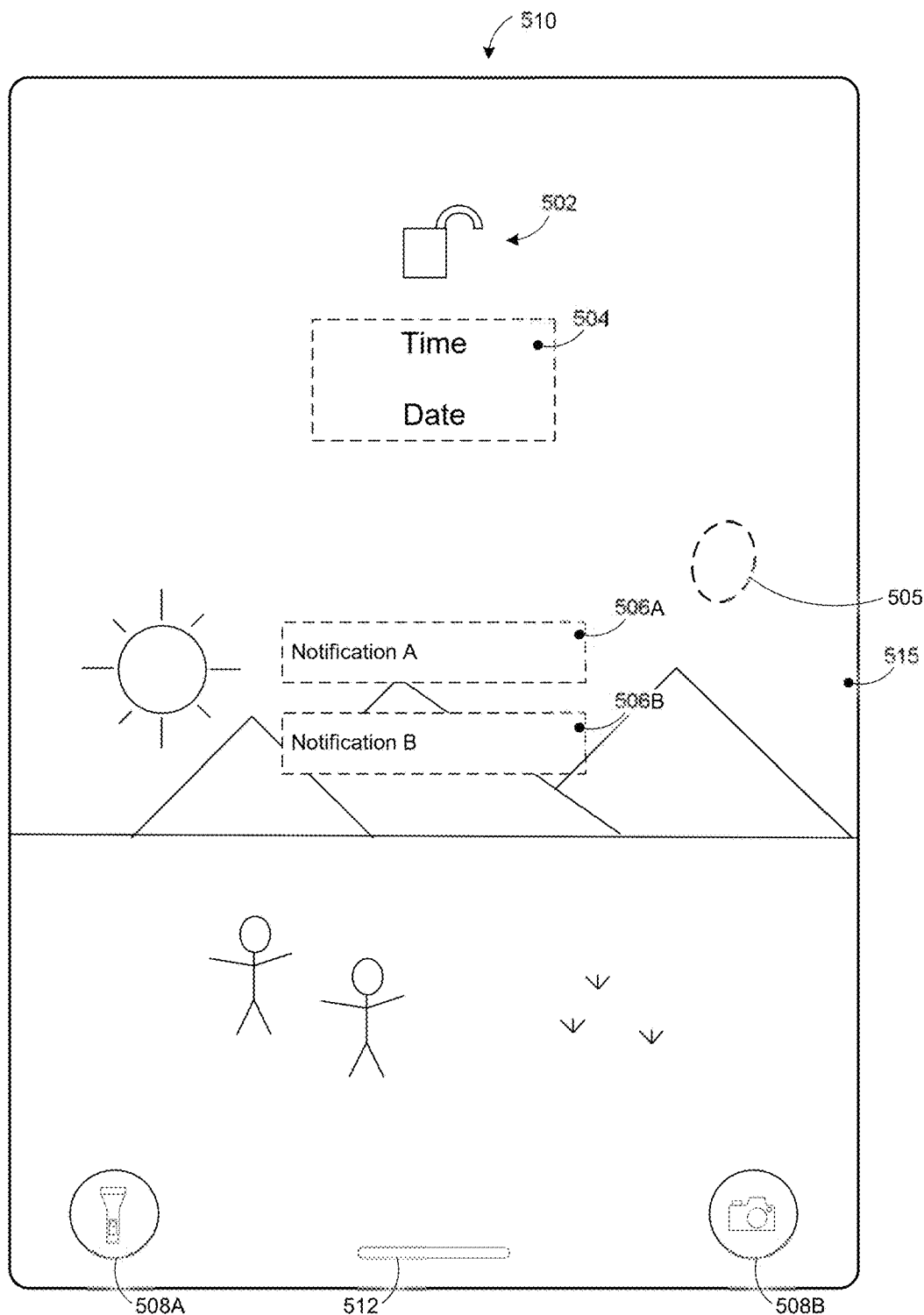
Figure 5D:
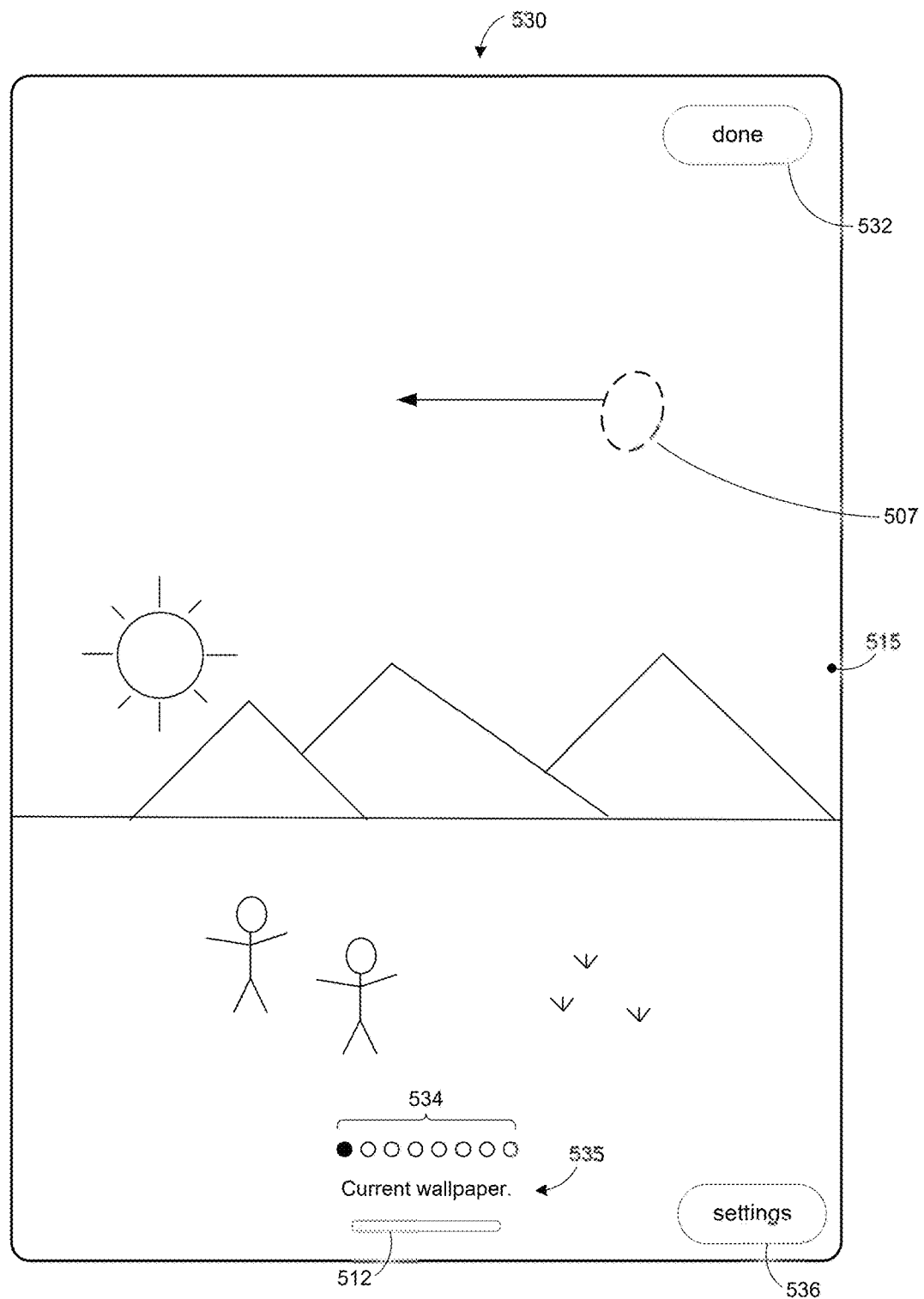

FIGS. 5C and 5D illustrate a sequence in which a wake screen user interface is replaced by a media gallery user interface in response to detecting a touch input in accordance with some embodiments. As shown in FIG. 5C, the electronic device detects a touch input 505 (e.g., a single or double tap gesture, tap and hold gesture, deep press, or the like) at a location that corresponds to the background of the wake screen user interface 510 (e.g., a location that does not correspond to any of the foreground user interface objects within the wake screen user interface 510). In response to detecting the touch input 505 in FIG. 5C, the electronic device displays the media gallery user interface 530 in FIG. 5D. In some embodiments, the electronic device enables (or allows) the transition from the wake screen user interface 510 to the media gallery user interface 530 while in the unlocked mode.

As shown in FIG. 5D, the media gallery user interface 530 includes the media item 515 and a plurality of foreground user interface objects including: a done affordance 532, which, when selected (e.g., with a single or double tap gesture), causes the electronic device to replace the media gallery user interface 530 with the wake screen user interface 510 without changing the background or wallpaper of the wake screen user interface 510; a setting affordance 536, which, when selected (e.g., with a single or double tap gesture), causes the electronic device to replace the media gallery user interface 530 with a wallpaper settings user interface (e.g., the wallpaper settings user interface 605 shown in FIG. 6A); a plurality of pagination dots 534 indicating a position of the media item 515 amongst a plurality of media items in a media gallery associated with the media gallery user interface 530; and a wallpaper indicator 535 indicating that the media item 515 is the current background or wallpaper for the wake screen user interface 510. In some embodiments, in response to detecting an upward swipe gesture within the media gallery user interface 530 (or the like), the electronic device replaces the media gallery user interface 530 with the wake screen user interface 510 without changing the background or wallpaper of the wake screen user interface 510.

Figure 5E:
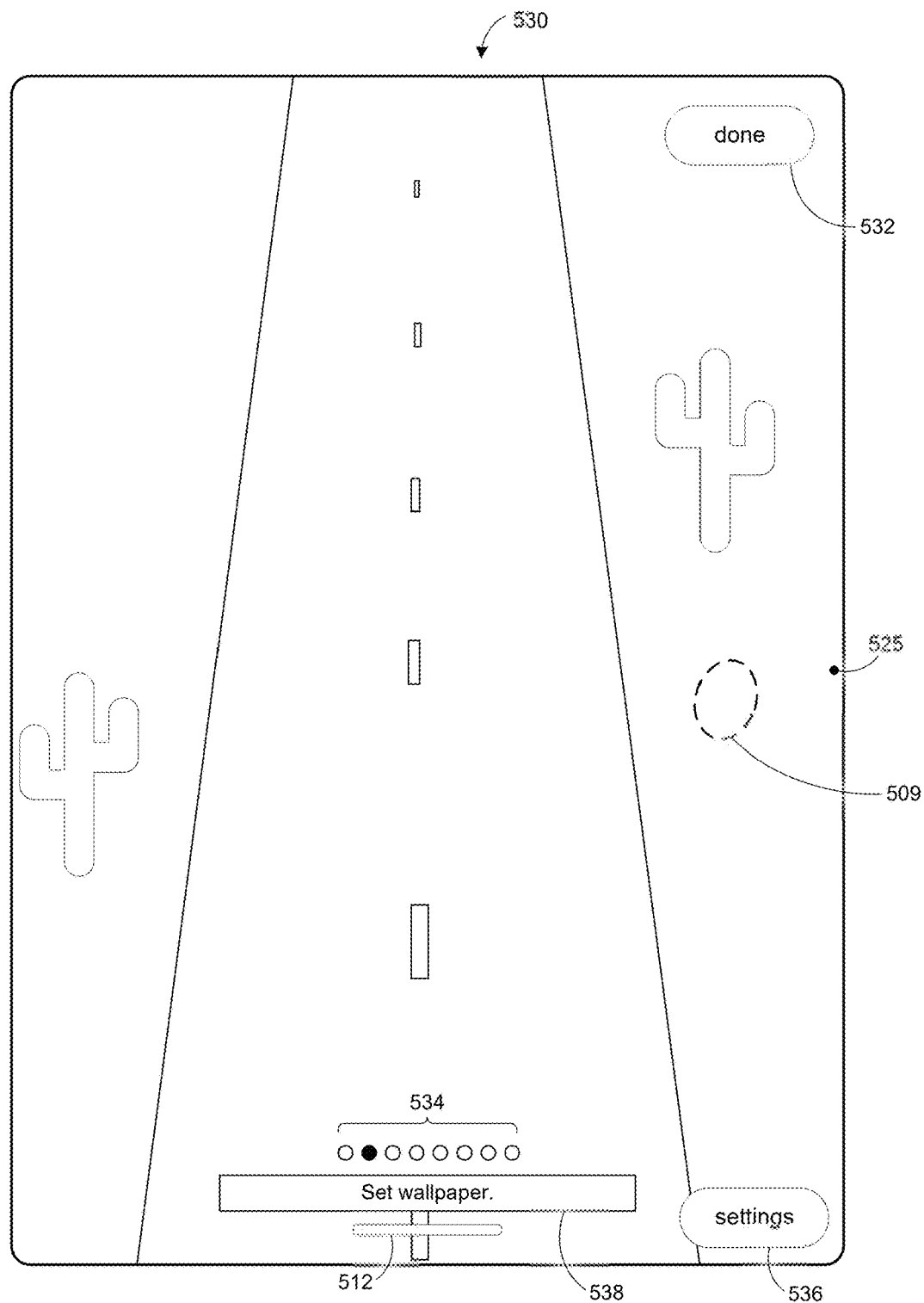

FIGS. 5D and 5E illustrate a sequence in which a first media item is replaced by a second media item within the media gallery user interface in response to detecting a navigation gesture in accordance with some embodiments. As shown in FIG. 5D, the electronic device detects a touch input gesture 507 (sometimes also referred to herein as a navigation gesture) that corresponds to a right-to-left swipe at a location that corresponds to the background of the media gallery user interface 530 (e.g., a location that does not correspond to any of the foreground user interface objects within the media gallery user interface 530). In response to detecting the touch input gesture 507 in FIG. 5D, the electronic device updates the media gallery user interface 530 in FIG. 5E such that a media item 525 is displayed as the background of the media gallery user interface 530. In response to detecting the touch input gesture 507 in FIG. 5D, the electronic device updates the plurality of pagination dots 534 and replaces the wallpaper indicator 535 with a "set wallpaper" affordance 538 in FIG. 5E, which, when selected (e.g., with a single or double tap gesture), causes the electronic device to set the media item 525 as the background or wallpaper for the wake screen user interface 510. According to some embodiments, when the "set wallpaper" affordance 538 is selected, the electronic device also sets a media item generated based on the media item 525 as the background or wallpaper for the home screen user interface 520 (e.g., a smart color, smart gradient, smart pattern, or the like as described below with reference to the method 900).

Figure 5F:
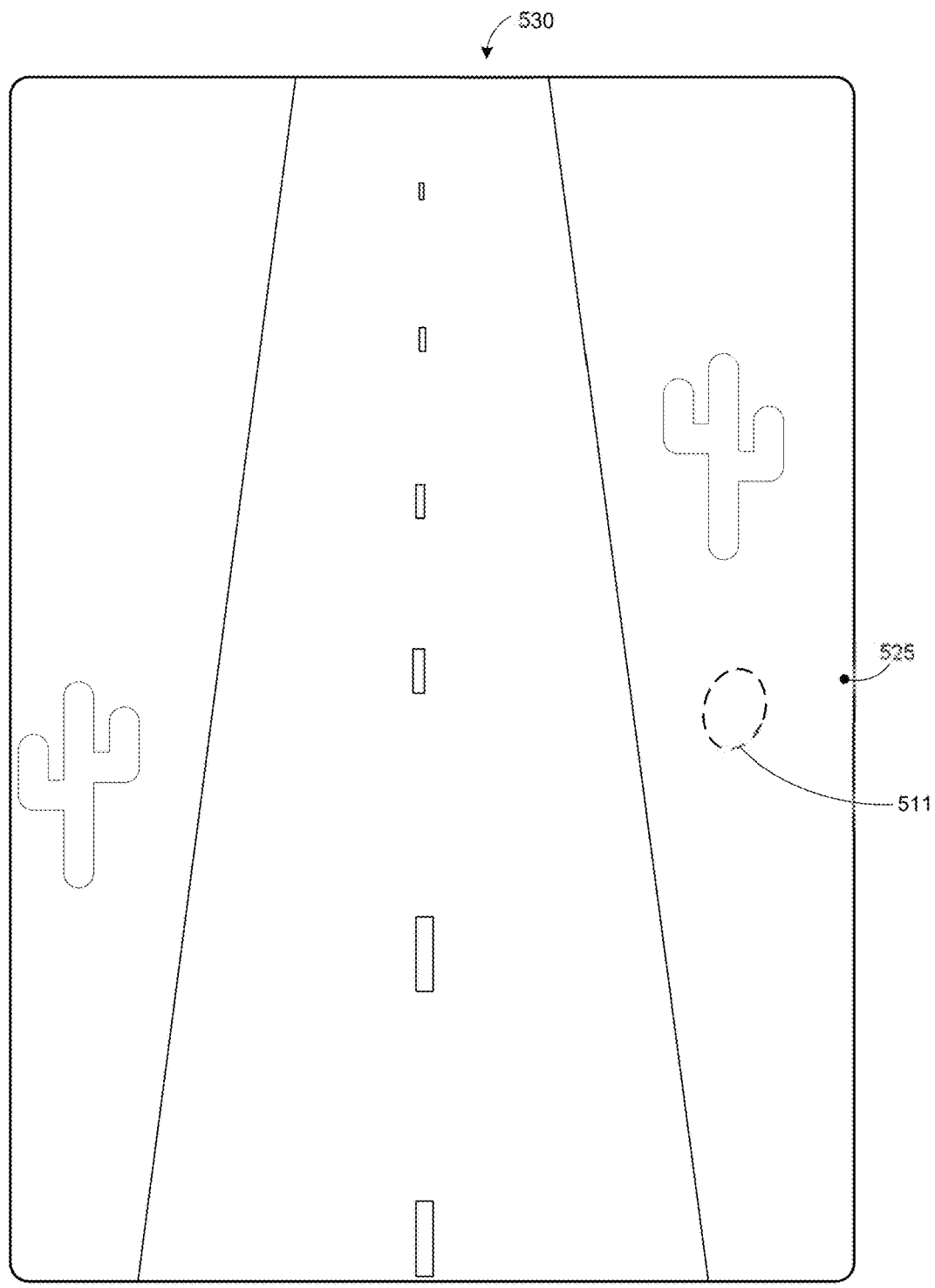

FIGS. 5E and 5F illustrate a sequence in which one or more foreground user interface objects within the media gallery user interface cease to be displayed in response to detecting a touch input in accordance with some embodiments. As shown in FIG. 5E, the electronic device detects a touch input 509 (e.g., a single or double tap gesture, a tap and hold gesture, a deep press, or the like) at a location that corresponds to the background of the media gallery user interface 530 (e.g., a location that does not correspond to any of the foreground user interface objects within the media gallery user interface 530). In response to detecting the touch input 509 in FIG. 5E, the electronic device ceases display of the foreground user interface objects within the media gallery user interface 530 in FIG. 5F. According to some embodiments, the electronic device ceases display of the foreground user interface objects within the media gallery user interface 530 after expiration of a determined timeout period (e.g., 10 seconds).

Figure 5G:
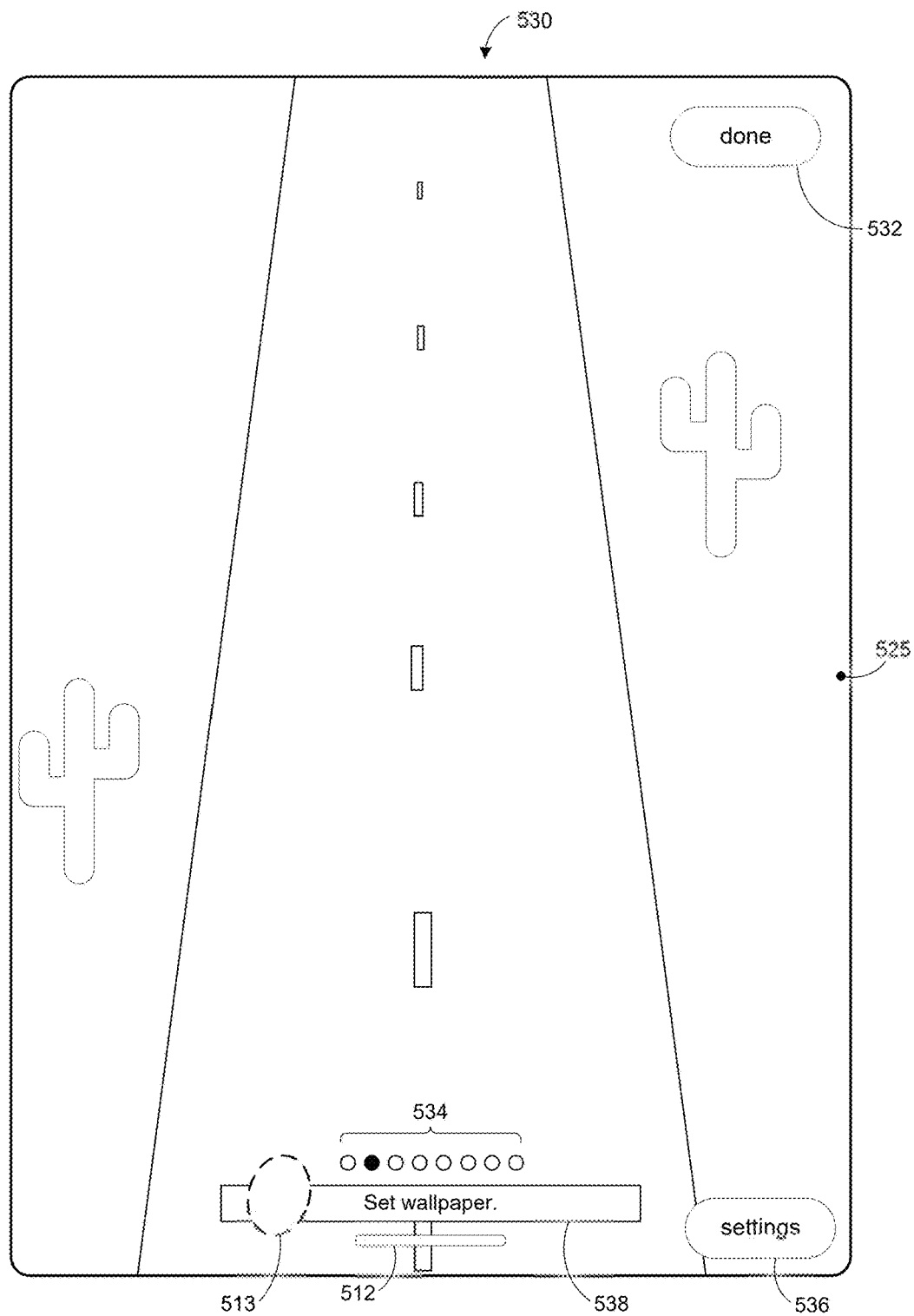

FIGS. 5F and 5G illustrate a sequence in which the one or more foreground user interface objects are redisplayed within the media gallery user interface in response to detecting a touch input in accordance with some embodiments. As shown in FIG. 5F, the electronic device detects a touch input 511 (e.g., a single or double tap gesture, a tap and hold gesture, a deep press, or the like) at a location that corresponds to the background of the media gallery user interface 530. In response to detecting the touch input 511 in FIG. 5F, the electronic device redisplays the foreground user interface objects within the media gallery user interface 530 in FIG. 5G.

Figure 5H:
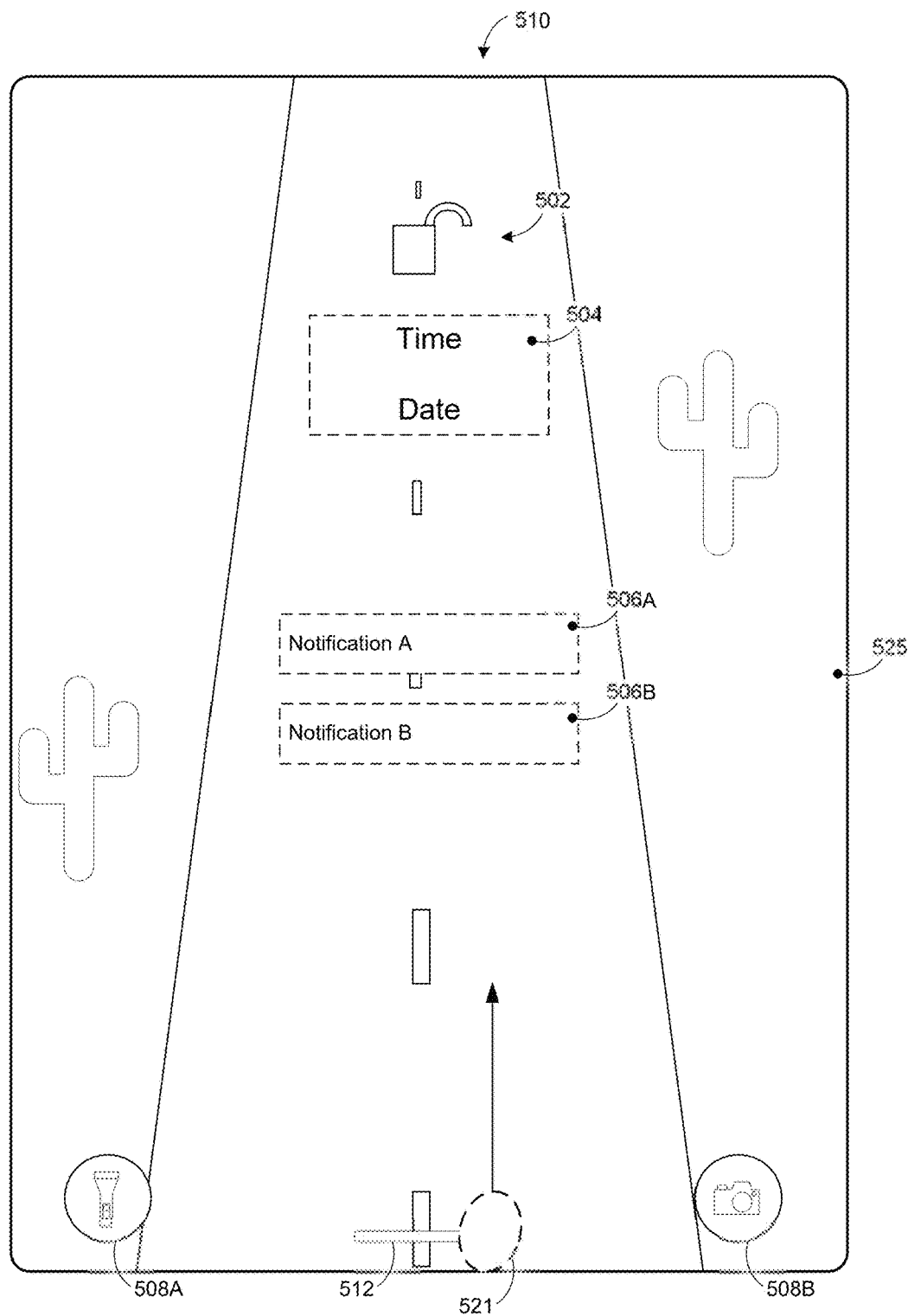

FIGS. 5G and 5H illustrate a sequence in which the media gallery user interface is replaced by the wake screen user interface in response to a selection input setting the second media item as the background for the wake screen user interface in accordance with some embodiments. As shown in FIG. 5G, the electronic device detects a touch input 513 (e.g., a tap gesture) at a location that corresponds to the "set wallpaper" affordance 538 within the media gallery user interface 530. In response to detecting the touch input 513 in FIG. 5G, the electronic device redisplays the wake screen user interface 510 including the media item 525 as the background or wallpaper thereof in FIG. 5H.

Figure 5I:
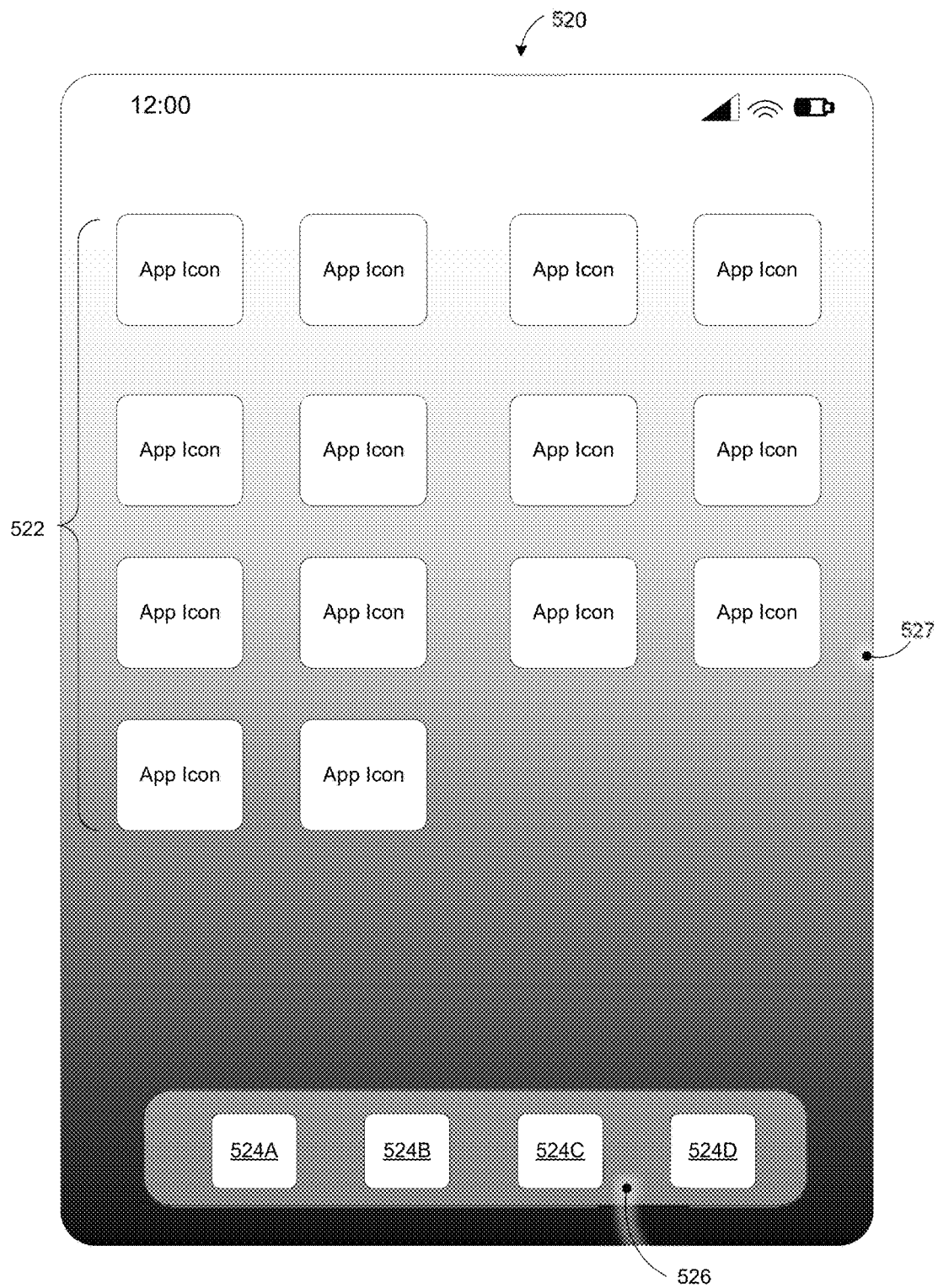

FIGS. 5H and 5I illustrate a sequence in which a wake screen user interface is replaced by a home screen user interface in response to detecting a touch input gesture in accordance with some embodiments. As shown in FIG. 5H, the electronic device detects a touch input gesture 521 corresponding to an upward swipe that originates at a location that corresponds to the home screen affordance 512. In response to detecting the touch input gesture 521 in FIG. 5H, the electronic device displays the home screen user interface 520 in FIG. 5I. In some embodiments, the electronic device enables (or allows) the transition from the wake screen user interface 510 to the home screen user interface 520 while in the unlocked mode. As shown in FIG. 5I, the electronic device displays the home screen user interface 520 that includes a media item 527 being used as a background or wallpaper.

For example, the media item 527 corresponds to a smart gradient generated based on one or more visual properties of the media item 525 corresponding to the background for the wake screen user interface 510 in FIG. 5H. In some embodiments, the one or more visual properties correspond to a dominant hue/color on a pixelwise basis throughout the media item 525, an average hue/color across the media item 525, an average brightness across the media item 525, an average saturation across the media item 525, or the like. As such, continuing with this example, the media item 527 includes a plurality of stripes (vertical, horizontal, diagonal, etc.) associated with different shades of the dominant color within the media item 525. In some embodiments, a smoothing or blending operation is performed between each of the plurality of stripes. See International Application No. PCT/US2020/024644, filed Mar. 25, 2020, which is incorporated by reference herein in its entirety, for further description regarding the creation of a color gradient (sometimes also herein called a "smart gradient") based on a reference image.

FIGS. 6A-6G illustrate example user interfaces for changing a home screen treatment being applied to a home screen user interface in accordance with some embodiments. The user interfaces in these figures are used to illustrate the processes described below, including the processes in FIGS. 9A and 9B. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B. In some embodiments, user inputs are sometimes referred to herein as touch inputs or touch input gestures.

Figure 6A:
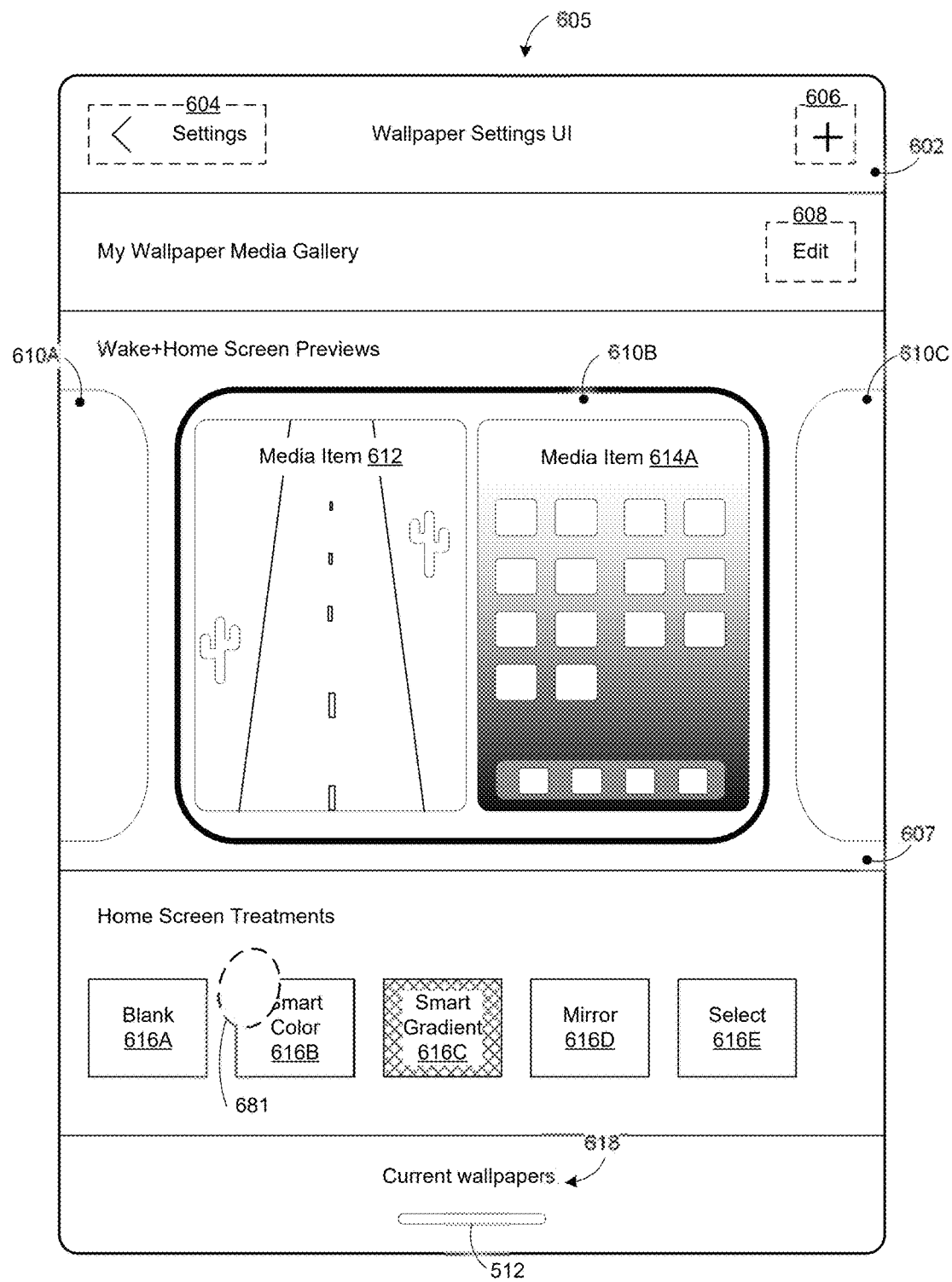
FIGS. 6A-6G illustrate example user interfaces for changing a home screen treatment being applied to a home screen user interface in accordance with some embodiments.
Figure 6B:
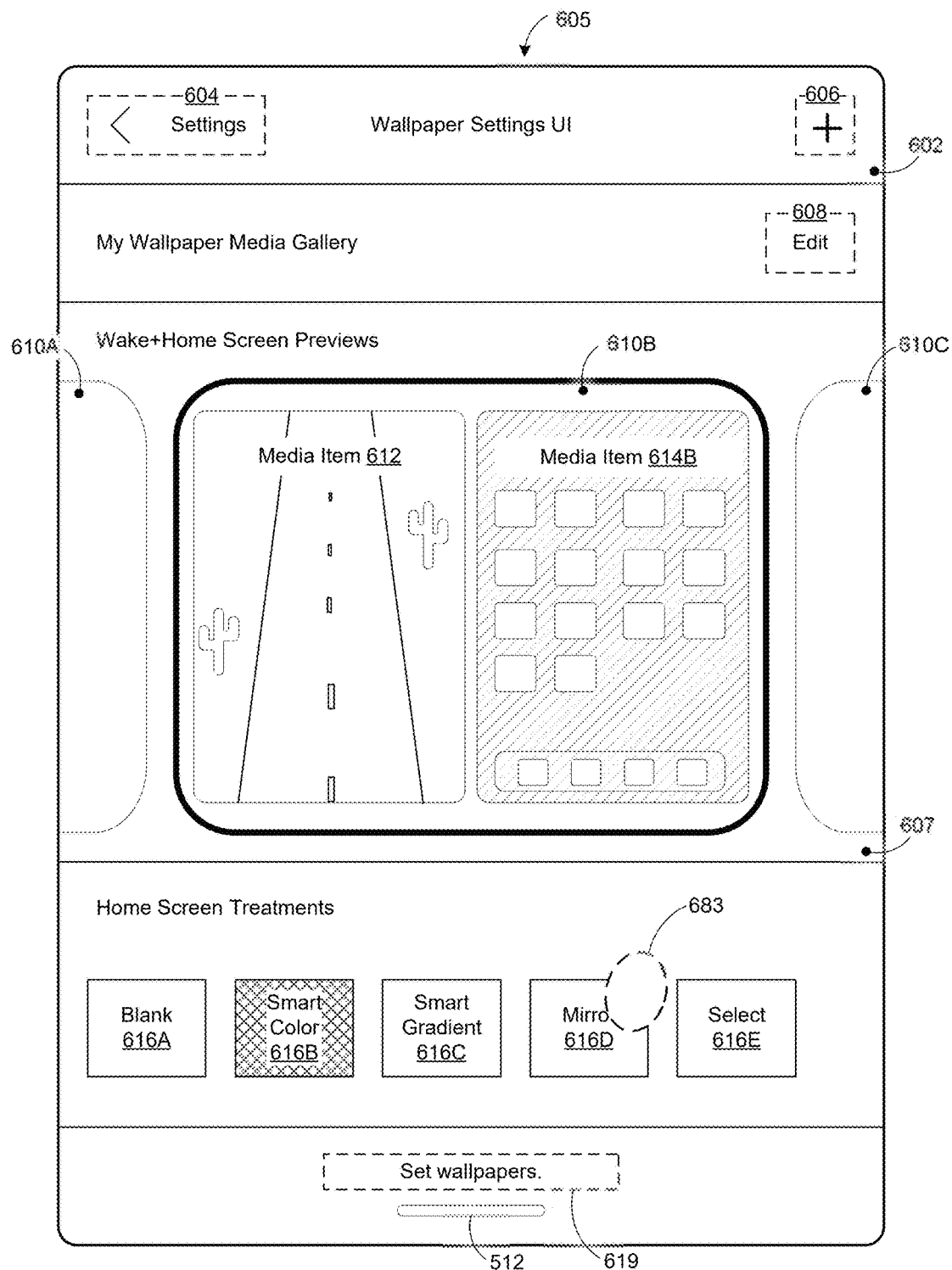

FIGS. 6A and 6B illustrate a sequence in which a home screen user interface preview is updated within a wallpaper setting user interface in response to detecting selection of a smart color home screen treatment option in accordance with some embodiments. As shown in FIG. 6A, the electronic device displays a wallpaper settings user interface 605 that includes a region 607 with a plurality of wake screen user interface and home screen user interface preview pairings 610A, 610B, 610C, . . . (sometimes also collectively referred to herein as the "wake+home screen preview pairings 610"), where the wake screen user interface and home screen user interface preview pairing 610B is currently displayed. According to some embodiments, the wake+ home screen preview pairings 610 correspond to media items within the media gallery user interface described above with reference to FIGS. 5A-5I. The wallpaper settings user interface 605 also includes selectable home screen treatment options 616A, 616B, 616C, 616D, and 616E (sometimes also collectively referred to herein as the "home screen treatment options 616"), which, when selected (e.g., with a single or double tap gesture), cause the electronic device to update the media item displayed as the background or wallpaper for the home screen user interface within the currently-selected wake screen user interface and home screen user interface preview pairing (e.g., as illustrated by the sequence shown in FIGS. 6A and 6B). For example, the home screen treatment option 616E enables the user to select an image to be used as a background the home screen user interface that is different from the current image used as the background the wake screen user interface.

The wake screen user interface and home screen user interface preview pairing 610B includes a media item 612 set as the background or wallpaper for the wake screen user interface and a media item 614A set as the background or wallpaper for the home screen user interface based on the currently-selected home screen treatment option 616B (e.g., smart gradient). As such, as shown in FIG. 6A, the media item 614A corresponds to a smart gradient background or wallpaper generated based on the media item 612.

For example, the media item 614A corresponds to a smart gradient generated based on one or more visual properties of the media item 612 corresponding to the background for the wake screen user interface. In some embodiments, the one or more visual properties correspond to a dominant hue/color on a pixelwise basis throughout the media item 612, an average hue/color across the media item 612, an average brightness across the media item 612, an average saturation across the media item 612, or the like. As such, continuing with this example, the media item 614A includes a plurality of stripes (vertical, horizontal, diagonal, etc.) associated with different shades of the dominant color within the media item 612. In some embodiments, a smoothing or blending operation is performed between each of the plurality of stripes. See International Application No. PCT/US2020/024644, filed Mar. 25, 2020, which is incorporated by reference herein in its entirety, for further description regarding the creation of a color gradient (sometimes also herein called a "smart gradient") based on a reference image.

Figure 6D:
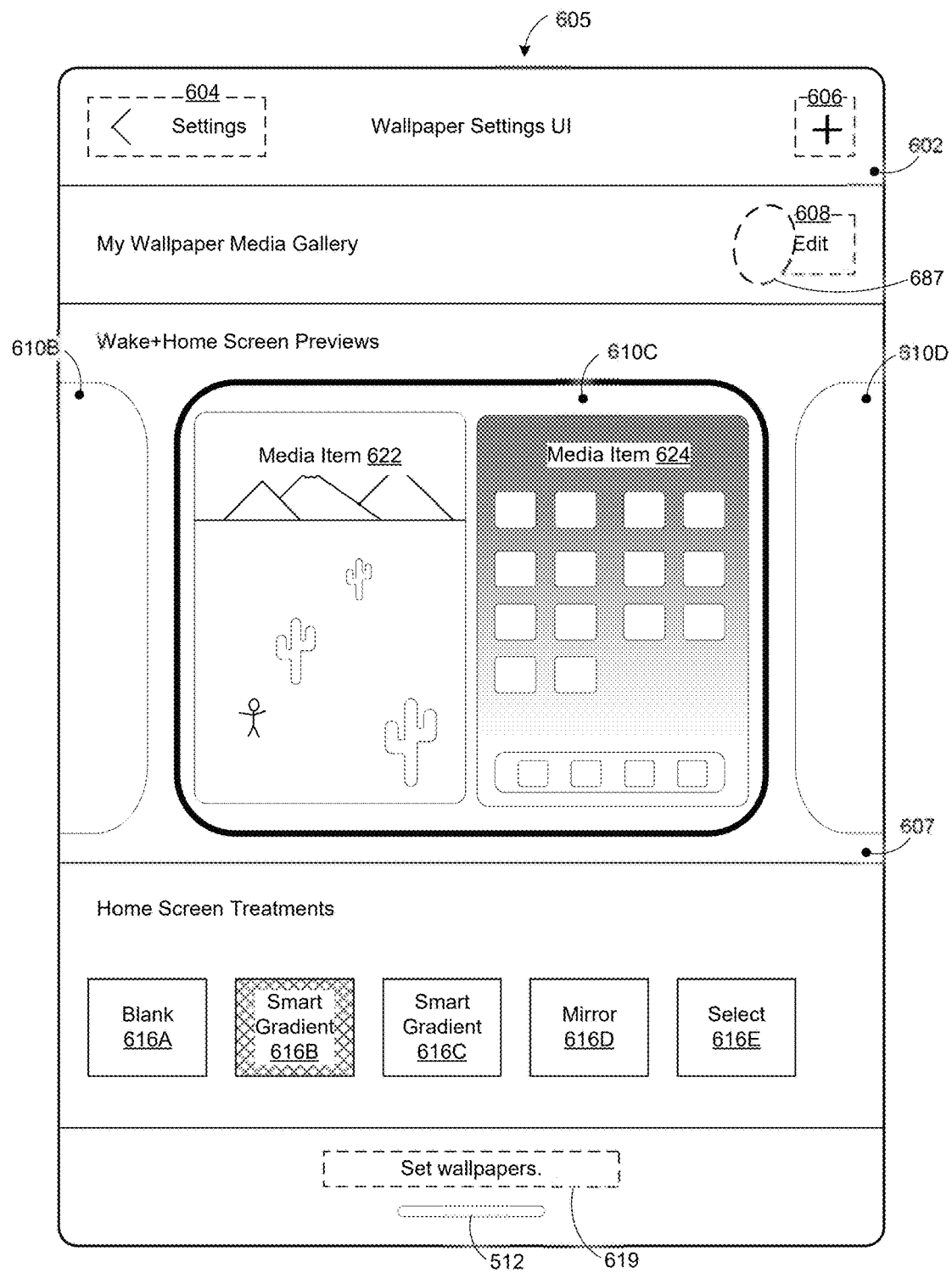
Figure 6E:
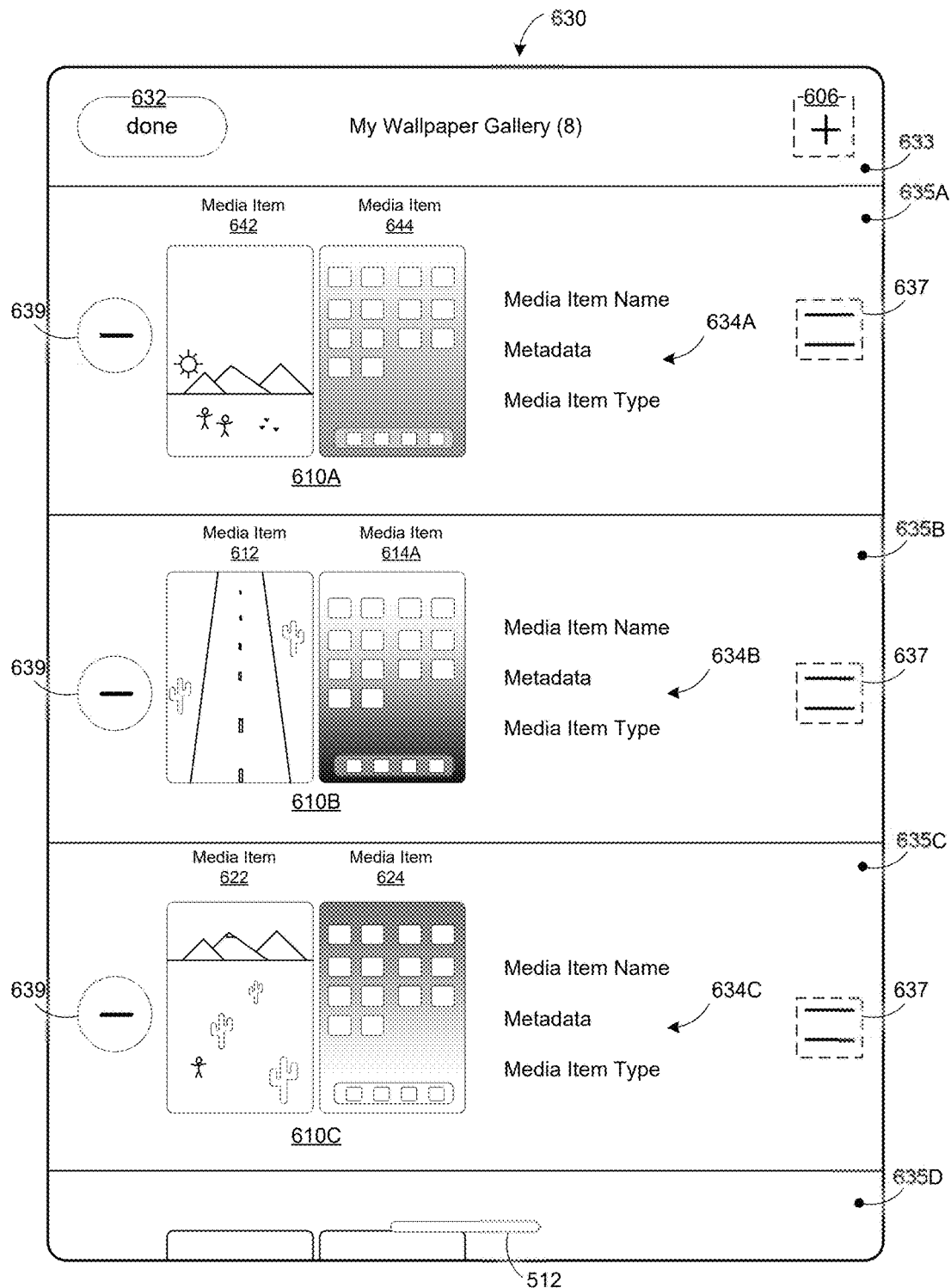
Figure 7A:
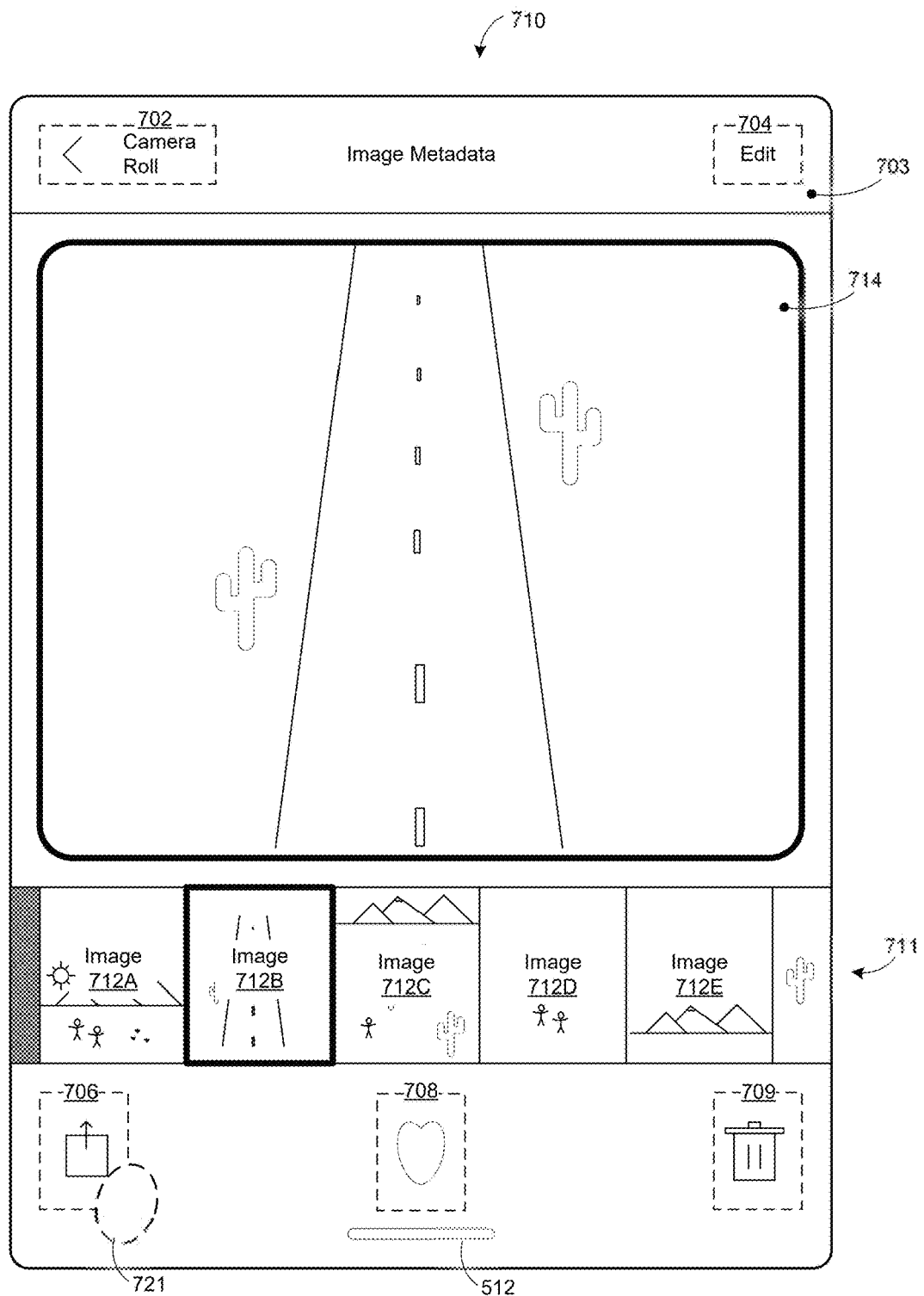
FIGS. 7A-7H illustrate example user interfaces for adding one or more media items to a media gallery in accordance with some embodiments.

The wallpaper settings user interface 605 also includes a chrome region 602 with: a back affordance 604, which, when selected (e.g., with a single or double tap gesture), causes the electronic device to replace display of the wallpaper settings user interface 605 with a setting user interface; and an addition affordance 606, which, when selected (e.g., with a single or double tap gesture), causes the electronic device to display a media gallery addition user interface for adding one or media items to a media gallery (e.g., similar to the media item selection user interface 710 in FIG. 7A). The wallpaper settings user interface 605 also includes an edit affordance 608, which, when selected (e.g., with a single or double tap gesture), causes the electronic device to replace display of the wallpaper settings user interface 605 with a media gallery editing user interface 630 for editing the media items in the media gallery (e.g., as illustrated by the sequence shown in FIGS. 6D and 6E). The wallpaper settings user interface 605 also includes: a wallpaper indicator 618 indicating that the media item 612 is the current background or wallpaper for the wake screen user interface and the media item 614A is the current background or wallpaper for the home screen user interface; and a home screen affordance 512, which, when selected with an upward swipe gesture originating thereon, causes the electronic device to replace display of the wallpaper settings user interface 605 with the home screen user interface (e.g., the home screen user interface 520 in FIG. 5I).

As shown in FIG. 6A, the electronic device detects a touch input 681 (e.g., a tap gesture) at a location that corresponds to the home screen treatment option 616C (e.g., smart color). In response to detecting the touch input 681 in FIG. 6A, the electronic device updates the wake screen user interface and home screen user interface preview pairing 610B in FIG. 6B by setting a media item 614B as the background or wallpaper for the home screen user interface based on the currently-selected home screen treatment option 616C (e.g., smart color). In response to detecting the touch input 681 in FIG. 6A, the electronic device replaces the wallpaper indicator 618 with a "set wallpaper" affordance 619 in FIG. 6B, which, when selected (e.g., with a single or double tap gesture), causes the electronic device to set the media item 612 as the background or wallpaper for the wake screen user interface and to set the media item 614B as the background or wallpaper for the home screen user interface.

As shown in FIG. 6B, the media item 614B corresponds to a smart color background or wallpaper generated based on the media item 612. For example, the media item 614B corresponds to a smart color generated based on one or more visual properties of the media item 612 corresponding to the background for the wake screen user interface. In some embodiments, the one or more visual properties correspond to a dominant hue/color on a pixelwise basis throughout the media item 612, an average hue/color across the media item 612, an average brightness across the media item 612, an average saturation across the media item 612, or the like.

Figure 6C:
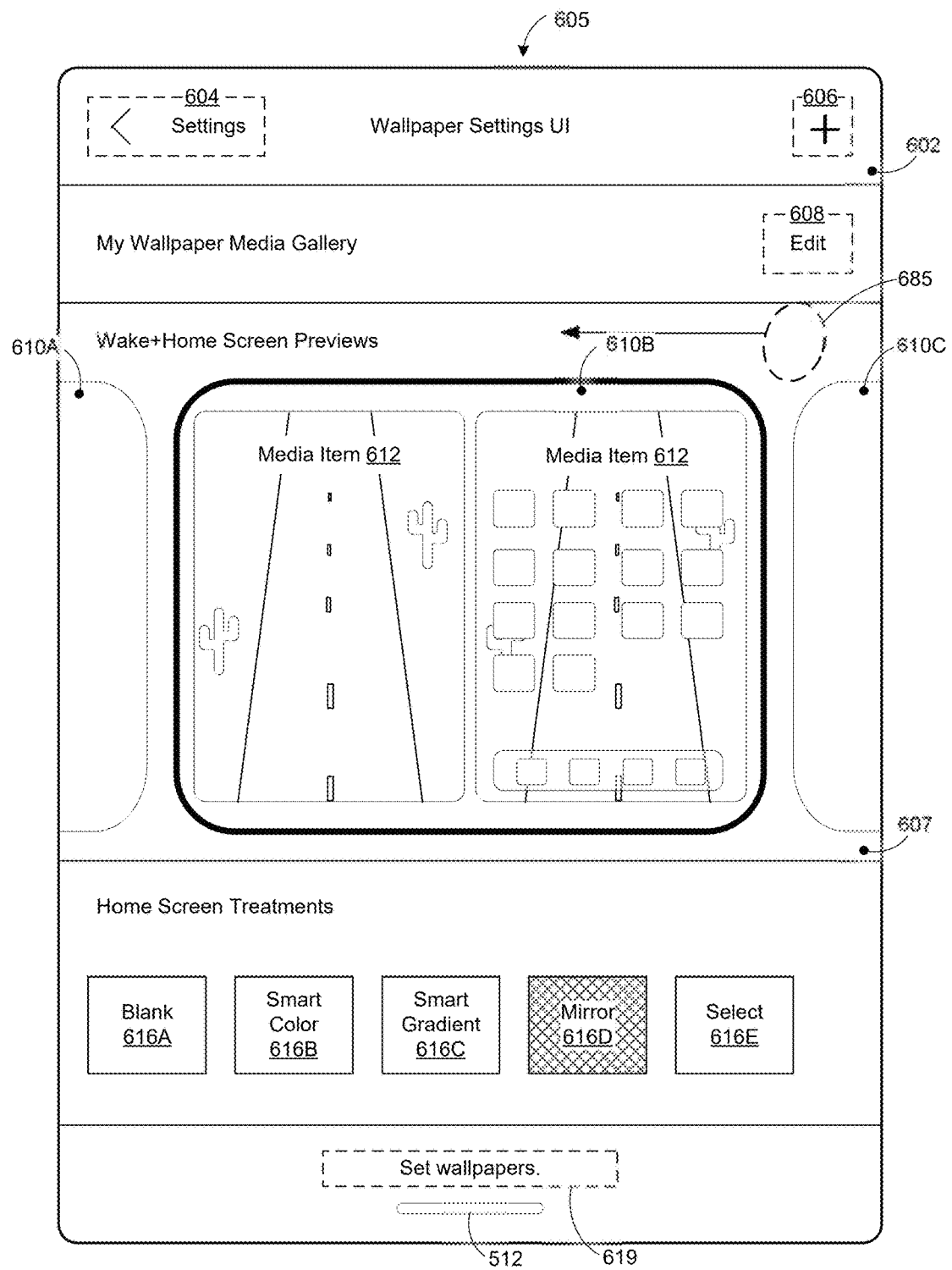

FIGS. 6B and 6C illustrate a sequence in which a home screen user interface preview is updated in response to detecting selection of a mirror home screen treatment option in accordance with some embodiments. As shown in FIG. 6B, the electronic device detects a touch input 683 (e.g., a tap gesture) at a location that corresponds to the home screen treatment option 616D (e.g., mirror). In response to detecting the touch input 683 in FIG. 6B, the electronic device updates the wake screen user interface and home screen user interface preview pairing 610B in FIG. 6C by setting the media item 612 as the background or wallpaper for the home screen user interface based on the currently-selected home screen treatment option 616D (e.g., mirror).

FIGS. 6C and 6D illustrate a sequence in which a first wake screen+home screen preview pairing is replaced by a second wake screen+home screen preview pairing in response to detecting a navigation gesture in accordance with some embodiments. As shown in FIG. 6C, the electronic device detects a touch input gesture 685 (sometimes also referred to herein as a navigation gesture) that corresponds to a right-to-left swipe gesture within the region 607 that includes the wake+home screen preview pairings 610. In response to detecting the touch input gesture 685 in FIG. 6C, the electronic device navigates through the wake+home screen preview pairings 610 in FIG. 6D such that the wake screen user interface and home screen user interface preview pairing 610C is currently displayed.

The wake screen user interface and home screen user interface preview pairing 610C includes a media item 622 set as the background or wallpaper for the wake screen user interface and a media item 624 set as the background or wallpaper for the home screen user interface based on the currently-selected home screen treatment option 616B (e.g., smart gradient). As such, as shown in FIG. 6D, the media item 624 corresponds to a smart gradient background or wallpaper generated based on the media item 622.

For example, the media item 624 corresponds to a smart gradient generated based on one or more visual properties of the media item 622 corresponding to the background for the wake screen user interface. In some embodiments, the one or more visual properties correspond to a dominant hue/color on a pixelwise basis throughout the media item 622, an average hue/color across the media item 622, an average brightness across the media item 622, an average saturation across the media item 622, or the like. As such, continuing with this example, the media item 624 includes a plurality of stripes (vertical, horizontal, diagonal, etc.) associated with different shades of the dominant color within the media item 622. In some embodiments, a smoothing or blending operation is performed between each of the plurality of stripes. See International Application No. PCT/US2020/024644, filed Mar. 25, 2020, which is incorporated by reference herein in its entirety, for further description regarding the creation of a color gradient (sometimes also herein called a "smart gradient") based on a reference image.

FIGS. 6D and 6E illustrate a sequence in which the wallpaper settings user interface is replaced with a media gallery editing user interface in accordance with some embodiments. As shown in FIG. 6D, the electronic device detects a touch input 687 (e.g., a tap gesture) at a location that corresponds to the edit affordance 608. In response to detecting the touch input 687 in FIG. 6D, the electronic device replaces display of the wallpaper settings user interface 605 with the media gallery editing user interface 630 in FIG. 6E.

As shown in FIG. 6E, the media gallery editing user interface 630 includes a chrome region 633 with: an addition affordance 606, which, when selected (e.g., with a single or double tap gesture), causes the electronic device to display a media gallery addition user interface for adding one or more media items to a media gallery (e.g., similar to the media item selection user interface 710 in FIG. 7A); and a done affordance 632, which, when selected (e.g., with a single or double tap gesture), causes the electronic device to replace the media gallery editing user interface 630 with the wallpaper settings user interface 605. As shown in FIG. 6E, the media gallery editing user interface 630 also includes a plurality of wake+home screen preview pairing regions 635A, 635B, 635C, 635D, . . . (sometimes collectively referred to herein as the "wake+home screen preview pairing regions 635") each including a movement handle 637 provided to reorder a respective wake+home screen preview pairing within the media gallery and a deletion affordance 639, which, when selected causes the electronic device to delete a respective wake+home screen preview pairing from the media gallery. According to some embodiments, the media gallery editing user interface 630 includes a number of the wake+home screen preview pairing regions 635 equivalent to a number of media items in the media gallery (e.g., eight media items as within the chrome region 633 in FIG. 6E). In some embodiments, in response to detecting a scroll gesture (e.g., a downward or upward swipe), the electronic device scrolls the wake+home screen preview pairing regions 635 accordingly.

The wake+home screen preview pairing region 635A corresponds to a wake+home screen preview pairing 610A that includes a media item 642 set as the wake screen user interface background or wallpaper and a media item 644 set as the home screen user interface background or wallpaper. For example, the media item 644 corresponds to a smart gradient generated based on the media item 642. The wake+home screen preview pairing region 635A also includes information 634A associated with the media item 642 such as a media item name, metadata (e.g., time, location, etc.), and a media item type (e.g., still image, live image, panorama, square, video, portrait, slow-motion, time-lapse, etc.).

The wake+home screen preview pairing region 635B corresponds to the wake+home screen preview pairing 610B that includes the media item 612 set as the wake screen user interface background or wallpaper and the media item 614A set as the home screen user interface background or wallpaper. For example, the media item 614A corresponds to a smart gradient generated based on the media item 612. The wake+home screen preview pairing region 635B also includes information 634B associated with the media item 612 such as a media item name, metadata (e.g., time, location, etc.), and a media item type (e.g., still image, live image, panorama, square, video, portrait, slow-motion, time-lapse, etc.).

The wake+home screen preview pairing region 635C corresponds to the wake+home screen preview pairing 610C that includes the media item 622 set as the wake screen user interface background or wallpaper and the media item 624 set as the home screen user interface background or wallpaper. For example, the media item 624 corresponds to a smart gradient generated based on the media item 622. The wake+home screen preview pairing region 635C also includes information 634C associated with the media item 622 such as a media item name, metadata (e.g., time, location, etc.), and a media item type (e.g., still image, live image, panorama, square, video, portrait, slow-motion, time-lapse, etc.).

According to some embodiments, the wake+home screen preview pairings 610 shown within the media gallery editing user interface 630 apply a same home screen treatment to the home screen user interface backgrounds or wallpapers (e.g., smart gradient). According to some embodiments, the wake+home screen preview pairings 610 shown within the media gallery editing user interface 630 may apply different home screen treatments to the backgrounds or wallpapers for the home screen user interface based on previous user selected home screen treatments, randomly selected home screen treatments, or the like.

Figure 6F:
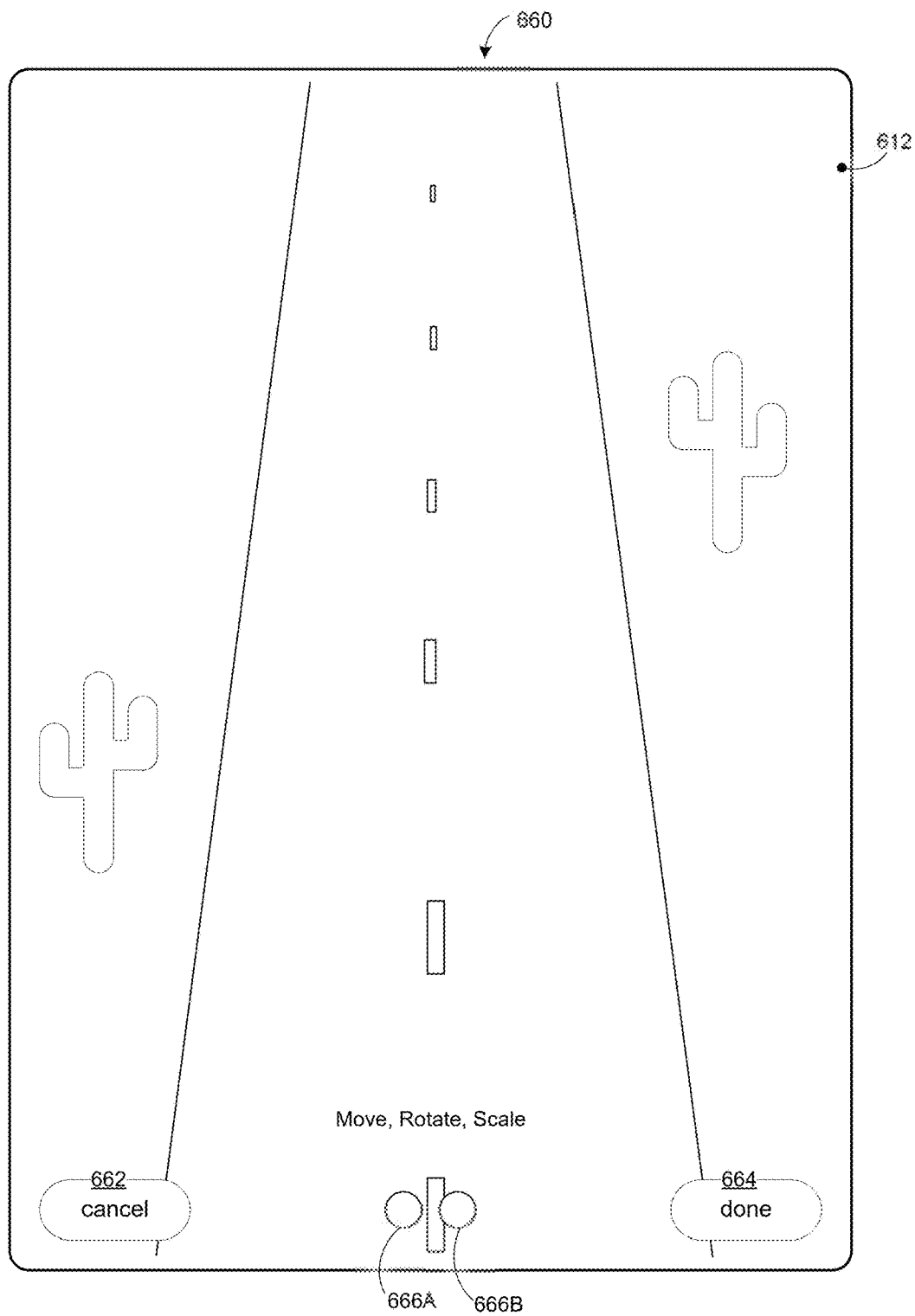

As shown in FIG. 6F, the electronic device displays a cropping user interface 660 provided to modify the media item 612 to be set as the background or wallpaper for the wake screen user interface. For example, the electronic device displays the cropping user interface 660 in response to detecting a user input (e.g., a tap gesture) at a location that corresponds to the wake screen user interface preview of the wake+home screen preview pairing within the wallpaper settings user interface 605 in FIGS. 6A-6D or within the media gallery editing user interface 630 in FIG. 6E.

For example, while the electronic device displays the cropping user interface 660, the user is able to move or pan the media item 612, rotate the media item 612, scale or zoom the media item 612, and/or the like. The cropping user interface 660 includes: a cancel affordance 662, which, when selected (e.g., with a single or double tap gesture), causes the electronic device to dismiss the cropping user interface 660 without applying changes to the media item 612; and a done affordance 664, which, when selected (e.g., with a single or double tap gesture), causes the electronic device to dismiss the cropping user interface 660 and to apply changes made by the user to the media item 612 within the media gallery. The cropping user interface 660 also includes a parallax toggle 666A and a multi-frame photo toggle 666B.

According to some embodiments, in response to detecting selection of the done affordance 664, the electronic device updates the wake screen user interface to display the changed version of the media item 612 as the background or wallpaper. According to some embodiments, in response to detecting selection of the done affordance 664, the electronic device updates the home screen user interface to display a media item generated based on the changed version of the media item 612 as the background or wallpaper when one of the smart color, smart gradient, or smart pattern home treatment options is currently-selected. Thus, for example, if the user zoomed into the media item 612 while in the cropping user interface 660 and subsequently selected the done affordance 664, the electronic device displays the zoomed-in version of the media item 612 as the wake screen user interface background or wallpaper and also displays a smart gradient based on the zoomed-in version of the media item 612 as the home screen user interface background or wallpaper.

Figure 6G:
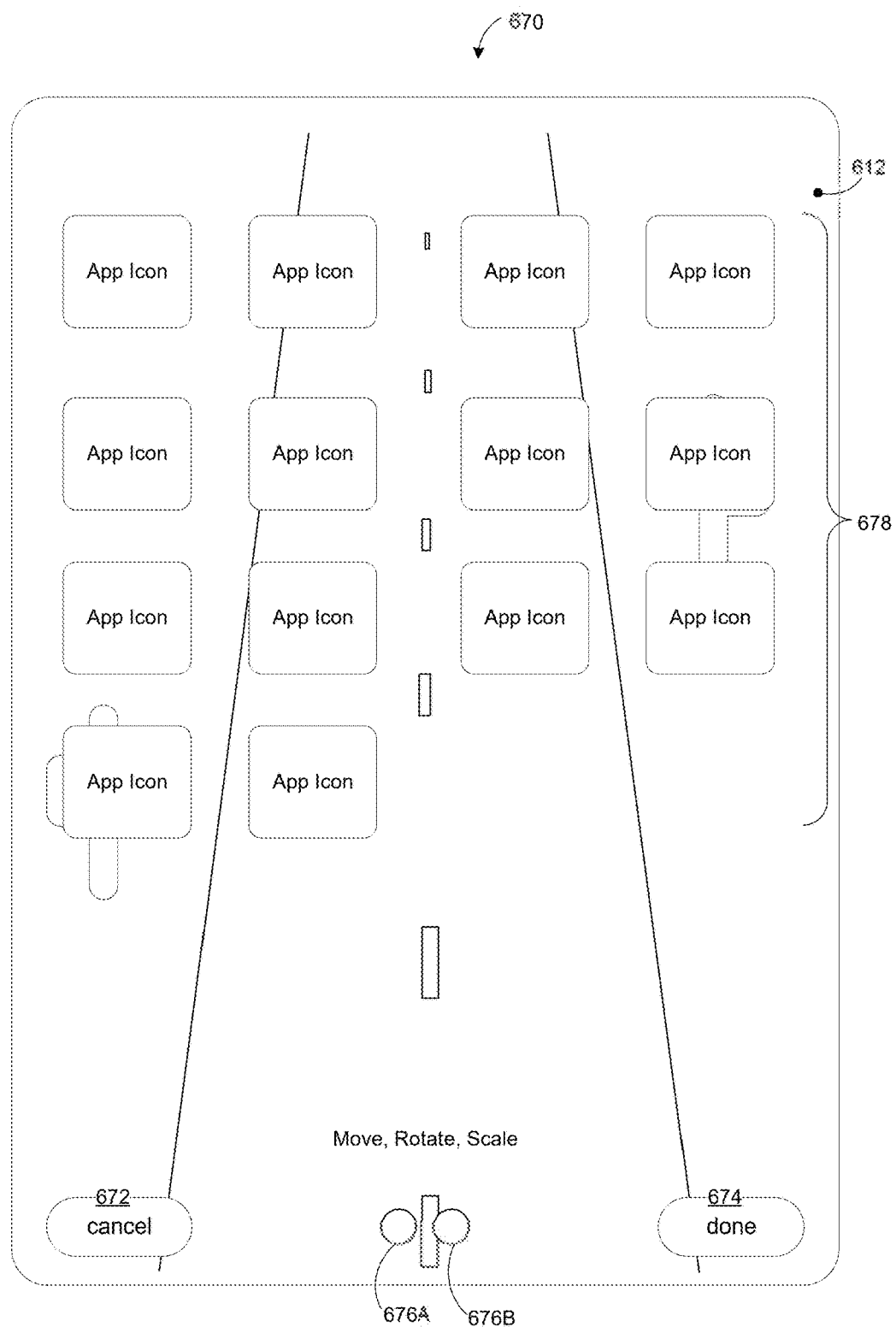

As shown in FIG. 6G, the electronic device displays a cropping user interface 670 provided to modify the media item 612 to be set as the background or wallpaper for the home screen user interface. For example, the electronic device displays the cropping user interface 670 in response to detecting a user input (e.g., a tap gesture) at a location that corresponds to the home screen user interface preview of the wake+home screen preview pairing within the wallpaper settings user interface 605 in FIGS. 6A-6D or within the media gallery editing user interface 630 in FIG. 6E.

For example, while the electronic device displays the cropping user interface 670, the user is able to move or pan the media item 612, rotate the media item 612, scale or zoom the media item 612, and/or the like within the cropping user interface 670. As shown in FIG. 6G, application icons 678 are overlaid on the media item 612 that corresponds to the background or wallpaper of the home screen user interface.

The cropping user interface 670 includes: a cancel affordance 672, which, when selected (e.g., with a single or double tap gesture), causes the electronic device to dismiss the cropping user interface 670 without applying changes to the media item 612; and a done affordance 674, which, when selected (e.g., with a single or double tap gesture), causes the electronic device to dismiss the cropping user interface 670 and to apply changes made by the user to the media item 612 within the media gallery. The cropping user interface 670 also includes a color inversion toggle 676A and a multi-frame photo toggle 676B (e.g., toggle between a temporally related sequence of two or more image frames and a single image frame therein such as a keyframe).

FIGS. 7A-7H illustrate example user interfaces for adding one or more media items to a media gallery in accordance with some embodiments. The user interfaces in these figures are used to illustrate the processes described below, including the processes in FIGS. 8A-8D. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B. In some embodiments, user inputs are sometimes referred to herein as touch inputs or touch input gestures.

Figure 7B:
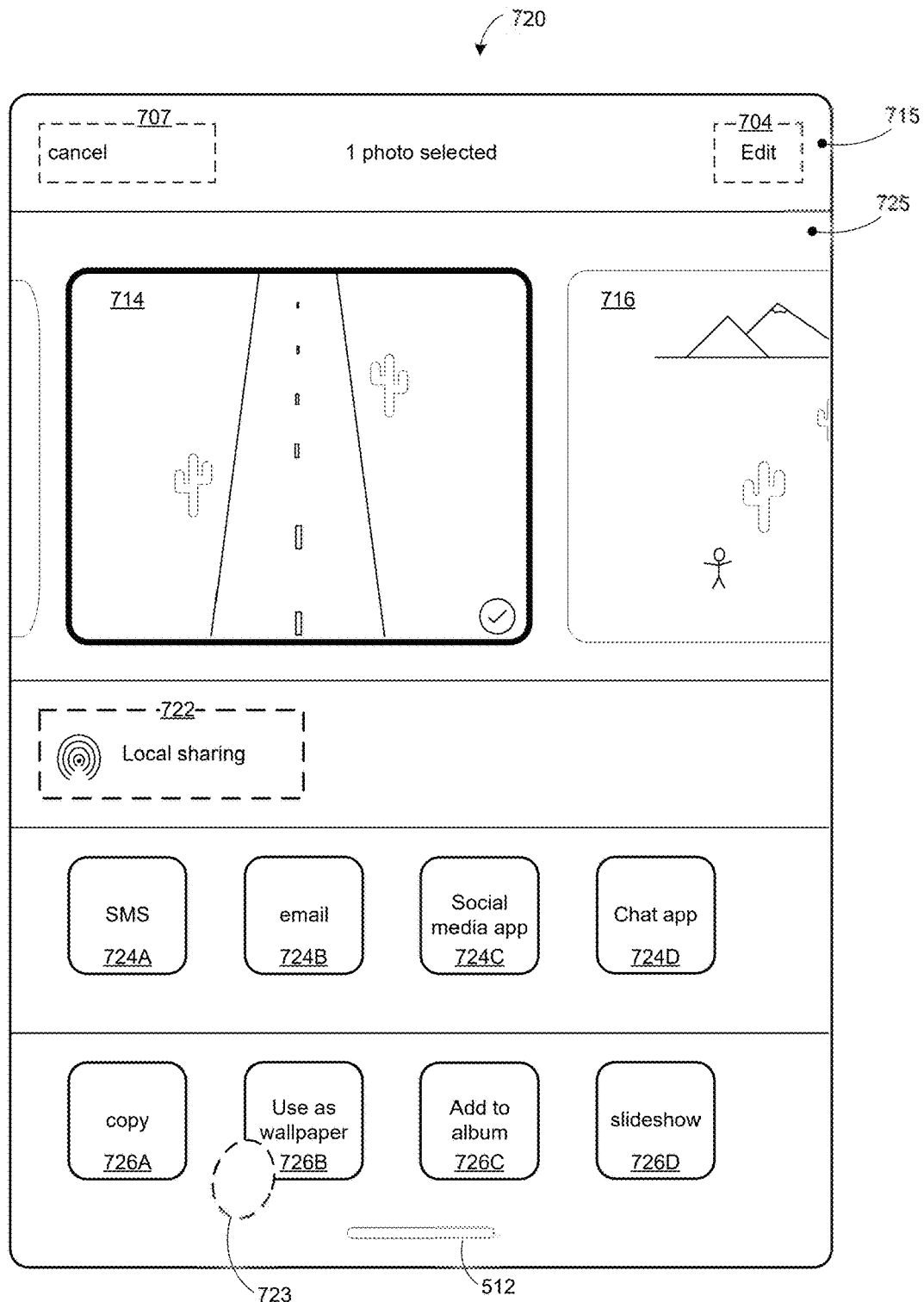

FIGS. 7A and 7B illustrate a sequence in which a media item selection user interface is replaced by a share user interface in response to detecting selection of a share affordance in accordance with some embodiments. As shown in FIG. 7A, the electronic device displays a media item selection user interface 710 that includes a currently-selected media item 714 (e.g., an image) and a chrome region 703 with: a back affordance 702, which, when selected causes the electronic device to display a previous user interface (e.g., the camera roll user interface); and an edit affordance 704, which, when selected (e.g., with a single or double tap gesture), causes the electronic device to display a media item editing user interface provided to edit the currently-selected media item 714. The media item selection user interface 710 also includes a thumbnail region 711 with a plurality of thumbnails 712A, 712B, 712C, 712D, 712E, . . . associated with media items (e.g., images), wherein the thumbnail 712B is associated with the currently-selected media item 714. The media item selection user interface 710 also includes: a share affordance 706, which, when selected (e.g., with a single or double tap gesture), causes the electronic device to display a share user interface (e.g., as illustrated by the sequence shown in FIGS. 7A and 7B); a like affordance 708, which, when selected (e.g., with a single or double tap gesture), causes the electronic device to add the currently-selected media item 714 to a liked album; and a deletion affordance 709, which, when selected (e.g., with a single or double tap gesture), causes the electronic device to delete the currently-selected media item 714.

As shown in FIG. 7A, the electronic device detects a touch input 721 (e.g., a tap gesture) at a location that corresponds to the share affordance 706. In response to detecting the touch input 721 in FIG. 7A, the electronic device displays a share user interface 720 in FIG. 7B. As shown in FIG. 7B, the share user interface 720 includes the currently-selected media item 714 and a chrome region 715 with: a cancel affordance 707, which, when selected (e.g., with a single or double tap gesture), causes the electronic device to dismiss the share user interface 720; and an edit affordance 704, which, when selected (e.g., with a single or double tap gesture), causes the electronic device to display a media item editing user interface provided to edit the currently-selected media item 714.

The share user interface 720 also includes a media items region 725 including the currently selected media item 714 (as shown by the thick border and check mark) and a portion of an unselected media item 716. The share user interface 720 also includes a plurality of sharing affordances 722, 724A, 724B, 724C, and 724D provided to share the currently-selected media item(s) (e.g., the media item 714) via various communication channels, communication means, communication methods, applications, or the like. The share user interface 720 also includes a plurality of action affordances 726A, 726B, 726C, and 726D provided to perform various actions, operations, or the like on the currently selected media item(s) (e.g., the media item 714). In some embodiments, when selected (e.g., with a single or double tap gesture), the "use as wallpaper" affordance 726B causes the electronic device to display the cropping user interface 660 for the currently-selected media item when a single media item is selected within the share user interface 720 (e.g., as illustrated by the sequence shown in FIGS. 7B and 7C). In some embodiments, when selected (e.g., with a single or double tap gesture), the "use as wallpaper" affordance 726B causes the electronic device to display the wallpaper setting user interface 605 when a plurality of media items are selected within the share user interface 720 (e.g., as illustrated by the sequence shown in FIGS. 7G and 7H)

Figure 7C:
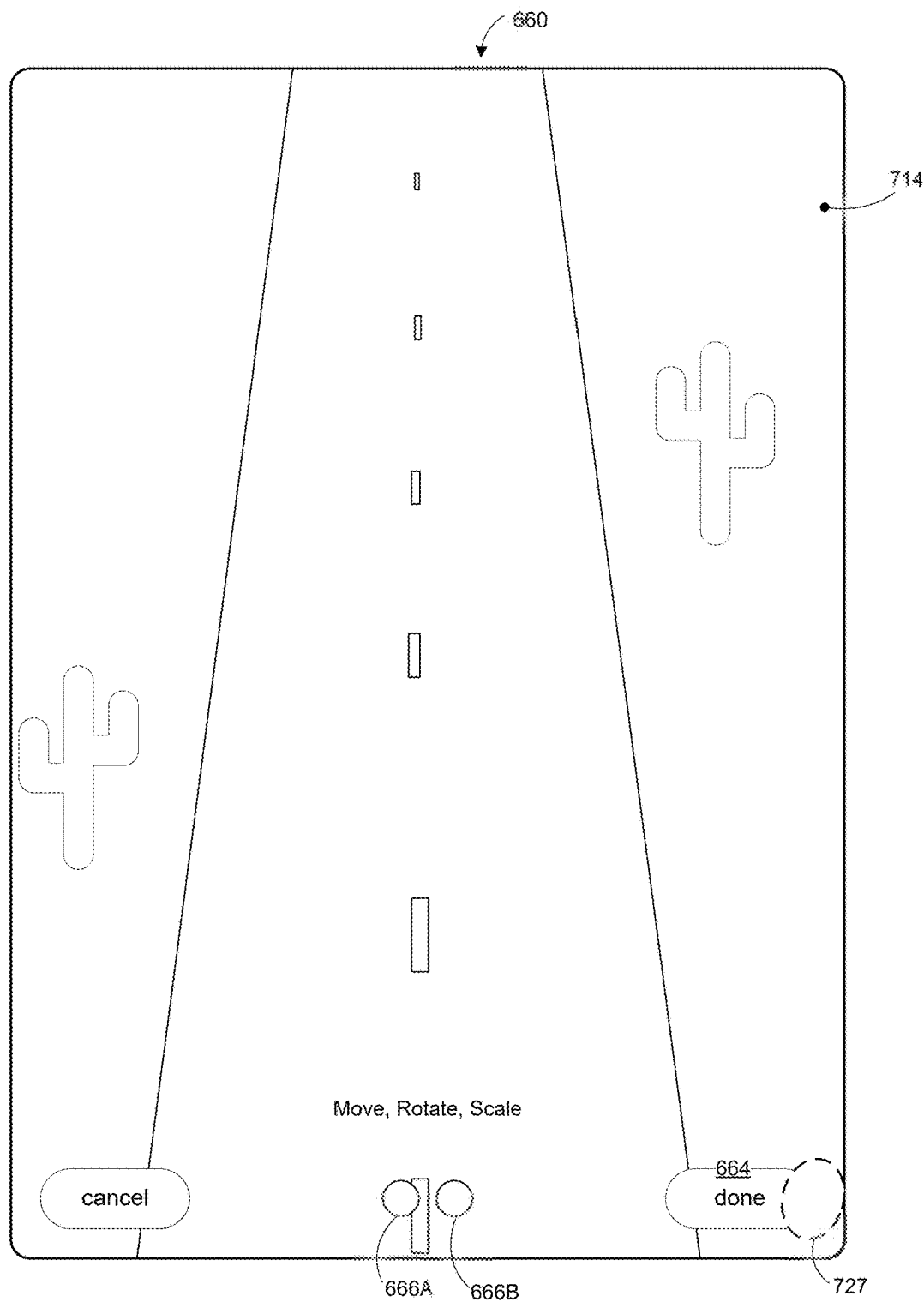
Figure 7D:
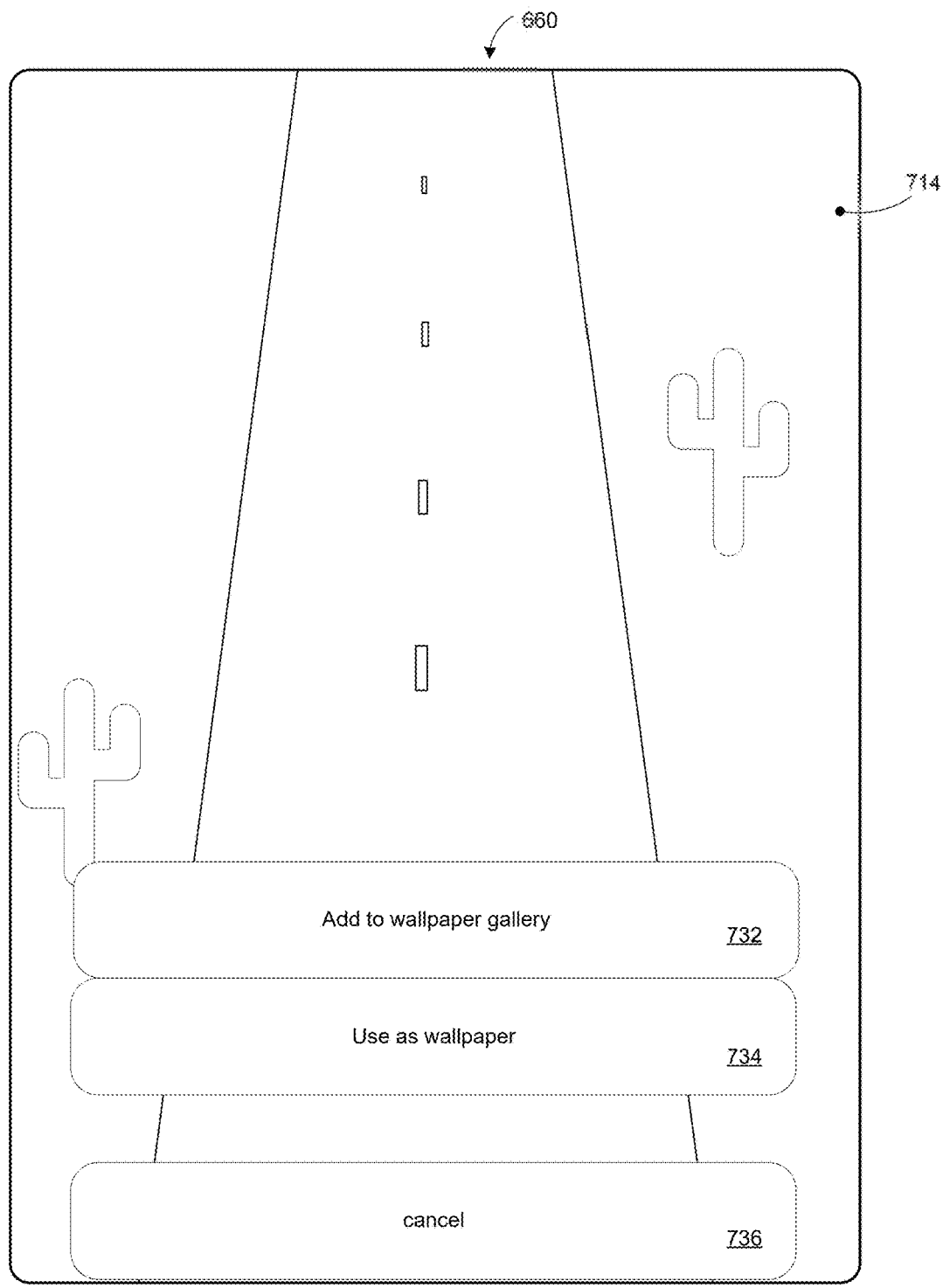

FIGS. 7B and 7C illustrate a sequence in which the share user interface is replaced by a media item cropping user interface in response to detecting selection of a wallpaper affordance and in accordance with a determination that a single media item has been selected in accordance with some embodiments. As shown in FIG. 7B, the electronic device detects a touch input 723 (e.g., a tap gesture) at a location that corresponds to the "use as wallpaper" affordance 726B (sometimes also referred to as the "wallpaper addition affordance"). In response to detecting the touch input 723 in FIG. 7B, the electronic device displays the cropping user interface 660 provided to modify (or crop) the media item 714 in FIG. 7C.

As shown in FIG. 7C, the electronic device detects a touch input 727 (e.g., a tap gesture) at a location that corresponds to the done affordance 664. In response to detecting the touch input 727 in FIG. 7C, the electronic device displays an "add to wallpaper gallery" affordance 732, a "use as wallpaper" affordance 734, and a cancel affordance 736 overlaid on the cropping user interface 660 in FIG. 7D. When selected (e.g., with a single or double tap gesture) the "add to wallpaper gallery" affordance 732 causes the electronic device to add the media item 714 (or a modified version thereof) to the media gallery and optionally to set the media item 714 (or a modified version thereof) as the background or wallpaper for the wake screen user interface. When selected (e.g., with a single or double tap gesture) the "use as wallpaper" affordance 734 causes the electronic device to set the media item 714 (or a modified version thereof) as the background or wallpaper for the wake screen user interface (without adding the media item 714 (or a modified version thereof) to the media gallery). When selected (e.g., with a single or double tap gesture) the "cancel" affordance 736 causes the electronic device to dismiss the cropping user interface 660.

Figure 7E:
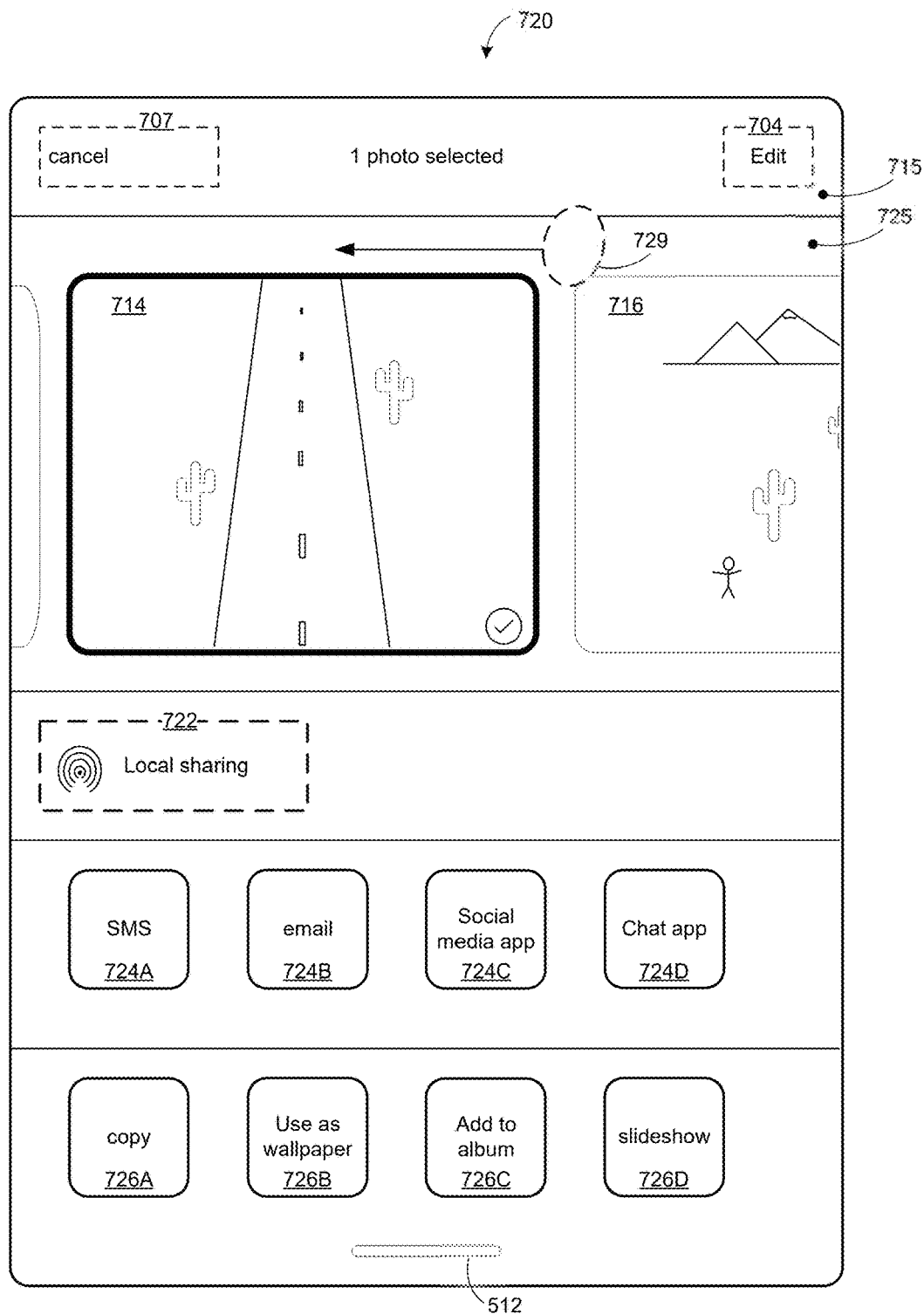
Figure 7F:
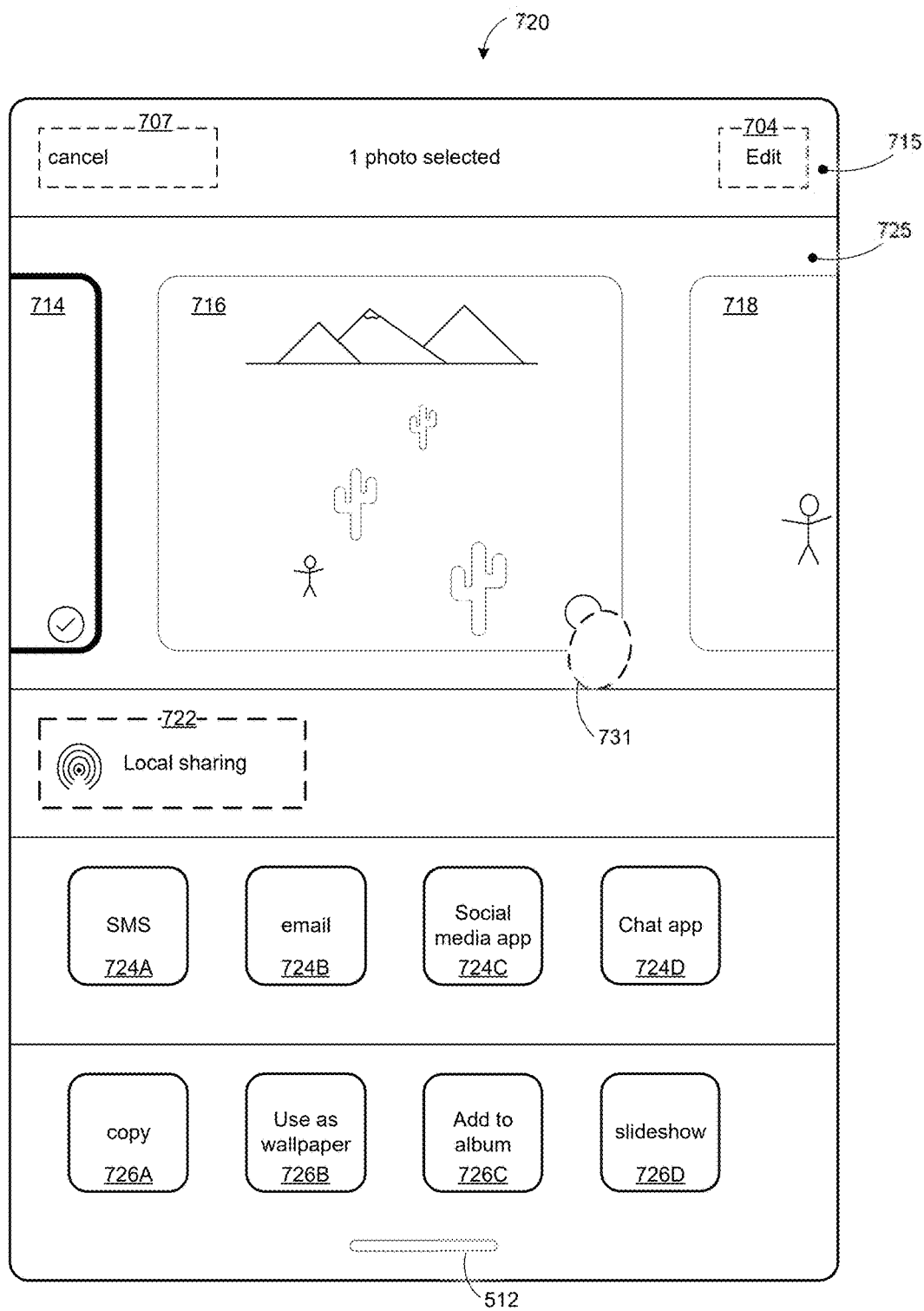
Figure 7G:
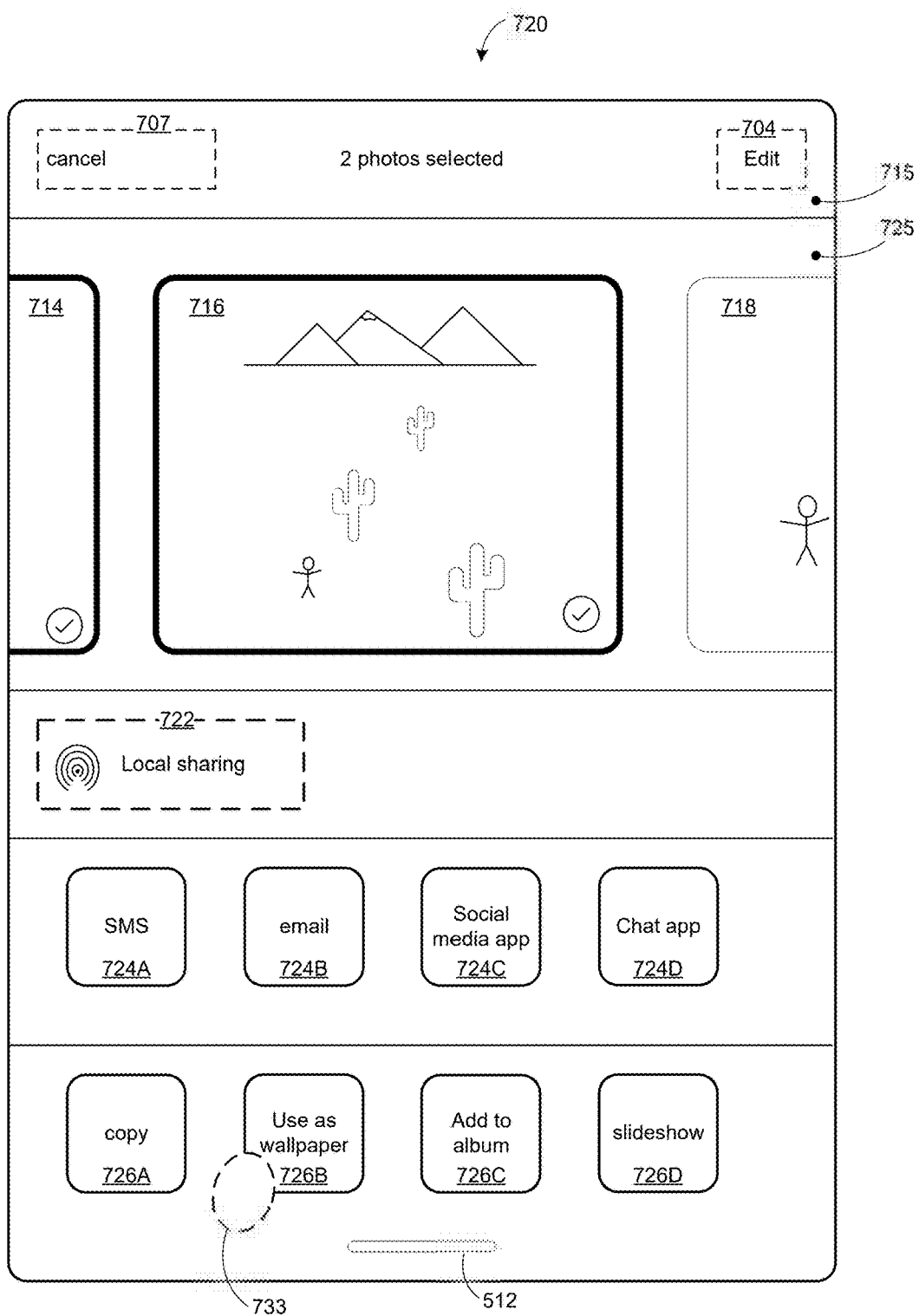

FIGS. 7E-7G illustrate a sequence in which a second media item is selected within the share interface in accordance with some embodiments. As shown in FIG. 7E, the electronic device detects a touch input gesture 729 (sometimes also referred to herein as a navigation gesture) that corresponds to a right-to-left swipe within the media items region 725. In response to detecting the touch input gesture 729 in FIG. 7E, the electronic device scrolls through the media items in the media items region 725 in FIG. 7F such that the media items region 725 includes a portion of the currently-selected media item 714 (as shown by the thick border and check mark), a portion of an unselected media item 718, and the unselected media item 716.

As shown in FIG. 7F, the electronic device detects a touch input 731 (e.g., a tap gesture) at a location that corresponds to the media item 716. In response to detecting the touch input 731 in FIG. 7F, the media items 714 and 716 are currently selected as shown by the thick borders and check marks.

Figure 7H:
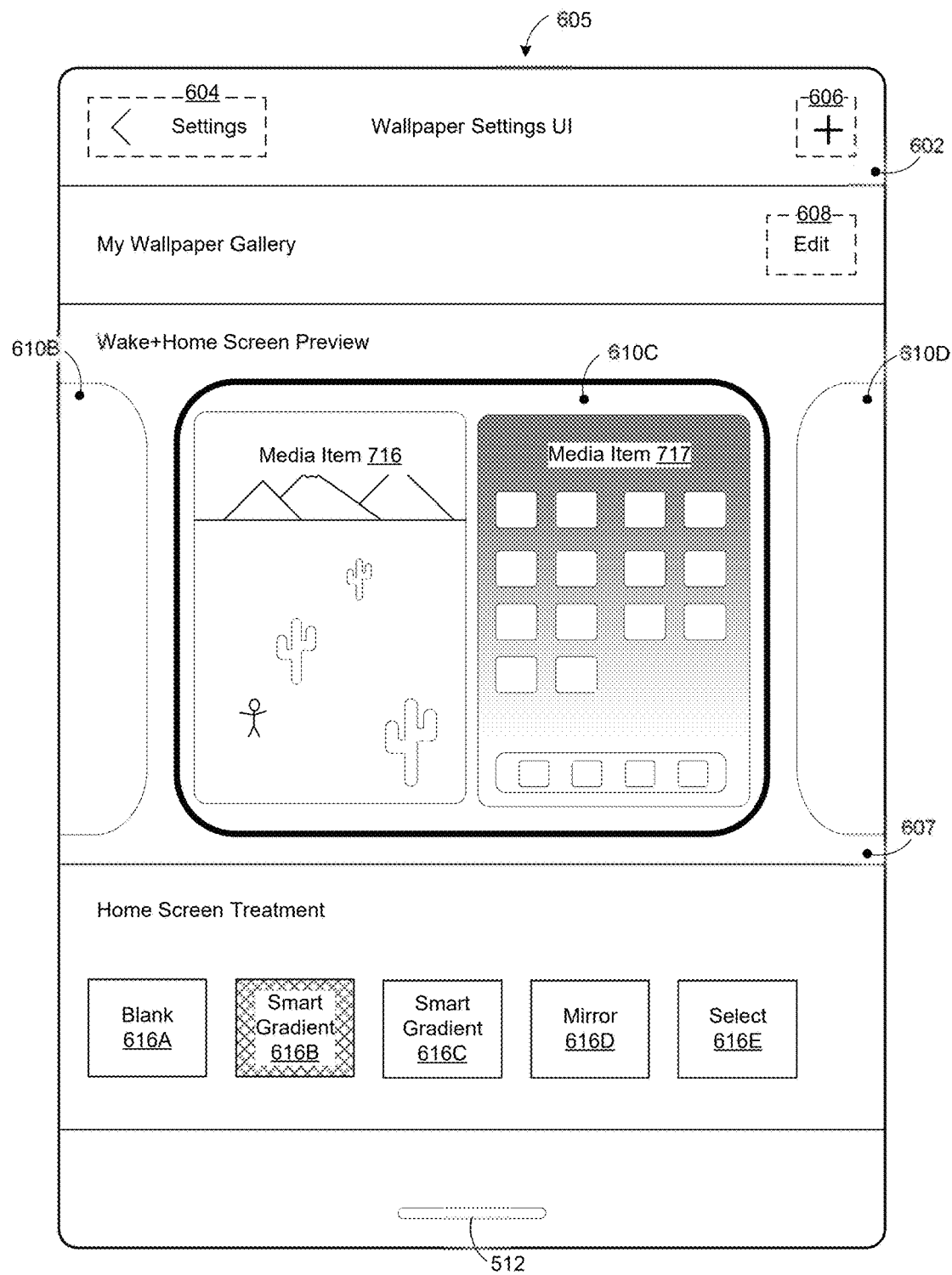
Figure 8B:
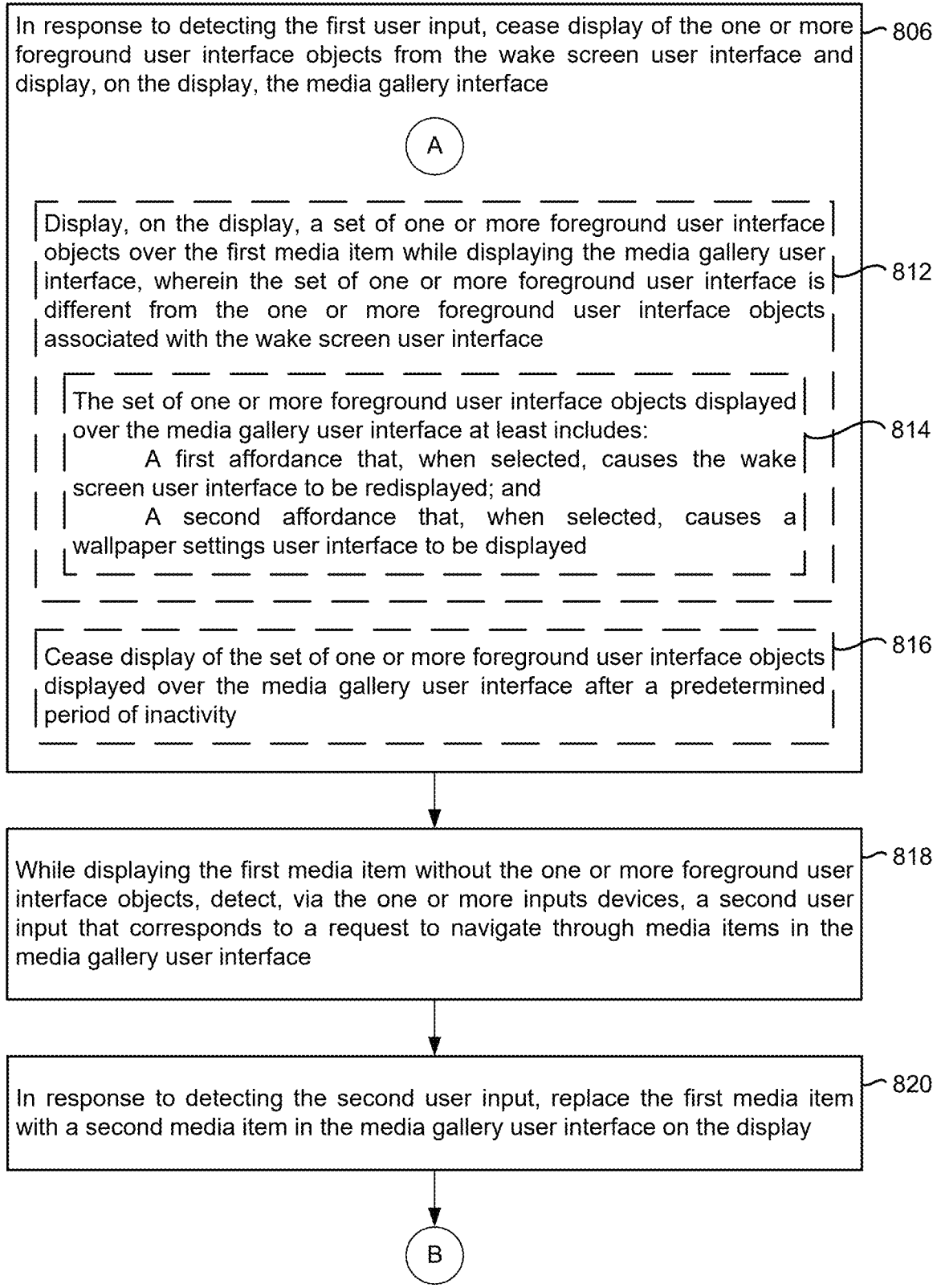
Figure 8C:
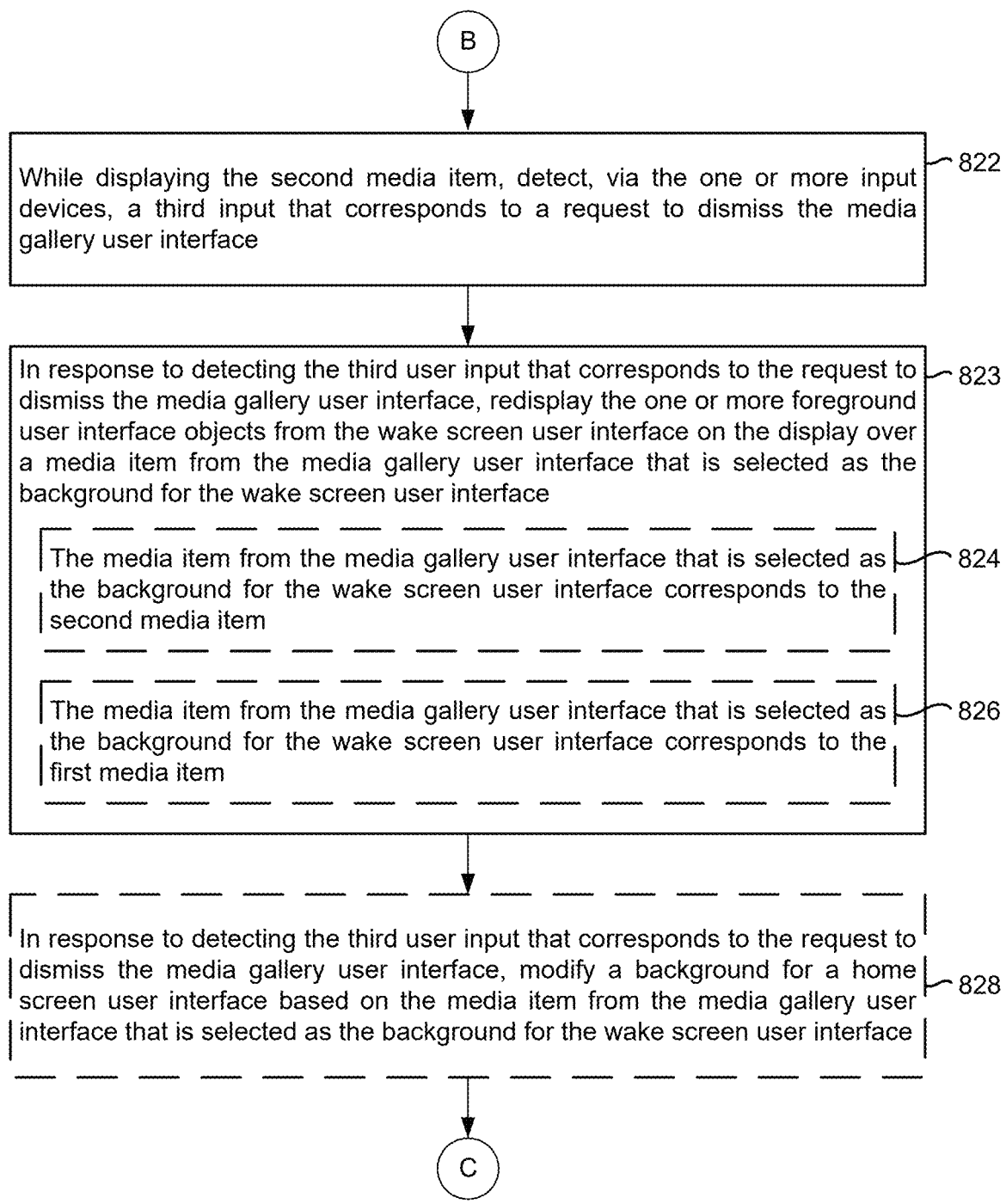

FIGS. 7G and 7H illustrate a sequence in which the share user interface is replaced by a wallpaper setting user interface in response to detecting selection of a wallpaper affordance and in accordance with a determination that a plurality of media items have been selected in accordance with some embodiments. As shown in FIG. 7G, the electronic device detects a touch input 733 (e.g., a tap gesture) at a location that corresponds to the "use as wallpaper" affordance 726B (sometimes also referred to as the "wallpaper addition affordance"). In response to detecting the touch input 733 in FIG. 7G, the electronic device displays the wallpaper settings user interface 605 in FIG. 7H.

As shown in FIG. 7H, the wake screen user interface and home screen user interface preview pairing 610C includes the media item 716 set as the background or wallpaper for the wake screen user interface and a media item 717 set as the background or wallpaper for the home screen user interface based on the currently-selected home screen treatment option 616B (e.g., smart gradient). As such, as shown in FIG. 7H, the media item 717 corresponds to a smart gradient background or wallpaper generated based on the media item 716. For example, the wake screen user interface and home screen user interface preview pairing 610B includes the media item 714.

For example, the media item 717 corresponds to a smart gradient generated based on one or more visual properties of the media item 716 corresponding to the background for the wake screen user interface. In some embodiments, the one or more visual properties correspond to a dominant hue/color on a pixelwise basis throughout the media item 716, an average hue/color across the media item 716, an average brightness across the media item 716, an average saturation across the media item 716, or the like. As such, continuing with this example, the media item 717 includes a plurality of stripes (vertical, horizontal, diagonal, etc.) associated with different shades of the dominant color within the media item 716. In some embodiments, a smoothing or blending operation is performed between each of the plurality of stripes. See International Application No. PCT/US2020/024644, filed Mar. 25, 2020, which is incorporated by reference herein in its entirety, for further description regarding the creation of a color gradient (sometimes also herein called a "smart gradient") based on a reference image.

FIGS. 8A-8D illustrate a flow diagram of a method 800 of accessing and navigating a media gallery user interface in accordance with some embodiments. The method 800 is performed at an electronic device (e.g., the portable multifunction device 100 in FIG. 1A, or the device 300 in FIG. 3) with a one or more processors, non-transitory memory, a display, and one or more input devices. In some embodiments, the display is a touch-screen display and the input device is on or integrated with the display. In some embodiments, the display is separate from the input device. Some operations in method 800 are, optionally, combined and/or the order of some operations is, optionally, changed.

As described below, the method 800 provides an intuitive way to access media items from a wake screen user interface in order to update a background or wallpaper of the wake screen user interface and/or home screen user interface. The method reduces the cognitive burden on a user when updating the background or wallpaper of the wake screen user interface and/or home screen user interface, thereby creating a more efficient human-machine interface. For battery-operated electronic devices, enabling a user to update the background or wallpaper of the wake screen user interface and/or home screen user interface faster and more efficiently conserves power and increases the time between battery charges.

While displaying a wake screen user interface on the display that includes a first media item that is being used as a background for the wake screen user interface and one or more foreground user interface objects that are displayed over the first media item, the device detects (802), via the one or more input devices, a first user input that corresponds to a request to display a media gallery user interface. For example, the one or more foreground user interface objects correspond to a lock/unlock indicator, time and date indicators, notifications, flashlight and camera affordances, a home screen affordance, and/or the like. As shown in FIGS. 5A and 5C, for example, the electronic device displays a wake screen user interface 510 that includes a media item 515 (e.g., the first media item) being used a background or wallpaper and a plurality of foreground user interface objects—an authentication indicator 502, a time and date indicator 504, notifications 506A and 506B, a flashlight affordance 508A, an image capture affordance 508B, and a home screen affordance 512. For example, the first media item corresponds to a live image, a still image, a video, or the like.

For example, the first user input corresponds a voice command, a double tap gesture, a long press, deep press, or the like. As shown in FIG. 5C, for example, the electronic device detects a touch input 505 (e.g., a single or double tap gesture, a tap and hold gesture, a deep press, or the like) at a location that corresponds to the background of the wake screen user interface 510 (e.g., a location that does not correspond to any of the foreground user interface objects within the wake screen user interface 510).

In some embodiments, the background for the wake screen user interface corresponds to a slideshow with the plurality of media items in the media gallery user interface including the first media item (e.g., wake screen slideshow mode). In some embodiments, the background for the wake screen user interface corresponds is randomly selected from the plurality of media items in the media gallery user interface including the first media item (e.g., wake screen shuffle mode).

In some embodiments, in response to detecting the first user input, the device (804): determines whether or not the device is unlocked; in accordance with a determination that the device is locked, maintains display of the wake screen user interface on the display and forego display of the media gallery user interface; and in accordance with a determination that the device is locked, replaces display of the wake screen user interface with the media gallery user interface on the display. As one example, the electronic device operates in the unlocked mode after successful authentication of a user's biometric information (e.g., a 3D face mesh, fingerprint, voice signature, or the like). As another example, the electronic device operates in the unlocked mode after successful authentication of a user's PIN or alphanumeric passcode.

According to some embodiments, the authentication indicator 502 is represented by an open padlock, as shown in FIG. 5A, while the electronic device is operating in an unlocked mode. According to some embodiments, the authentication indicator 502 is represented by a closed padlock while the electronic device is operating in a locked mode. For example, the electronic device operates in the unlocked mode after a user has been authenticated by the electronic device based on successful entry of a PIN or other alphanumeric code, biometric information (e.g., a face mesh or fingerprint), or the like. In some embodiments, the electronic device enables (or allows) the transition from the wake screen user interface 510 to the media gallery user interface 530 illustrated by the sequence shown in FIGS. 5C and 5D because the electronic device is operating in the unlocked mode, otherwise the electronic device would maintain the wake screen user interface 510. Limiting the transition from the wake screen user interface to the media gallery user interface to the unlocked mode provides the user with a sense of security while reducing accidental inputs and also reducing the number and/or duration of user interactions with the device. Reducing the number and/or duration user interactions with the device reduces wear-and-tear of the device and reduces power drain, increasing battery life of the device.

In response to detecting the first user input, the device ceases (806) display of the one or more foreground user interface objects from the wake screen user interface and display, on the display, the media gallery user interface. According to some embodiments, the media gallery user interface enables a user to quickly update the background or wallpaper of the wake and/or home screen user interfaces from a gallery of media items. As one example, in response to detecting the touch input 505 in FIG. 5C, the electronic device replaces display of the wake screen user interface 510 with the media gallery user interface 530 in FIG. 5D. Accessing a media gallery user interface from the wake screen user interface provides an efficient mechanism for a user to more quickly change a background or wallpaper for the wake screen user interface and/or home screen user interface, thus reducing the number and/or duration of user interactions with the device. Reducing the number and/or duration user interactions with the device reduces wear-and-tear of the device and reduces power drain, increasing battery life of the device.

In some embodiments, the media items in the media gallery user interface includes (808) a plurality of media items previously selected by a user of the device, and the plurality of media items includes the first media item and the second media item. In some embodiments, the media gallery user interface includes a plurality of media items in a customizable media gallery. In some embodiments, the plurality of media items corresponds to media items previously selected by the user. As shown in FIGS. 5D and 5E, the media gallery user interface 530 at least includes the media item 515 (e.g., the first media item) and the media item 525 (e.g., the second media item). The media gallery user interface, including user selected media items, provides an efficient mechanism for a user to more quickly change a background or wallpaper for the wake screen user interface and/or home screen user interface, thus reducing the number and/or duration of user interactions with the device. Reducing the number and/or duration user interactions with the device reduces wear-and-tear of the device and reduces power drain, increasing battery life of the device.

In some embodiments, the media items in the media gallery user interface includes (810) a plurality of media items populated based on media selection criteria, and the plurality of media items includes the first media item and the second media item. In some embodiments, the media gallery user interface includes a plurality of media items in a customizable media gallery. In some embodiments, the plurality of media items in the customizable media gallery are populated (without user intervention) based on media item selection criteria such as recently viewed media items, recently captured media items, recently imported media items, frequently viewed media items, and/or the like. As shown in FIGS. 5D and 5E, the media gallery user interface 530 at least includes the media item 515 (e.g., the first media item) and the media item 525 (e.g., the second media item). The media gallery user interface, including media items populates based on media selection criteria, provides an efficient mechanism for a user to more quickly change a background or wallpaper for the wake screen user interface and/or home screen user interface, thus reducing the number and/or duration of user interactions with the device. Reducing the number and/or duration user interactions with the device reduces wear-and-tear of the device and reduces power drain, increasing battery life of the device.

In some embodiments, the device displays (812), on the display, a set of one or more foreground user interface objects over the first media item while displaying the media gallery user interface, wherein the set of one or more foreground user interface is different from the one or more foreground user interface objects associated with the wake screen user interface. As shown in FIG. 5D, for example, the media gallery user interface 530 includes the media item 515 and a plurality of foreground user interface objects, including: a done affordance 532; a setting affordance 536; a plurality of pagination dots 534 indicating a position of the media item 515 amongst a plurality of media items in a media gallery associated with the media gallery user interface 530; and a wallpaper indicator 535 indicating that the media item 515 is the current background or wallpaper for the wake screen user interface 510.

In some embodiments, the set of one or more foreground user interface objects displayed over the media gallery user interface at least includes (814): a first affordance that, when selected (e.g., with a single or double tap gesture), causes the wake screen user interface to be redisplayed; and a second affordance that, when selected (e.g., with a single or double tap gesture), causes a wallpaper settings user interface to be displayed. For example, the first affordance corresponds to a "done" button. For example, the first affordance corresponds to a "settings" or gear button. As shown in FIG. 5D, for example, the media gallery user interface 530 includes a done affordance 532, which, when selected (e.g., with a single or double tap gesture), causes the electronic device to replace the media gallery user interface 530 with the wake screen user interface 510 without changing the background or wallpaper of the wake screen user interface 510. As shown in FIG. 5D, for example, the media gallery user interface 530 also includes a setting affordance 536, which, when selected (e.g., with a single or double tap gesture), causes the electronic device to replace the media gallery user interface 530 with a wallpaper settings user interface (e.g., the wallpaper settings user interface 605 shown in FIG. 6A). The first affordance provides an efficient mechanism for a user to more quickly transition from the media gallery user interface to the wake screen user interface, thus reducing the number and/or duration of user interactions with the device. Reducing the number and/or duration user interactions with the device reduces wear-and-tear of the device and reduces power drain, increasing battery life of the device. The second affordance provides an efficient mechanism for a user to more quickly transition from the media gallery user interface to the wallpaper settings user interface, thus reducing the number and/or duration of user interactions with the device. Reducing the number and/or duration user interactions with the device reduces wear-and-tear of the device and reduces power drain, increasing battery life of the device.

In some embodiments, the device ceases (816) display of the set of one or more foreground user interface objects displayed over the media gallery user interface after a predetermined period of inactivity. In some embodiments, the predetermined period of inactivity corresponds to a timeout period without detecting user inputs. For example, with reference to FIGS. 5E and 5F, the electronic device ceases display of the foreground user interface objects within the media gallery user interface 530 after elapse of a determined timeout period (e.g., 10 seconds). As an alternative example, FIGS. 5E and 5F illustrate a sequence in which one or more foreground user interface objects within the media gallery user interface 530 cease to be displayed in response to detecting a touch input 509. Removing the one or more foreground user interface objects within the media gallery user interface provides a less-cluttered user interface for a user to more quickly change a background or wallpaper for the wake screen user interface and/or home screen user interface, thus reducing the number and/or duration of user interactions with the device. Reducing the number and/or duration user interactions with the device reduces wear-and-tear of the device and reduces power drain, increasing battery life of the device.

While displaying the first media item without the one or more foreground user interface objects, the device detects (818), via the one or more input devices, a second user input that corresponds to a request to navigate through media items in the media gallery user interface. For example, the second user input corresponds to a left-to-right or right to-left swipe gesture. In some embodiments, the directionality of the second user input determines which direction the user navigates through the customizable wallpaper gallery. For example, the first media item corresponds to a current wake screen wallpaper.

As shown in FIG. 5D, the electronic device detects a touch input gesture 507 that corresponds to a right-to-left swipe at a location that corresponds to the background of the media gallery user interface 530 (e.g., a location that does not correspond to any of the foreground user interface objects within the media gallery user interface 530). In response to detecting the touch input gesture 507 in FIG. 5D, the electronic device updates the media gallery user interface 530 in FIG. 5E such that a media item 525 is displayed as the background of the media gallery user interface 530.

In response to detecting the second user input, the device replaces (820) the first media item with a second media item in the media gallery user interface on the display. In some embodiments, the media gallery user interface also includes pagination dots indicating the position of the current wake screen wallpaper among the plurality of media items in the customizable media gallery. For example, FIGS. 5D and 5E illustrate a sequence in which a first media item 515 is replaced by a second media item 525 within the media gallery user interface 530 in response to detecting a navigation gesture 507 (e.g., a right-to-left swipe gesture).

Continuing with this example, in response to detecting the touch input gesture 507 in FIG. 5D, the electronic device updates the plurality of pagination dots 534 and replaces the wallpaper indicator 535 with a "set wallpaper" affordance 538 in FIG. 5E, which, when selected (e.g., with a single or double tap gesture), causes the electronic device to set the media item 525 as the background or wallpaper for the wake screen user interface 510. The media gallery user interface provides an efficient mechanism for a user to more quickly change a background or wallpaper for the wake screen user interface and/or home screen user interface, thus reducing the number and/or duration of user interactions with the device. Reducing the number and/or duration user interactions with the device reduces wear-and-tear of the device and reduces power drain, increasing battery life of the device.

While displaying the second media item, the device detects (822), via the one or more input devices, a third input that corresponds to a request to dismiss the media gallery user interface. As one example, the third user input corresponds to a swipe-up gesture from the bottom of the display while the media gallery user interface is displayed. As another example, the third user input corresponds to selection of a done affordance within the media gallery user interface. As yet another example, the third user input corresponds to selection of a "set wallpaper" affordance within the media gallery user interface.

As shown in FIG. 5G, the electronic device detects a touch input 513 (e.g., a tap gesture) at a location that corresponds to the "set wallpaper" affordance 538 within the media gallery user interface 530. In response to detecting the touch input 513 in FIG. 5G, the electronic device redisplays the wake screen user interface 510 including the media item 525 as the background or wallpaper thereof in FIG. 5H.

As shown in FIG. 5G, the media gallery user interface 530 includes a done affordance 532, which, when selected (e.g., with a single or double tap gesture), causes the wake screen user interface 510 to replace the media gallery user interface 530 without setting the second media item 525 as the background for the wake screen user interface 510. As shown in FIG. 5G, the media gallery user interface 530 includes a "set wallpaper" affordance 538, which, when selected (e.g., with a single or double tap gesture), causes the second media item 525 to replace the first media item 515 as the background for the wake screen user interface 510. As shown in FIG. 5G, the media gallery user interface 530 includes a settings affordance 536, which, when selected (e.g., with a single or double tap gesture), causes a wallpaper settings interface 605 shown in FIG. 6A to replace the media gallery user interface 530.

In response to detecting the third user input that corresponds to the request to dismiss the media gallery user interface, the device redisplays (823) the one or more foreground user interface objects from the wake screen user interface on the display over a media item from the media gallery user interface that is selected as the background for the wake screen user interface. According to some embodiments, the media item from the media gallery user interface that is selected as a background for the wake screen corresponds to one of the first or second media items. In some embodiments, the device detects an input to replace the first media item with the second media item as the background for wake screen user interface prior to detecting the third user input. In some embodiments, the device detects the third user input without detecting a prior input to replace the first media item with the second media item as the background for wake screen user interface. For example, FIGS. 5G and 5H illustrate a sequence in which the media gallery user interface 530 is replaced by the wake screen user interface 510 in response to a selection input 513 setting the second media item 525 as the background for the wake screen user interface 510. As shown in FIG. 5H, the second media item 525 is the background or wallpaper of the wake screen user interface 510. The media gallery user interface provides an efficient mechanism for a user to more quickly change a background or wallpaper for the wake screen user interface and/or home screen user interface, thus reducing the number and/or duration of user interactions with the device. Reducing the number and/or duration user interactions with the device reduces wear-and-tear of the device and reduces power drain, increasing battery life of the device.

In some embodiments, the media item from the media gallery user interface that is selected (824) as the background for the wake screen user interface corresponds to the second media item. For example, the device detects an input to replace the first media item with the second media item as the background for wake screen user interface prior to detecting the third user input. For example, FIGS. 5G and 5H illustrate a sequence in which the media gallery user interface 530 is replaced by the wake screen user interface 510 in response to a selection input 513 setting the second media item 525 as the background for the wake screen user interface 510.

In some embodiments, the media item from the media gallery user interface that is selected (826) as the background for the wake screen user interface corresponds to the first media item. For example, the device detects the third user input without detecting a prior input to replace the first media item with the second media item as the background for wake screen user interface. For example, with reference to FIG. 5E, in response to detecting a user input selecting the done affordance 532, the electronic device replaces display of the media gallery user interface 530 with the wake screen user interface 510 while maintaining the first media item 515 as the background for the wake screen user interface 510.

In some embodiments, in response to detecting the third user input that corresponds to the request to dismiss the media gallery user interface, the device modifies (828) (e.g., automatically without further user input) a background for a home screen user interface based on the media item from the media gallery user interface that is selected as the background for the wake screen user interface. In some embodiments, the background for the home screen user interface is based on the media item from the media gallery user interface that is selected as the background for the wake screen user interface and a home screen treatment option (e.g., smart color, smart gradient, mirror, etc.).

For example, after setting the second media item 525 as the background for the wake screen interface 510, FIGS. 5H and SI illustrate a sequence in which the wake screen user interface 510 is replaced by the home screen user interface 520 in response to detecting a touch input gesture 521. Continuing with this example, as shown in FIG. 5I, the home screen user interface 520 includes a media item 527 being used as a background or wallpaper. For example, the media item 527 corresponds to a smart gradient generated based on one or more visual properties of the media item 525 corresponding to the background for the wake screen user interface 510 in FIG. 5H. In some embodiments, the one or more visual properties correspond to a dominant hue/color on a pixelwise basis throughout the media item 525, an average hue/color across the media item 525, an average brightness across the media item 525, an average saturation across the media item 525, or the like. As such, continuing with this example, the media item 527 includes a plurality of stripes (vertical, horizontal, diagonal, etc.) associated with different shades of the dominant color within the media item 525. In some embodiments, a smoothing or blending operation is performed between each of the plurality of stripes. Modifying the background for the home screen user interface based on the media item from the media gallery user interface that is selected as the background for the wake screen user interface provides an efficient mechanism for a user to more quickly change a background or wallpaper for the home screen user interface, thus reducing the number and/or duration of user interactions with the device. Reducing the number and/or duration user interactions with the device reduces wear-and-tear of the device and reduces power drain, increasing battery life of the device.

In some embodiments, the device (830): detects, via the one or more input devices, a fourth user input that corresponds to selecting a respective user interface object from the one or more foreground user interface objects; and, in response to detecting the fourth user input, performs an operation that corresponds to the respective user interface object without displaying the media gallery user interface. As one example, with reference to FIG. 5C, the electronic device illuminates a light emission element of the electronic device (e.g., a flash component associated with the camera) in response to detecting selection of the flashlight affordance 508A (e.g., with a single or double tap gesture, tap and hold gesture, deep press gesture, or the like) within the wake screen user interface 510. As another example, with reference to FIG. 5C, the electronic device replaces display of the wake screen user interface 510 with an image capture user interface provided to capture images using an interior-facing or exterior-facing image sensor of the electronic device in response to detecting selection of the camera affordance 508B (e.g., with a single or double tap gesture, tap and hold gesture, deep press gesture, or the like) within the wake screen user interface 510.

As yet another example, with reference to FIG. 5C, the electronic device displays an expanded view of the notification 506A in response to detecting selection of the notification 506A (e.g., with a single or double tap gesture) within the wake screen user interface 510. As yet another example, the electronic device dismisses the notification 506B in response to detecting deletion gesture relative to the notification 506B (e.g., a right-to-left swipe gesture at a location over the notification 506B) within the wake screen user interface 510. As yet another example, the electronic device replaces display of the wake screen user interface 510 with the home screen user interface 520 in response to detecting an upward swipe gesture relative to a home screen affordance 512 within the wake screen user interface 510 (e.g., as illustrated by the sequence shown in FIGS. 5A and 5B). Performing two different operations from the wake screen user interface in response to user inputs directed to different portions of the wake screen user interface (e.g., accessing the media gallery user interface or performing an operation associated with a foreground user interface object) provides an efficient mechanism to perform either of the operations, thus reducing number and/or duration of user interactions with the device to perform at least one of the operations. Reducing number and/or duration of user interactions with the device reduces wear-and-tear of the device and, for battery powered devices, increases battery life of the device.

In some embodiments, the device (832): detects, via the one or more input devices, a fourth user input that corresponds selecting one or more media items; detects, via the one or more input devices, a fifth user input that corresponds to selecting a share affordance provided to display a share interface including one or more selectable operations for performance on the one or more media items; in response to detecting the fifth user input, displays, on the display, the share interface at least including a wallpaper addition affordance that corresponds to adding the one or more media items to the media gallery user interface; detects, via the one or more input devices, a sixth user input that correspond to selecting the wallpaper addition affordance; and, in response to detecting the sixth user input: in accordance with a determination that the fourth user input corresponds to selecting a single media item, displays, on the display, a cropping user interface provided to perform one or more modification operations on the single media item; and in accordance with a determination that the fourth user input corresponds to selecting a plurality of media items, displays, on the display, a wallpaper settings user interface including a side-by-side preview of a wake screen user interface and a home screen user interface based on one of the plurality of media items. For example, FIGS. 7A and 7B illustrate a sequence in which a media item selection user interface 710 is replaced by a share user interface 720 in response to detecting selection of a share affordance 706 while at least the media item 714 is currently selected. Performing two different operations from the share user interface in response to detecting selection of the wallpaper addition affordance based on the number of media items selected (e.g., accessing the cropping user interface or the wallpaper settings user interface) provides an efficient mechanism to access either of the user interfaces, thus reducing the number and/or duration of user interactions with the device to access at least one of the user interfaces. Reducing the number and/or duration of user interactions with the device reduces wear-and-tear of the device and, for battery powered devices, increases battery life of the device.

As one example, FIGS. 7B and 7C illustrate a sequence in which the share user interface 720 is replaced by a cropping user interface 660 provided to modify the media item 714 in response to detecting selection of the wallpaper addition affordance 726A and in accordance with a determination that a single media item 714 has been selected. For example, while the electronic device displays the cropping user interface 660, the user is able to move or pan the media item 714, rotate the media item 714, scale or zoom the media item 714, and/or the like. For example, the one or more modification operations correspond to rotating, moving/panning, zooming/scaling the media item, and/or the like based on a portion of the selected media item visible within the cropping user interface.

As another example, FIGS. 7G and 7H illustrate a sequence in which the share user interface 720 is replaced by a wallpaper setting user interface 605 in response to detecting selection of the wallpaper addition affordance 726A and in accordance with a determination that a plurality of media items 714 and 716 have been selected. As shown in FIG. 7H, the side-by-side wake screen user interface and home screen user interface preview pairing 610C includes the media item 716 set as the background or wallpaper for the wake screen user interface and a media item 717 set as the background or wallpaper for the home screen user interface based on the currently-selected home screen treatment option 616B (e.g., smart gradient). As such, as shown in FIG. 7H, the media item 717 corresponds to a smart gradient background or wallpaper generated based on the media item 716. For example, the wake screen user interface and home screen user interface preview pairing 610B includes the media item 714. As one example, the side-by-side preview is associated with a first media item selected among the plurality of selected media items. As another example, the side-by-side preview is associated with a last media item selected among the plurality of selected media items. As yet another example, the side-by-side preview is associated with a most recently viewed media item among the plurality of selected media items. As yet another example, the side-by-side preview is associated with a most recently captured or imported media item among the plurality of selected media items.

It should be understood that the particular order in which the operations in FIGS. 8A-8D have been described is merely example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., the methods 900 and 1100) are also applicable in an analogous manner to method 800 described above with respect to FIGS. 8A-8D. For example, the user inputs, user input gestures, media items, wake screen user interface, home screen user interface, media gallery user interface, backgrounds, and previews described above with reference to method 800 optionally have one or more of the characteristics of the user inputs, user input gestures, media items, wake screen user interface, home screen user interface, media gallery user interface, backgrounds, and previews described herein with reference to other methods described herein (e.g., the methods 900 and 1100). For brevity, these details are not repeated here.

The operations in the information processing methods described above are, optionally, implemented by running one or more functional modules in an information processing apparatus such as general-purpose processors (e.g., as described with respect to FIGS. 1A, 3, and 5A) or application specific chips. Further, the operations described above with reference to FIGS. 8A-8D, optionally, implemented by components depicted in FIGS. 1A and 1B. For example, the user inputs, user input gestures, media items, wake screen user interface, home screen user interface, media gallery user interface, backgrounds, and previews are, optionally, implemented by the event sorter 170, the event recognizer 180, and the event handler 190. The event monitor 171 in the event sorter 170 detects a contact on the touch-sensitive surface 451, and the event dispatcher module 174 delivers the event information to the application 136-1. A respective event recognizer 180 of the application 136-1 compares the event information to respective event definitions 186 and determines whether a first contact at a first location on the touch-sensitive surface corresponds to a predefined event or sub-event, such as selection of an object on a user interface. When a respective predefined event or sub-event is detected, the event recognizer 180 activates an event handler 190 associated with the detection of the event or sub-event. The event handler 190 optionally utilizes or calls the data updater 176 or the object updater 177 to update the application internal state 192. In some embodiments, the event handler 190 accesses a respective GUI updater 178 to update what is displayed by the application. Similarly, it would be clear to a person having ordinary skill in the art how other processes can be implemented based on the components depicted in FIGS. 1A and 1B.

FIGS. 9A and 9B illustrate a flow diagram of a method 900 of updating a background or wallpaper for a home screen user interface based on a request to set a media item as a background or wallpaper for a wake screen user interface in accordance with some embodiments. The method 900 is performed at an electronic device (e.g., the portable multifunction device 100 in FIG. 1A, or the device 300 in FIG. 3) with a one or more processors, non-transitory memory, a display, and one or more input devices. In some embodiments, the display is a touch-screen display and the input device is on or integrated with the display. In some embodiments, the display is separate from the input device. Some operations in method 900 are, optionally, combined and/or the order of some operations is, optionally, changed.

As described below, the method 900 provides an intuitive way to update a background or wallpaper for a home screen user interface in response to a request to set a media item as a background or wallpaper for a wake screen user interface. The method reduces the cognitive burden on a user when updating a background or wallpaper for a wake screen user interface and/or home screen user interface, thereby creating a more efficient human-machine interface. For battery-operated electronic devices, enabling a user to update a background or wallpaper for a wake screen user interface and/or home screen user interface faster and more efficiently conserves power and increases the time between battery charges.

The device detects (902), via the one or more input devices, a user input that corresponds to a request to set a respective media item as a background for a wake screen user interface for the device. As one example, FIGS. 5G and 5H illustrate a sequence in which the media gallery user interface 530 is replaced by the wake screen user interface 510 in response to a selection input 513 setting the second media item 525 as the background for the wake screen user interface 530. As another example, with reference to FIG. 6D, in response to detecting selection of the "set wallpaper" affordance 619, the electronic device sets the media item 622 as the background or wallpaper for the wake screen user interface.

In response to detecting the user input, the device (904): in accordance with a determination that the user input corresponds to a request to set a first media item as a background for the wake screen user interface, sets a second media item that is different from the first media item as a background for a home screen user interface for the device; and in accordance with a determination that the user input corresponds to a request to set a third media item as a background for the wake screen user interface, sets a fourth media item that is different from the third media item as a background for the home screen user interface for the device. Setting a respective media item as a background or wallpaper for a home screen user interface in response to a request to set a media item as a background or wallpaper for a wake screen user interface provides an efficient mechanism to set backgrounds for both the wake screen user interface and the home screen user interface, thus reducing the number and/or duration of user interactions with the device reduces wear-and-tear of the device. Reducing the number and/or duration of user interactions with the device reduces wear-and-tear of the device and, for battery powered devices, increases battery life of the device.

As one example, after setting the second media item 525 as the background for the wake screen interface 510, FIGS. 5H and 5I illustrate a sequence in which the wake screen user interface 510 is replaced by the home screen user interface 520 in response to detecting a touch input gesture 521. Continuing with this example, as shown in FIG. 5I, the home screen user interface 520 includes a media item 527 being used as a background or wallpaper. For example, the media item 527 corresponds to a smart gradient generated based on one or more visual properties of the media item 525 corresponding to the background for the wake screen user interface 510 in FIG. 5H. In some embodiments, the one or more visual properties correspond to a dominant hue/color on a pixelwise basis throughout the media item 525, an average hue/color across the media item 525, an average brightness across the media item 525, an average saturation across the media item 525, or the like. As such, continuing with this example, the media item 527 includes a plurality of stripes (vertical, horizontal, diagonal, etc.) associated with different shades of the dominant color within the media item 525. In some embodiments, a smoothing or blending operation is performed between each of the plurality of stripes.

As another example, with reference to FIG. 6B, in response to detecting selection of the "set wallpaper" affordance 619, the electronic device sets the media item 612 as the background or wallpaper for the wake screen user interface and also sets the media item 614B as the background or wallpaper for the home screen user interface. As shown in FIG. 6B, the media item 614B corresponds to a smart color background or wallpaper generated based on the media item 612. For example, the media item 614B corresponds to a smart color generated based on one or more visual properties of the media item 612 corresponding to the background for the wake screen user interface. In some embodiments, the one or more visual properties correspond to a dominant hue/color on a pixelwise basis throughout the media item 612, an average hue/color across the media item 612, an average brightness across the media item 612, an average saturation across the media item 612, or the like.

In some embodiments, the second media item is generated (906) based on the first media item, and the fourth media item is generated based on the third media item. Generating a media item to set as the background for the home screen user interface based on a media item set as the background for the wake screen user interface (without user intervention) provides continuity between the backgrounds for the wake and home screen user interfaces, thus reducing the number and/or duration of user interactions with the device reduces wear-and-tear of the device. Reducing the number and/or duration of user interactions with the device reduces wear-and-tear of the device and, for battery powered devices, increases battery life of the device.

In some embodiments, the second media item corresponds to (908) a first solid color generated based on one or more visual properties of the first media item, and the fourth media item corresponds to a second solid color generated based on one or more visual properties of the third media item. For example, the one or more visual properties correspond to a dominant hue/color on a pixelwise basis throughout the media item, an average hue/color across the media item, an average brightness across the media item, an average saturation across the media item, or the like. Generating a media item to set as the background for the home screen user interface that corresponds to a solid color based on the media item set as the background for the wake screen user interface (without user intervention) provides continuity between the backgrounds for the wake and home screen user interface, thus reducing the number and/or duration of user interactions with the device reduces wear-and-tear of the device. Reducing the number and/or duration of user interactions with the device reduces wear-and-tear of the device and, for battery powered devices, increases battery life of the device.

As one example, with reference to FIG. 6B, the media item 614B corresponds to a smart color background or wallpaper generated based on the media item 612. For example, the media item 614B corresponds to a smart color generated based on one or more visual properties of the media item 612 corresponding to the background for the wake screen user interface. In some embodiments, the one or more visual properties correspond to a dominant hue/color on a pixelwise basis throughout the media item 612, an average hue/color across the media item 612, an average brightness across the media item 612, an average saturation across the media item 612, or the like.

In some embodiments, the second media item corresponds to (910) a first color gradient selected based on one or more visual properties of the first media item, and the fourth media item corresponds to a second color gradient generated based on one or more visual properties of the third media item. For example, the one or more visual properties correspond to a dominant hue/color on a pixelwise basis throughout the media item, an average hue/color across the media item, an average brightness across the media item, an average saturation across the media item, or the like. In some embodiments, the first color gradient includes a plurality of stripes (vertical, horizontal, diagonal, etc.) associated with different shades of the dominant color within the first media item. In some embodiments, a smoothing or blending operation is performed between each of the plurality of stripes. Generating a media item to set as the background for the home screen user interface that corresponds to a color gradient based on the media item set as the background for the wake screen user interface (without user intervention) provides continuity between the backgrounds for the wake and home screen user interface, thus reducing the number and/or duration of user interactions with the device reduces wear-and-tear of the device. Reducing the number and/or duration of user interactions with the device reduces wear-and-tear of the device and, for battery powered devices, increases battery life of the device.

As one example, with reference to FIG. 6A, the media item 614A corresponds to a smart gradient background or wallpaper generated based on the media item 612. For example, the media item 614A corresponds to a smart gradient generated based on one or more visual properties of the media item 612 corresponding to the background for the wake screen user interface. In some embodiments, the one or more visual properties correspond to a dominant hue/color on a pixelwise basis throughout the media item 612, an average hue/color across the media item 612, an average brightness across the media item 612, an average saturation across the media item 612, or the like. As such, continuing with this example, the media item 614A includes a plurality of stripes (vertical, horizontal, diagonal, etc.) associated with different shades of the dominant color within the media item 612.

As another example, with reference to FIG. 6D, the media item 624 corresponds to a smart gradient background or wallpaper generated based on the media item 622. For example, the media item 624 corresponds to a smart gradient generated based on one or more visual properties of the media item 622 corresponding to the background for the wake screen user interface. In some embodiments, the one or more visual properties correspond to a dominant hue/color on a pixelwise basis throughout the media item 622, an average hue/color across the media item 622, an average brightness across the media item 622, an average saturation across the media item 622, or the like. As such, continuing with this example, the media item 624 includes a plurality of stripes (vertical, horizontal, diagonal, etc.) associated with different shades of the dominant color within the media item 622.

In some embodiments, the first color gradient is generated (912) using (e.g., generated using only or containing) a subset of colors that are contained in the first media item, and wherein the second color gradient is generated using (e.g., generated using only or containing) a subset of colors contained in the third media item. For example, the first color gradient corresponds to shades of a dominant hue/color within the first media item, and the second color gradient corresponds to shades of a dominant hue/color within the second media item.

In some embodiments, the second media item corresponds to (914) a first pattern generated based on one or more visual properties of the first media item, and the fourth media item corresponds to a second pattern generated based on one or more visual properties of the third media item. For example, the one or more visual properties correspond to a dominant hue/color on a pixelwise basis throughout the media item, an average hue/color across the media item, an average brightness across the media item, an average saturation across the media item, dominant feature (lines, circles, leaves, faces, etc.), or the like. As one example, the first pattern corresponds to a predetermined pattern with shades of one or more dominant hues/colors within the first media item, and the second pattern corresponds to a predetermined pattern with shades of one or more dominant hues/colors within the second media item. As another example, the first pattern is generated based on a dominate feature or shape and shades of one or more dominant hues/colors within the first media item, and the second pattern is generated based on a dominate feature or shape and shades of one or more dominant hues/colors within the second media item. Generating a media item to set as the background for the home screen user interface that corresponds to a pattern based on the media item set as the background for the wake screen user interface (without user intervention) provides continuity between the backgrounds for the wake and home screen user interface, thus reducing the number and/or duration of user interactions with the device reduces wear-and-tear of the device. Reducing the number and/or duration of user interactions with the device reduces wear-and-tear of the device and, for battery powered devices, increases battery life of the device.

determination that the user input corresponds to a request to set the first media item as a background for the wake screen user interface, the device concurrently displays (916), on the display, a first preview of the first media item being used as a background for the wake screen user interface and the second media item being used as a background for the home screen user interface. For example, the preview of the wake and home screen user interfaces are displayed side-by-side. For example, one or more application icons are overlaid on the background for the home screen user interface, where the one or more application icons correspond to the current applications icons on the home screen user interface. In some embodiments, the preview of the wake and home screen user interfaces are displayed within a wallpaper settings interface. The wallpaper settings user interface provides an efficient mechanism for a user to more quickly view and navigate through wake+home screen preview pairings, thus reducing the number and/or duration of user interactions with the device reduces wear-and-tear of the device. Reducing the number and/or duration of user interactions with the device reduces wear-and-tear of the device and reduces power drain, increasing battery life of the device.

For example, with reference to FIG. 6A, the electronic device displays a wallpaper settings user interface 605 that includes a region 607 with a plurality of wake+home screen preview pairings 610, where the wake screen user interface and home screen user interface preview pairing 610B is currently displayed. According to some embodiments, the wake+home screen preview pairings 610 correspond to media items within the media gallery user interface described above with reference to FIGS. 5A-5I. The wake screen user interface and home screen user interface preview pairing 610B includes a media item 612 set as the background or wallpaper for the wake screen user interface and a media item 614A set as the background or wallpaper for the home screen user interface based on the currently-selected home screen treatment option 616B (e.g., smart gradient).

In some embodiments, while displaying the first preview on the display, the device displays (918), on the display, a first affordance that, when selected (e.g., with a single or double tap gesture), causes a current user interface with the first preview to be replaced with a media gallery editing user interface provided to edit a plurality of media items associated with a media gallery user interface, wherein the media gallery user interface includes the first and third media items. For example, each row in the edit interface includes a side-by-side preview of wake+home screens and corresponds to a respective media item in the media gallery. The first affordance provides an efficient mechanism for a user to more quickly transition to the media gallery editing user interface, thus reducing the number and/or duration of user interactions with the device reduces wear-and-tear of the device. Reducing the number and/or duration of user interactions with the device reduces wear-and-tear of the device and reduces power drain, increasing battery life of the device.

For example, with reference to FIG. 6D, the wallpaper settings user interface 605 includes an edit affordance 608. Continuing with this example, in FIG. 6E, the electronic device displays the media gallery editing user interface 630 in response to detecting the touch input 687 selecting the edit affordance 608 in FIG. 6D. As shown in FIG. 6E, the media gallery editing user interface 630 includes a plurality of wake+home screen preview pairing regions 635 associated with respective wake+home screen preview pairings 610. According to some embodiments, the media gallery editing user interface 630 includes a number of the wake+home screen preview pairing regions 635 equivalent to a number of media items in the media gallery (e.g., eight media items as within the chrome region 633 in FIG. 6E). Continuing with this example, the wake+home screen preview pairing region 635B corresponds to the wake+home screen preview pairing 610B that includes the media item 612 set as the wake screen user interface background or wallpaper and the media item 614A set as the home screen user interface background or wallpaper.

In some embodiments, while displaying the first preview on the display, the device displays (920), on the display, a second affordance that, when selected (e.g., with a single or double tap gesture), causes a current user interface with the first preview to be replaced with a media gallery addition user interface provided to add one or more media items to a plurality of media items associated with a media gallery user interface, wherein the media gallery user interface includes the first and third media items. In some embodiments, upon selecting a media item within the media gallery addition user interface to add to the media gallery user interface the device displays a cropping user interface for editing the media item to be added to the media gallery user interface (e.g., similar to the cropping user interface 660 in FIG. 6F). For example, the cropping user interface enables the user to rotate, pan/move, or scale/zoom the media item to be added to the media gallery user interface. For example, the cropping user interface also includes parallax and live toggles. The second affordance provides an efficient mechanism for a user to more quickly transition to the media gallery addition user interface, thus reducing the number and/or duration of user interactions with the device reduces wear-and-tear of the device. Reducing the number and/or duration of user interactions with the device reduces wear-and-tear of the device and reduces power drain, increasing battery life of the device.

For example, with reference to FIG. 6A, the wallpaper settings user interface 605 includes an addition affordance 606, which, when selected (e.g., with a single or double tap gesture), causes the electronic device to display a media gallery addition user interface for adding one or media items to a media gallery (e.g., similar to the media item selection user interface 710 in FIG. 7A).

In some embodiments, the device (922): detects, via the one or more input devices, a subsequent user input that corresponds to a request to set the third media item as the background for the wake screen user interface; and in response to detecting the subsequent user input, concurrently displays, on the display, a second preview of the third media item being used as the background for the wake screen user interface and the fourth media item being used as the background for the home screen user interface. For example, the third media item corresponds to a modified version of the first media—cropped, panned, rotated, etc. For example, the third media item is different from the first media item. For example, FIGS. 6C and 6D illustrate a sequence in which a first wake screen+home screen preview pairing 610B is replaced by a second wake screen+home screen preview pairing 610C in response to detecting a navigation gesture 685.

It should be understood that the particular order in which the operations in FIGS. 9A and 9B have been described is merely example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., the methods 800 and 1100) are also applicable in an analogous manner to method 900 described above with respect to FIGS. 9A and 9B. For example, the user inputs, user input gestures, media items, wake screen user interface, home screen user interface, backgrounds, and previews described above with reference to method 900 optionally have one or more of the characteristics of the user inputs, user input gestures, media items, wake screen user interface, home screen user interface, backgrounds, and previews described herein with reference to other methods described herein (e.g., the methods 800 and 1100) For brevity, these details are not repeated here.

The operations in the information processing methods described above are, optionally, implemented by running one or more functional modules in an information processing apparatus such as general-purpose processors (e.g., as described with respect to FIGS. 1A, 3, and 5A) or application specific chips. Further, the operations described above with reference to FIGS. 9A and 9B, optionally, implemented by components depicted in FIGS. 1A and 1B. For example, the user inputs, user input gestures, media items, wake screen user interface, home screen user interface, backgrounds, and previews are, optionally, implemented by the event sorter 170, the event recognizer 180, and the event handler 190. The event monitor 171 in the event sorter 170 detects a contact on the touch-sensitive surface 451, and the event dispatcher module 174 delivers the event information to the application 136-1. A respective event recognizer 180 of the application 136-1 compares the event information to respective event definitions 186 and determines whether a first contact at a first location on the touch-sensitive surface corresponds to a predefined event or sub-event, such as selection of an object on a user interface. When a respective predefined event or sub-event is detected, the event recognizer 180 activates an event handler 190 associated with the detection of the event or sub-event. The event handler 190 optionally utilizes or calls the data updater 176 or the object updater 177 to update the application internal state 192. In some embodiments, the event handler 190 accesses a respective GUI updater 178 to update what is displayed by the application. Similarly, it would be clear to a person having ordinary skill in the art how other processes can be implemented based on the components depicted in FIGS. 1A and 1B.

FIGS. 10A-10AB illustrate example user interfaces for modifying media items in a media gallery in accordance with some embodiments. The user interfaces in these figures are used to illustrate the processes described below, including the processes in FIGS. 11A-11E. Although some of the examples which follow will be given with reference to inputs on a touch-screen display (where the touch-sensitive surface and the display are combined), in some embodiments, the computing system detects inputs on a touch-sensitive surface 451 that is separate from the display 450, as shown in FIG. 4B. In some embodiments, user inputs are sometimes referred to herein as touch inputs or touch input gestures. In some embodiments, the user interfaces in FIGS. 10A-10AB are presented or caused to be displayed by a computing system including non-transitory memory and one or more processors, wherein the computing system is communicatively coupled to a display device and one or more input devices.

Figure 10B:
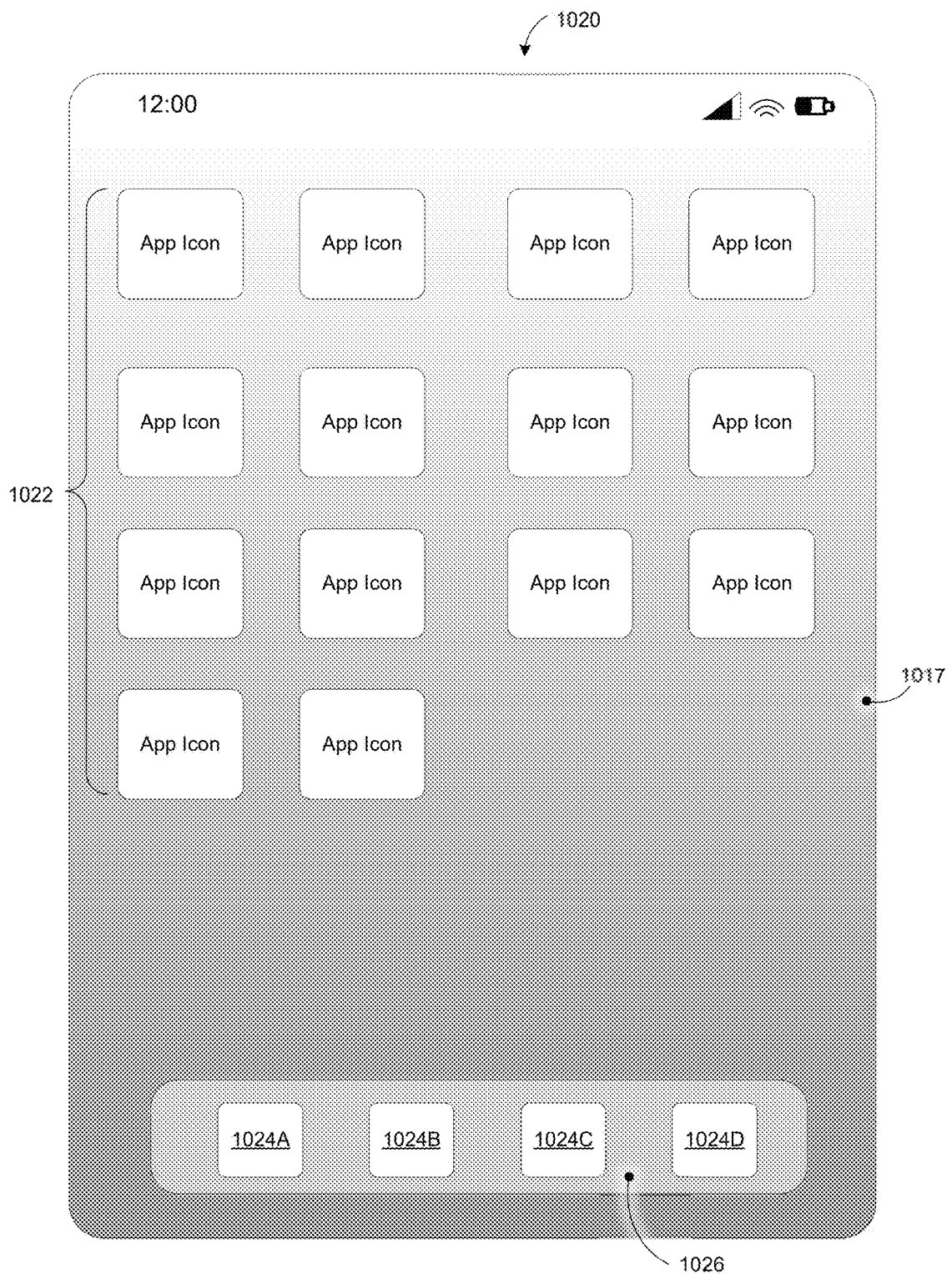

FIGS. 10A and 10B illustrate a sequence in which a wake screen user interface is replaced by a home screen user interface in response to detecting a touch input gesture in accordance with some embodiments. As shown in FIG. 10A, the computing system displays a wake screen user interface 1010 that includes a media item 1015 being used as a background or wallpaper. The wake screen user interface 1010 also includes a plurality of foreground user interface objects—an authentication indicator 1002, a time and date indicator 1004, notifications 1006A and 1006B, a flashlight affordance 1008A, an image capture affordance 1008B, and a home screen affordance 1012.

According to some embodiments, the authentication indicator 1002 is represented by an open padlock, as shown in FIG. 10A, while the computing system is operating in an unlocked mode. According to some embodiments, the authentication indicator 1002 is represented by a closed padlock while the computing system is operating in a locked mode. For example, the computing system operates in the unlocked mode after a user has been authenticated by the computing system based on successful entry of a PIN or other alphanumeric code, biometric information (e.g., a 3D face mesh or fingerprint), or the like.

In some embodiments, when selected (e.g., with a single or double tap gesture, tap and hold gesture, deep press gesture, or the like), the flashlight affordance 1008A causes the computing system to illuminate a light emission element of the computing system (e.g., a flash component associated with the camera). In some embodiments, when selected (e.g., with a single or double tap gesture, tap and hold gesture, deep press gesture, or the like), the image capture affordance 1008B causes the computing system to replace display of the wake screen user interface 1010 with an image capture user interface provided to capture images using an interior-facing or exterior-facing image sensor of the computing system.

As shown in FIG. 10A, the computing system detects a touch input gesture 1003 corresponding to an upward swipe that originates at a location that corresponds to a home screen affordance 1012. In response to detecting the touch input gesture 1003 in FIG. 10A, the computing system displays a home screen user interface 1020 in FIG. 10B. In some embodiments, the computing system enables (or allows) the transition from the wake screen user interface 1010 to the home screen user interface 1020 while in the unlocked mode. As shown in FIG. 10B, the computing system displays a home screen user interface 1020 that includes a media item 1017 being used as a background or wallpaper. The home screen user interface 1020 also includes plurality of selectable application icons 1022 and a dock region 1026 with selectable application icons 1024A, 1024B, 1024C, and 1024D.

For example, the media item 1017 corresponds to a smart gradient generated based on one or more visual properties of the media item 1015 corresponding to the background for the wake screen user interface 1010 shown in FIG. 10A. In some embodiments, the one or more visual properties correspond to a dominant hue/color on a pixelwise basis throughout the media item 1015, an average hue/color across the media item 1015, an average brightness across the media item 1015, an average saturation across the media item 1015, or the like. As such, continuing with this example, the media item 1017 includes a plurality of stripes (vertical, horizontal, diagonal, etc.) associated with different shades of the dominant color within the media item 1015.

Figure 10C:
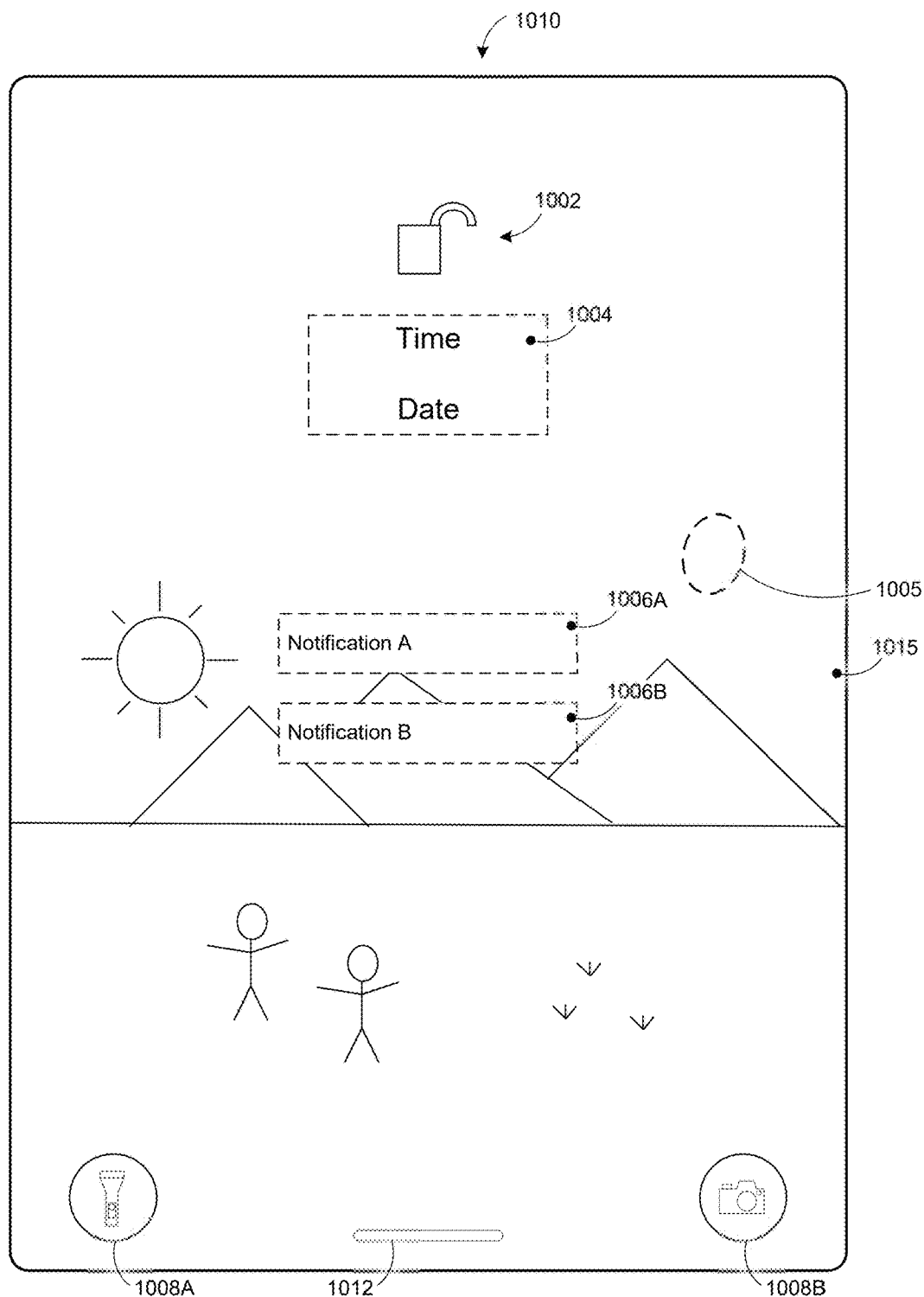
Figure 10D:
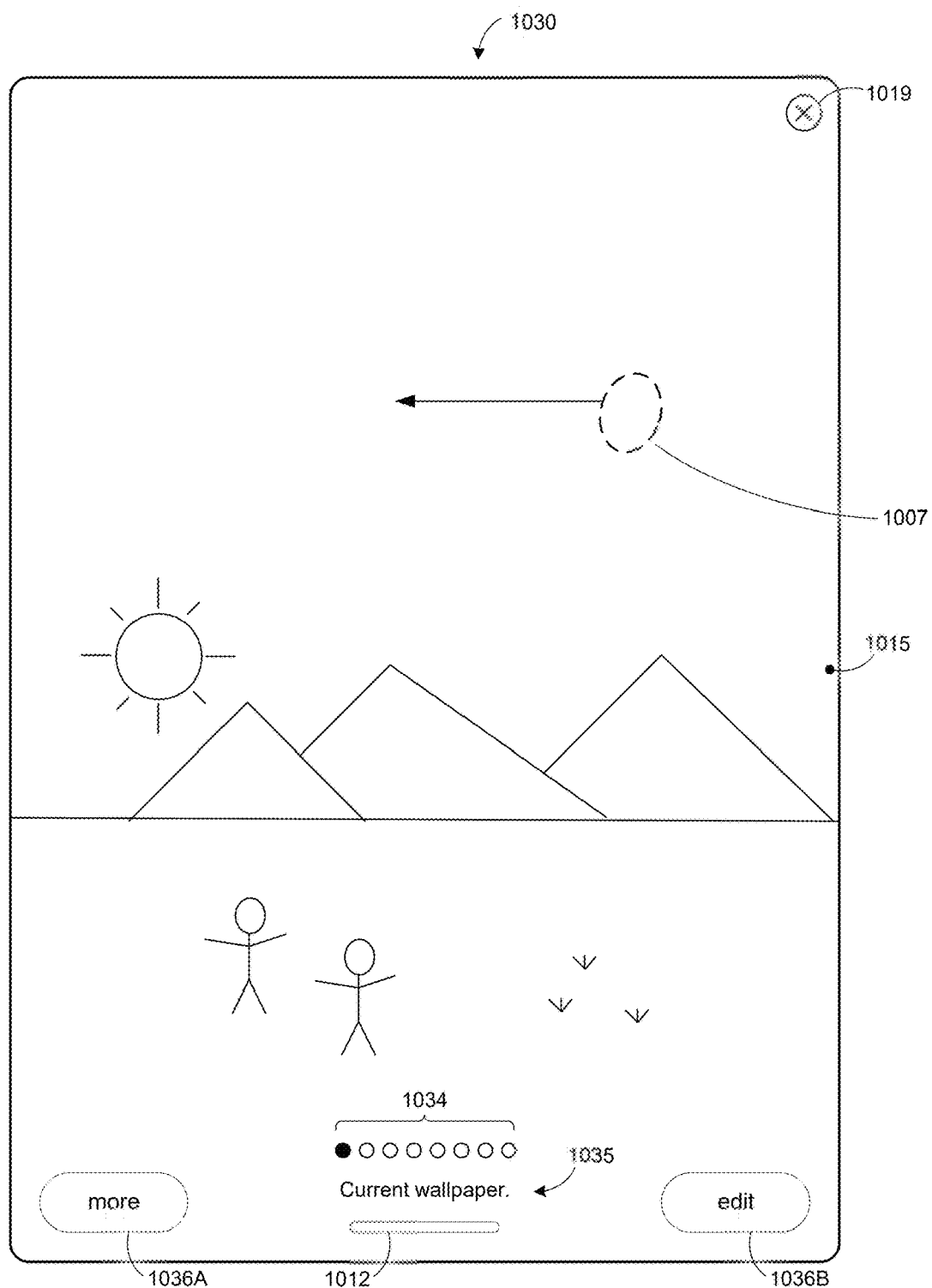

FIGS. 10C and 10D illustrate a sequence in which a wake screen user interface is replaced by a media gallery user interface in response to detecting a touch input in accordance with some embodiments. As shown in FIG. 10C, the computing system detects a touch input 1005 (e.g., a single or double tap gesture, tap and hold gesture, deep press, or the like) at a location that corresponds to the background of the wake screen user interface 1010 (e.g., a location that does not correspond to any of the foreground user interface objects within the wake screen user interface 1010). In response to detecting the touch input 1005 in FIG. 10C, the computing system displays the media gallery user interface 1030 in FIG. 10D. In some embodiments, the computing system enables (or allows) the transition from the wake screen user interface 1010 to the media gallery user interface 1030 while in the unlocked mode.

As shown in FIG. 10D, the media gallery user interface 1030 includes the media item 1015 and a plurality of foreground user interface objects including: an exit affordance 1019, which, when selected (e.g., with a single or double tap gesture), causes the computing system to replace the media gallery user interface 1030 with a last user interface (e.g., the wake screen user interface 1010 without changing the background or wallpaper of the wake screen user interface 1010); a "more" affordance 1036A, which, when selected (e.g., with a single or double tap gesture), causes the computing system to display an operation menu overlaid on the media gallery user interface 1030 (e.g., the operation menu 10141 shown in FIG. 10S); an "edit" affordance 1036B, which, when selected (e.g., with a single or double tap gesture), causes the computing system to replace the media gallery user interface 1030 with an editing user interface for at least one of adding or removing media items from the set of one or more media items in the media gallery (e.g., the editing user interface 1040 in FIG. 10J); a plurality of pagination dots 1034 indicating a position of the media item 1015 amongst a plurality of media items in a media gallery associated with the media gallery user interface 1030; and a wallpaper indicator 1035 indicating that the media item 1015 is the current background or wallpaper for the wake screen user interface 1010. In some embodiments, in response to detecting an upward swipe gesture within the media gallery user interface 1030 (or the like), the computing system replaces the media gallery user interface 1030 with the wake screen user interface 1010 without changing the background or wallpaper of the wake screen user interface 1010.

In some embodiments, the pagination dots 1034 function as a scrubber bar. In some embodiments, the computing system skips to the beginning of the media items included in the media gallery user interface in response to detecting a tap gesture (or the like) directed to a left-most pagination dot (or a region adjacent thereto). In some embodiments, the computing system skips to the end of the media items included in the media gallery user interface in response to detecting a tap gesture (or the like) directed to a right-most pagination dot (or a region adjacent thereto).

Figure 10E:
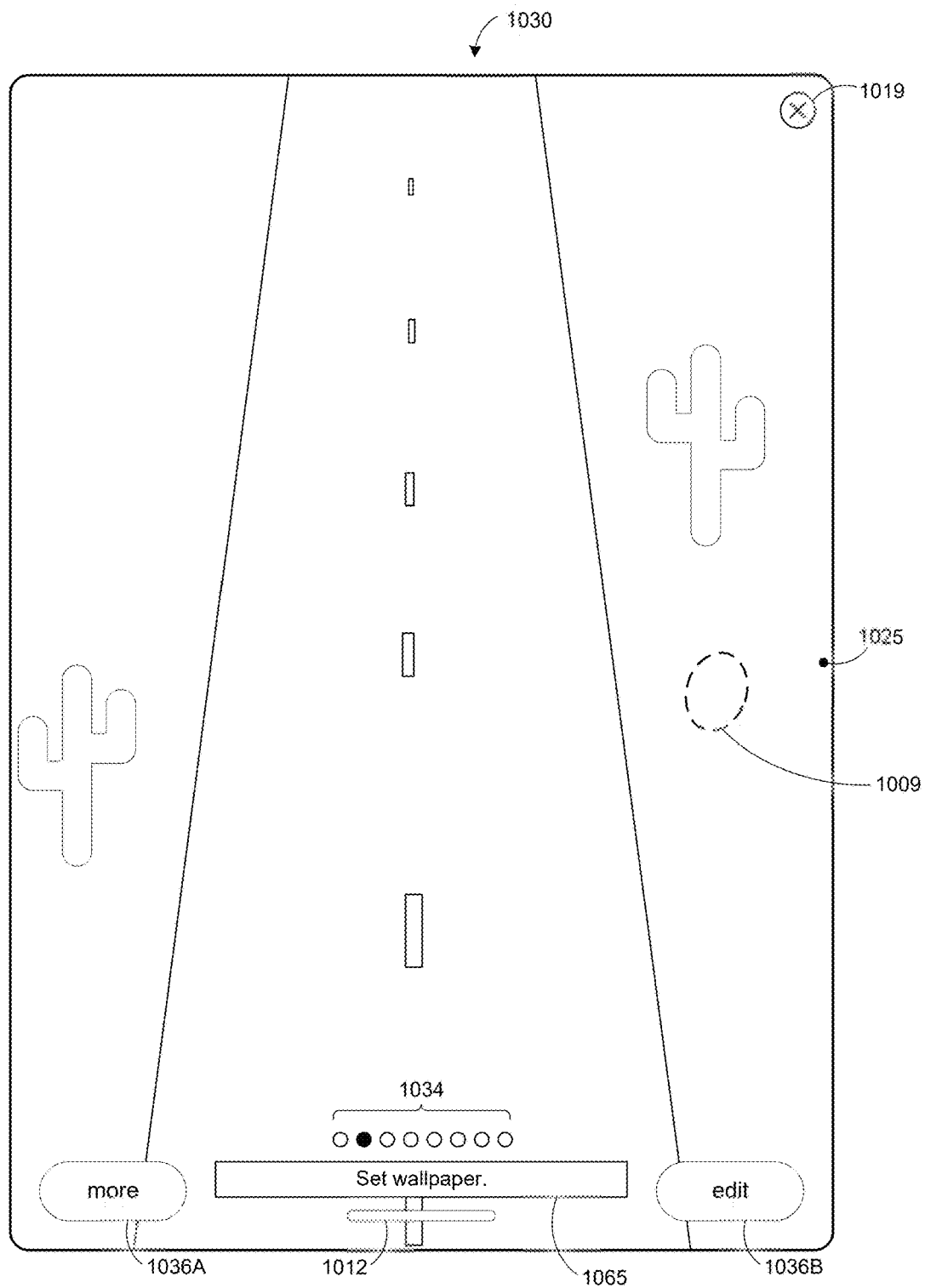

FIGS. 10D and 10E illustrate a sequence in which a first media item is replaced by a second media item within the media gallery user interface in response to detecting a navigation gesture in accordance with some embodiments. As shown in FIG. 10D, the computing system detects a touch input gesture 1007 (sometimes also referred to herein as a navigation gesture) that corresponds to a right-to-left swipe at a location that corresponds to the background of the media gallery user interface 1030 (e.g., a location that does not correspond to any of the foreground user interface objects within the media gallery user interface 1030). In response to detecting the touch input gesture 1007 in FIG. 10D, the computing system updates the media gallery user interface 1030 in FIG. 10E such that a media item 1025 is displayed as the background of the media gallery user interface 1030.

In response to detecting the touch input gesture 1007 in FIG. 10D, the computing system also updates the plurality of pagination dots 1034 and replaces the wallpaper indicator 1035 with a "set wallpaper" affordance 1065 in FIG. 10E, which, when selected (e.g., with a single or double tap gesture), causes the computing system to set the media item 1025 as the background or wallpaper for the wake screen user interface 1010. According to some embodiments, when the "set wallpaper" affordance 1065 is selected, the computing system also sets a media item generated based on the media item 1025 as the background or wallpaper for the home screen user interface 1020 (e.g., a smart color, smart gradient, smart pattern, or the like as described above with reference to the method 900).

Figure 10F:
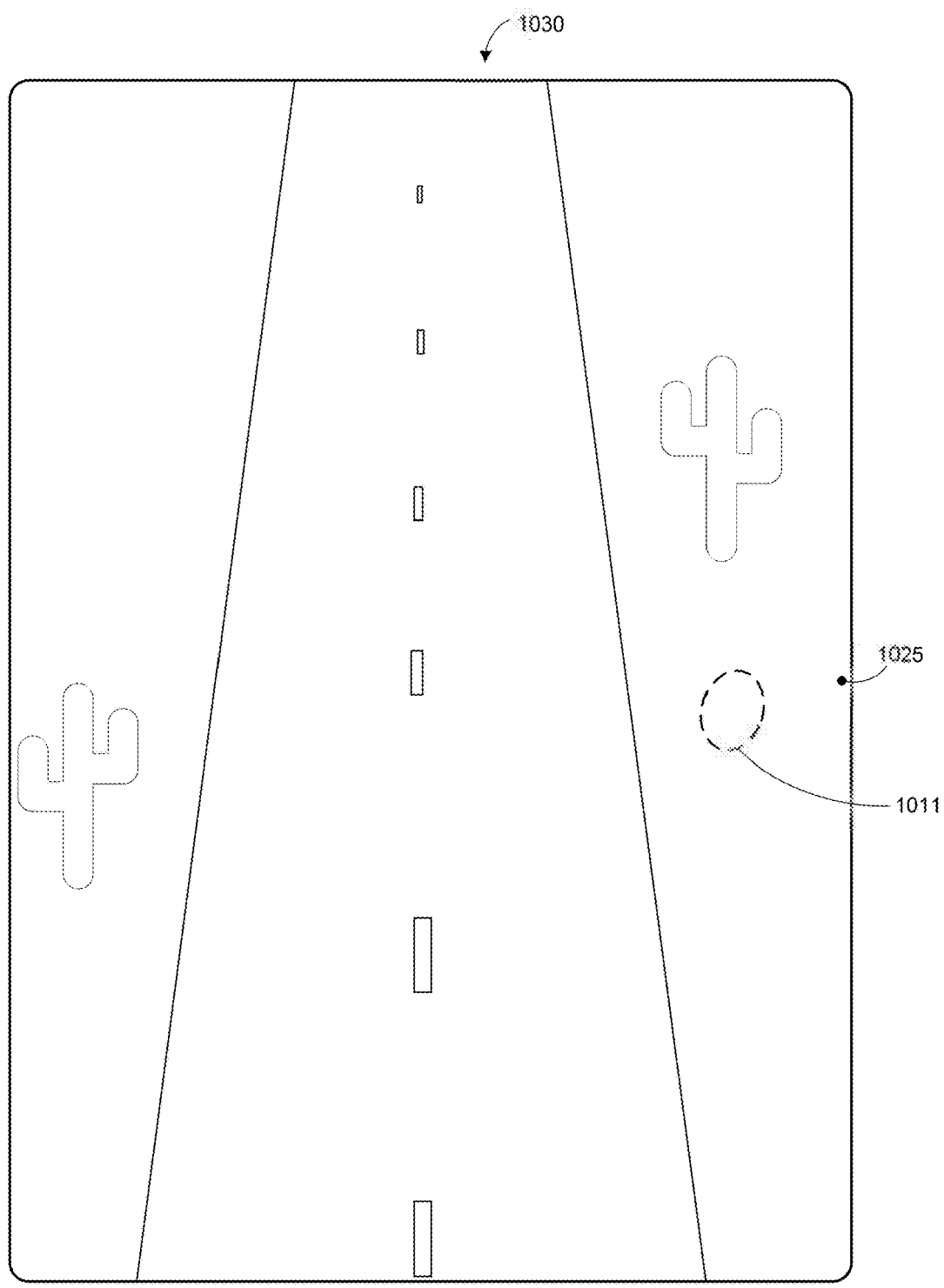

FIGS. 10E and 10F illustrate a sequence in which one or more foreground user interface objects within the media gallery user interface cease to be displayed in response to detecting a touch input in accordance with some embodiments. As shown in FIG. 10E, the computing system detects a touch input 1009 (e.g., a single or double tap gesture, a tap and hold gesture, a deep press, or the like) at a location that corresponds to the background of the media gallery user interface 1030 (e.g., a location that does not correspond to any of the foreground user interface objects within the media gallery user interface 1030). In response to detecting the touch input 1009 in FIG. 10E, the computing system ceases display of the foreground user interface objects within the media gallery user interface 1030 in FIG. 10F. According to some embodiments, the computing system ceases display of the foreground user interface objects within the media gallery user interface 1030 after expiration of a determined timeout period (e.g., 10 seconds).

Figure 10G:
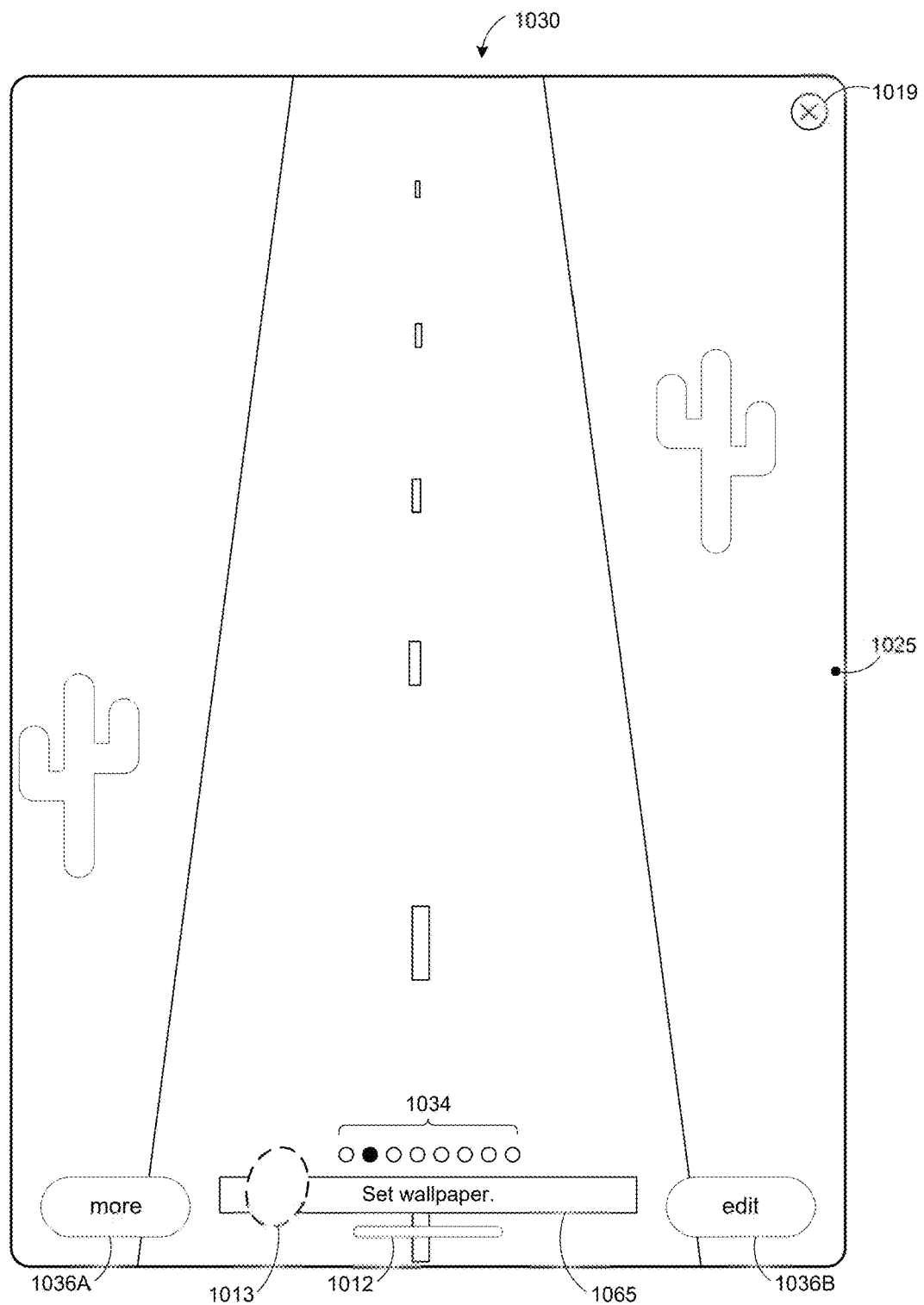

FIGS. 10F and 10G illustrate a sequence in which the one or more foreground user interface objects are redisplayed within the media gallery user interface in response to detecting a touch input in accordance with some embodiments. As shown in FIG. 10F, the computing system detects a touch input 1011 (e.g., a single or double tap gesture, a tap and hold gesture, a deep press, or the like) at a location that corresponds to the background of the media gallery user interface 1030. In response to detecting the touch input 1011 in FIG. 10F, the computing system redisplays the foreground user interface objects within the media gallery user interface 1030 in FIG. 10G.

Figure 10H:
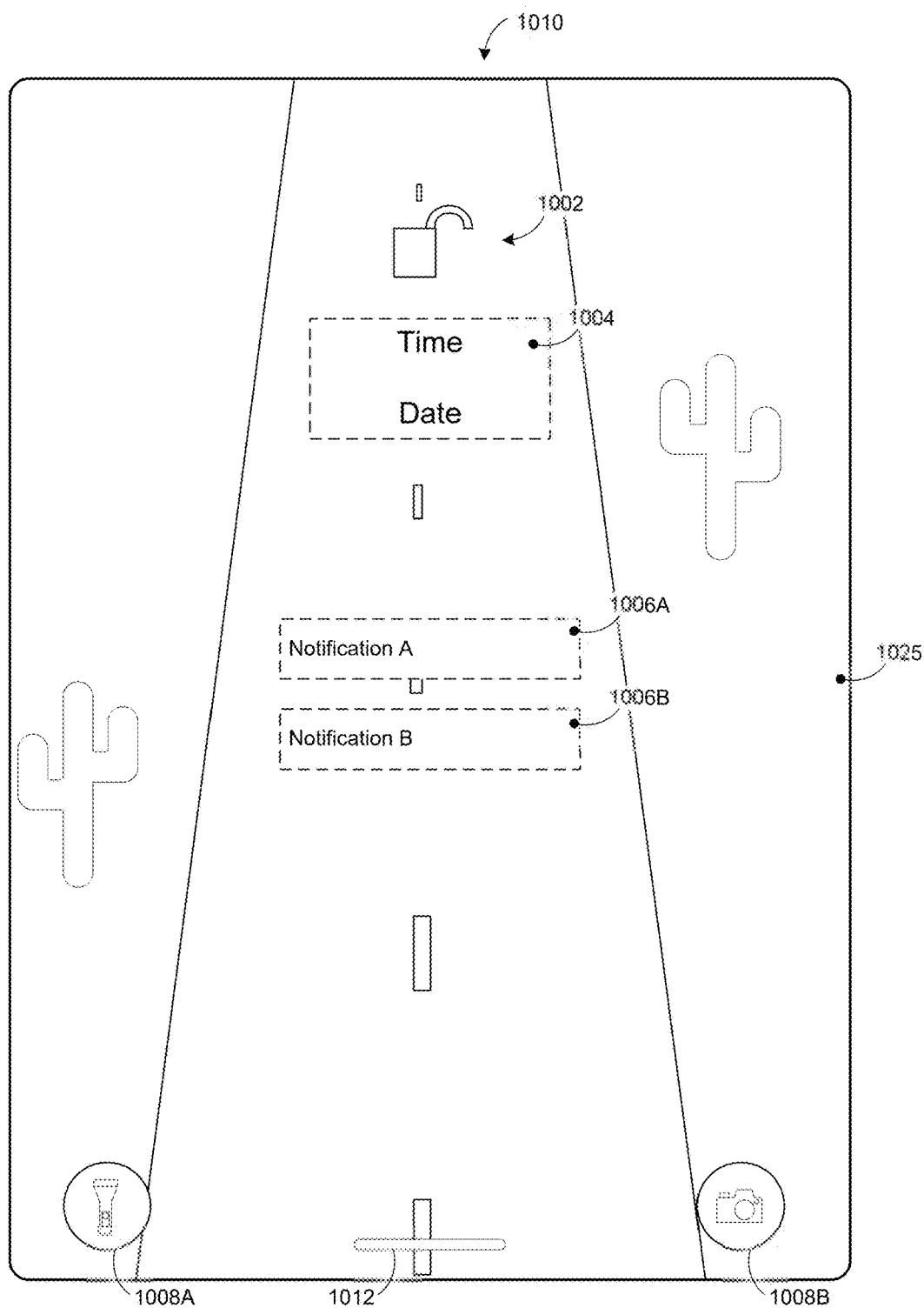

FIGS. 10G and 10H illustrate a sequence in which the media gallery user interface is replaced by the wake screen user interface in response to a selection input setting the second media item as the background for the wake screen user interface in accordance with some embodiments. As shown in FIG. 10G, the computing system detects a touch input 1013 (e.g., a tap gesture) at a location that corresponds to the "set wallpaper" affordance 1065 within the media gallery user interface 1030. In response to detecting the touch input 1013 in FIG. 10G, the computing system redisplays the wake screen user interface 1010 including the media item 1025 as the background or wallpaper thereof in FIG. 10H.

Figure 10I:
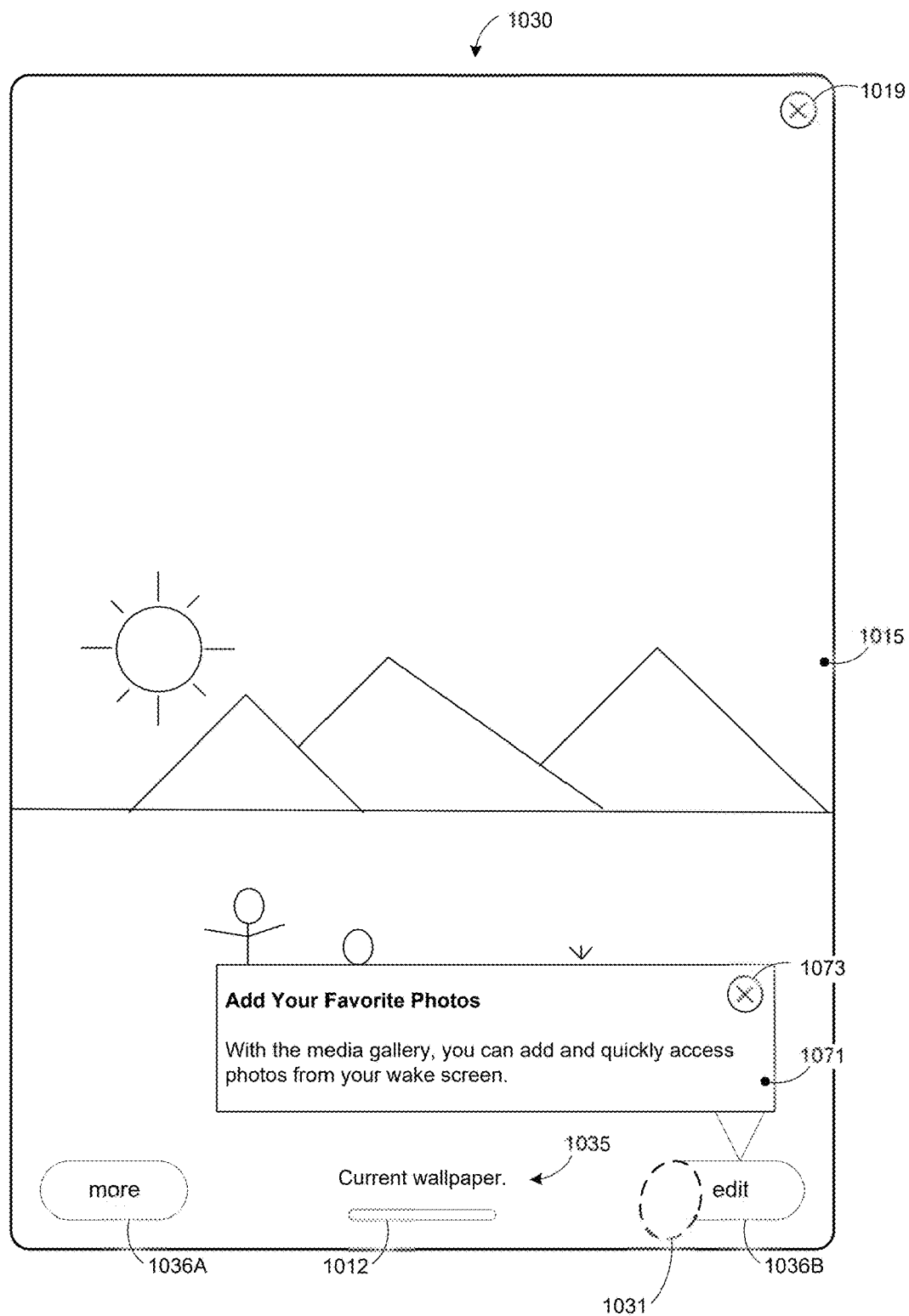

FIGS. 10C and 10I illustrate an alternative sequence in which a wake screen user interface is replaced by a media gallery user interface in response to detecting a touch input in accordance with some embodiments. As shown in FIG. 10C, the computing system detects a touch input 1005 (e.g., a single or double tap gesture, tap and hold gesture, deep press, or the like) at a location that corresponds to the background of the wake screen user interface 1010 (e.g., a location that does not correspond to any of the foreground user interface objects within the wake screen user interface 1010). In response to detecting the touch input 1005 in FIG. 10C, the computing system displays the media gallery user interface 1030 in FIG. 10I.

FIG. 10I illustrates an alternative state of the media gallery user interface 1030 whereby a single media item (e.g., the media item 1015) is currently associated with the media gallery. As such, in FIG. 10I, the computing system displays a prompt 1071 that solicits the user to add media items to his/her media gallery. As shown in FIG. 10I, the prompt 1071 includes an exit affordance 1073, which, when selected (e.g., with a single or double tap gesture), causes the computing system to dismiss the prompt 1071.

Figure 10J:
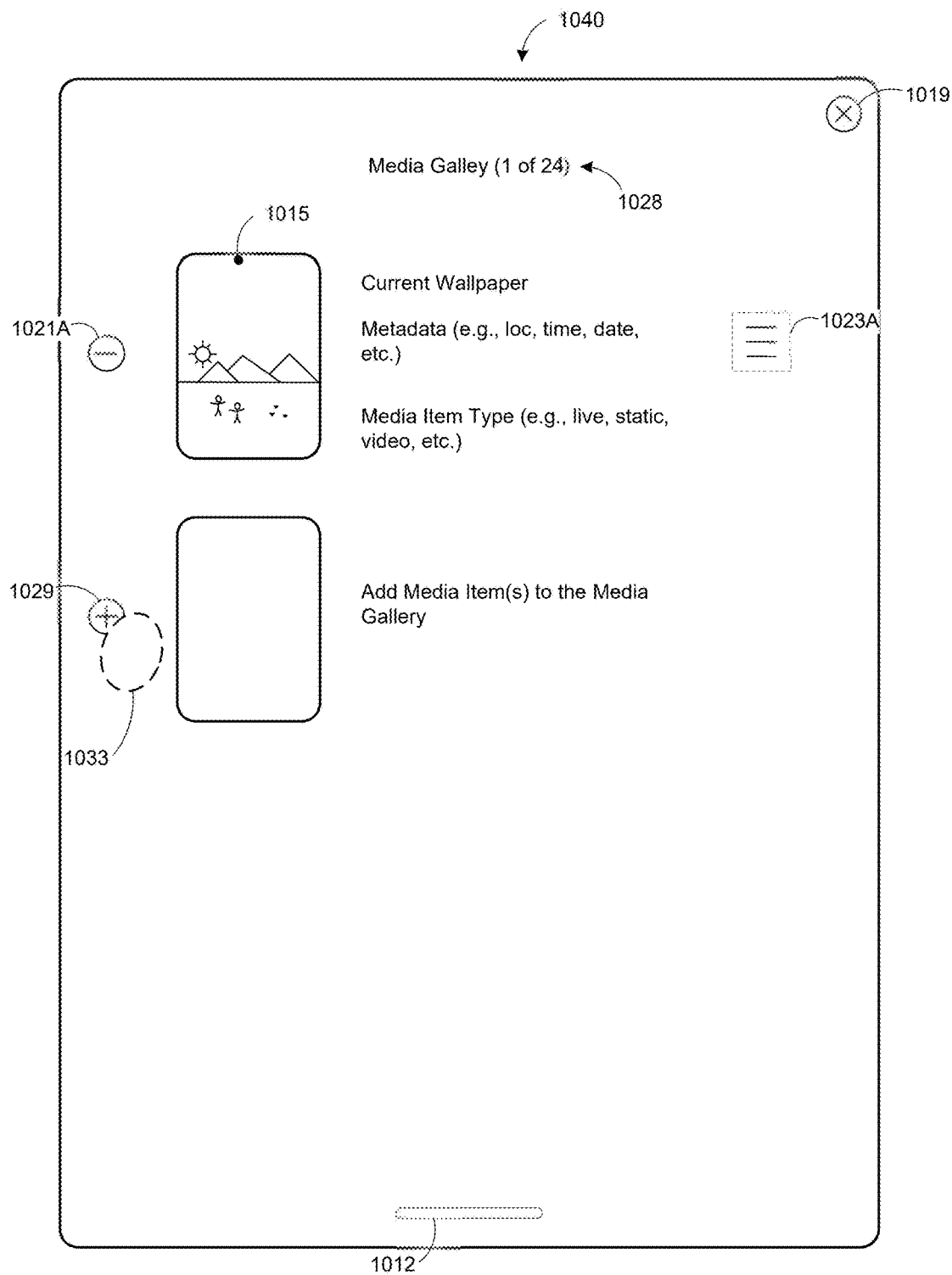

FIGS. 10I and 10J illustrate a sequence in which the media gallery user interface is replaced by an editing user interface for at least one of adding or removing media items from the set of one or more media items in the media gallery in accordance with some embodiments. As shown in FIG. 10I, the computing system detects a touch input 1031 (e.g., a tap gesture) at a location that corresponds to the "edit" affordance 1036B within the media gallery user interface 1030. In response to detecting the touch input 1031 in FIG. 10I, the computing system displays the editing user interface 1040 in FIG. 10J.

As shown in FIG. 10J, the editing user interface 1040 includes an indication 1028 of the current number of media items included within the media gallery as well as the maximum number of media items that the media gallery can hold (e.g., 1 media item of a possible 24 media items). One of ordinary skill in the art will appreciate that the current number of media items associated with the media gallery and the limit of possible media items associated with the media gallery are merely examples and may be replaced with other values in various other embodiments.

The editing user interface 1040 also includes the media item 1015 as well as an indication that the media item 1015 corresponds to the current wallpaper or background for the wake screen user interface 1010, metadata associated with the media item 1015 (e.g., the location where the media item 1015 was captured, the time and date the media item 1015 was captured, and/or the like), and an indication of the media type or classification associated with the media item 1015 (e.g., live image, static image, video, slideshow, or the like). Moreover, as shown in FIG. 10J, the editing user interface 1040 further includes a first editing affordance 1029 for initiating a process for adding one or more media items to the media gallery (e.g., as shown in FIGS. 10J-10N) and a second editing affordance 1021A for initiating a process for removing the media items 1015 from the media gallery. As shown in FIG. 10J, the editing user interface 1040 further includes a reordering handle 1023A, which, when selected (e.g., with a single or double tap and drag gesture), enables the user to reorder the media items included within the media gallery.

FIGS. 10J-10N illustrate a sequence in which two media items are added to the media gallery in accordance with some embodiments. As shown in FIG. 10J, the computing system detects a touch input 1033 (e.g., a single or double tap gesture) at a location that corresponds to the first editing affordance 1029 within the editing user interface 1040. In response to detecting the touch input 1033 in FIG. 10J, the computing system displays the media item picker user interface 1050 in FIG. 10K.

Figure 10K:
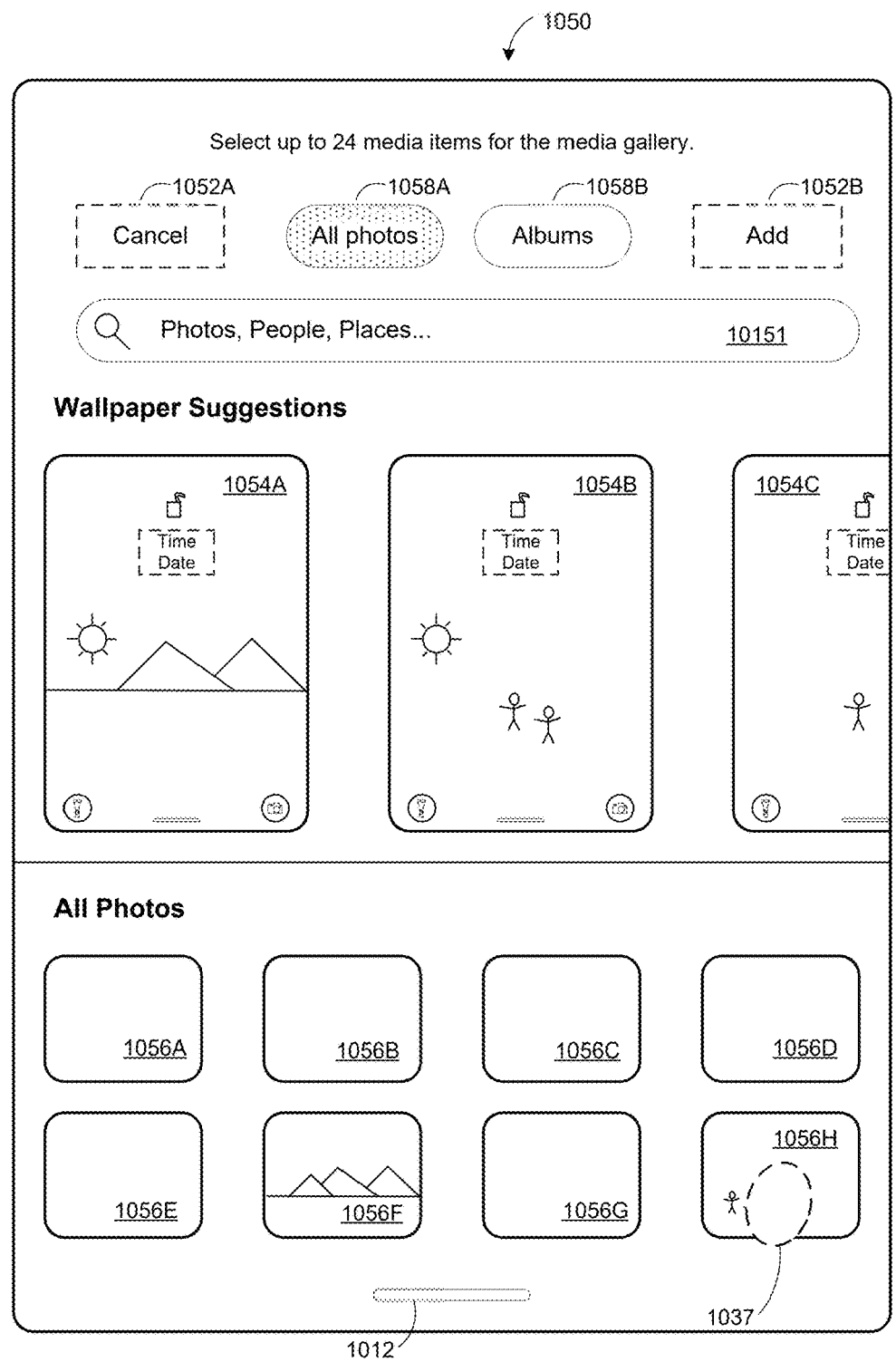

As shown in FIG. 10K, the media item picker user interface 1050 includes wallpaper suggestions 1054A, 1054B, and 1054C (sometimes collectively referred to herein as the "wallpaper suggestions 1054") including media items shown as the wallpaper or background for a wake screen user interface with the foreground user interface objects overlaid thereon. In some embodiments, the user is able to view additional wallpaper suggestions 1054 by scrolling rightward within the media item picker user interface 1050. As shown in FIG. 10K, the media item picker user interface 1050 also includes selectable media items 1056A, 1056B, 1056C, 1056D, 1056E, 1056F, 1056G, and 1056H (sometimes collectively referred to herein as the "media items 1056") available for adding to the media gallery. In some embodiments, the user is able to view additional selectable media items by scrolling down within the media item picker user interface 1050.

In some embodiments, the computing system selects the media items associated with the wallpaper suggestions 1054 from the user's camera roll (e.g., the user's repository of media content stored locally and/or remotely) based on predefined logic such as most recently viewed media items, most frequently viewed media items, content/objects within the media items that are of relevance to the user (based on semantic segmentation), metadata associated with the media items that are of relevance to the user (based on date, location, persons/animals identified within the media items, etc.), and/or the like. In some embodiments, the media items associated with the wallpaper suggestions 1054 are cropped, scaled, and/or the like such that the one or more foreground user interface objects and the time/date associated with the wake screen user interface do not occlude important features of the media items such as people, faces, landmarks, animals, and/or the like. In some embodiments, the media items associated with the wallpaper suggestions 1054 correspond to system wallpapers.

Figure 10L:
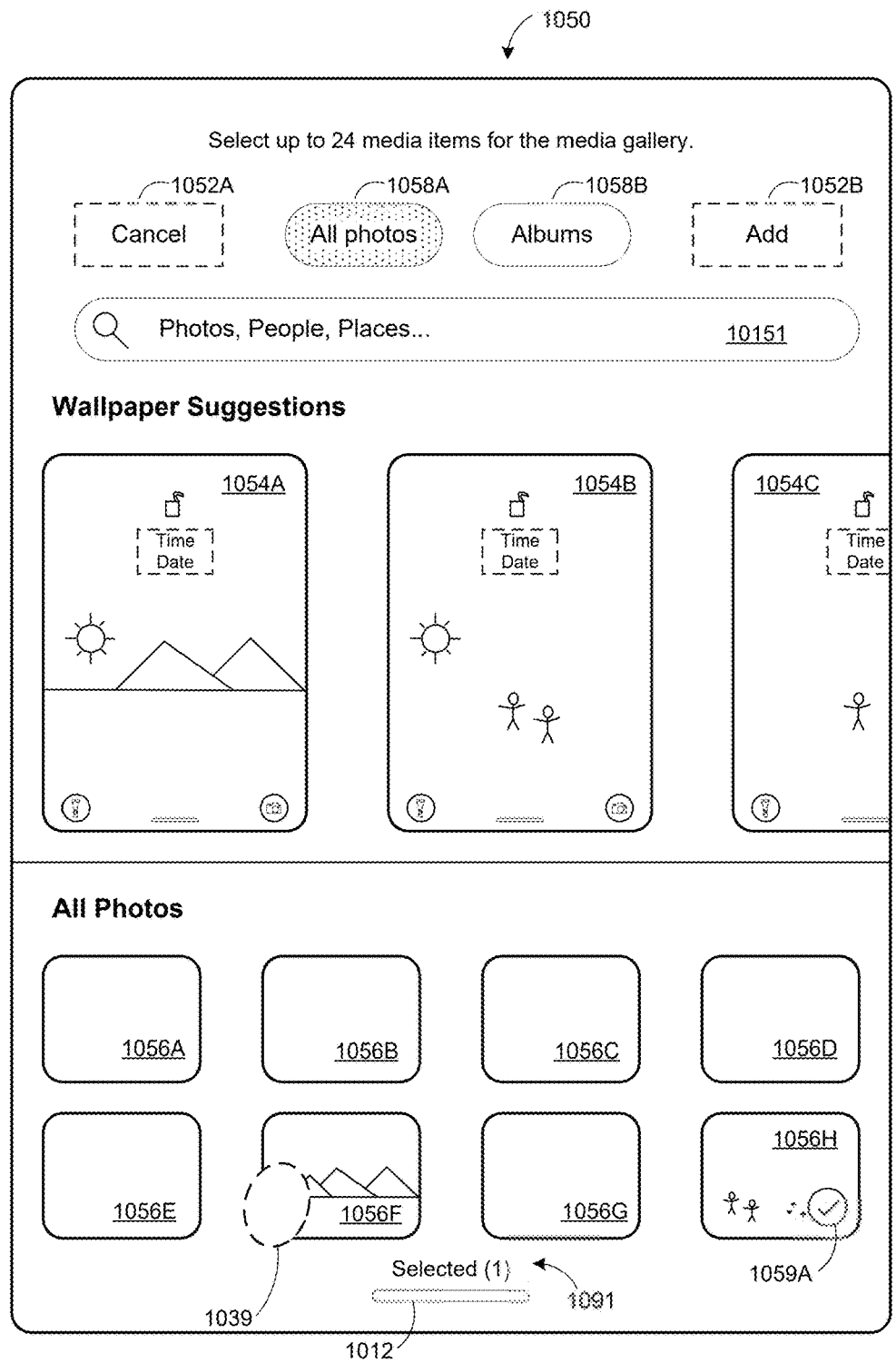
Figure 10M:
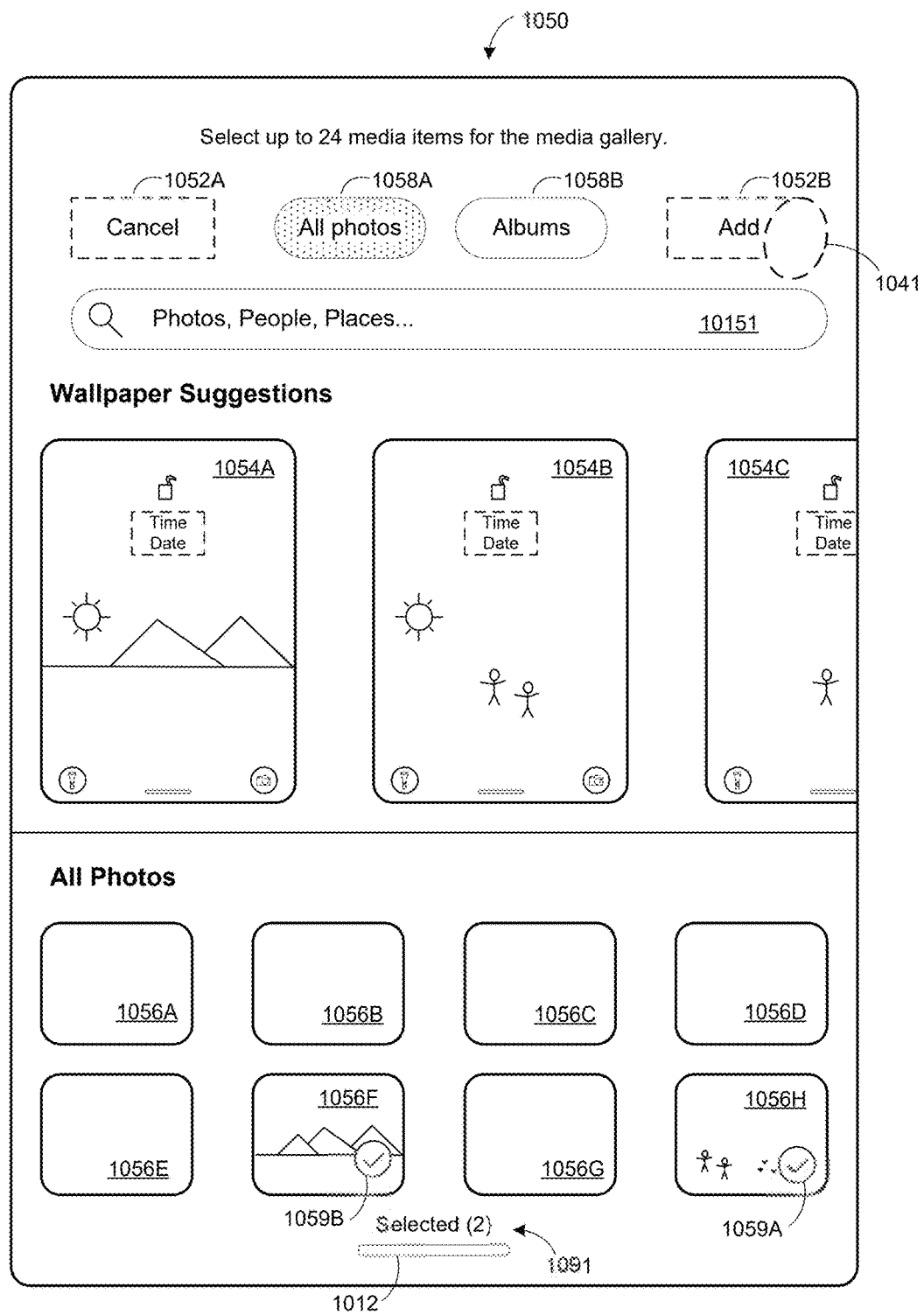
Figure 10N:
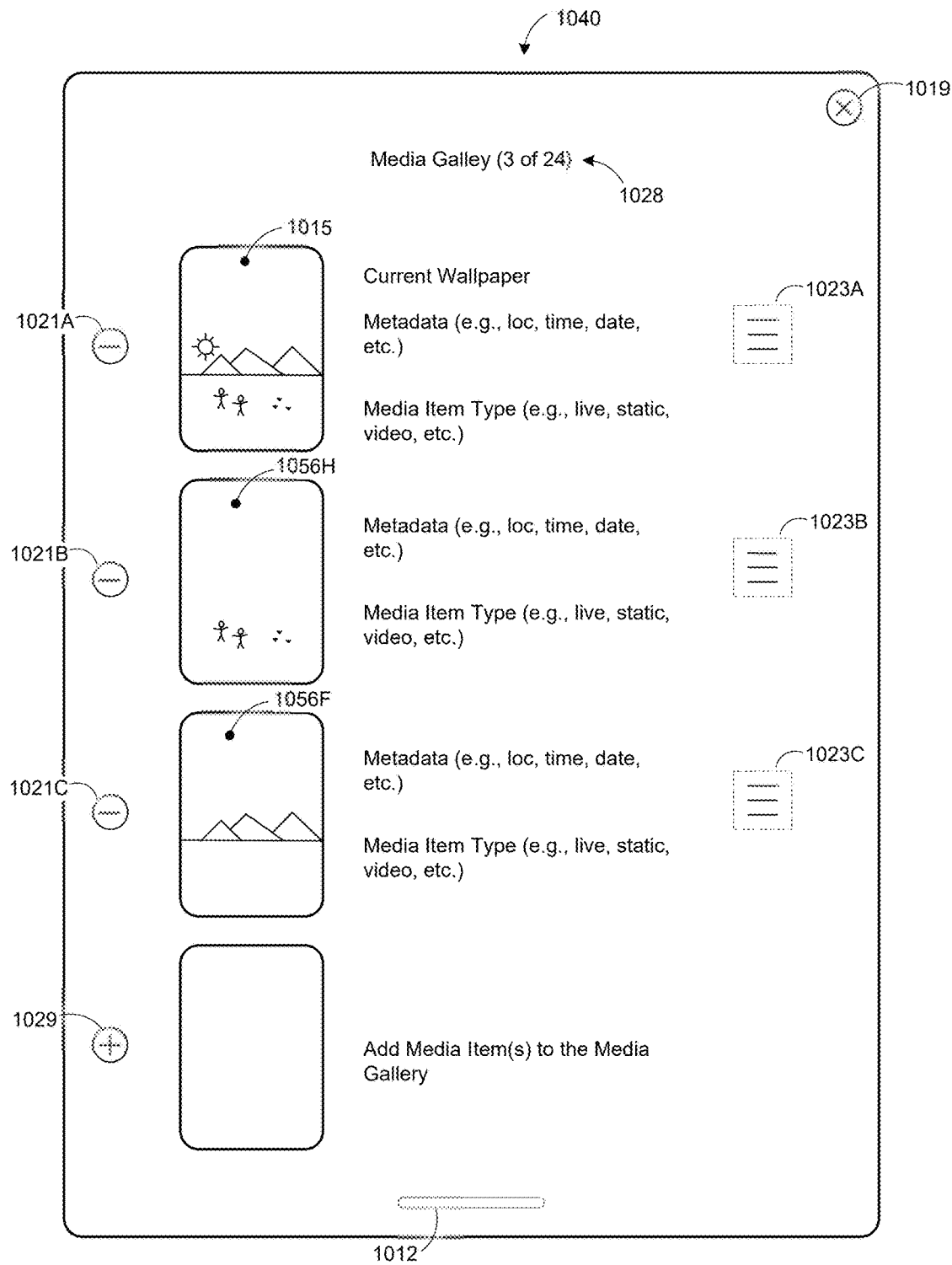
Figure 10O:
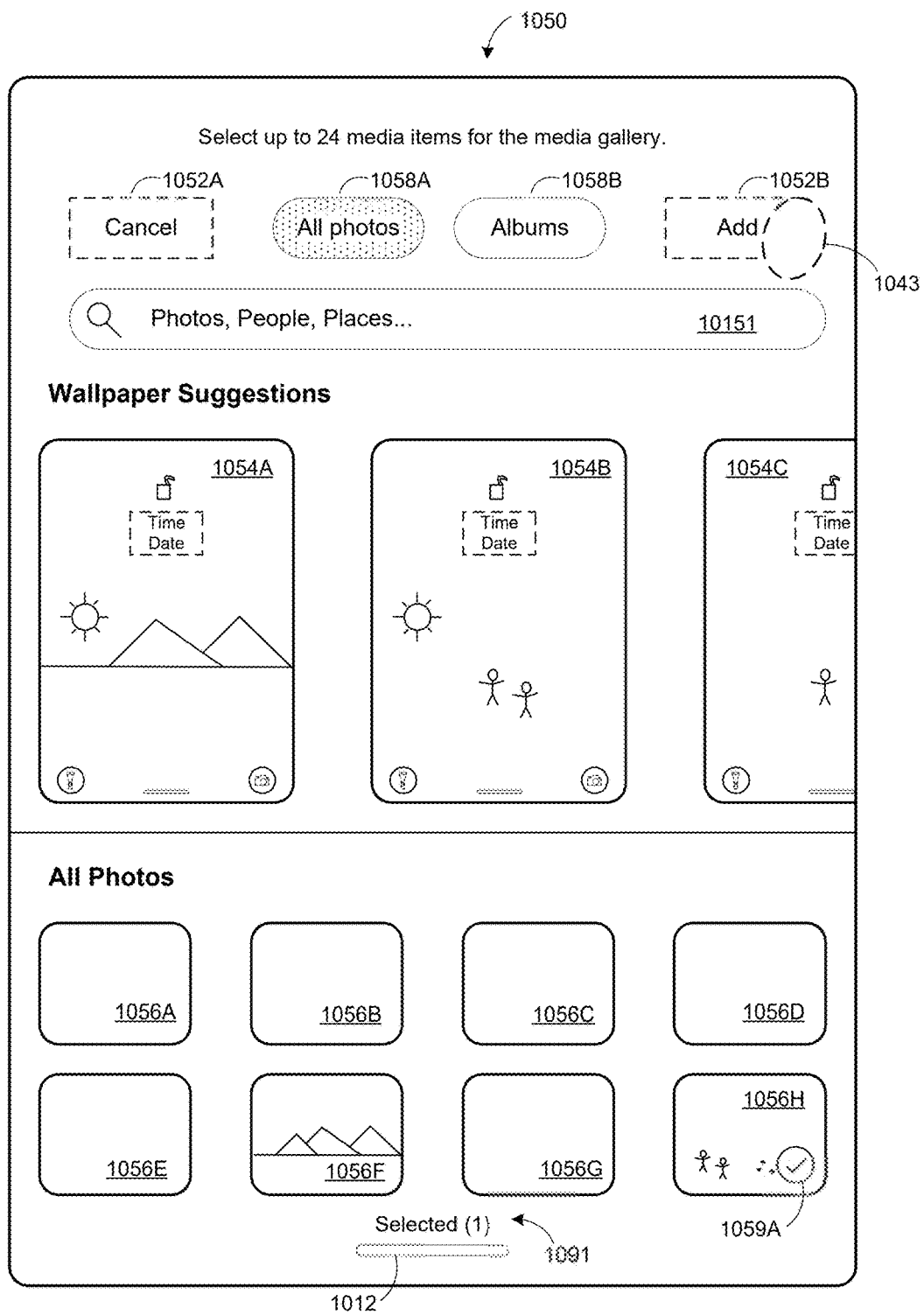
Figure 10P:
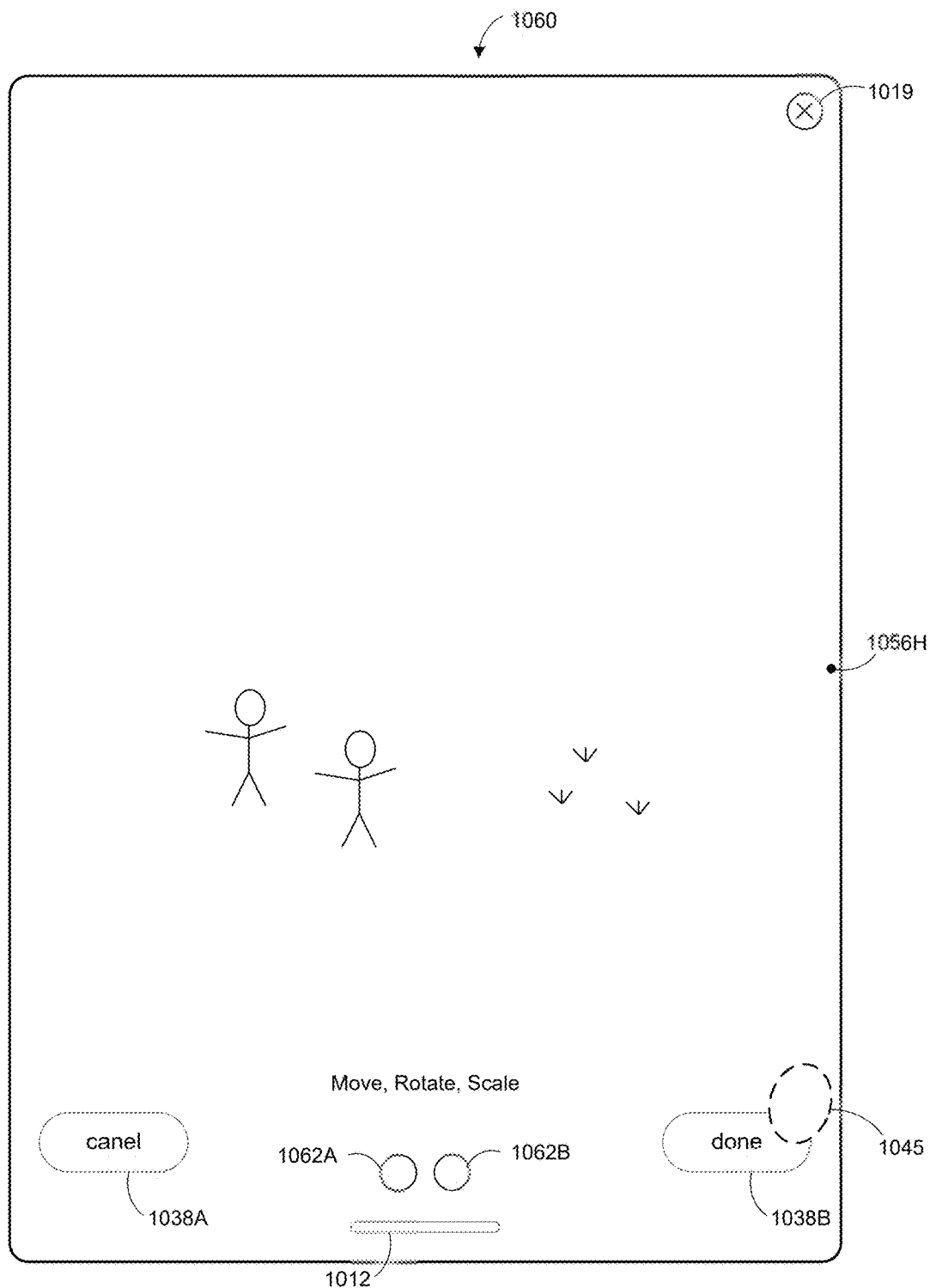
Figure 10Q:
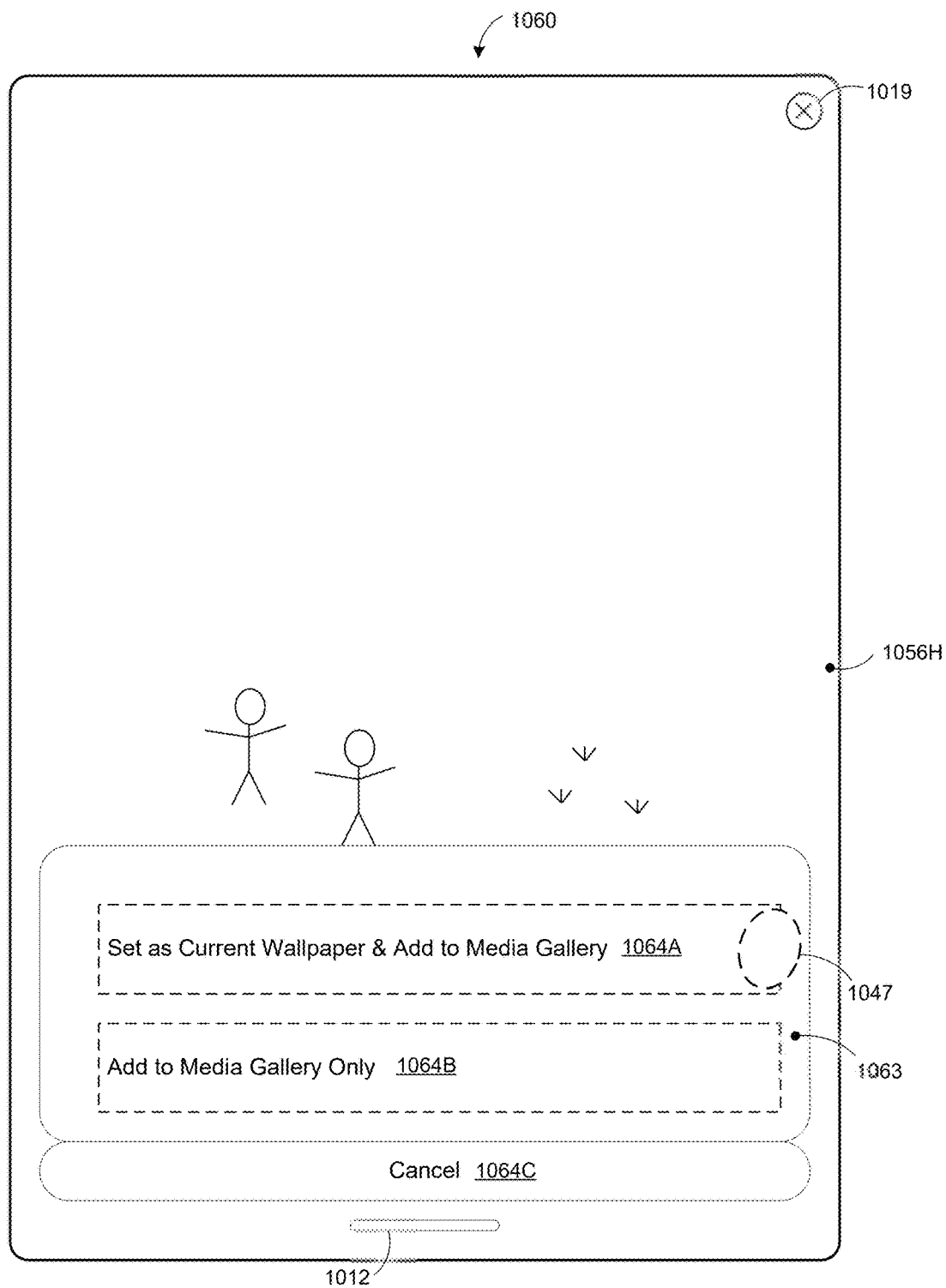
Figure 10R:
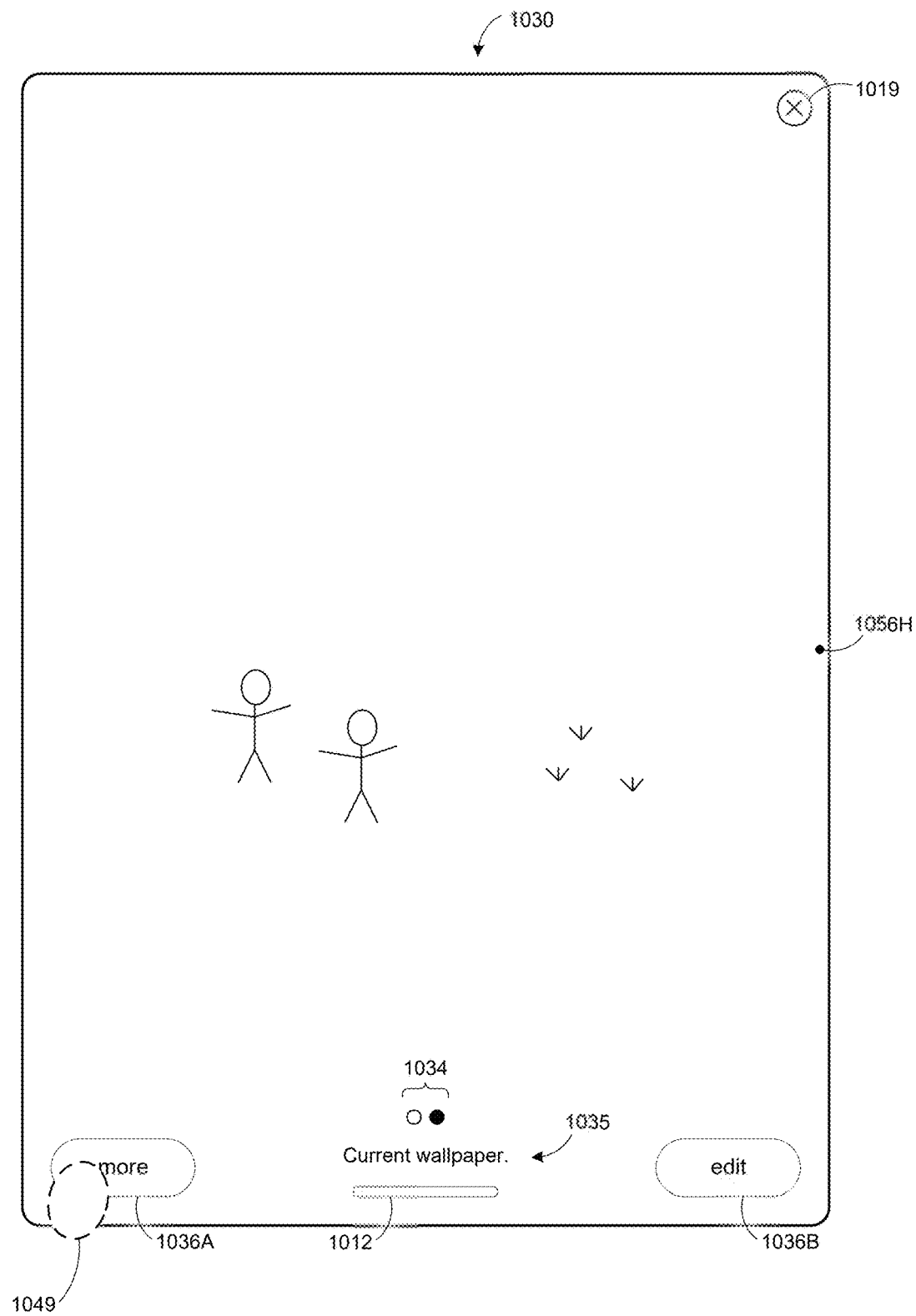
Figure 10S:
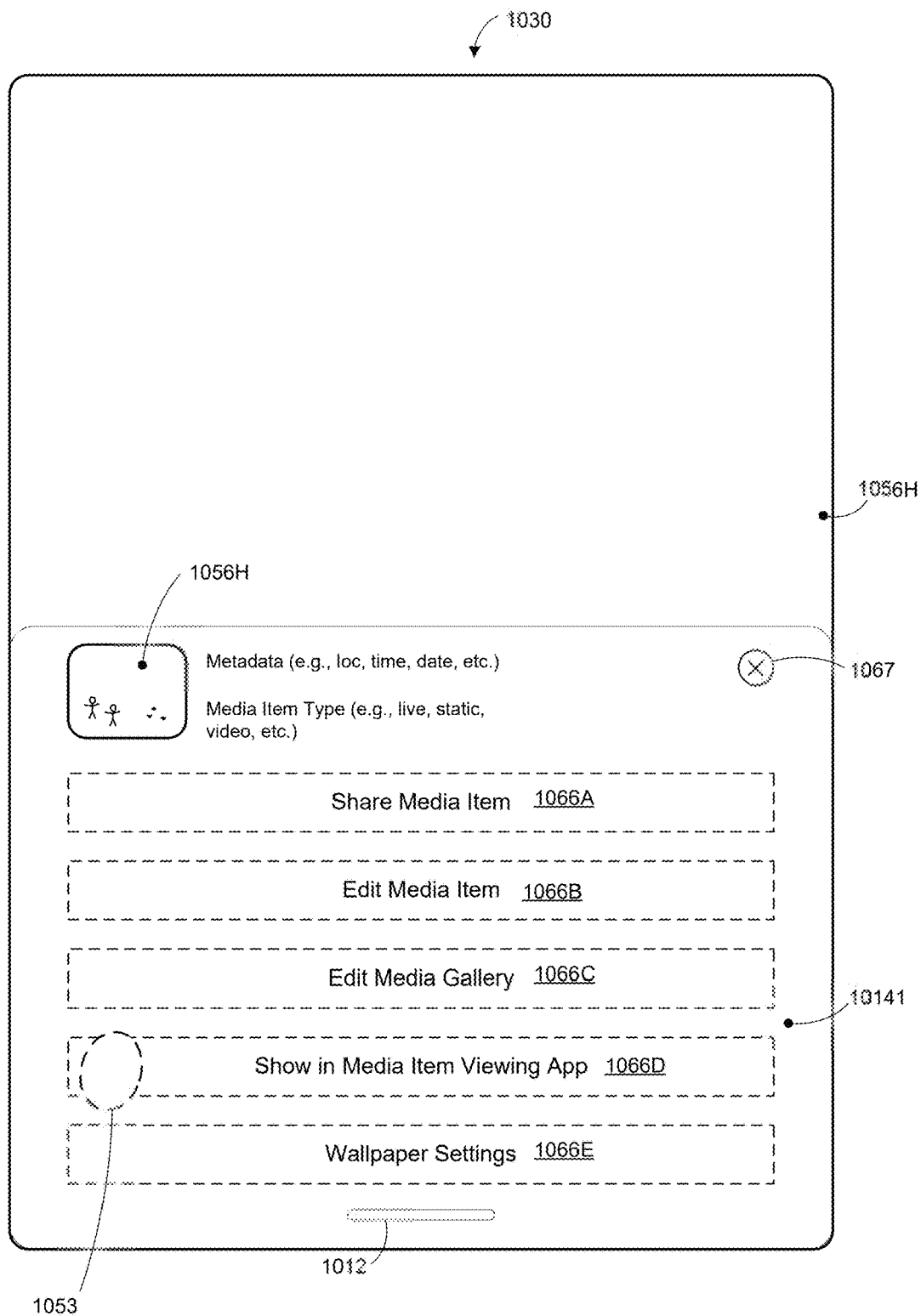
Figure 10T:
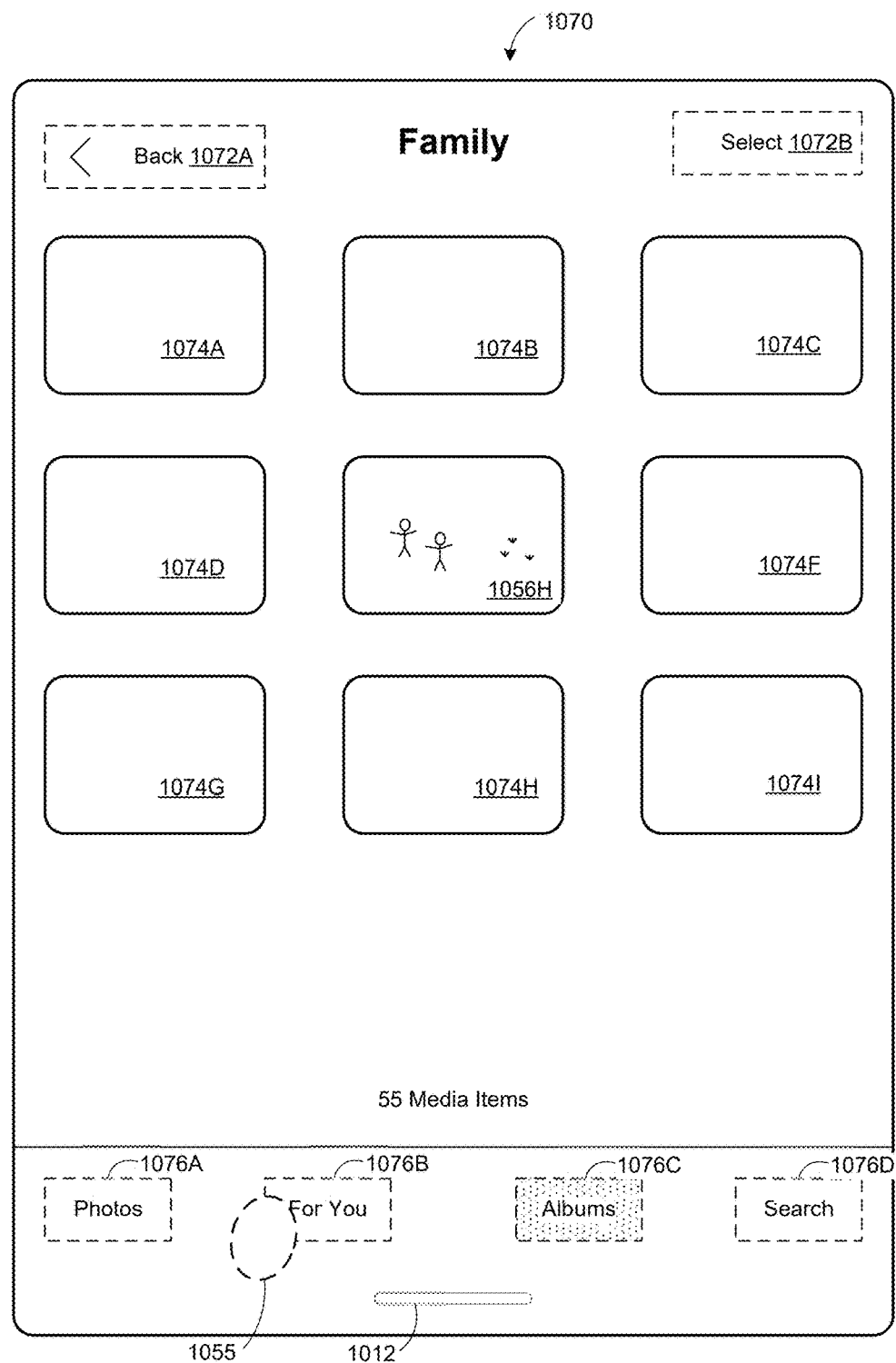
Figure 10U:
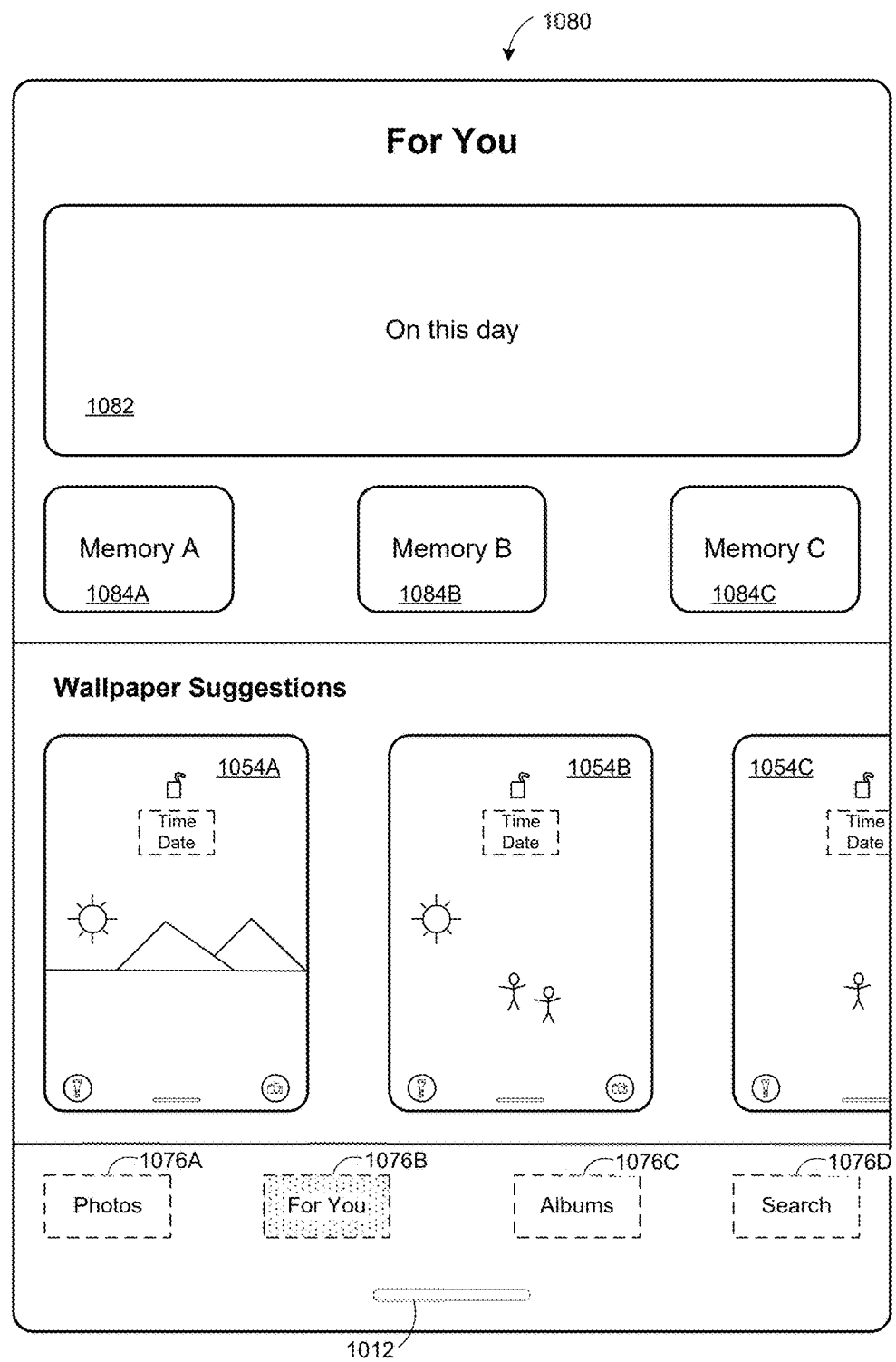

In some embodiments, the media items associated with the wallpaper suggestions 1054 correspond to images specifically selected by the OS as being good wallpaper candidates based on wallpaper criteria (or machine learning (ML) intelligence) different from criteria used to populate the "For You" tab in the media item viewing application (e.g., shown in FIG. 10U). For example, the media items associated with the wallpaper suggestions 1054 include a different set of media items as compared to the suggested media items in the media item viewing application (e.g., with one or more overlapping media items or mutually exclusive sets of media items). As another example, the media items associated with the wallpaper suggestions 1054 are the same as the suggested media items in the media item viewing application but are cropped in a different manner to suit the wake screen user interface.

As shown in FIG. 10K, the media item picker user interface 1050 also includes: a cancel affordance 1052A, which, when selected (e.g., with a single or double tap gesture), causes the computing system to replace display of the media item picker user interface 1050 with the editing user interface 1040; and an add affordance 1052B, which, when selected (e.g., with a single or double tap gesture), causes the computing system to add currently selected media items 1056 to the media gallery. As shown in FIG. 10K, the media item picker user interface 1050 further includes an indicator 1058A associated with "all photos", which is currently selected as shown by the fill within the indicator 1058A, and an indicator 1058B associated with "albums". As shown in FIG. 10K, the media item picker user interface 1050 further includes a search field 10151 that enables a user to search for media items within his/her locally and/or remotely stored media items, camera roll, and/or the like.

As shown in FIG. 10K, the computing system detects a touch input 1037 (e.g., a single or double tap gesture) at a location that corresponds to the media item 1056H within the media item picker user interface 1050. In response to detecting the touch input 1037 in FIG. 10K, the computing system displays a selection indicator 1059A overlaid on the media item 1056H as well as a text indicator 1091 provided to indicate a count of currently selected media items (e.g., one media item currently selected) in FIG. 10L.

As shown in FIG. 10L, the computing system detects a touch input 1039 (e.g., a single or double tap gesture) at a location that corresponds to the media items 1056F within the media item picker user interface 1050. In response to detecting the touch input 1039 in FIG. 10L, the computing system displays a selection indicator 1059B overlaid on the media item 1056F and also updates the text indicator 1091 (e.g., two media items currently selected) in FIG. 10M.

As shown in FIG. 10M, the computing system detects a touch input 1041 (e.g., a single or double tap gesture) at a location that corresponds to the add affordance 1052B within the media item picker user interface 1050. In response to detecting the touch input 1041 in FIG. 10M, the computing system replaces display of the media item picker user interface 1050 with the editing user interface 1040 in FIG. 10N and adds the media items 1056F and 1056H to the media gallery.

As shown in FIG. 10N, the editing user interface 1040 includes an updated indication 1028 of the current number of media items included within the media gallery as well as the maximum number of media items that the media gallery can hold (e.g., 3 media items of a possible 24 media items). As shown in FIG. 10N, the editing user interface 1040 also includes the media item 1015 as well as an indication that the media item 1015 corresponds to the current wallpaper or background for the wake screen user interface 1010, metadata associated with the media item 1015 (e.g., the location where the media item 1015 was captured, the time and date the media item 1015 was captured, and/or the like), and an indication of the media type or classification associated with the media item 1015 (e.g., live image, static image, video, slideshow, or the like).

As shown in FIG. 10N, the editing user interface 1040 also includes: the media item 1056H as well as metadata associated with the media item 1056H (e.g., the location where the media item 1056H was captured, the time and date the media item 1015 was captured, and/or the like), and an indication of the media type or classification associated with the media item 1056H (e.g., live image, static image, video, slideshow, or the like); and the media item 1056F as well as metadata associated with the media item 1056F (e.g., the location where the media item 1056F was captured, the time and date the media item 1015 was captured, and/or the like), and an indication of the media type or classification associated with the media item 1056F (e.g., live image, static image, video, slideshow, or the like). Moreover, as shown in FIG. 10N, the editing user interface 1040 further includes a first editing affordance 1029 for initiating a process for adding one or more media items to the media gallery (e.g., as shown in FIGS. 10J-10N) and second editing affordances 1021A, 1021B, and 1021C for initiating a process for removing the corresponding media items 1015, 1056H, and 1056F, respectively, from the media gallery. As shown in FIG. 10N, the editing user interface 1040 further includes reordering handles 1023A, 1023B, and 1023C for reordering the corresponding media items 1015, 1056H, and 1056F, respectively, within the media gallery.

FIGS. 10J, 10K, and 10O-10R illustrate a sequence in which a single media item is added to the media gallery in accordance with some embodiments. In response to detecting the touch input 1037 in FIG. 10K, the computing system displays a selection indicator 1059A overlaid on the media item 1056H as well as a text indicator 1091 provided to indicate a count of currently selected media items (e.g., one media item currently selected) in FIG. 10O. As shown in FIG. 10O, the computing system detects a touch input 1043 (e.g., a single or double tap gesture) at a location that corresponds to the add affordance 1052B within the media item picker user interface 1050. In response to detecting the touch input 1043 in FIG. 10O, the computing system replaces display of the media item picker user interface 1050 with the cropping user interface 1060 in FIG. 10P and adds the media item 1056H to the media gallery.

As shown in FIG. 10P, the computing system displays a cropping user interface 1060 provided to modify the media item 1056H. For example, while the computing system displays the cropping user interface 1060, the user is able to move or pan the media item 1056H, rotate the media item 1056H, scale or zoom the media item 1056H, and/or the like. The cropping user interface 1060 includes: a cancel affordance 1038A, which, when selected (e.g., with a single or double tap gesture), causes the computing system to dismiss the cropping user interface 1060 without applying changes to the media item 1056H; and a done affordance 1038B, which, when selected (e.g., with a single or double tap gesture), causes the computing system to dismiss the cropping user interface 1060 and to apply changes made by the user to the media item 1056H. In this example, the cropping user interface 1060 also includes a live/static image toggle 1062A and a perspective view toggle 1062B.

As shown in FIG. 10P, the computing system detects a touch input 1045 (e.g., a single or double tap gesture) at a location that corresponds to the done affordance 1038B within the cropping user interface 1060. In response to detecting the touch input 1045 in FIG. 10P, the computing system displays a prompt region 1063 overlaid on the cropping user interface 1060 in FIG. 10Q. For example, the prompt region 1063 slides over the cropping user interface 1060 from the bottom edge of the cropping user interface 1060.

As shown in FIG. 10Q, the prompt region 1063 includes: a first affordance 1064A, which, when selected (e.g., with a single or double tap gesture), causes the computing system to set the media item 1056H at the wallpaper or background for the wake screen user interface 1010 and to add the media item 1056H to the media gallery; a second affordance 1064B, which, when selected (e.g., with a single or double tap gesture), causes the computing system to add the media item 1056H to the media gallery (without setting the media item 1056H at the wallpaper or background for the wake screen user interface 1010); and a cancel affordance 1064C, which, when selected (e.g., with a single or double tap gesture), causes the computing system to dismiss the prompt region 1063.

As shown in FIG. 10Q, the computing system detects a touch input 1047 (e.g., a single or double tap gesture) at a location that corresponds to the first affordance 1064A within the prompt region 1063. In response to detecting the touch input 1047 in FIG. 10Q, the computing system sets the media item 1056H at the wallpaper or background for the wake screen user interface 1010 and to adds the media item 1056H to the media gallery. Furthermore, in response to detecting the touch input 1047 in FIG. 10Q, the computing system replaces display of the cropping user interface 1060 with the media gallery user interface 1030 in FIG. 10R.

As shown in FIG. 10R, the media gallery user interface 1030 includes the media item 1056H and a plurality of foreground user interface objects including: the exit affordance 1019, which, when selected (e.g., with a single or double tap gesture), causes the computing system to replace the media gallery user interface 1030 with the wake screen user interface 1010 without changing the background or wallpaper of the wake screen user interface 1010; the "more" affordance 1036A, which, when selected (e.g., with a single or double tap gesture), causes the computing system to display an operation menu overlaid on the media gallery user interface 1030 (e.g., the operation menu 10141 shown in FIG. 10S); the "edit" affordance 1036B, which, when selected (e.g., with a single or double tap gesture), causes the computing system to replace the media gallery user interface 1030 with an editing user interface for at least one of adding or removing media items from the set of one or more media items in the media gallery (e.g., the editing user interface 1040 in FIG. 10J); the plurality of pagination dots 1034 indicating the position of the media item 1056H amongst the plurality of media items in the media gallery associated with the media gallery user interface 1030; and the wallpaper indicator 1035 indicating that the media item 1056H is the current background or wallpaper for the wake screen user interface 1010.

FIGS. 10R and 10S illustrate a sequence in which the computing system displays an operation menu in accordance with some embodiments. As shown in FIG. 10R, the computing system detects a touch input 1049 (e.g., a single or double tap gesture) at a location that corresponds to the "more" affordance 1036A within the media gallery user interface 1030. In response to detecting the touch input 1049 in FIG. 10R, the computing system displays the operation menu 10141 overlaid on the media gallery user interface 1030 in FIG. 10S. For example, the operation menu 10141 slides over the media gallery user interface 1030 from the bottom edge of the media gallery user interface 1030.

As shown in FIG. 10S, the operation menu 10141 includes: an exit affordance 1067, which, when selected (e.g., with a single or double tap gesture), causes the computing system to dismiss the operation menu 10141; and a preview of the media item 1056H as well as metadata associated with the media item 1056H (e.g., the location where the media item 1056H was captured, the time and date the media item 1015 was captured, and/or the like), and an indication of the media type or classification associated with the media item 1056H (e.g., live image, static image, video, slideshow, or the like)

Figure 10V:
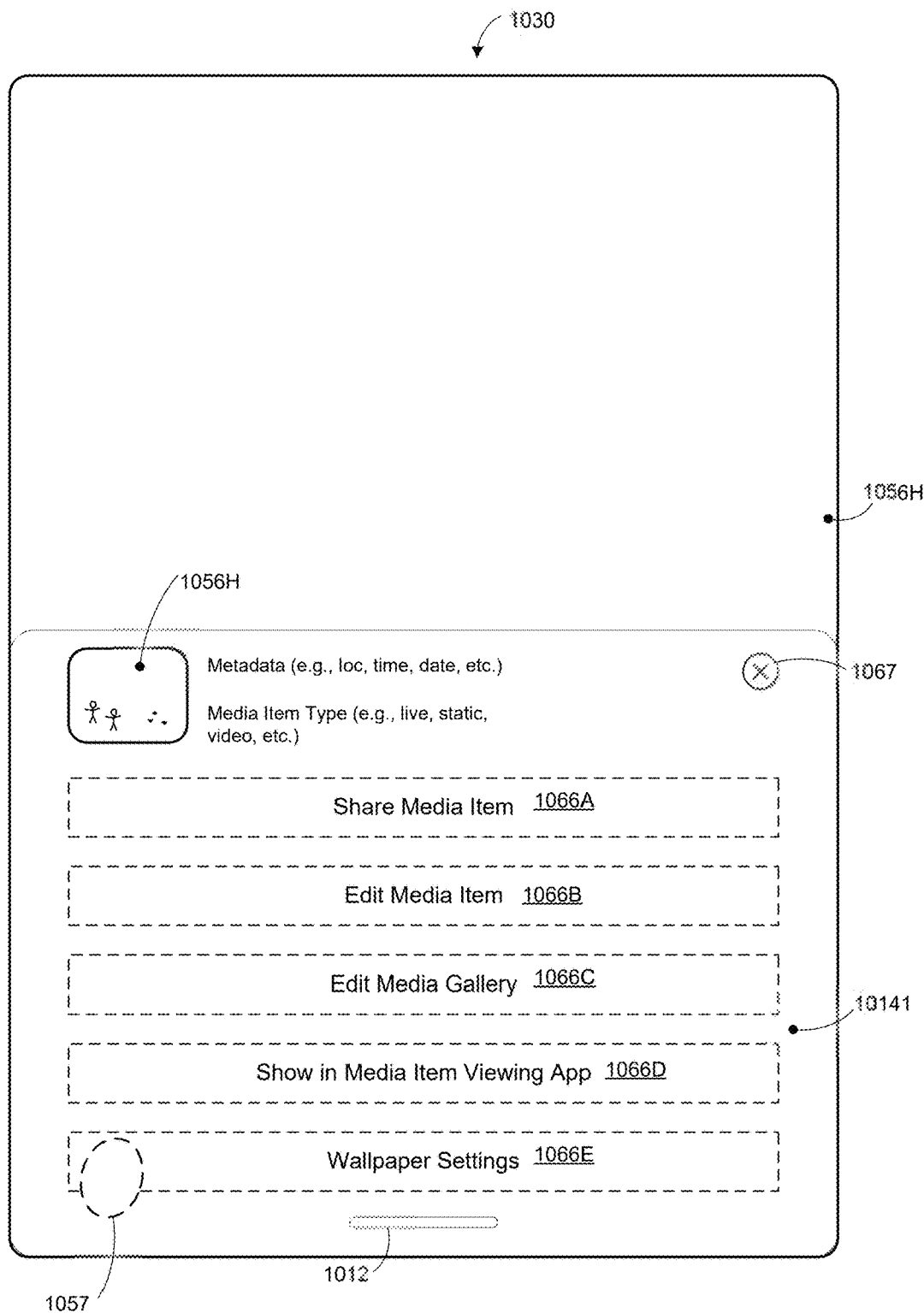

As shown in FIG. 10S, the operation menu 10141 also includes: an affordance 1066A, which, when selected (e.g., with a single or double tap gesture), causes the computing system to display a share menu including a plurality of options or modes by which to share the media item 1056H; an affordance 1066B, which, when selected (e.g., with a single or double tap gesture), causes the computing system to display the cropping user interface 1060 provided to modify the media item 1056H (e.g., as shown in FIG. 10P); an affordance 1066C, which, when selected (e.g., with a single or double tap gesture), causes the computing system to display the editing user interface 1040 provided to modify the media items included in the media gallery (e.g., as shown in FIG. 10J); an affordance 1066D, which, when selected (e.g., with a single or double tap gesture), causes the computing system to open the media item 1056H within a media item viewing application (e.g., as shown in FIG. 10T); and an affordance 1066E, which, when selected (e.g., with a single or double tap gesture), causes the computing system to display the wallpaper setting user interface 1090 (e.g., shown in FIG. 10V).

FIGS. 10S and 10T illustrate a sequence in which an affordance associated with opening the media item within the media item viewing application is selected from the operation menu in accordance with some embodiments. As shown in FIG. 10S, the computing system detects a touch input 1053 (e.g., a single or double tap gesture) at a location that corresponds to the affordance 1066D within the operation menu 10141. In response to detecting the touch input 1053 in FIG. 10S, the computing system displays the media item 1056H within the "Albums" tab 1070 of the media item viewing application in FIG. 10T. As shown in FIG. 10T, the media item 1056H is shown within the "Albums" tab 1070 of the media item viewing application along with other media items associated with the "Family" album of media items.

As shown in FIG. 10T, the "Albums" tab 1070 of the media item viewing application includes a plurality of media items 1074A, 1074B, 1074C, 1074D, 1056H, 1074F, 1074G, 1074H, and 1074I associated with the "Family" album of media items. As shown in FIG. 10T, the "Albums"

tab 1070 of the media item viewing application also includes: a back affordance 1072A, which, when selected (e.g., with a single or double tap gesture), causes the computing system to replace display of the "Albums" tab 1070 of the media item viewing application with a previous user interface (e.g., the media gallery user interface 1030 in FIG. 10R); and a select affordance 1072A provided to select media items associated with the "Family" album of media items. As shown in FIG. 10T, the "Albums" tab 1070 of the media item viewing application further includes indicators 1076A, 1076B, 1076C, and 1076D corresponding to the photos, "For You", albums, and search tabs of the media item viewing application, respectively. In FIG. 10T, the "Albums" tab 1070 of the media item viewing application is currently selected as shown by the fill within the indicator 1076C.

FIGS. 10T and 10U illustrate a sequence in which the computing system displays the "For You" tab of the media item viewing application in accordance with some embodiments. As shown in FIG. 10T, the computing system detects a touch input 1055 (e.g., a single or double tap gesture) at a location that corresponds to the indicator 1076B associated with the "For You" tab 1080 of the media item viewing application. In response to detecting the touch input 1055 in FIG. 10T, the computing system displays the "For You" tab 1080 of the media item viewing application in FIG. 10U.

As shown in FIG. 10U, the "For You" tab 1080 of the media item viewing application includes a first memory collection 1082 (e.g., associated with other media items taken on the same day over past years), and other memory collections 1084A, 1084B, and 1084C. As shown in FIG. 10U, the "For You" tab 1080 of the media item viewing application also includes the wallpaper suggestions 1054 including media items shown as the wallpaper or background for a wake screen user interface with the foreground user interface objects overlaid thereon. In some embodiments, the user is able to view additional wallpaper suggestions 1054 by scrolling rightward within the "For You" tab 1080 of the media item viewing application. In FIG. 10U, the "For You" tab 1080 of the media item viewing application is currently selected as shown by the fill within the indicator 1076B.

In some embodiments, the computing system selects the media items associated with the wallpaper suggestions 1054 from the user's camera roll (e.g., the user's repository of media content stored locally and/or remotely) based on predefined logic such as most recently viewed media items, most frequently viewed media items, content/objects within the media items that are of relevance to the user (based on semantic segmentation), metadata associated with the media items that are of relevance to the user (based on date, location, persons/animals identified within the media items, etc.), and/or the like. In some embodiments, the media items associated with the wallpaper suggestions 1054 are cropped, scaled, and/or the like such that the one or more foreground user interface objects and the time/date associated with the wake screen user interface do not occlude important features of the media items such as people, faces, landmarks, animals, and/or the like. In some embodiments, the media items associated with the wallpaper suggestions 1054 correspond to system wallpapers.

Figure 10W:
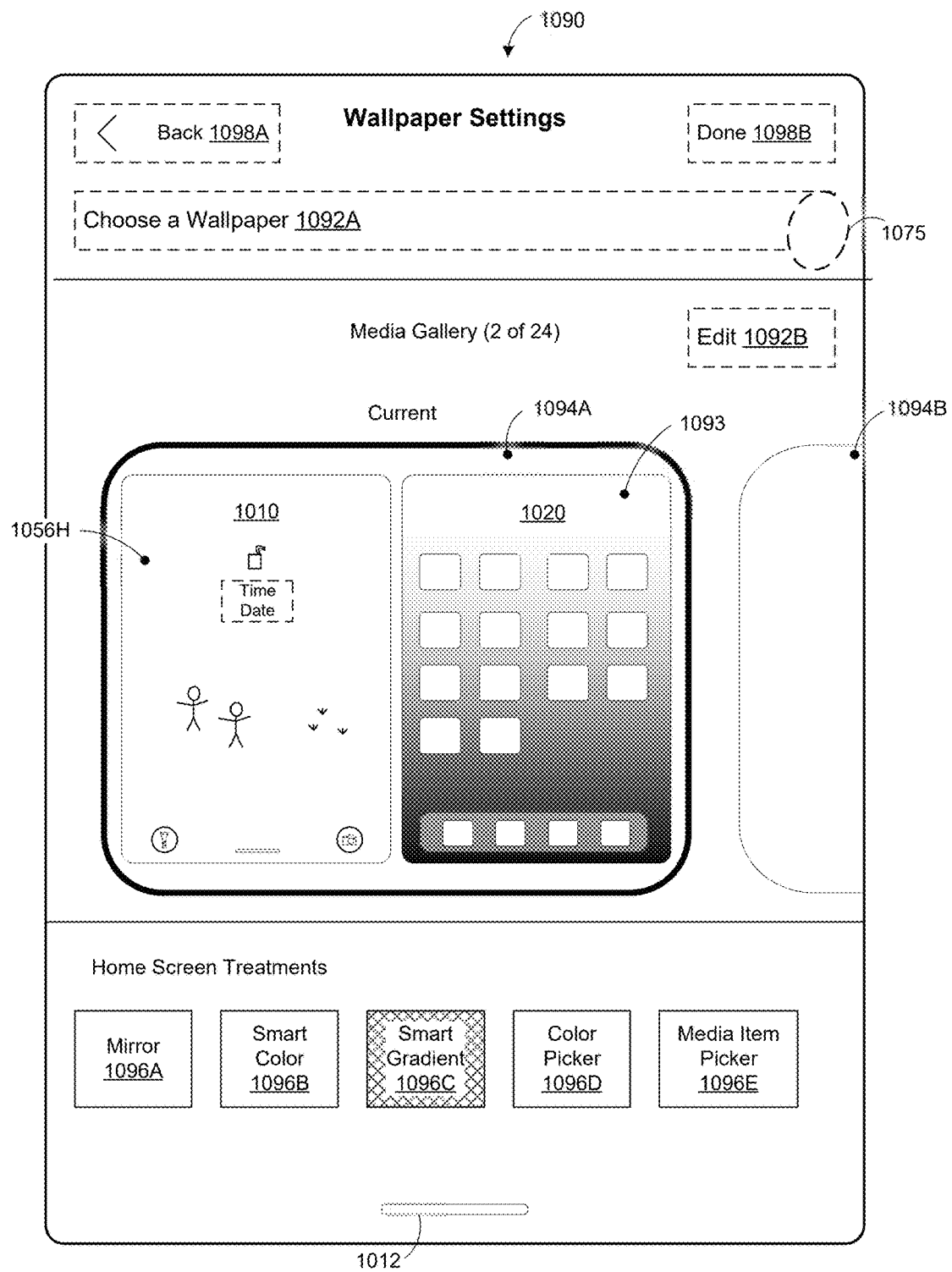

FIGS. 10V and 10W illustrate a sequence in which an affordance associated with opening the wallpaper settings user interface is selected from the operation menu in accordance with some embodiments. As shown in FIG. 10V, the computing system detects a touch input 1057 (e.g., a single or double tap gesture) at a location that corresponds to the affordance 1066E within the operation menu 10141. In response to detecting the touch input 1057 in FIG. 10V, the computing system displays the wallpaper settings user interface 1090 in FIG. 10W (e.g., similar to and adapted from the wallpaper settings user interface 605 shown in FIG. 6A).

As shown in FIG. 10W, the wallpaper settings user interface 1090 includes a plurality of wake screen user interface and home screen user interface preview pairings 1094A, 1094B, . . . (sometimes also collectively referred to herein as the "wake+home screen preview pairings 1094"). In FIG. 10W, the wake+home screen preview pairing 1094A includes the media item 1056H as the wallpaper or background for the wake screen user interface 1010 and a media item 1093 (e.g., a smart gradient generated from the media item 1056H) as the wallpaper or background for the home screen user interface 1020. In this example, the media item 1056H is the current wallpaper or background for the wake screen user interface 1010, and the home screen treatment option 1096C (e.g., the smart gradient option) is currently selected as evinced by the fill within the home screen treatment option 1096C.

According to some embodiments, the wake+home screen preview pairings 1094 correspond to media items within the media gallery user interface described above with reference to FIGS. 10D and 10E, or the like. The wallpaper settings user interface 1090 also includes selectable home screen treatment options 1096A, 1096B, 1096C, 1096D, and 1096E (sometimes also collectively referred to herein as the "home screen treatment options 1096"), which, when selected (e.g., with a single or double tap gesture), cause the computing system to update the media item displayed as the background or wallpaper for the home screen user interface 1020 within the currently-selected wake screen user interface and home screen user interface preview pairing 1094A. For example, the home screen treatment option 1096E enables the user to select an image to be used as a background for the home screen user interface that is different from the current image used as the background for the wake screen user interface (e.g., by opening the media item picker user interface 1050 shown in FIG. 10K).

For example, the media item 1093 corresponds to a smart gradient generated based on one or more visual properties of the media item 1056H corresponding to the background for the wake screen user interface 1010. In some embodiments, the one or more visual properties correspond to a dominant hue/color on a pixelwise basis throughout the media item 1056H, an average hue/color across the media item 1056H, an average brightness across the media item 1056H, an average saturation across the media item 1056H, or the like. As such, continuing with this example, the media item 1093 includes a plurality of stripes (vertical, horizontal, diagonal, etc.) associated with different shades of the dominant color within the media item 1056H. In some embodiments, a smoothing or blending operation is performed between each of the plurality of stripes.

Figure 10X:
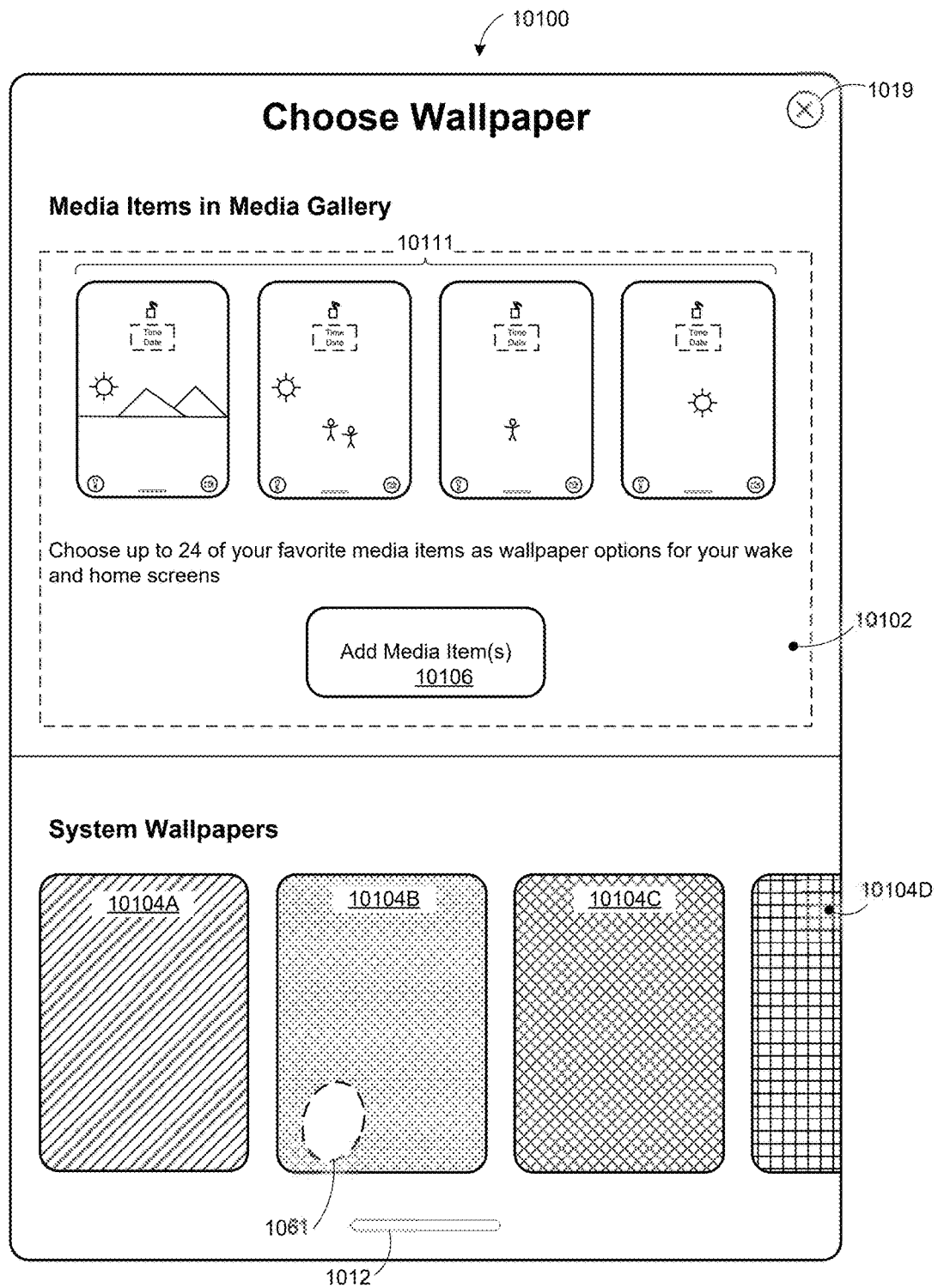

As shown in FIG. 10W, the wallpaper settings user interface 1090 also includes: a "choose a wallpaper" affordance 1092A, which, when selected (e.g., with a single or double tap gesture), causes the computing system to display the wallpaper picker user interface 10100 shown in FIG. 10X; and an edit affordance 1092B, which, when selected (e.g., with a single or double tap gesture), causes the computing system to display the editing user interface 1040 shown in FIG. 10J for modifying the media items included in the media gallery. As shown in FIG. 10W, the wallpaper settings user interface 1090 further includes: a back affordance 1098A, which, when selected (e.g., with a single or double tap gesture), causes the computing system to display a previous user interface (e.g., the media gallery user interface 1030 in FIG. 10R); and a done affordance 1098B, which, when selected (e.g., with a single or double tap gesture), causes the computing system to dismiss the wallpaper settings user interface 1090 (e.g., as shown in FIGS. 10Y and 10Z).

FIGS. 10W and 10X illustrate a sequence in which the computing system displays the wallpaper picker user interface in accordance with some embodiments. As shown in FIG. 10W, the computing system detects a touch input 1075 (e.g., a single or double tap gesture) at a location that corresponds to the "choose a wallpaper" affordance 1092A within the wallpaper settings user interface 1090. In response to detecting the touch input 1075 in FIG. 10W, the computing system displays the wallpaper picker user interface 10100 in FIG. 10X.

As shown in FIG. 10X, the wallpaper picker user interface 10100 includes: a media gallery region 10102 with a plurality of preview representations 10111 of media items from the media gallery shown as the background or wallpaper for the wake screen user interface with the foreground user interface objects overlaid thereon; and an "add media item(s)" affordance 10106, which, when selected (e.g., with a single or double tap gesture), causes the computing system to display the editing user interface 1040 shown in FIG. 10J for modifying the media items included in the media gallery. As shown in FIG. 10X, the wallpaper picker user interface 10100 also includes system wallpaper 10104A, 10104B, 10104C, and 10104D (sometimes collectively referred to herein as the "system wallpaper 10104") including media items shown as the wallpaper or background for a wake screen user interface. In some embodiments, the user is able to view additional system wallpapers 10104 by scrolling rightward within the wallpaper picker user interface 10100. As shown in FIG. 10X, the wallpaper picker user interface 10100 further includes an exit affordance 1019, which, when selected (e.g., with a single or double tap gesture), causes the computing system to replace the wallpaper picker user interface 10100 with the wallpaper settings user interface 1090 in FIG. 10W.

Figure 10Y:
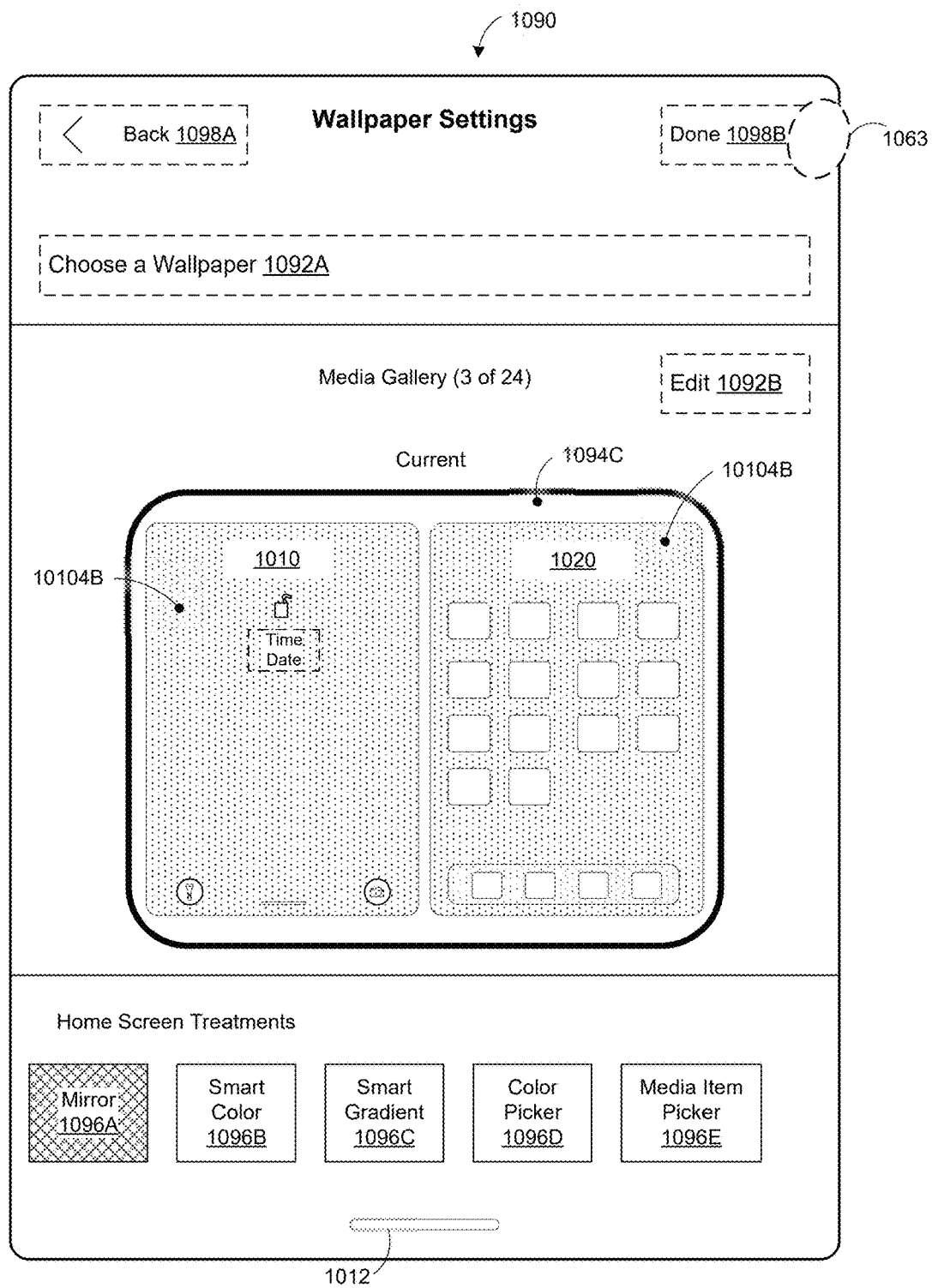
Figure 10Z:
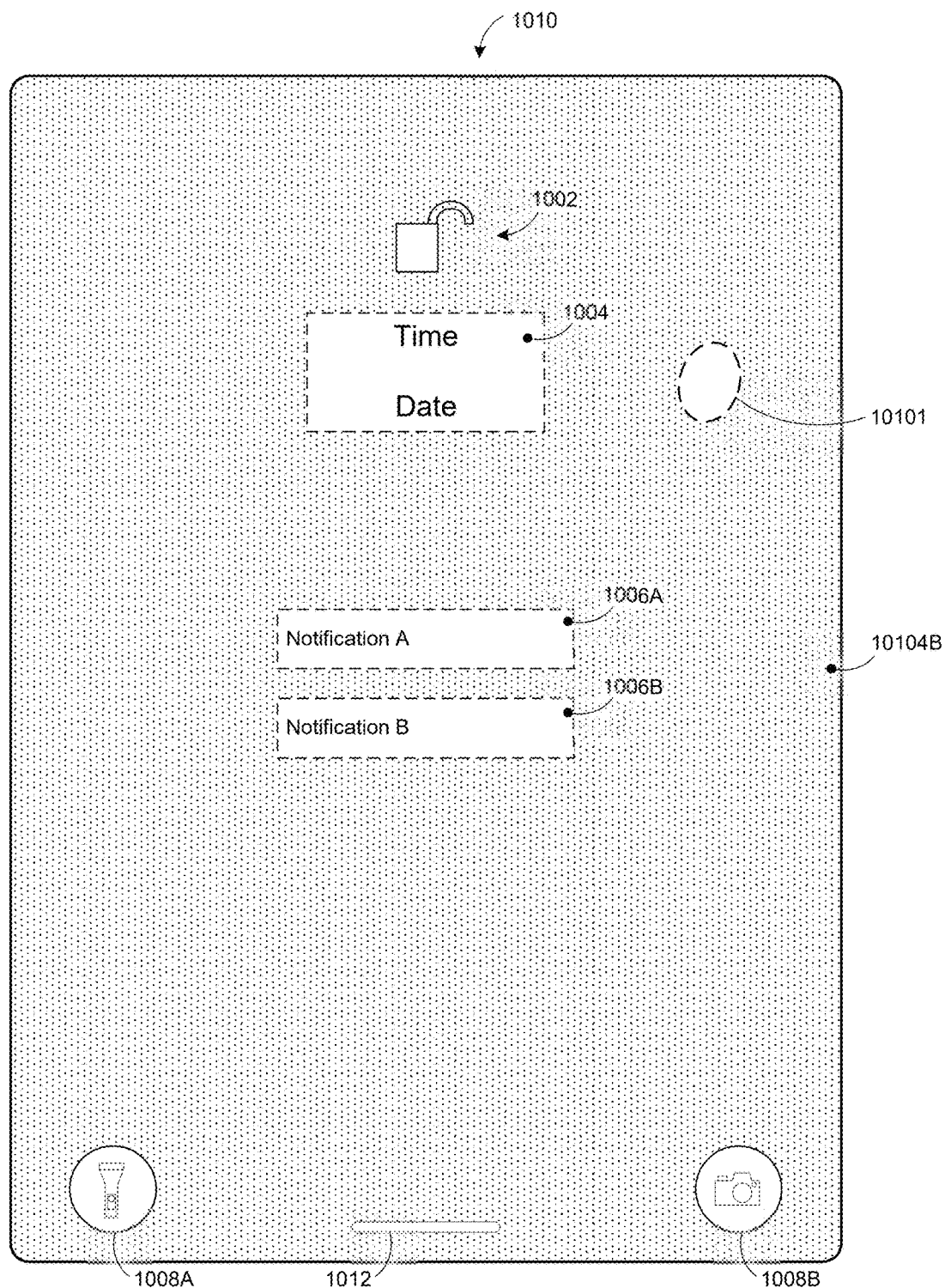
Figure 10A:
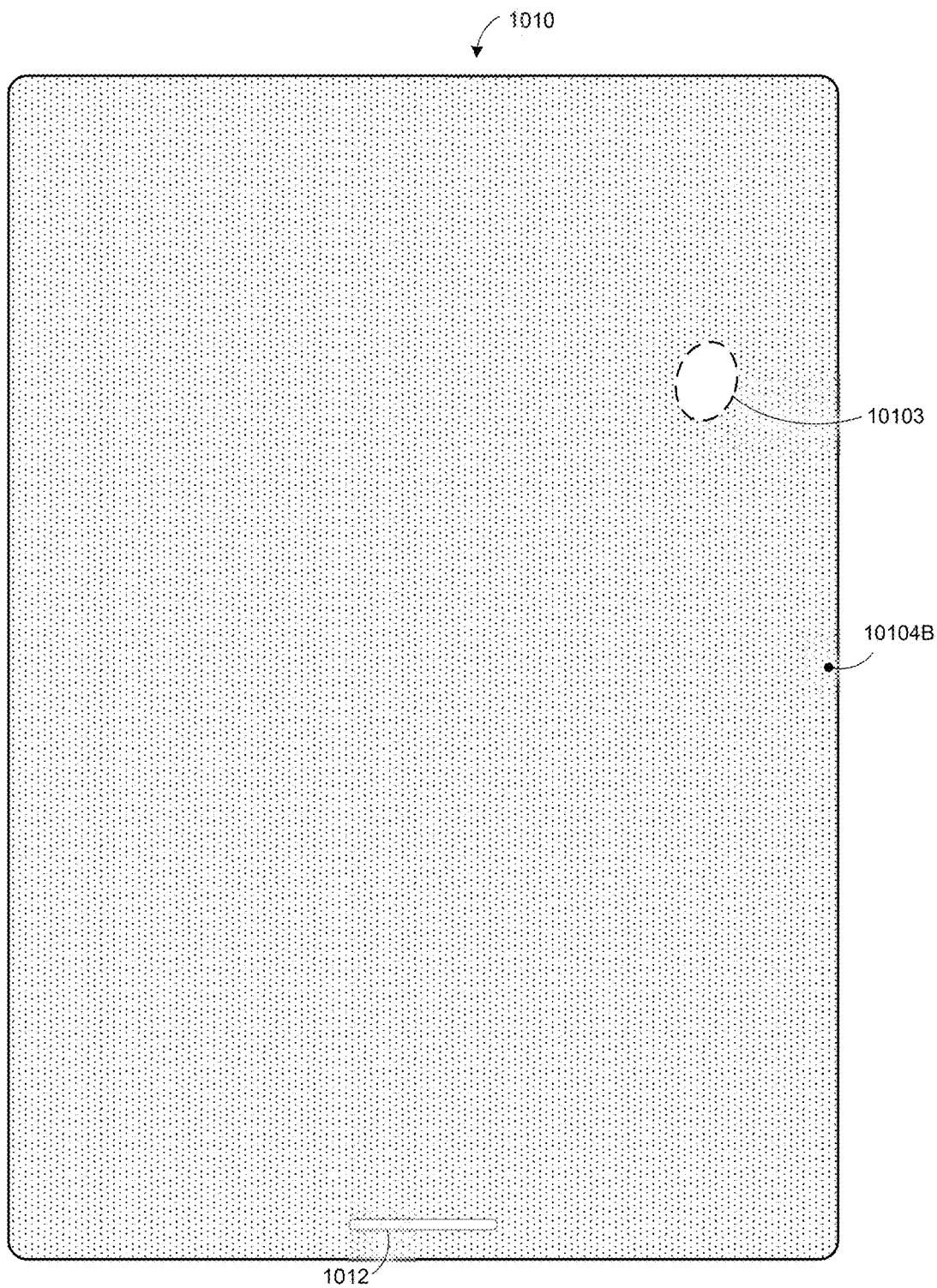
Figure 10A:
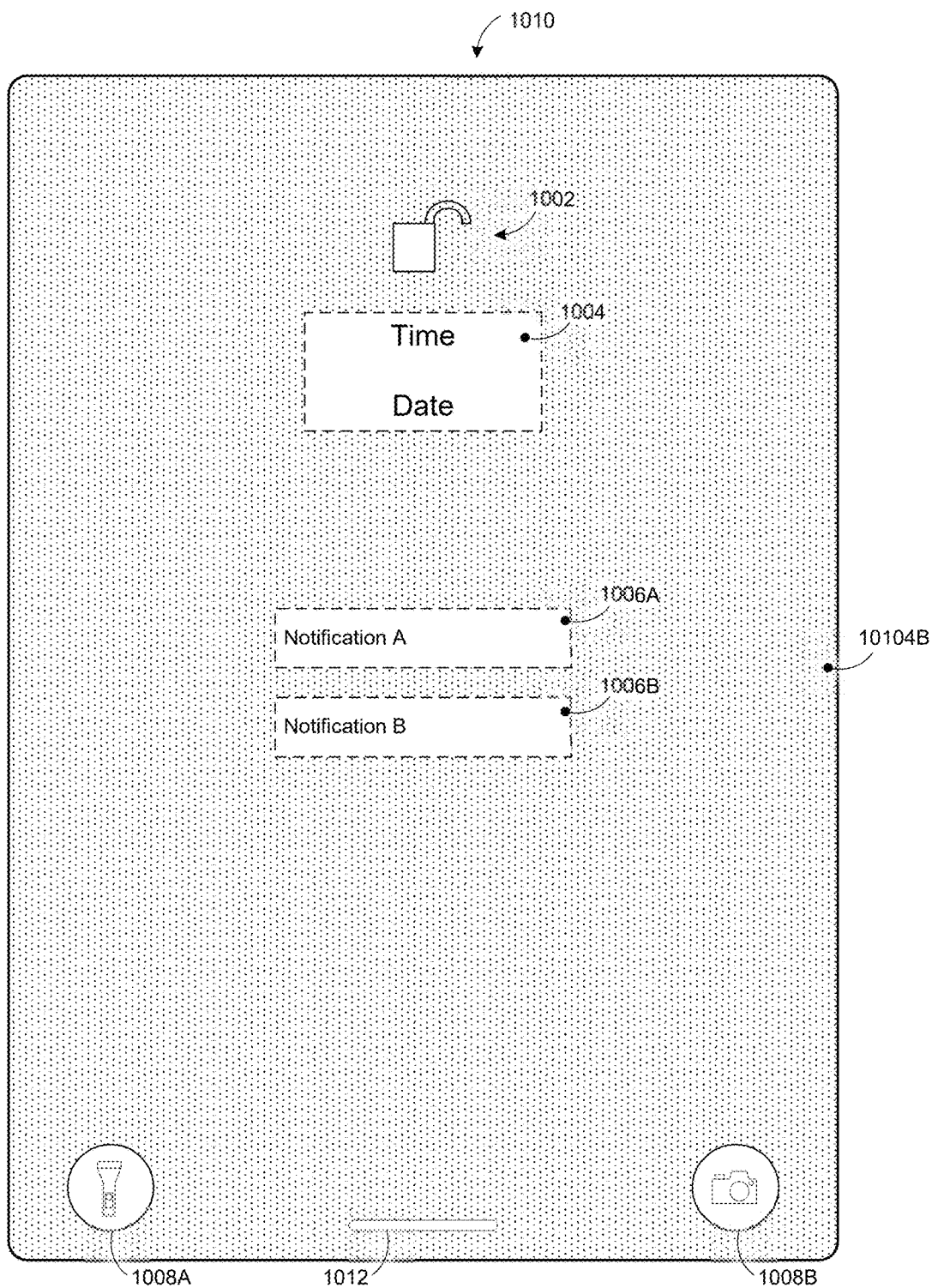
Figure 11A:
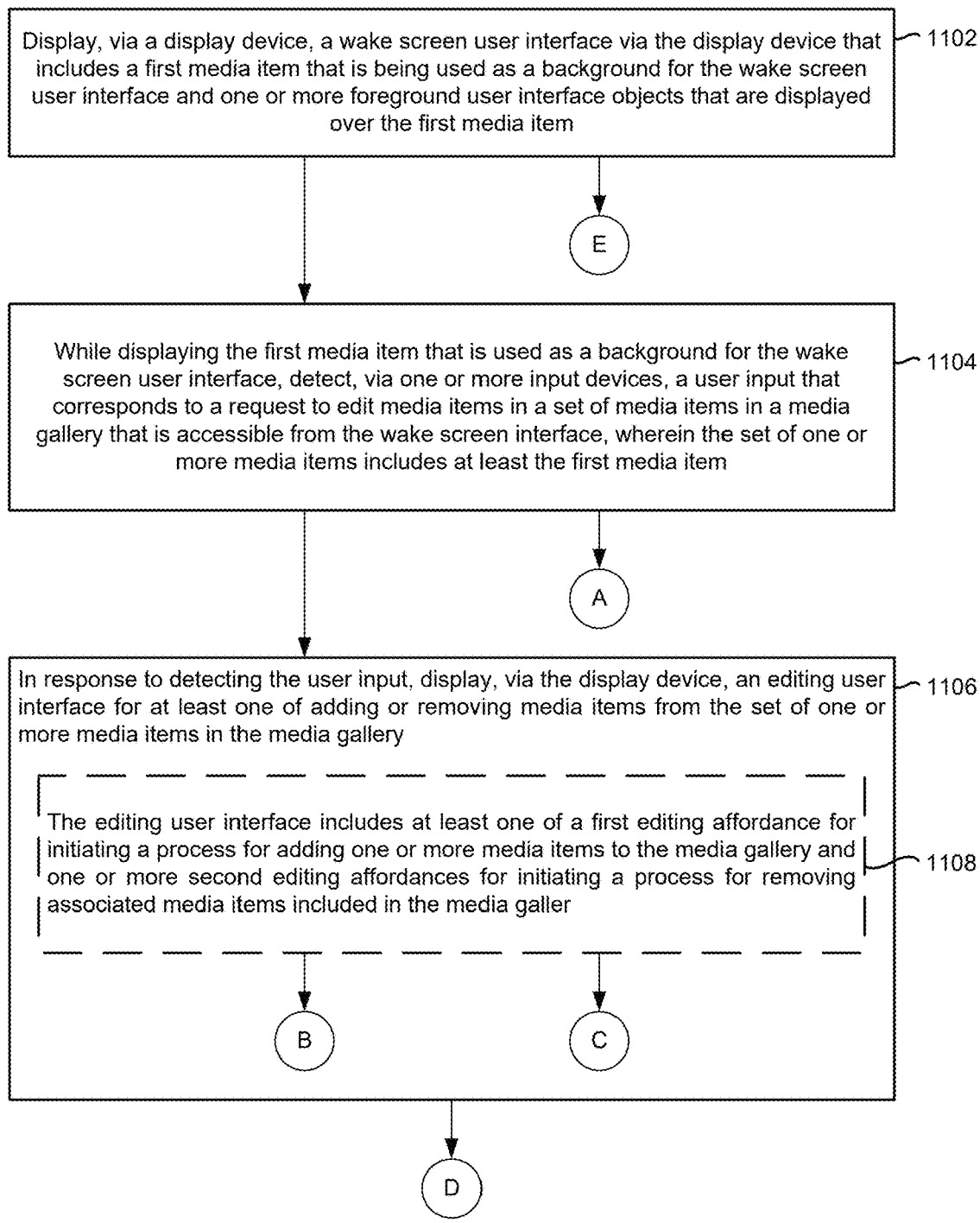
Figure 11B:
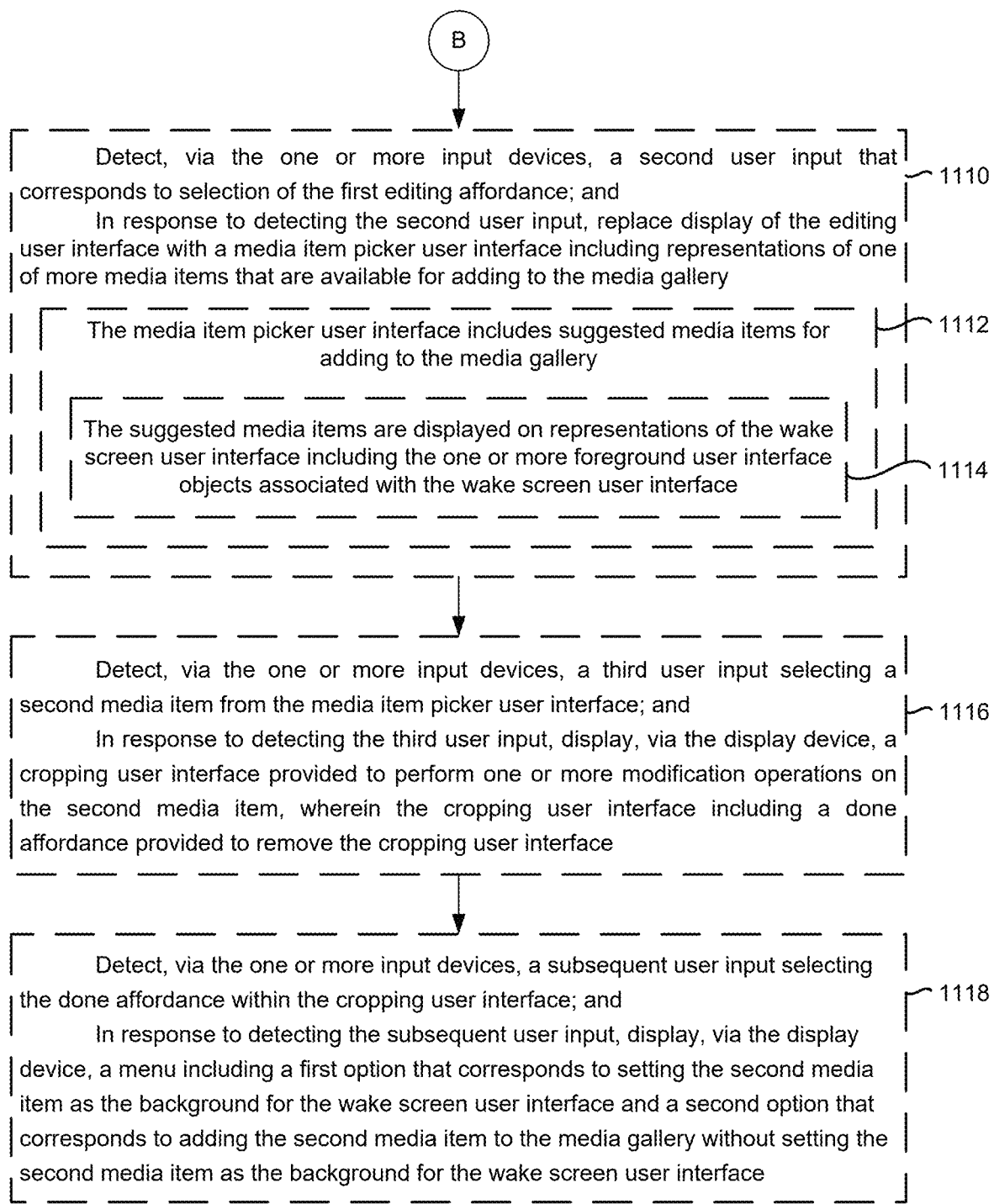
Figure 11D:
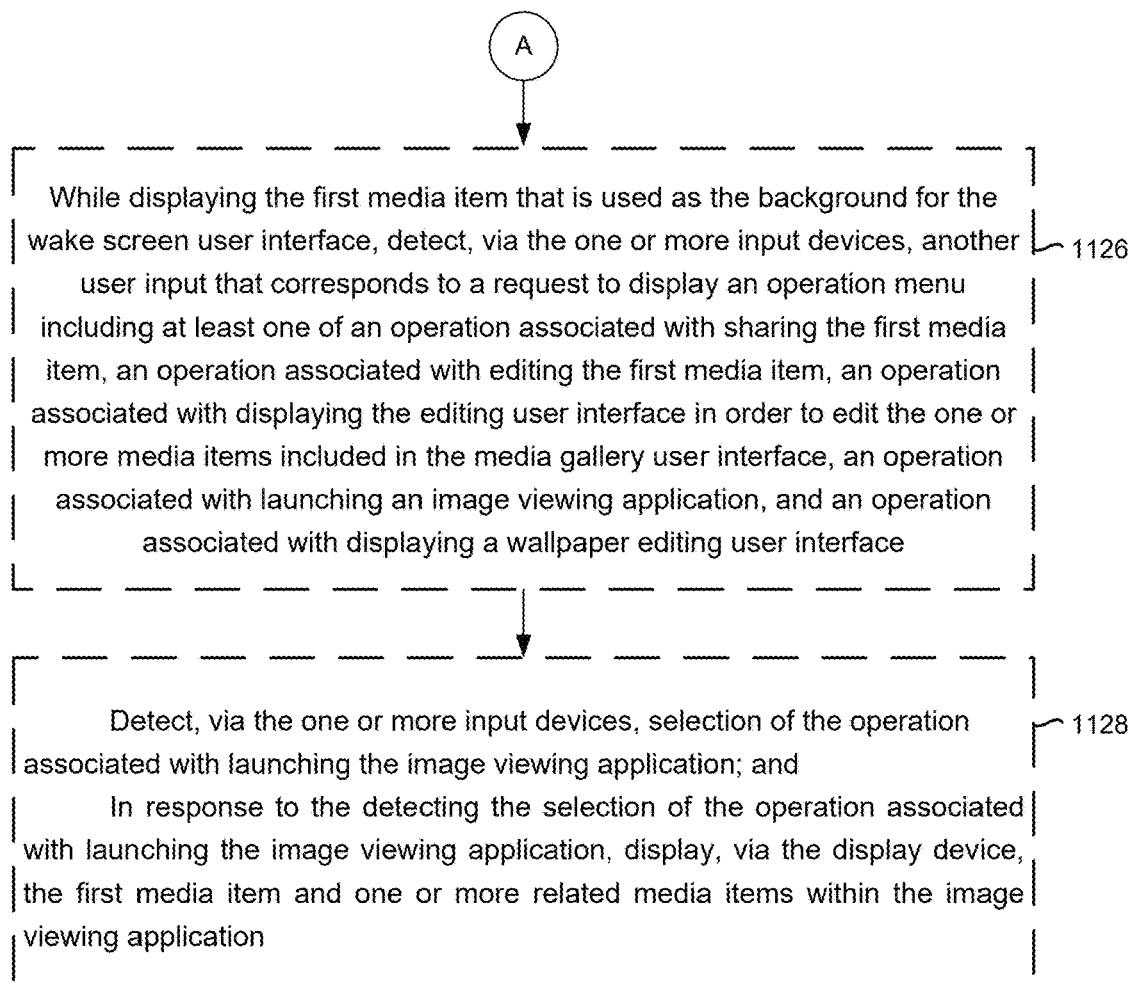
Figure 11D:
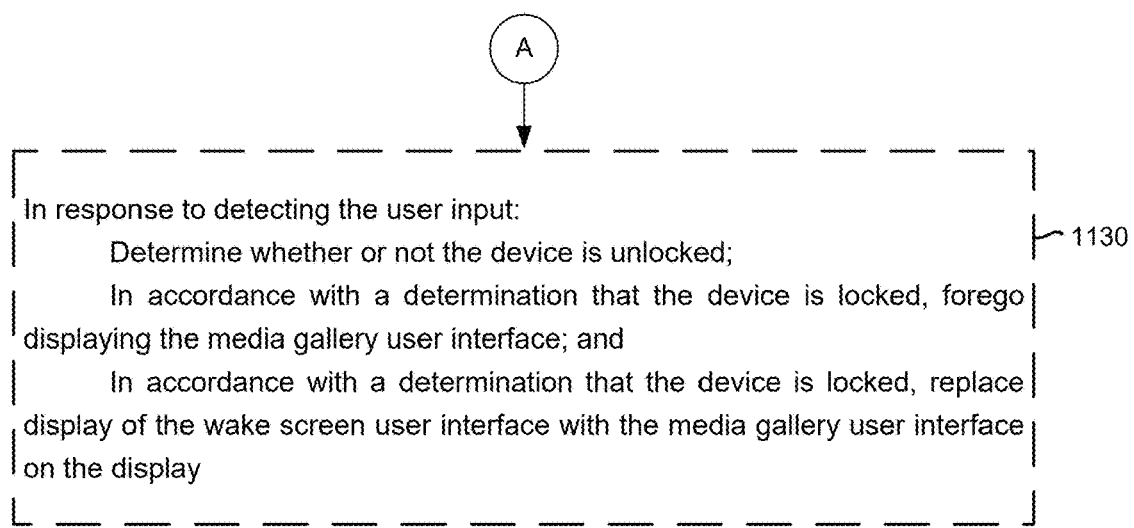
Figure 11E:
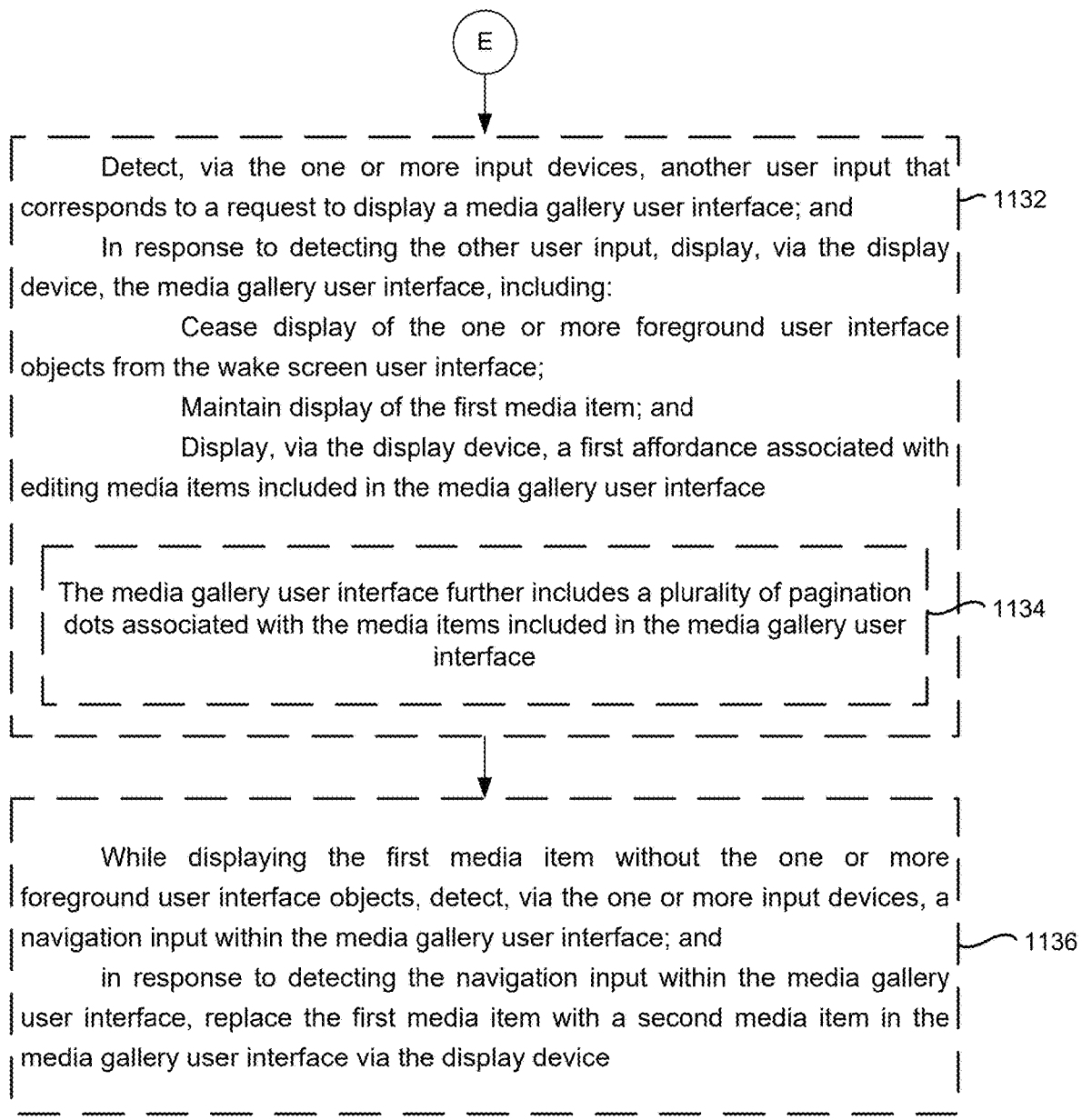

FIGS. 10X and 10Y illustrate a sequence in which a system wallpaper from the wallpaper picker user interface is selected as the new wallpaper or background for the wake screen user interface in accordance with some embodiments. As shown in FIG. 10X, the computing system detects a touch input 1061 (e.g., a single or double tap gesture) at a location that corresponds to the system wallpaper 10104B within the wallpaper picker user interface 10100. In response to detecting the touch input 1061 in FIG. 10X, the computing system displays the wallpaper settings user interface 1090 in FIG. 10Y.

As shown in FIG. 10Y, the wallpaper settings user interface 1090 includes the wake+home screen preview pairing 1094C where the system wallpaper 10104B is set as the wallpaper or background for the wake screen user interface 1010 and the system wallpaper 10104B is also the wallpaper or background for the home screen user interface 1020. In this example, the system wallpaper 10104B is the current wallpaper or background for the wake screen user interface 1010, and the home screen treatment option 1096A (e.g., the mirror option) is currently selected as evinced by the fill within the home screen treatment option 1096A.

FIGS. 10Y and 10Z illustrate a sequence in which the wake screen user interface replaces the wallpaper settings user interface in accordance with some embodiments. As shown in FIG. 10Y, the computing system detects a touch input 1063 (e.g., a single or double tap gesture) at a location that corresponds to the done affordance 1098B within the wallpaper settings user interface 1090. In response to detecting the touch input 1063 in FIG. 10Y, the computing system displays the wake screen user interface 1010 in FIG. 10Z with the system wallpaper 10104B as the wallpaper or background. In FIG. 10Z, the system wallpaper 10104B is the wallpaper or background for the wake screen user interface 1010 with the foreground user interface objects overlaid thereon.

FIGS. 10Z and 10AA illustrate a sequence in which a wake screen user interface is replaced by a media gallery user interface in response to detecting a touch input in accordance with some embodiments. As shown in FIG. 10Z, the computing system detects a touch input 10101 (e.g., a single or double tap gesture, tap and hold gesture, deep press, or the like) at a location that corresponds to the background of the wake screen user interface 1010 (e.g., a location that does not correspond to any of the foreground user interface objects within the wake screen user interface 1010). In response to detecting the touch input 10101 in FIG. 10Z, the computing system displays the media gallery user interface 1030 in FIG. 10AA. In some embodiments, the computing system enables (or allows) the transition from the wake screen user interface 1010 to the media gallery user interface 1030 while in the unlocked mode.

FIGS. 10AA and 10AB illustrate a sequence in which the one or more foreground user interface objects are redisplayed within the media gallery user interface in response to detecting a touch input in accordance with some embodiments. As shown in FIG. 10AA, the computing system detects a touch input 10103 (e.g., a single or double tap gesture, a tap and hold gesture, a deep press, or the like) at a location that corresponds to the background of the media gallery user interface 1030. In response to detecting the touch input 10103 in FIG. 10AA, the computing system redisplays the foreground user interface objects within the media gallery user interface 1030 in FIG. 10AB. According to some embodiments, while the system wallpaper 10104B is set as the wallpaper or background for the wake screen user interface 1010, the computing system disables the ability to provide navigation inputs within the media gallery user interface 1030 in order to navigate among the media items in the media gallery.

FIGS. 11A-11E illustrate a flow diagram of a method 1100 of modifying media items in a media gallery in accordance with some embodiments. The method 1100 is performed at a computing system (e.g., the portable multifunction device 100 in FIG. 1A, or the device 300 in FIG. 3) with non-transitory memory and one or more processors, wherein the computing system is communicatively coupled to a display device and one or more input devices. In some embodiments, the display device is a touch-screen display and the one or more input devices is on or integrated with the display. In some embodiments, the display device is separate from the one or more input devices. Some operations in method 1100 are, optionally, combined and/or the order of some operations is, optionally, changed.

As described below, the method 1100 provides an intuitive way to modify the media items in the media gallery. The method reduces the cognitive burden on a user when modifying the media gallery, thereby creating a more efficient human-machine interface. For battery-operated computing systems, enabling a user to modify the media items in the media gallery faster and more efficiently conserves power and increases the time between battery charges.

The computing system displays (1102), via the display device, a wake screen user interface that includes a first media item that is being used as a background for the wake screen user interface and one or more foreground user interface objects that are displayed over the first media item. As shown in FIG. 10A, for example, the computing system displays a wake screen user interface 1010 that includes a media item 1015 being used as a background or wallpaper. The wake screen user interface 1010 also includes a plurality of foreground user interface objects—an authentication indicator 1002, a time and date indicator 1004, notifications 1006A and 1006B, a flashlight affordance 1008A, an image capture affordance 1008B, and a home screen affordance 1012. For example, the one or more user interface objects correspond to time and date indicators, notifications, flashlight and camera affordance, home screen affordance, and/or the like (e.g., as shown in FIGS. 10A and 10C). For example, the first media item may be a live photo, a static photo, a video clip, a slideshow of photos, or the like.

As one example, FIGS. 10C and 10D illustrate a sequence in which a wake screen user interface 1010 is replaced by a media gallery user interface 1030 in response to detecting a touch input in accordance with some embodiments. In some embodiments, the media gallery user interface replaces the wake screen user interface in response to detecting a previous user input that corresponds to a voice command, double tap gesture, long press, deep press, or the like while displaying the wake screen user interface. In some embodiments, the media gallery user interface includes a plurality of media items in a customizable media gallery. In some embodiments, the plurality of media items is selected by the user. In some embodiments, the plurality of media items in the customizable media gallery are populated based on most frequently viewed media items in a user's camera roll, most recently added media items to the user's camera roll, and/or the like.

The media gallery user interface provides an efficient mechanism for a user to more quickly change a background or wallpaper for the wake screen user interface and/or home screen user interface, thus reducing the number and/or duration of user interactions with the device. Reducing the number and/or duration user interactions with the device reduces wear-and-tear of the device and reduces power drain, increasing battery life of the device.

While displaying the first media item that is used as a background for the wake screen user interface, the computing system detects (1104), via the one or more input devices, a user input that corresponds to a request to edit media items in a set of media items in a media gallery that is accessible from the wake screen interface, wherein the set of one or more media items includes at least the first media item. As one example, FIGS. 10I and 10J illustrate a sequence in which the media gallery user interface 1030 is replaced by an editing user interface 1040 for at least one of adding or removing media items from the set of one or more media items in the media gallery in accordance with some embodiments. In some embodiments, the computing system continues to display at least a portion of the first media item prior to detecting the input. In some embodiments, the computing system continues to display at least a portion of the first media item prior to and after detecting the input. In some embodiments, the user input corresponds to selection of the "edit" affordance within the media gallery user interface.

In response to detecting the user input, the computing system displays (1106), via the display device, an editing user interface for at least one of adding or removing media items from the set of one or more items in the media gallery. For example, as shown in FIG. 10J, the editing user interface 1040 includes an indication 1028 of the current number of media items included within the media gallery as well as the maximum number of media items that the media gallery can hold (e.g., 1 media item of a possible 24 media items).

In some embodiments, the editing user interface includes (1108) at least one of a first editing affordance for initiating a process for adding one or more media items to the media gallery and one or more second editing affordances for initiating a process for removing associated media items included in the media gallery. As one example, as shown in FIG. 10J, the editing user interface 1040 includes a first editing affordance 1029 for initiating a process for adding one or more media items to the media gallery (e.g., as shown in FIGS. 10J-10N) and a second editing affordance 1021A for initiating a process for removing the media items 1015 from the media gallery. In some embodiments, the media gallery editing user interface corresponds to a sheet that slides over the media gallery user interface. In some embodiments, the process for removing media items may be automatic or include additional confirmation steps. In some embodiments, the process for adding media items may include a media item picker user interface.

The editing user interface enables a user to quickly modify the media items within the media gallery, thus reducing the number and/or duration of user interactions with the device reduces wear-and-tear of the device. Reducing the number and/or duration of user interactions with the device reduces wear-and-tear of the device and, for battery powered devices, increases battery life of the device.

In some embodiments, the computing system (1110): detects, via the one or more input devices, a second user input that corresponds to selection of the first editing affordance; and, in response to detecting the second user input, replaces display of the editing user interface with a media item picker user interface including representations of one of more media items that are available for adding to the media gallery. As one example, FIGS. 10J and 10K illustrate a sequence in which the computing system replace the editing user interface 1040 with the media item picker user interface 1050 in response to selection of the first editing affordance 1029 within the editing user interface 1040.

In some embodiments, if a single media item is selected from the media item picker user interface, the device subsequently displays the cropping user interface (e.g., as shown in FIGS. 10J, 10K, and 10O-10R). In some embodiments, if a two or more media items are selected from the media item picker user interface, the computing system redisplays the media gallery user interface (and forgoes displaying the cropping user interface) (e.g., as shown in FIGS. 10J-10N).

In some embodiments, the media item picker user interface includes (1112) suggested media items for adding to the media gallery. For example, as shown in FIG. 10K, the media item picker user interface 1050 includes wallpaper suggestions 1054A, 1054B, and 1054C (sometimes collectively referred to herein as the "wallpaper suggestions 1054") including media items shown as the wallpaper or background for a wake screen user interface with the foreground user interface objects overlaid thereon. In some embodiments, the user is able to view additional wallpaper suggestions 1054 by scrolling rightward within the media item picker user interface 1050. As shown in FIG. 10K, the media item picker user interface 1050 also includes selectable media items 1056A, 1056B, 1056C, 1056D, 1056E, 1056F, and 1056G, 1056H (sometimes collectively referred to herein as the "media items 1056") available for adding to the media gallery. In some embodiments, the user is able to view additional selectable media items by scrolling down within the media item picker user interface 1050.

The suggested media items enable a user to quickly add high quality (e.g., pre-scaled and pre-cropped) media items to the media gallery, thus reducing the number and/or duration of user interactions with the device reduces wear-and-tear of the device. Reducing the number and/or duration of user interactions with the device reduces wear-and-tear of the device and, for battery powered devices, increases battery life of the device.

In some embodiments, the suggestions are selected by the computing system from the user's camera roll (e.g., the user's repository of media content stored locally and/or remotely) based on predefined logic such as most recently viewed media items, most frequently viewed media items, content/objects within the media items that are of relevance to the user (based on semantic segmentation), metadata associated with the media items that are of relevance to the user (based on date, location, persons/animals identified within the media items, etc.), and/or the like. In some embodiments, the suggestions are cropped, scaled, and/or the like such that the one or more foreground user interface objects and the time/date associated with the wake screen user interface do not occlude important features of the suggested media items such as people, faces, landmarks, animals, and/or the like. In some embodiments, the suggestions correspond to system wallpapers.

In some embodiments, the suggestions include images specifically selected by the computing system (or the OS associated therewith) as being good wallpaper candidates based on wallpaper criteria (or ML intelligence) different from criteria used to populate the "For You" tab in the image viewing application (e.g., shown in FIG. 10U). For example, the suggestions include a different set of media items as compared to the suggested media items in the image viewing application (e.g., with one or more overlapping media items or mutually exclusive sets of media items). As another example, the suggestions are the same as the suggested media items in the image viewing application but are cropped in a different manner to suit the wake screen user interface.

In some embodiments, the suggested media items are displayed (1114) on representations of the wake screen user interface including the one or more foreground user interface objects associated with the wake screen user interface. For example, as shown in FIG. 10K, the media item picker user interface 1050 includes the wallpaper suggestions 1054 with various media items shown as the wallpaper or background for a wake screen user interface with the foreground user interface objects overlaid thereon. In some embodiments, the representations are cropped/displayed according to an aspect ratio of the display device. In some embodiments, the representations include a date and time (may be the current date and time).

In some embodiments, the computing system (1116): detects, via the one or more input devices, a third user input selecting a second media item from the media item picker user interface; and, in response to detecting the third user input, displays, via the display device, a cropping user interface provided to perform one or more modification operations on the second media item, wherein the cropping user interface includes a done affordance provided to remove the cropping user interface. For example, as shown in FIG. 10P, the computing system displays a cropping user interface 1060 provided to modify the media item 1056H. For example, the one or more modification operations correspond to rotating, moving/panning, and zooming/scaling the media item—crop based on a portion of the media item visible via the display device. In some embodiments, the cropping user interface includes a live/static toggle and a perspective view affordance.

In some embodiments, the computing system (1118): detects, via the one or more input devices, a subsequent user input selecting the done affordance within the cropping user interface; and, in response to detecting the subsequent user input, displays, via the display device, a menu including a first option that corresponds to setting the second media item as the background for the wake screen user interface and a second option that corresponds to adding the second media item to the media gallery without setting the second media item as the background for the wake screen user interface. For example, as shown in FIG. 10Q, the computing system displays a prompt region 1063 overlaid on the cropping user interface 1060 that includes: a first affordance 1064A, which, when selected (e.g., with a single or double tap gesture), causes the computing system to set the media item 1056H at the wallpaper or background for the wake screen user interface 1010 and to add the media item 1056H to the media gallery; a second affordance 1064B, which, when selected (e.g., with a single or double tap gesture), causes the computing system to add the media item 1056H to the media gallery; and a cancel affordance 1064C, which, when selected (e.g., with a single or double tap gesture), causes the computing system to dismiss the prompt region 1063. For example, the menu corresponds to a pop-over menu, a slide-over sheet, or the like. In some embodiments, the first and second options are selected via separate affordances or radio buttons. In some embodiments, the first and second options are associated with a single toggle.

In some embodiments, the computing system (1120): detects, via the one or more input devices, a subsequent user input that corresponds to selection of a respective second editing affordance among the one or more second editing affordances; and, in response to detecting the subsequent user input, initiates the process for removing a media item that corresponds to the respective second editing affordance from the media gallery. For example, as shown in FIG. 10J, the editing user interface 1040 includes a second editing affordance 1021A for initiating a process for removing the media items 1015 from the media gallery. In some embodiments, each of the existing media items includes a removal button and other metadata/information for the associated media item such as static/live, location, date/time, and/or the like.

In some embodiments, the computing system (1122): detects, via the one or more input devices, one or more other user inputs selecting one or more media items from the media item picker user interface; in accordance with a determination that a number of media items selected by the one or more other user inputs does not exceed a media item limit associated with the media gallery, adds the one or more media items to the media gallery; and, in accordance with a determination that the number of media items selected by the one or more other user inputs does exceed the media item limit associated with the media gallery, forgoes adding the one or more media items to the media gallery and displaying, via the display device, a notification that the media gallery has reached the media item limit. In some embodiments, the notification may be paired with audible and/or haptic feedback.

In some embodiments, the computing system (1124): detects, via the one or more input devices, another user input that corresponds to selecting a respective user interface object from the one or more foreground user interface objects within the wake screen user interface; and, in response to detecting the other user input, performs an operation that corresponds to the respective user interface object without displaying the media gallery user interface. For example, the computing device activates the flashlight in response to detecting selection of a flashlight affordance (e.g., the flashlight affordance 1008A within the wake screen user interface 1010 in FIG. 10A), enters an image capture mode for a camera in response to detecting selection of a camera affordance (e.g., the image capture affordance 1008B within the wake screen user interface 1010 in FIG. 10A), views notification(s) in response to selection of representation(s) thereof (e.g., the notifications 1006A and 1006B within the wake screen user interface 1010 in FIG. 10A), dismisses a notification, displays an application user interface corresponding to a detecting selection of a notification, replaces the wake screen user interface with the home screen user interface in response to selection of a home screen affordance (e.g., the home screen affordance 1012 within the wake screen user interface 1010 in FIG. 10A), or the like.

In some embodiments, while displaying the first media item that is used as the background for the wake screen user interface, the computing system detects (1126), via the one or more input devices, another user input that corresponds to a request to display an operation menu including at least one of an operation associated with sharing the first media item, an operation associated with editing the first media item, an operation associated with displaying the editing user interface in order to edit the one or more media items included in the media gallery, an operation associated with launching an image viewing application (e.g., with the first media item opened and optionally any related photos within the same event, day, location, etc. to move thereto), and an operation associated with displaying a wallpaper editing user interface. For example, FIGS. 10R and 10S illustrate a sequence in which the computing system displays an operation menu 10141 in accordance with some embodiments.

As shown in FIG. 10S, the operation menu 10141 also includes: an affordance 1066A, which, when selected (e.g., with a single or double tap gesture), causes the computing system to display a share menu including a plurality of options or modes by which to share the media item 1056H; an affordance 1066B, which, when selected (e.g., with a single or double tap gesture), causes the computing system to display the cropping user interface 1060 provided to modify the media item 1056H (e.g., as shown in FIG. 10P); an affordance 1066C, which, when selected (e.g., with a single or double tap gesture), causes the computing system to display the editing user interface 1040 provided to modify the media items included in the media gallery (e.g., as shown in FIG. 10J); an affordance 1066D, which, when selected (e.g., with a single or double tap gesture), causes the computing system to open the media item 1056H within a media item viewing application (e.g., as shown in FIG. 10T); and an affordance 1066E, which, when selected (e.g., with a single or double tap gesture), causes the computing system to display the wallpaper setting user interface 1090 (e.g., shown in FIG. 10V).

In some embodiments, the other input corresponds to selection of the "more" affordance with the media gallery user interface (e.g., as shown in FIG. 10R). In some embodiments, the operation menu at least includes one of a share photo(s) affordance, an edit wallpaper affordance, an edit media gallery affordance, a show in photos affordance, and a wallpaper settings affordance. In some embodiments, in response to detecting selection of the share photos affordance, the computing system displays a share sheet with different options for sharing the first media item such as one or more social media platforms, email, SMS, etc. In some embodiments, in response to detecting selection of the edit wallpaper affordance, the computing system displays a media item editing user interface for cropping the first media item and other similar operations (e.g., the cropping user interface 1060 in FIG. 10P). In some embodiments, in response to detecting selection of the media gallery affordance, the computing system displays the media gallery editing user interface for at least one of adding or subtracting media items included in the media gallery user interface (e.g., the editing user interface 1040 in FIG. 10J). In some embodiments, in response to detecting selection of the show in photos affordance, the computing system launches a photos application and shows the first media item within the photos application interface (e.g., the "Albums" tab 1070 of the media item viewing application in FIG. 10T). In some embodiments, in response to detecting selection of the wallpaper settings affordance, the computing system displays a wallpaper setting user interface (e.g., the wallpaper setting user interface 605 in FIG. 6A or the wallpaper setting user interface 1090 in FIG. 10W).

In some embodiments, the computing system (1128): detects, via the one or more input devices, selection of the operation associated with launching the image viewing application; and, in response to the detecting the selection of the operation associated with launching the image viewing application, displays, via the display device, the first media item and one or more related media items within the image viewing application. For example, FIGS. 10S and 10T illustrate a sequence in which an affordance 1066D associated with opening the media item within the media item viewing application is selected from the operation menu 10141 in accordance with some embodiments. As shown in FIG. 10T, the media item 1056H is shown with the "Albums" tab 1070 of the media item viewing application along with other media items associated with the "Family" album of media items.

In some embodiments, in response to detecting the user input, the computing system (1130): determines whether or not the computing system is unlocked; in accordance with a determination that the computing system is locked, foregoes displaying a media gallery user interface; and, in accordance with a determination that the computing system is unlocked, replaces display of the wake screen user interface with the media gallery user interface on the display device. As one example, the computing system is unlocked by authenticating the user's biometric information. As another example, the computing system is unlocked by authenticating the user's passcode. In some embodiments, the method 1100 optionally also includes maintaining display of the wake screen user interface via the display device.

Limiting the transition from the wake screen user interface to the media gallery user interface to the unlocked mode provides the user with a sense of security while reducing accidental inputs and also reducing the number and/or duration of user interactions with the device. Reducing the number and/or duration user interactions with the device reduces wear-and-tear of the device and reduces power drain, increasing battery life of the device.

In some embodiments, the computing system (1132): detects, via the one or more input devices, another user input that corresponds to a request to display a media gallery user interface; and, in response to detecting the other user input, displays, via the display device, the media gallery user interface, including: ceasing display of the one or more foreground user interface objects from the wake screen user interface; maintaining display of the first media item; and displaying, via the display device, a first affordance (e.g., the edit affordance with the media gallery user interface) associated with editing media items included in the media gallery user interface. For example, FIGS. 10C and 10D illustrate a sequence in which a wake screen user interface 1010 is replaced by a media gallery user interface 1030 in response to detecting a touch input in accordance with some embodiments.

As shown in FIG. 10D, the media gallery user interface 1030 includes: a "more" affordance 1036A, which, when selected (e.g., with a single or double tap gesture), causes the computing system to display an operation menu overlaid on the media gallery user interface 1030 (e.g., the operation menu 10141 shown in FIG. 10S); and an "edit" affordance 1036B, which, when selected (e.g., with a single or double tap gesture), causes the computing system to replace the media gallery user interface 1030 with an editing user interface for at least one of adding or removing media items from the set of one or more media items in the media gallery (e.g., the editing user interface 1040 in FIG. 10J). In some embodiments, the computing device also displays an indication that the first media item corresponds to the current wake screen wallpaper (e.g., the wallpaper indicator 1035 in FIG. 10D).

Accessing a media gallery user interface from the wake screen user interface provides an efficient mechanism for a user to more quickly change a background or wallpaper for the wake screen user interface and/or home screen user interface, thus reducing the number and/or duration of user interactions with the device. Reducing the number and/or duration user interactions with the device reduces wear-and-tear of the device and reduces power drain, increasing battery life of the device.

In some embodiments, the media gallery user interface further includes (1134) a plurality of pagination dots associated with the media items included in the media gallery user interface. For example, as shown in FIG. 10D, the media gallery user interface 1030 includes a plurality of pagination dots 1034 indicating a position of the media item 1015 amongst a plurality of media items in a media gallery associated with the media gallery user interface 1030. In some embodiments, the pagination dots 1034 function as a scrubber bar. In some embodiments, the computing system skips to the beginning of the media items included in the media gallery user interface in response to detecting a tap gesture (or the like) directed to a left-most pagination dot (or a region adjacent thereto). In some embodiments, the computing system skips to the end of the media items included in the media gallery user interface in response to detecting a tap gesture (or the like) directed to a right-most pagination dot (or a region adjacent thereto).

In some embodiments, the computing system (1136): while displaying the first media item without the one or more foreground user interface objects, detects, via the one or more input devices, a navigation input (e.g., a substantially horizontal swipe gesture, a voice command, a tap gesture detected adjacent an edge of the display, or the like) within the media gallery user interface; and, in response to detecting the navigation input within the media gallery user interface, replaces the first media item with a second media item in the media gallery user interface via the display device. For example, FIGS. 10D and 10E illustrate a sequence in which a first media item 1015 is replaced by a second media item 1025 within the media gallery user interface 1030 in response to detecting a navigation gesture 1007 in accordance with some embodiments.

The media gallery user interface provides an efficient mechanism for a user to more quickly change a background or wallpaper for the wake screen user interface and/or home screen user interface, thus reducing the number and/or duration of user interactions with the device. Reducing the number and/or duration user interactions with the device reduces wear-and-tear of the device and reduces power drain, increasing battery life of the device.

In some embodiments, if the media gallery user interface is empty and the next item input is detected, the computing system maintains the first media item and optionally displays a notification/prompt to add media items to the media gallery user interface. In some embodiments, if the media gallery user interface only includes the first media item and the next item input is detected, the computing system maintains the first media item and optionally display a notification/prompt to add more media items to the media gallery user interface (e.g., the prompt 1071 shown in FIG. 10I).

In some embodiments, if the first media item corresponds to a system wallpaper and the swipe gesture is detected, the computing system maintains the first media item (e.g., as shown in FIGS. 10Z-10AB). In some embodiments, after replacing the first media item with the second media item, the media gallery user interface includes an affordance to set the second media item as the wake screen wallpaper. In some embodiments, this also causes the home screen wallpaper to be updated. In some embodiments, the background for the home screen user interface is based on the media item from the media gallery user interface that is selected as the background for the wake screen user interface and a home screen treatment option (e.g., smart color, smart gradient, mirror, etc.).

It should be understood that the particular order in which the operations in FIGS. 11A-11E have been described is merely example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., the methods 800 and 900) are also applicable in an analogous manner to method 1100 described above with respect to FIGS. 11A-11E. For example, the user inputs, user input gestures, media items, wake screen user interface, home screen user interface, backgrounds, and previews described above with reference to method 1100 optionally have one or more of the characteristics of the user inputs, user input gestures, media items, wake screen user interface, home screen user interface, backgrounds, and previews described herein with reference to other methods described herein (e.g., the methods 800 and 900) For brevity, these details are not repeated here.

The operations in the information processing methods described above are, optionally, implemented by running one or more functional modules in an information processing apparatus such as general-purpose processors (e.g., as described with respect to FIGS. 1A, 3, and 5A) or application specific chips. Further, the operations described above with reference to FIGS. 11A-11E, optionally, implemented by components depicted in FIGS. 1A and 1B. For example, the user inputs, user input gestures, media items, wake screen user interface, home screen user interface, backgrounds, and previews are, optionally, implemented by the event sorter 170, the event recognizer 180, and the event handler 190. The event monitor 171 in the event sorter 170 detects a contact on the touch-sensitive surface 451, and the event dispatcher module 174 delivers the event information to the application 136-1. A respective event recognizer 180 of the application 136-1 compares the event information to respective event definitions 186 and determines whether a first contact at a first location on the touch-sensitive surface corresponds to a predefined event or sub-event, such as selection of an object on a user interface. When a respective predefined event or sub-event is detected, the event recognizer 180 activates an event handler 190 associated with the detection of the event or sub-event. The event handler 190 optionally utilizes or calls the data updater 176 or the object updater 177 to update the application internal state 192. In some embodiments, the event handler 190 accesses a respective GUI updater 178 to update what is displayed by the application. Similarly, it would be clear to a person having ordinary skill in the art how other processes can be implemented based on the components depicted in FIGS. 1A and 1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:
   at a computing system including non-transitory memory and one or more processors, wherein the computing system is communicatively coupled to a display device, one or more input devices, and an image sensor:
      detecting, via the one or more input devices, a user input that corresponds to a request to set a respective media item as a background for a wake screen user interface; and
      in response to detecting the user input:
         in accordance with a determination that the user input corresponds to a request to set a first media item as a background for the wake screen user interface:
            setting a second media item that is different from the first media item as a background for a home screen user interface; and
            concurrently displaying, on the display device, a first preview of the first media item being used as a background for the wake screen user interface and the second media item being used as a background for the home screen user interface; and
         in accordance with a determination that the user input corresponds to a request to set a third media item as a background for the wake screen user interface, setting a fourth media item that is different from the third media item as a background for the home screen user interface.

2. The method of claim 1, wherein the second media item is generated based on the first media item, and wherein the fourth media item is generated based on the third media item.

3. The method of claim 2, wherein the second media item corresponds to a first solid color generated based on one or more visual properties of the first media item, and wherein the fourth media item corresponds to a second solid color generated based on one or more visual properties of the third media item.

4. The method of claim 2, wherein the second media item corresponds to a first color gradient selected based on one or more visual properties of the first media item, and wherein the fourth media item corresponds to a second color gradient generated based on one or more visual properties of the third media item.

5. The method of claim 4, wherein the first color gradient is generated using a subset of colors that are contained in the first media item, and wherein the second color gradient is generated using a subset of colors contained in the third media item.

6. The method of claim 2, wherein the second media item corresponds to a first pattern generated based on one or more visual properties of the first media item, and wherein the fourth media item corresponds to a second pattern generated based on one or more visual properties of the third media item.

7. The method of claim 1, further comprising:
   detecting, via the one or more input devices, a subsequent user input that corresponds to a request to set the third media item as the background for the wake screen user interface; and
   in response to detecting the subsequent user input, concurrently displaying, on the display device, a second preview of the third media item being used as the background for the wake screen user interface and the fourth media item being used as the background for the home screen user interface.

8. The method of claim 1, further comprising:
   while displaying the first preview, displaying, on the display device, a first affordance that, when selected, causes a current user interface with the first preview to be replaced with a media gallery editing user interface provided to edit a plurality of media items associated with a media gallery user interface, wherein the media gallery user interface includes the first and third media items.

9. The method of claim 1, further comprising:
   while displaying the first preview, displaying, on the display device, a second affordance that, when selected, causes a current user interface with the first preview to be replaced with a media gallery addition user interface provided to add one or more media items to a plurality of media items associated with a media gallery user interface, wherein the media gallery user interface includes the first and third media items.

10. A computing system comprising:
   one or more processors;
   a non-transitory memory;
   an interface for communicating with a display device, one or more input devices, and an image sensor; and
   one or more programs stored in the non-transitory memory, which, when executed by the one or more processors, cause the computing system to:

detect, via the one or more input devices, a user input that corresponds to a request to set a respective media item as a background for a wake screen user interface; and in response to detecting the user input:

in accordance with a determination that the user input corresponds to a request to set a first media item as a background for the wake screen user interface:

set a second media item that is different from the first media item as a background for a home screen user interface; and concurrently display, on the display device, a first preview of the first media item being used as a background for the wake screen user interface and the second media item being used as a background for the home screen user interface; and in accordance with a determination that the user input corresponds to a request to set a third media item as a background for the wake screen user interface, set a fourth media item that is different from the third media item as a background for the home screen user interface.

11. The computing system of claim 10, wherein the second media item is generated based on the first media item, and wherein the fourth media item is generated based on the third media item.

12. The computing system of claim 11, wherein the second media item corresponds to a first solid color generated based on one or more visual properties of the first media item, and wherein the fourth media item corresponds to a second solid color generated based on one or more visual properties of the third media item.

13. The computing system of claim 11, wherein the second media item corresponds to a first color gradient selected based on one or more visual properties of the first media item, and wherein the fourth media item corresponds to a second color gradient generated based on one or more visual properties of the third media item.

14. The computing system of claim 13, wherein the first color gradient is generated using a subset of colors that are contained in the first media item, and wherein the second color gradient is generated using a subset of colors contained in the third media item.

15. The computing system of claim 11, wherein the second media item corresponds to a first pattern generated based on one or more visual properties of the first media item, and wherein the fourth media item corresponds to a second pattern generated based on one or more visual properties of the third media item.

16. A non-transitory memory storing one or more programs, which, when executed by one or more processors of a computing system with an interface for communicating with a display device, one or more input devices, and an image sensor, cause the computing system to:

detect, via the one or more input devices, a user input that corresponds to a request to set a respective media item as a background for a wake screen user interface; and in response to detecting the user input:

in accordance with a determination that the user input corresponds to a request to set a first media item as a background for the wake screen user interface:

set a second media item that is different from the first media item as a background for a home screen user interface; and concurrently display, on the display device, a first preview of the first media item being used as a background for the wake screen user interface and the second media item being used as a background for the home screen user interface; and in accordance with a determination that the user input corresponds to a request to set a third media item as a background for the wake screen user interface, set a fourth media item that is different from the third media item as a background for the home screen user interface.

17. The non-transitory memory of claim 16, wherein the second media item is generated based on the first media item, and wherein the fourth media item is generated based on the third media item.

18. The non-transitory memory of claim 17, wherein the second media item corresponds to a first solid color generated based on one or more visual properties of the first media item, and wherein the fourth media item corresponds to a second solid color generated based on one or more visual properties of the third media item.

19. The non-transitory memory of claim 17, wherein the second media item corresponds to a first color gradient selected based on one or more visual properties of the first media item, and wherein the fourth media item corresponds to a second color gradient generated based on one or more visual properties of the third media item.

20. The non-transitory memory of claim 19, wherein the first color gradient is generated using a subset of colors that are contained in the first media item, and wherein the second color gradient is generated using a subset of colors contained in the third media item.

21. The non-transitory memory of claim 17, wherein the second media item corresponds to a first pattern generated based on one or more visual properties of the first media item, and wherein the fourth media item corresponds to a second pattern generated based on one or more visual properties of the third media item.

* * * * *